US012711723B1

(12) United States Patent
Bologna et al.

(10) Patent No.: US 12,711,723 B1
(45) **Date of Patent: *Aug. 18, 2026**

(54) FITMENT SYSTEM AND METHOD FOR DESIGNING A FOOTBALL HELMET

(71) Applicant: Riddell, Inc., Des Plaines, IL (US)

(72) Inventors: Vittorio Bologna, Des Plaines, IL (US); Joseph Levene, Des Plaines, IL (US)

(73) Assignee: Riddell, Inc., Des Plaines, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/598,955

(22) Filed: Mar. 7, 2024

Related U.S. Application Data

(60) Provisional application No. 63/450,642, filed on Mar. 7, 2023.

(51) Int. Cl.
*G06F 19/20* (2011.01)
*A63B 71/10* (2006.01)
*G06T 19/20* (2011.01)

(52) U.S. Cl.
CPC .............. *G06T 19/20* (2013.01); *A63B 71/10* (2013.01); *G06T 2219/2004* (2013.01)

(58) Field of Classification Search
None
See application file for complete search history.

(56) References Cited

U.S. PATENT DOCUMENTS 9,545,127 B1 1/2017 Sandifer
11,213,736 B2 * 1/2022 Bologna ................ A42C 2/002
11,399,589 B2 * 8/2022 Bologna ................ A42B 3/046
11,712,615 B2 8/2023 Bologna et al.
11,857,378 B1 * 1/2024 Bojarski ................ G06F 3/013
12,104,892 B2 10/2024 King
2012/0036620 A1 2/2012 Harris
2013/0211774 A1 8/2013 Bentley et al.
2014/0201889 A1 7/2014 Pietrzak et al.
2020/0188733 A1 * 6/2020 Beckwith ............ A42B 3/0433
2020/0215415 A1 * 7/2020 Bologna ................ A63B 71/10
2021/0055711 A1 * 2/2021 Pietrzak ................ A42C 2/007

(Continued)

FOREIGN PATENT DOCUMENTS

WO WO-2018072017 A1 * 4/2018 ............ A42B 3/124
WO WO-2025088277 A1 * 5/2025 ............ A42C 2/007

OTHER PUBLICATIONS

Ellena, Thierry, et al. "A design framework for the mass customisation of custom-fit bicycle helmet models." International Journal of Industrial Ergonomics 64 (2018): 122-133. (Year: 2018).*

(Continued)

*Primary Examiner* — Zhengxi Liu
(74) *Attorney, Agent, or Firm* — Barnes & Thornburg LLP

(57) ABSTRACT

A data collection, processing and fitment system for a protective sports helmet that is designed to improve: (i) the comfort and fit of the helmet, (ii) the efficiency of the design, selection and build process, and (iii) how the helmet responds when an impact or series of impacts are received by the helmet when worn by a player. In general terms, the system selects a combination of pre-manufactured energy attenuation components from a larger collection of pre-manufactured energy attenuation components that best fit the head of the player that will wear the helmet based upon data collected from the player.

22 Claims, 109 Drawing Sheets

(56) References Cited

U.S. PATENT DOCUMENTS

| | | | | |
|---|---|---|---|---|
| 2021/0283855 | A1* | 9/2021 | Bologna | A61B 5/6803 |
| 2023/0354944 | A1* | 11/2023 | Petre | A42B 3/127 |
| 2024/0296259 | A1* | 9/2024 | Bologna | A42C 2/007 |

OTHER PUBLICATIONS

Van Den Bosch, Henricus Lambertus Antonius. "Crash helmet testing and design specifications." (2006). (Year: 2006).*

Zhang, Jie, et al. "Customize my helmet: A novel algorithmic approach based on 3D head prediction." Computer-Aided Design 150 (2022): 103271. (Year: 2022).*

Chang, Chia-Yuan, Chih-Hsiang Ho, and San-Yi Chang. "Design of a Helmet." ME 499 (2003): 599. (Year: 2003).*

Zuckerman, Scott L., et al. "A football helmet prototype that reduces linear and rotational acceleration with the addition of an outer shell." Journal of neurosurgery 130.5 (2018): 1634-1641. (Year: 2018).*

Meyer, David G., and John Hauser. "Modeling and exploration of an active helmet design." 2013 American Control Conference. IEEE, 2013. (Year: 2013).*

Tan, Long Bin, et al. "Performance of an advanced combat helmet with different interior cushioning systems in ballistic impact: Experiments and finite element simulations." International Journal of Impact Engineering 50 (2012): 99-112. (Year: 2012).*

Johnston, James M., et al. "Simulation, fabrication and impact testing of a novel football helmet padding system that decreases rotational acceleration." Sports Engineering 18.1 (2015): 11-20. (Year: 2015).*

* cited by examiner

PLAYER BODY PART DATA MAY INCLUDE:

- A POINT OR COORDINATE IN 2D SPACE
- A POINT OR COORDINATE IN 3D SPACE
- A LOCUS IN 2D SPACE
- A LOCUS IN 3D SPACE
- A LINE IN 2D SPACE
- A LINE IN 3D SPACE
- A PLURALITY OF POINTS OR COORDINATES IN 2D SPACE
- A PLURALITY OF POINTS OR COORDINATES IN 3D SPACE
- A PLURALITY OF LOCI IN 2D SPACE
- A PLURALITY OF LOCI IN 3D SPACE
- A PLURALITY OF LINES IN 2D SPACE
- A PLURALITY OF LINES IN 3D SPACE (E.G., WIRE-FRAME, WHICH ADJACENT POINTS USING LINE SEGMENTS))
- PARTIAL SURFACE IN 2D SPACE
- PARTIAL SURFACE IN 3D SPACE
- A PLURALITY PARTIAL SURFACES IN 2D SPACE
- A PLURALITY PARTIAL SURFACES IN 3D SPACE
- COMPLETE SURFACE IN 2D SPACE
- COMPLETE SURFACE IN 3D SPACE
- SPATIAL DATA DESCRIBED IN U.S. PATENT NOS. 10,159,296, 11,033,796, 11,167,198, 11,399,589, U.S. PATENT PROVISIONAL NOS. 62/719,130, 62/770,453, 63/242,010, AND/OR PCT/US22/42966
- ANY OTHER DATA TYPE DESCRIBED WITHIN THIS APPLICTION

5010.2
$S_A$
5010.4
$S_B$
5010.6
$S_C$
5010.8
$S_D$
5010.10
$S_E$
Size
400.4.4
2400.2
$S_J$
2400.4
$S_K$
2400.6
$S_L$
2400.8
$S_M$
2400.10
$S_N$
Size
400.4.2
$D_{S1}$
$D_{S2}$
$D_{S3}$
$D_{S4}$
$D_{S5}$
Data Set
$D_{PS} = 13$
400.4
180.99

209.2.99
207.2.99
207.4.99
209.4.99
2
410
200.99
180.99

| | CONFIGURATION | FRONT | CROWN | REAR | OCCIPITAL | SIDE | JAW |
|---|---|---|---|---|---|---|---|
| SMALL | 0 | SUF0 | SC0 | SR0 | SO0 | SS0 | SJ0 |
| | 1 | SUF1 | SC1 | SR1 | SO1 | SS1 | SJ1 |
| | 2 | SUF2 | SC2 | SR2 | | SS2 | SJ2 |
| | 3 | SUF3 | SC3 | SR3 | | SS3 | SJ3 |
| | 4 | SUF4 | SC4 | SR4 | | SS4 | SJ4 |
| | 5 | | SC5 | SR5 | | | SJ5 |
| | 6 | | SC6 | SR6 | | | SJ6 |
| | 7 | | SC7 | | | | SJ7 |
| MEDIUM | 0 | MUF0 | MC0 | MR0 | MO0 | MS0 | MJ0 |
| | 1 | MUF1 | | MR1 | MO1 | MS1 | MJ1 |
| | 2 | MUF2 | | MR2 | MO2 | MS2 | MJ2 |
| | 3 | MUF3 | | MR3 | | MS3 | MJ3 |
| | 4 | | | MR4 | | MS4 | MJ4 |
| | 5 | | | MR5 | | MS5 | MJ5 |
| | 6 | | | | | | |
| | 7 | | | | | | |
| LARGE | 0 | LUF0 | LC0 | LR0 | LO0 | LS0 | LJ0 |
| | 1 | LUF1 | LC1 | LR1 | LO1 | LS1 | LJ1 |
| | 2 | LUF2 | LC2 | LR2 | LO2 | LS2 | LJ2 |
| | 3 | LUF3 | LC3 | LR3 | LO3 | | LJ3 |
| | 4 | LUF4 | LC4 | | LO4 | | LJ4 |
| | 5 | LUF5 | | | LO5 | | LJ5 |
| | 6 | LUF6 | | | | | LJ6 |
| | 7 | | | | | | LJ7 |

$$SD = HD + (VPT_1 \ldots . VPT_X + (FPT - IFT))$$

FIG. 63

$$\sqrt{(S[X]^2 - O[X]^2) + (S[Y]^2 - O[Y]^2) + (S[Z]^2 - O[Z]^2)}$$
$$= \sqrt{(H[X]^2 - O[X]^2) + (H[Y]^2 - O[Y]^2) + (H[Z]^2 - O[Z]^2)}$$
$$+ \left(\sqrt{(VO_1[X]^2 - VI_1[X]^2) + (VO_1[Y]^2 - VI_1[Y]^2) + (VO_1[Z]^2 - VI_1[Z]^2)}\right.$$
$$\cdots \sqrt{(VO_x[X]^2 - VI_x[X]^2) + (VO_x[Y]^2 - VI_x[Y]^2) + (VO_x[Z]^2 - VI_x[Z]^2)}$$
$$+ \left(\left(\sqrt{(H[X]^2 - FI[X]^2) + (H[Y]^2 - FI[Y]^2) + (H[Z]^2 - FI[Z]^2)}\right.\right.$$
$$\left. + \sqrt{(FO[X]^2 - H[X]^2) + (FO[Y]^2 - H[Y]^2) + (FO[Z]^2 - H[Z]^2)}\right)$$
$$\left.\left. - \sqrt{(H[X]^2 - FI[X]^2) + (HO[Y]^2 - FI[Y]^2) + (HO[Z]^2 - FI[Z]^2)}\right)\right)$$

FITMENT SYSTEM AND METHOD FOR DESIGNING A FOOTBALL HELMET

CROSS-REFERENCE TO RELATED APPLICATIONS

This application claims priority from U.S. Provisional Patent Application No. 63/450,642, which is incorporated herein by referenced and made a part hereof.

TECHNICAL FIELD

The invention relates to a spatial data collection, processing and fitment system for protective sports equipment, such as a protective sports helmet, that improves: (i) the comfort and/or fit of protective sports equipment, (ii) the efficiency of the design, selection and build process of the protective sports equipment, and (iii) impact-related performance of the protective sports equipment, including how the equipment responds when an impact or series of impacts are received by the equipment when worn by a player. For example, the disclosed spatial data collection, processing and fitment system facilitates the design and manufacture of a protective sports helmet by selecting a specific combination of pre-manufactured components (e.g., internal energy attenuation components) from amongst pluralities of pre-manufactured components (e.g., a larger group of internal energy attenuation components) based upon spatial head data that is collected from a specific player that will wear the helmet during the course of playing a contact sport (e.g., American football, hockey, or lacrosse) or engaged in a helmeted sporting activity (e.g., motorcycling, mountain biking, cycling, motorsports and hiking).

BACKGROUND OF THE INVENTION

Protective sports helmets, including those worn during the play of a contact sports, such as football, hockey, and lacrosse, typically include an outer shell, an internal pad assembly coupled to an interior surface of the shell, a faceguard or face mask, and a chin protector or strap that releasably secures the helmet on the player's or wearer's head. However, most, if not all, traditional protective sports helmets do not use advanced techniques to select certain components that best fits the player's anatomical features from a plurality of pre-manufactured components to generate a protective sports helmet that best fits the player's anatomical features.

The description provided in the background section should not be assumed to be prior art merely because it is mentioned in or associated with the background section. Furthermore, the background section may describe one or more aspects of the inventive system and technology.

BRIEF DESCRIPTION OF THE DRAWINGS

The drawing figures depict one or more implementations in accord with the present teachings, by way of example only, not by way of limitation. In the figures, like reference numerals, refer to the same or similar elements.

FIGS. 5A-5B are flow charts of a portion of the spatial data collection, processing and fitment system, which includes the player body part data and how said player body part data may be collected using various data collection apparatuses;

FIG. 63 shows a first equation that may be used to select a component from a plurality of components using the body part model selection methodology of the spatial data collection, processing and fitment system;

FIG. 64 shows a second equation that may be used to select a component from a plurality of components using the body part model selection methodology;

FIG. 99 is a perspective view of a second human torso protective assembly designed from the spatial data collection, processing and fitment system, wherein said second human torso protective assembly includes an outer protective assembly and an inner energy attenuation assembly that has been specifically selected for a second player's torso based on data collected of the second player;

FIGS. 100A-100E are perspective views of five distinct configurations of an upper left energy attenuation components of the inner energy attenuation assembly to be installed within the human torso protective assembly;

FIG. 101A is a right view of the upper left energy attenuation components of the inner energy attenuation assembly to be installed within the human torso protective assembly, wherein the five configurations of the upper left components shown in FIGS. 100A-100E have been vertically stacked to illustrate different respective configurations amongst those components;

FIG. 101B is a cross-section view of the upper left energy attenuation components of the inner energy attenuation taken along line 101B-101B of FIG. 101A;

FIG. 102A is a front view of the upper left energy attenuation components of the inner energy attenuation assembly to be installed within the human torso protective assembly, wherein the five configurations of the upper left components shown in FIGS. 100A-100E have been vertically stacked to illustrate different respective configurations amongst those components;

FIG. 102B is a cross-section view of the upper left energy attenuation components of the inner energy attenuation taken along line 102B-102B of FIG. 102A;

FIG. 103 is a front view of a player having a plurality of anthropometric points positioned and denoted on said player's body;

FIG. 104 is a front view of a body part model having a plurality of anthropometric points positioned on said model and measurements associated with said anthropometric points;

FIG. 105 is a left side view of a body part model having a plurality of anthropometric points positioned on said model and measurements associated with said anthropometric points;

FIG. 106 shows an exemplary motorsports helmet designed from the spatial data collection, processing and fitment system;

FIG. 107 shows a first embodiment of a cycling helmet designed from the spatial data collection, processing and fitment system;

FIG. 108-109 shows a second embodiment of a cycling helmet designed from the spatial data collection, processing and fitment system;

Figure 110:
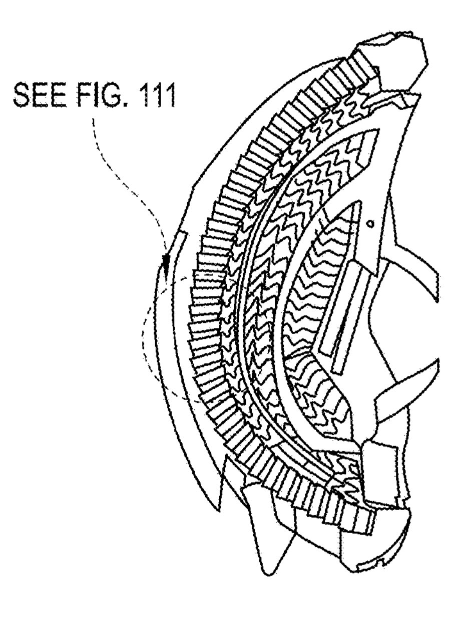
Figure 111:
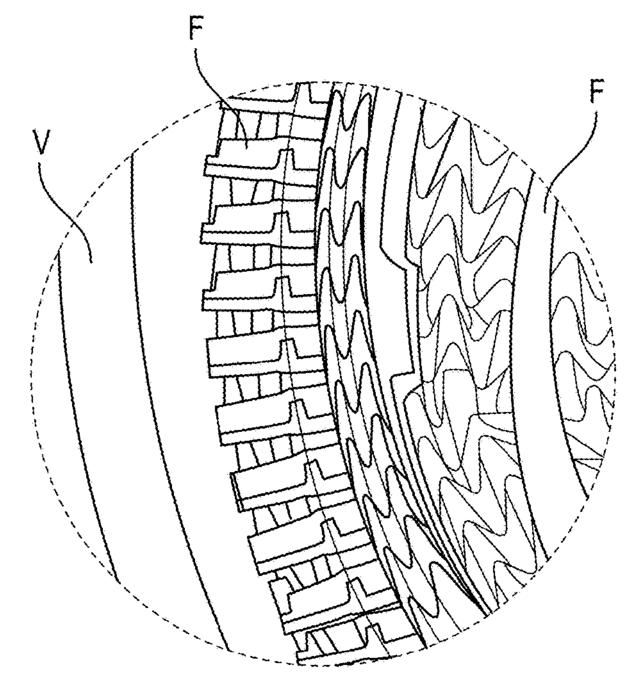
Figure 112:
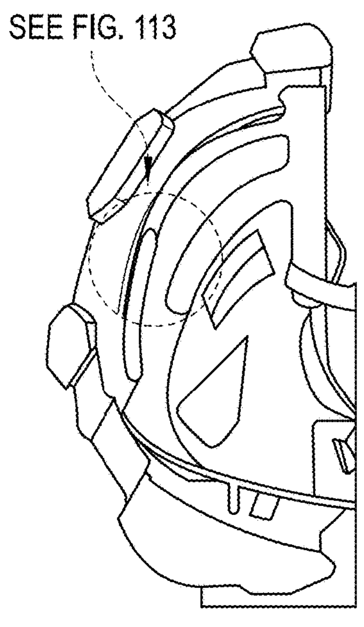
Figure 113:
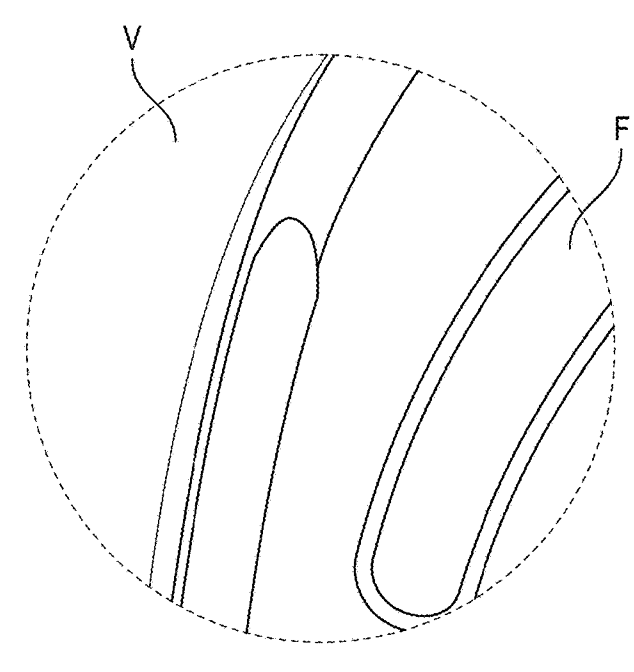
Figures 114, 115, 116:
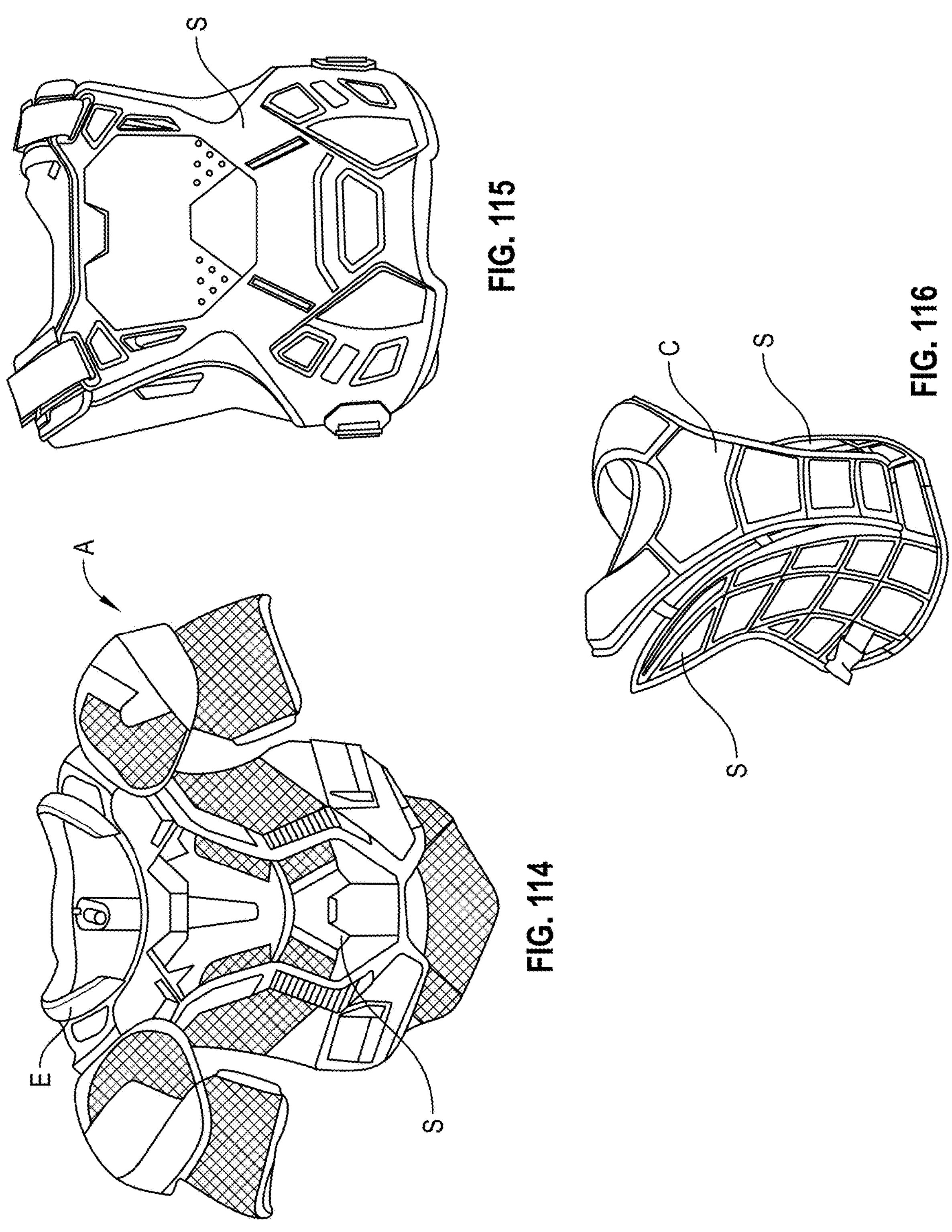
Figures 117, 118, 119A, 119B:
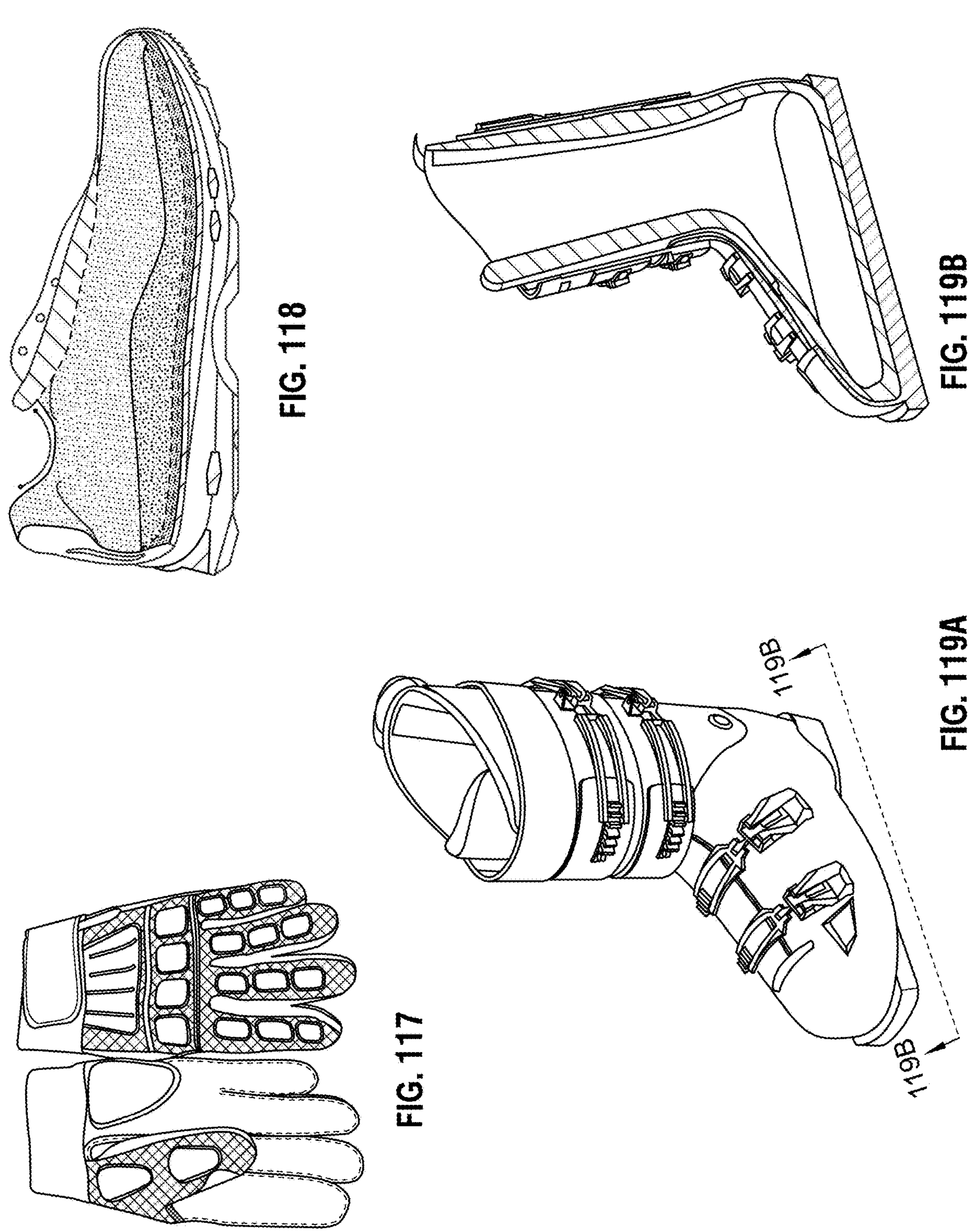
Figures 120, 121, 122:
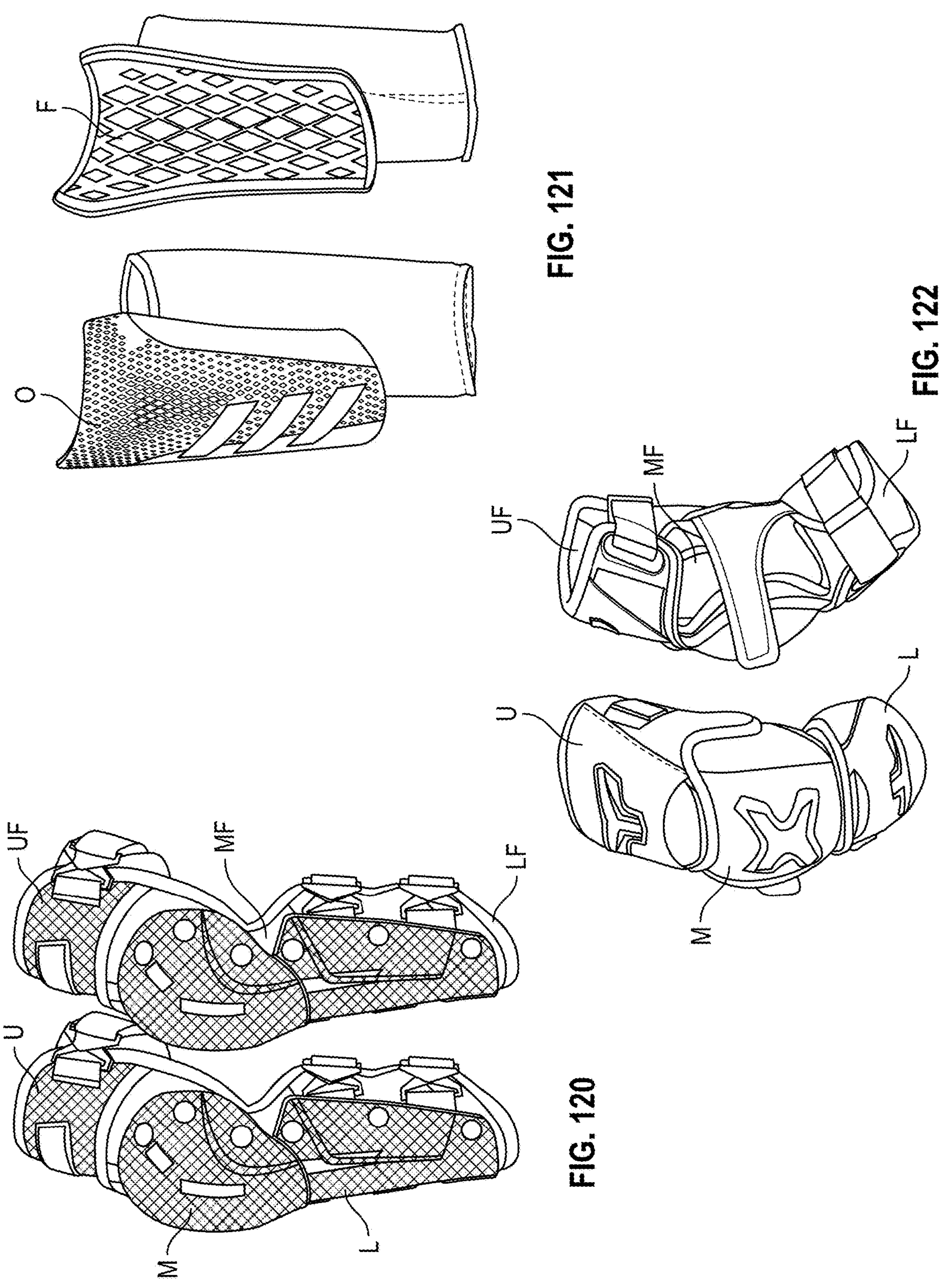

FIG. 110-111 shows a third embodiment of a cycling helmet designed from the spatial data collection, processing and fitment system;

FIG. 112-113 shows a fourth embodiment of a cycling helmet designed from the spatial data collection, processing and fitment system;

FIG. 114 shows a first embodiment of a chest protector designed from the spatial data collection, processing and fitment system;

FIG. 115 shows a second embodiment of a chest protector designed from the spatial data collection, processing and fitment system;

FIG. 116 shows a third embodiment of a chest protector designed from the spatial data collection, processing and fitment system;

FIG. 117 shows a pair of gloves designed from the spatial data collection, processing and fitment system;

FIG. 118 shows a shoe designed from the spatial data collection, processing and fitment system;

FIG. 119A shows a ski boot designed from the spatial data collection, processing and fitment system;

FIG. 119B is a cross-sectional view of the ski boot taken along the 119B-119B line of FIG. 119A;

FIG. 120 shows a first embodiment of a leg or shin guard designed from the spatial data collection, processing and fitment system;

FIG. 121 shows a second embodiment of a leg or shin guard designed from the spatial data collection, processing and fitment system; and FIG. 122 shows a pair of elbow pads designed from the spatial data collection, processing and fitment system.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts may be performed in a different order. Accordingly, the drawings, flow charts and detailed description are to be regarded as illustrative in nature, not restrictive or limiting.

A. INTRODUCTION

This application discloses an inventive spatial data collection, processing and fitment system 10 for protective sports equipment, where the system 10 is purposely designed to improve: (i) the comfort and fit of the protective sports equipment, (ii) the efficiency of the design, selection and build process of the protective sports equipment, and (iii) impact-related performance of the protective sports equipment, including how the protective sports equipment responds when an impact or series of impacts are received by the protective sports equipment when worn by a player. To accomplish these improvements, the system 10 selects at least one, and preferably a combination of, pre-manufactured component, assembly, or product from amongst a larger group or pluralities of pre-manufactured components, assemblies, or products based upon spatial data collected from a specific player that will wear the protective sports equipment while engaged in the sports activity. As detailed below, the system 10 obtains spatial data from a player and then uses one of the disclosed methods to select an optimal pre-manufactured component, assembly, product, or combination thereof that "best fit" the player's body part. In an embodiment discussed in detail below, the spatial data collection, processing and fitment system facilitates the design and manufacture of a protective sports helmet by selecting a specific combination of pre-manufactured components (e.g., internal energy attenuation components) from pluralities of pre-manufactured components (e.g., a larger group of internal energy attenuation components) based upon spatial head data that is collected from a specific player that will wear the helmet during the course of playing the contact sport.

In one embodiment, the optimal pre-manufactured component, combination of pre-manufactured components, pre-manufactured assembly, combination of pre-manufactured assemblies, or product that "best fit" the player's body part provides a "desirable interference fit" between: (i) the selected pre-manufactured component, combination of pre-manufactured components, pre-manufactured assembly, combination of pre-manufactured assemblies, or product, and (ii) the player's body part (e.g., the player's head H) against which the protective sports equipment (e.g., helmet) is worn by the player. The desirable interference fit ("IF") is not a random number or concept; instead, it is predefined and specifically tailored by the designer of the protective sports equipment to ensure that a sufficient amount of pressure is selectively and purposely applied to regions of the player's body part. In one embodiment, the helmet is designed with a first interference fit IF that results in the application of a first amount of pressure to a first region of the player's head when said helmet is worn in a pre-impact state, wherein said first amount of pressure is: (i) less than a predetermined maximum value (e.g. 10 psi), and (ii) more than a predetermined minimum value (e.g., 0.25 psi). In order to achieve the desired interference fit IF and apply said first amount of pressure on the player's body part, the optimal pre-manufactured component, combination of pre-manufactured components, pre-manufactured assembly, combination of pre-manufactured assemblies, or product are designed to be pre-compressed, to a certain degree, when said helmet is worn by the player in said pre-impact state. Said helmet may also be designed with a second interference fit IF that results in the application of a second amount of pressure to a second region of the player's head when said helmet is worn in the pre-impact state, wherein said second amount of pressure is: (i) less than a predetermined maximum value (e.g. 10 psi), and (ii) not above a predetermined minimum value (e.g., 0.25 psi). Additionally, said helmet may also be designed with a third interference fit IF that results in the application of a third amount of pressure to a third region of the player's head when said helmet is worn in the pre-impact state, wherein said third amount of pressure is between the first amount of pressure and second amount of pressure. In another embodiment, the protective sports equipment is designed not to apply a first amount of pressure to the player's body part when said protective sports equipment is worn in a pre-impact state. In both of these embodiments, it is desirable to configure the protective sports equipment to ensure that said protective sports equipment does not apply pressure to the player's body part that is greater than the predetermined maximum value (e.g. 10 psi).

Once the optimal pre-manufactured component, combination of pre-manufactured components, pre-manufactured assembly, combination of pre-manufactured assemblies, or product that "best fit" the player is selected, then this information is uploaded into a database and may be assigned a unique player ID number. The physical protective equipment can be ordered for a player using the unique player ID number. Once the order is received by the designer/manufacturer, the physical equipment can be designed, built and shipped to the player based upon the optimal combination of pre-manufactured components that "best fit" the player. In addition, the configuration of the protective sports equipment, including the optimal pre-manufactured component, combination of pre-manufactured components, pre-manufactured assembly, combination of pre-manufactured assemblies, or product, may be altered based upon new player data has been uploaded into a database when the player's anatomical features have changed over time. Thus, the protective sports equipment may be reconfigured for the same player as he/she grows over time. Furthermore, the configuration of the protective sports equipment, including the optimal pre-manufactured component, combination of pre-manufactured components, pre-manufactured assembly, combination of pre-manufactured assemblies, or product, may be revised if the same protective sports equipment (e.g., helmet) is transferred or reassigned from a first or original player to a second or subsequent player, where the second player has anatomical features that are different than the first player, and the second player has provided player data. As such, the protective sports equipment may be reconfigured in a timely and cost-effective manner for the second player that has been assigned protective sports equipment that was previously used by the first player.

It should be understood that the system 10 and methods disclosed herein provide an unconventional solution to the problem of trying to select a pre-manufactured component, combination of pre-manufactured components, pre-manufactured assembly, combination of pre-manufactured assemblies, or product that best fits the player's anatomical features. This unconventional system 10 and the solution it provides is rooted in technology and provides information that was not available in conventional systems. This unconventional system 10 also represents an improvement in the subject technical field otherwise unrealized by conventional systems. Specifically, unlike conventional systems, the system 10 and methods disclosed herein determines what pre-manufactured component (e.g., energy attenuation component or helmet shell), combination of pre-manufactured components (e.g., energy attenuation components), pre-manufactured assembly (e.g., energy attenuation assembly), combination of pre-manufactured assemblies (e.g., energy attenuation members), best fit the player out of millions, if not billions, of possible combinations of pre-manufactured component, combination of pre-manufactured components, pre-manufactured assembly, combination of pre-manufactured assemblies. The methods disclosed herein are operationally linked and tied to the system 10, which ensures that the disclosed methods cannot preempt all uses of these methods beyond the system 10. Also, as detailed below, these complicated methods involve numerous highly detailed steps and cannot be accurately performed using a pen and paper or within the human mind. Additionally, the system 10 provides multiple improvements over conventional systems, including rapidly and properly fitting the player with protective sports equipment.

B. AMERICAN FOOTBALL HELMETS (FIGS. 1A-2B)

While the disclosed system 10 may be used to configure, design, build, and/or ship any type of protective sports equipment, said system 10 may be used to build an American football helmet 5000 that includes a helmet shell 5010 and an energy attenuation assembly 3000. The energy attenuation assembly 3000 is installed within the helmet shell 5010 and features: (i) a fixed layer 4000 configured to be positioned adjacent to the player's head H such that it overlies a substantial majority of the player's head H, and (ii) a variable layer 2000 positioned between the fixed layer 4000 and an inner surface of the helmet shell 5010. In the American football helmet 5000, the fixed layer 4000: (i) has the same configuration and layout for all player's regardless of head topography, (ii) features a substantially uniform compression deflection ("CD") ratio, as measured on a regional basis of the fixed layer 4000 or throughout the entirety of the fixed layer 4000, and (iii) may include: a front fixed component 4100, a crown fixed component 4200, a rear fixed component 4300 and opposed left and right side fixed components 4400*a, b*. In contrast, the variable layer 2000: (i) does not have the same configuration and layout for all player's regardless of head topography, (ii) features a CD ratio that is considerably greater than the fixed layer 4000, and (iii) may include: a lower front variable component 2100, a upper front variable component 2200, rear variable component 2400, occipital variable component 2500, side variable component 2600*a, b* and a frontal boss variable component 2700*a, b*.

Figures 1A, 1B:
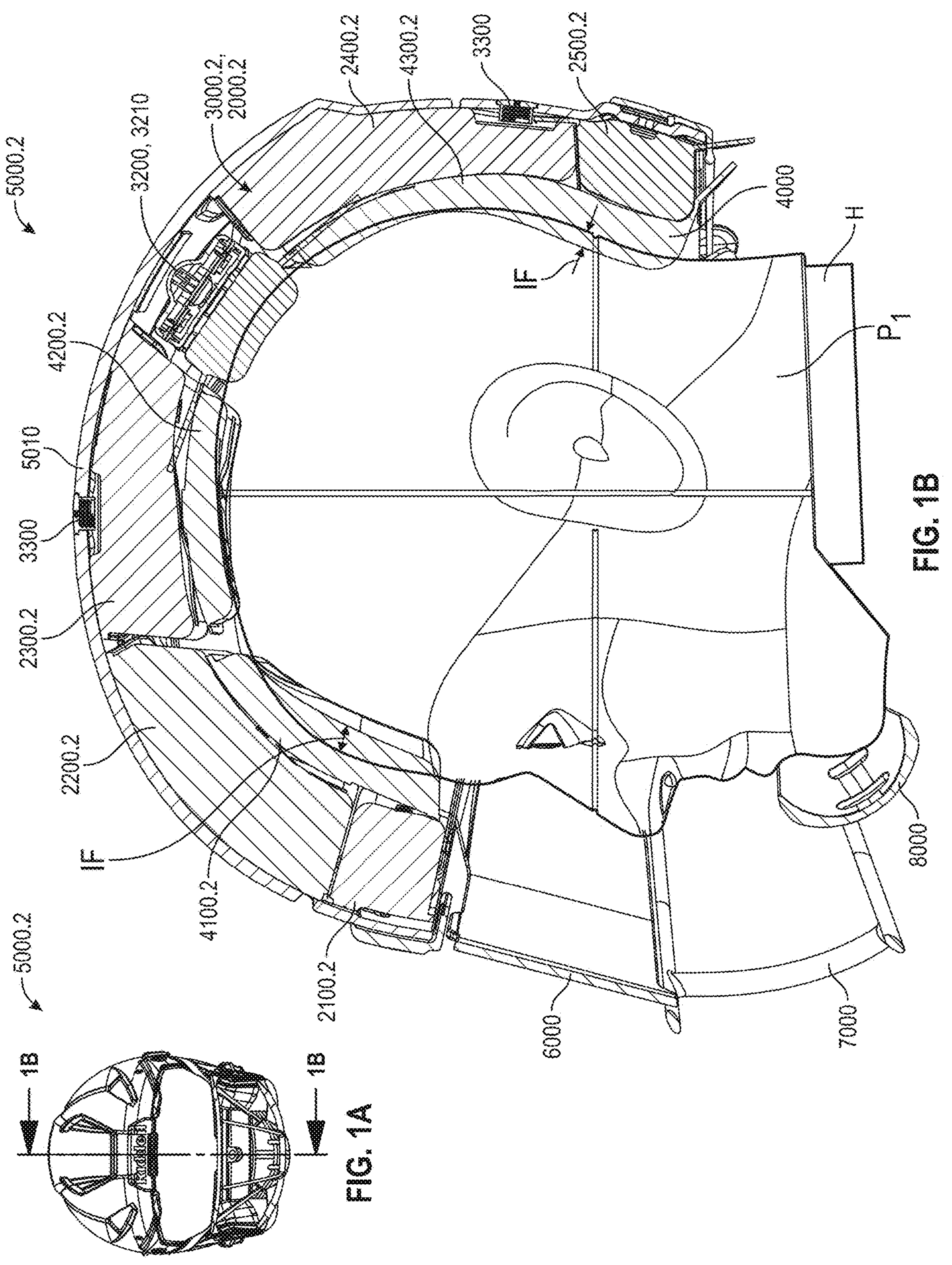
FIG. 1A is a front view of a first player's head positioned in a first protective sports helmet designed from a spatial data collection, processing and fitment system, wherein said first protective sports helmet includes a helmet shell and an energy attenuation assembly that has been specifically selected for the first player's head based on data collected of the first player.
FIG. 1B is a cross-sectional view of the protective sports helmet of FIG. 1A taken along line 1B-1B, showing (i) a fixed layer, and (ii) a variable layer, wherein the fixed layer resides against the player's head and the variable layer resides between the fixed layer and the helmet shell.
Figures 2A, 2B:
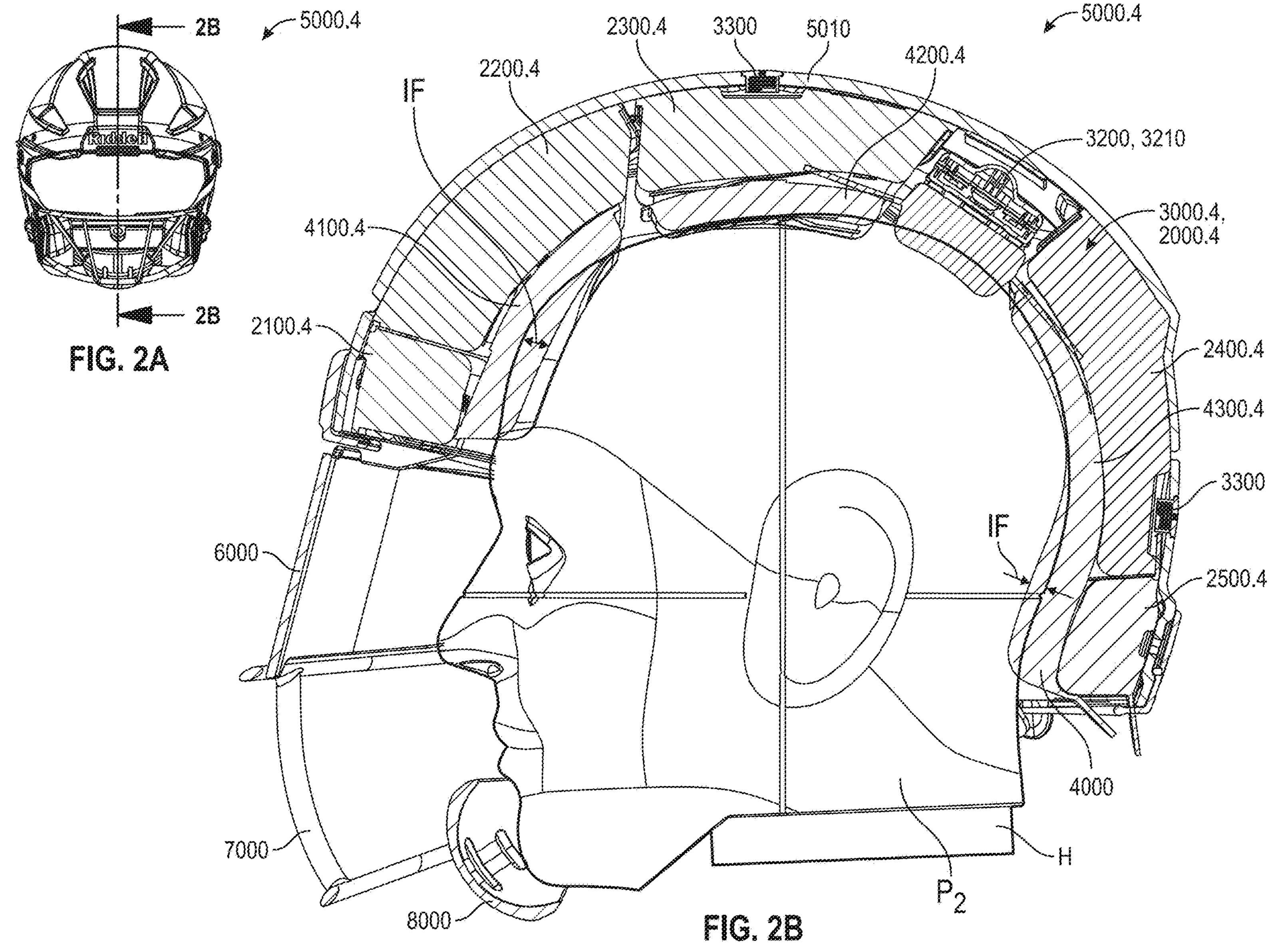
FIG. 2A is a front view of a second player's head positioned in a second protective sports helmet designed from the spatial data collection, processing and fitment system, wherein said second protective sports helmet includes a helmet shell and an energy attenuation assembly that has been specifically selected for the second player's head based on data collected from the second player.
FIG. 2B shows a cross-sectional view of FIG. 2A taken along line 2B-2B, showing (i) a fixed layer, and (ii) a variable layer, wherein the fixed layer resides against the player's head and the variable layer resides between the fixed layer and the helmet shell.

FIGS. 1A-2B show two exemplary American football helmets 5000.2, 5000.4 that are designed, selected and built for two different players—first player $P_1$ and second player $P_2$—using the disclosed system 10. Specifically, FIGS. 1A-1B show a first American football helmet 5000.2 that includes a first helmet shell 5010 and a first energy attenuation assembly 3000.2, with a first fixed layer 4000 and first variable layer 2000.2, that has been specifically selected and configured with an optimal combination of selected pre-manufactured components for a first player $P_1$ based upon data collected from said first player $P_1$. Additionally, FIGS. 2A-2B show a second exemplary American football helmet 5000.4 that includes a helmet shell 5010 and a second energy attenuation assembly 3000.4, with a fixed layer 4000 and second variable layer 2000.4, that has been specifically selected and configured with an optimal combination of selected pre-manufactured components for a second player $P_2$ based upon data collected from said second player $P_2$. These exemplary American football helmets 5000.2, 5000.4 include the same helmet shells 5010 but different energy attenuation assemblies 3000.2, 3000.4, wherein: (i) the fixed layers 4000 are the same, and (ii) the variable layers 2000.2, 2000.4 are different, as each helmet 5000.2, 5000.4 includes: (a) the same lower front components 2100.2, 2100.4, (b) the same crown components 2300.2, 2300.4, (c) different upper front variable components 2200.2, 2200.4, (d) different rear variable components 2400.2, 2400.4, and (e) different occipital variable components 2500.5, 2500.4. Moreover, the system 10 selected: (i) the same pre-manufactured helmet shells 5010 from the plurality of pre-manufactured helmet shells 5010 for the first and second players because their general head sizes are similar, (ii) the same pre-manufactured fitting layer 4000 for the first and second players because all players receive the same fitting layer 4000 within a given helmet shell size, and (iii) different variable layers 2000.2, 2000.4 based upon an optimal combination of selected pre-manufactured components because the general shape of the first player's $P_1$ head H is different than the general shape of the second player's $P_2$ head H.

As shown in FIGS. 1B and 2B, the fixed layer 4000 is positioned adjacent the player's head H and the variable layer 2000 is positioned adjacent to the inner surface of the helmet shell 5010. This orientation is opposite of typical conventional football helmets and is beneficial because all players are positioned within a fixed layer 4000, which simplifies the design and selection of the optimal combination of the pre-manufactured helmet components for the specific player. Also, when the helmet is in a "helmet worn, but pre-impact state," the fixed layer 4000 is preferably: (i) compressed at least a minimum amount in certain regions (e.g., 2.5 mm) to provide an interference fit ("IF") on the player's head H, and not compressed any amount in other regions (e.g., 0 mm). Additionally, the variable layer 2000 is not compressed or only nominally compressed in comparison to the fixed layer 4000. The orientation of the fixed layer 4000 and the variable layer 2000 also eliminates the need to perform complex pressure-related calculations and detailed analysis of each energy attenuation component or member having different CD ratios in the energy attenuation assembly, which are required by certain conventional football helmets. Elimination of these calculations and analysis is beneficial because they are time consuming and prone to errors that can compromise the performance, fit and feel of the energy attenuation assembly. Finally, by positioning the variable layer 2000 between the fixed layer 4000 and the shell 5010, the designer of the system 10 may adjust or change the number and/or configuration of energy attenuation components that are included in the variable layer 2000 without requiring additional modifications to the helmet 5000 to accept the altered configuration of the variable layer 2000.

In the exemplary embodiment shown in the Figures, the energy attenuation assembly 3000 of the American football helmet 5000 includes an optimal combination of selected energy attenuation components but they are distinctly configured such that they are not interchangeable with each other. For example, the crown energy attenuation member 3050 comprises a fixed crown component 4200 and a variable crown component 2300 that are distinctly designed and configured such that they can only be installed in the crown region of the shell 5010; the crown components 4200, 2300 are not suitable for installation in other regions of the shell 5010. The fixed layer 4000 and the variable layer 2000, and the energy attenuation components thereof, have distinct configurations and curvatures that provide the inventive energy attenuation assembly 3000 with improved energy attenuation performance when an impact is received by the shell 5010. The distinct configuration and curvature of the rear energy attenuation member 3100 of the inventive energy attenuation assembly 3000 are particularly important in the player's occipital head region. Also, the distinctly configured and curved fixed layer 4000 and variable layer 2000, and the energy attenuation components thereof, obviate the need to insert separate "form liners", shims or energy attenuation component wedges into the energy attenuation assembly 3000 to improve fit and comfort and/or performance of the energy attenuation assembly 3000.

C. DEFINITIONS

This section identifies a number of terms and definitions that are used throughout the Application. The term "player" is a person who wears the equipment (e.g., protective sports helmet) while engaged in practice or game play of the sport. The term "equipment wearer" or "wearer" is a player who is wearing the equipment. The term "designer", "manufacturer" or "operator" is a person who utilizes the inventive system 10 to designs, test, or manufacture the equipment.

Figures 68A, 68B, 68C, 68D, 68E:
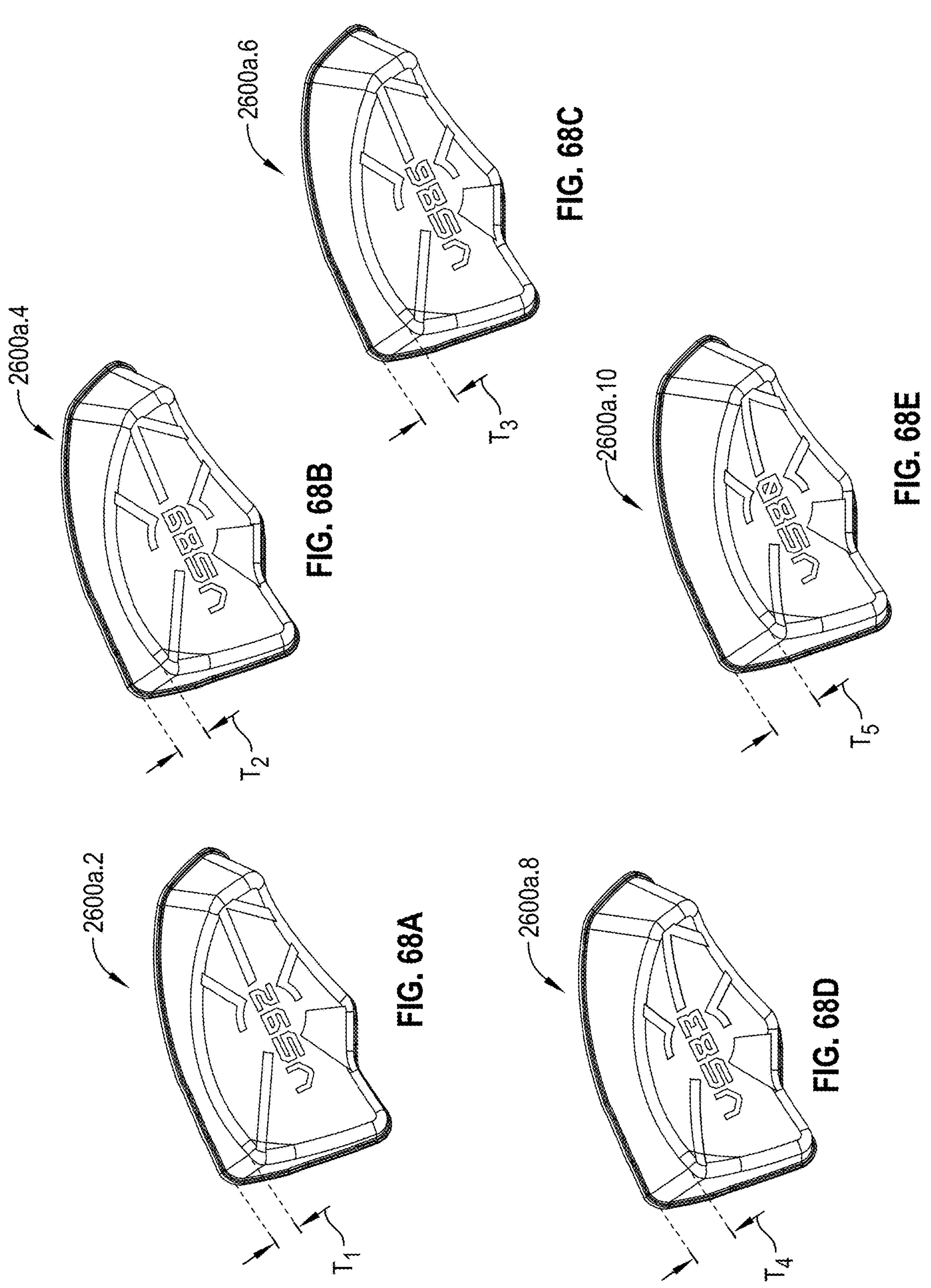
FIGS. 68A-68E are perspective views of five distinct configurations of a left side component of the variable layer of the energy management assembly to be installed within the protective sports helmet.
Figures 69, 70:
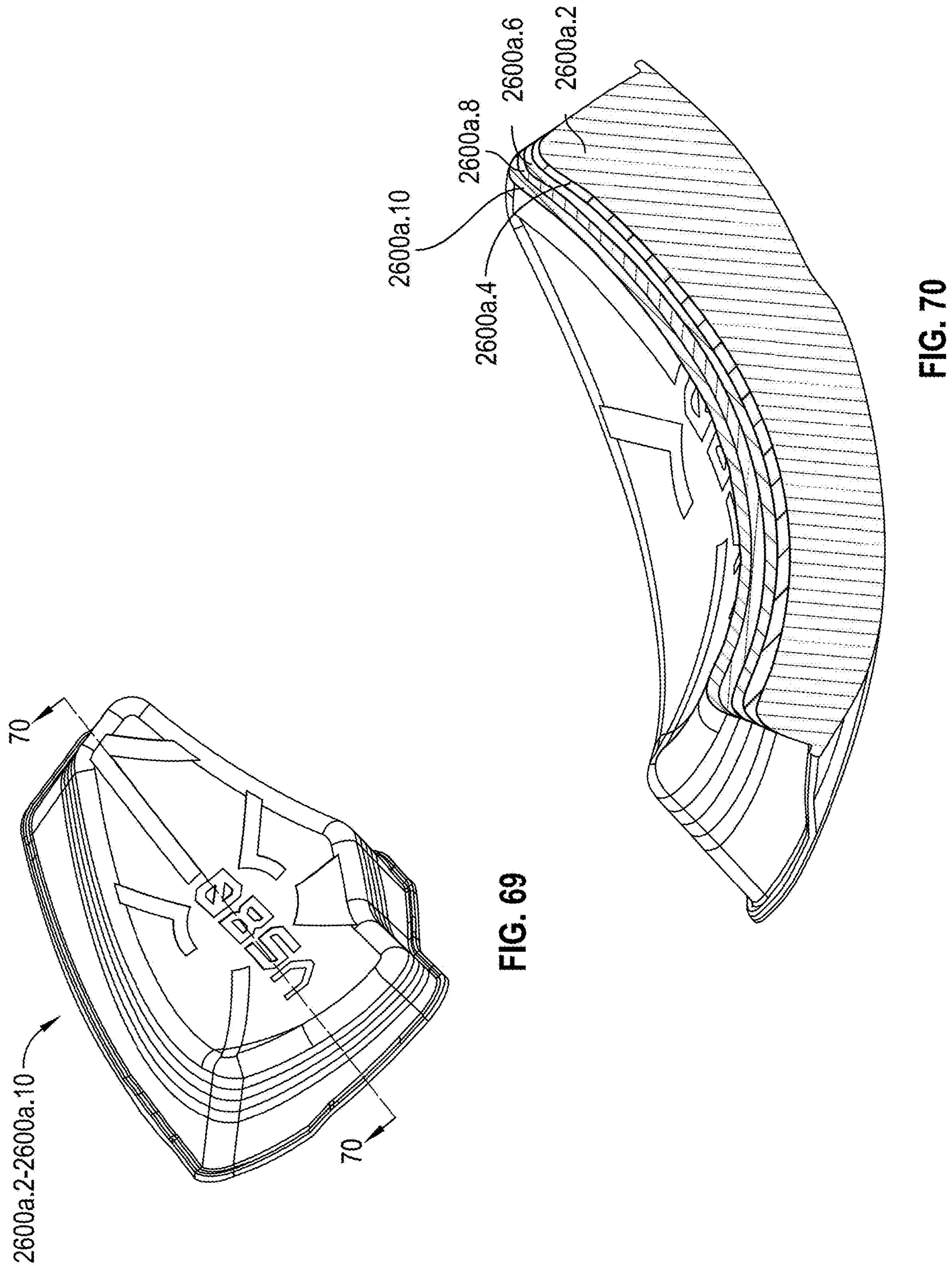
FIG. 69 is a perspective view of the left side components of the variable layer of the energy management assembly to be installed within the protective sports helmet, wherein the five configurations of the left side components of the variable layer shown in FIGS. 68A-68E have been vertically stacked to illustrate different respective thicknesses amongst those components.
FIG. 70 is a cross-section view of the left side components of the variable layer taken along line 70-70 of FIG. 69.
Figures 71, 72:
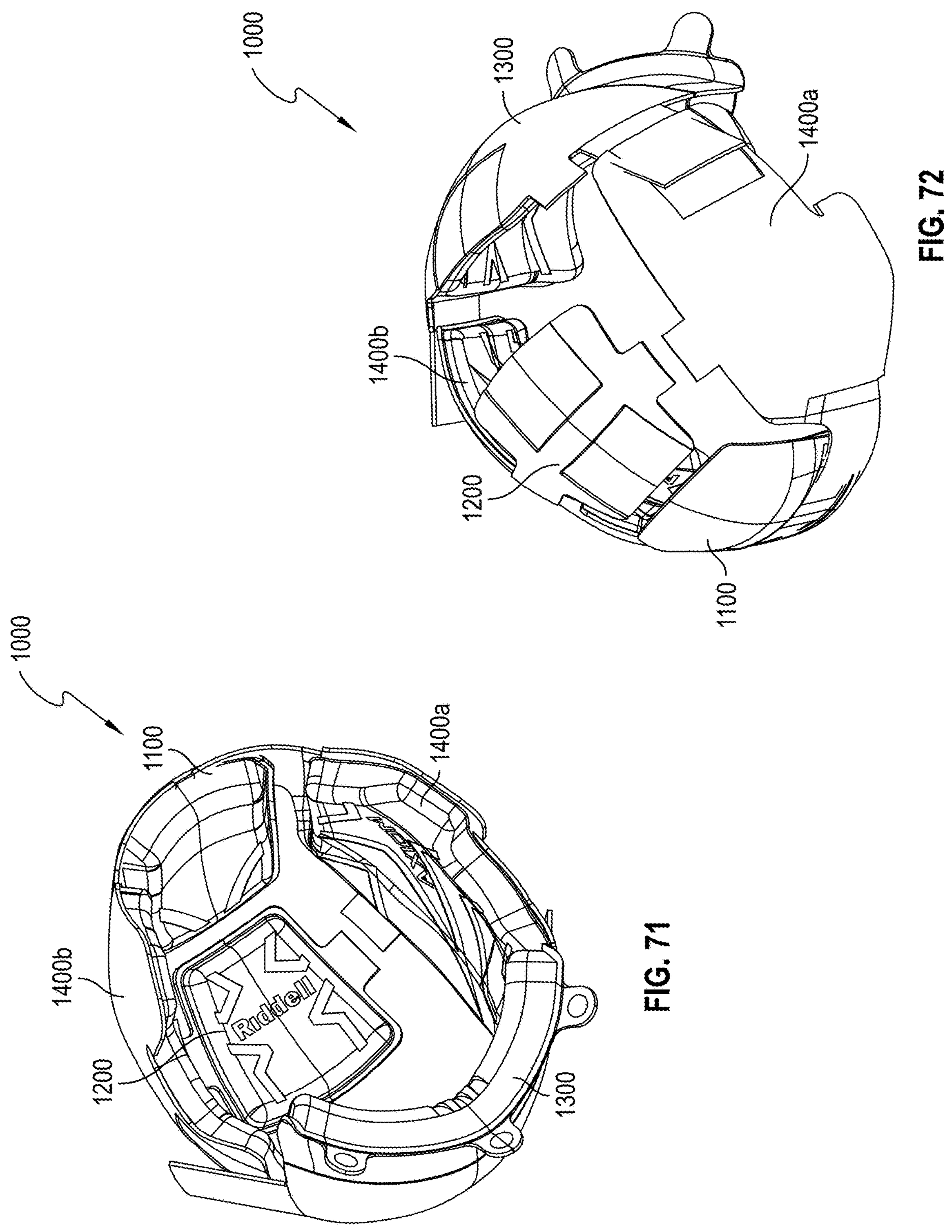
FIG. 71 is a bottom perspective view of the fixed layer of the energy management assembly for the protective sports helmet designed from the spatial data collection, processing and fitment system.
FIG. 72 is a top perspective view of the fixed layer of the energy management assembly for the protective sports helmet designed from the spatial data collection, processing and fitment system.

A "protective sports equipment" is a type of protective equipment that a player or wearer wears while engaged in the play of a sport or an activity. For example, protective sports equipment may include helmets (e.g., FIGS. 1A-2B, 31A-61B), shoulder pads (e.g., FIGS. 62-64), gloves (e.g., FIG. 68), shoes (e.g., FIG. 69), boots (e.g., FIG. 70), skates, shin guards (e.g., 71-72), elbow pads (e.g., 73), neck guards, chest protectors (e.g., FIGS. 65-67), life jackets, or other energy attenuation components or protective gear worn by a player. The protective sports equipment may be worn by a player or wearer who plays or participate in American football, soccer, hockey lacrosse, baseball, cycling, polo, equestrian, rock climbing, auto racing, motorcycle riding, motocross racing, skiing, skating, snowboarding, and other sporting activities. Further, the protective sports equipment may be worn over any body part of the wearer or player, which includes heads, shins, knees, hips, chest, shoulders, elbows, feet and wrists.

A "protective sports helmet" is a type of protective sports equipment that a player or wearer wears on his/her head while engaged in the play of a sport or an activity requiring a protective sports helmet.

A "protective contact sports helmet" or "contact sports helmet" is a type of protective sports helmet that the player wears while he/she is engaged in the play of the contact sport, namely American football, hockey or lacrosse, that typically requires a team of players. It is common for the rules and the regulations of the particular contact sport to mandate that the player wear the contact sports helmet while the player is engaged in playing the sport. For these contact sports, a national organization or rules committee associated with the respective sport mandates the player's wearing of the contact sports helmet and certain protective sports equipment during the course of play.

A "protective recreational sports helmet" or "recreational sports helmet" is a type of protective sports helmet that is worn by the wearer while he/she is participating in a recreational activity such as cycling, climbing sports, skiing, snowboarding, motorsports or motorcycling, that typically can be done by an individual wearer. Recreational sports helmets typically must also comply with safety regulations promulgated by a governing body, such as ASTM/ANSI regulations for cycling helmets and Department of Transport (DOT) for motorsports helmets and motorcycling helmets.

A "football helmet" is a special type of protective contact sports helmet that a wearer or player wears on his/her head while engaged in playing American football. Unlike other recreational sports helmets or protective sports helmets, American football helmets must comply with football-specific safety regulations promulgated by a governing body, such as NOCSAE.

The term "anatomical features" can include any one or any combination of the following: (i) dimensions, (ii) topography and/or (iii) contours of the player's body part that is scanned and/or analyzed by the system 10. In the context of a football helmet 5000, the anatomical features of the player's head H include, but are not limited to, the player's skull, facial region, eye region and jaw region. Because the disclosed football helmet 5000 is worn on the player's head and the energy attenuation assembly 3000 makes contact with the player's hair and/or scalp, the "anatomical features" term also includes the type, amount and volume of the player's hair or lack thereof. For example, some players have long hair, short hair, a combination of long and short hair, and other players have no hair (i.e., are bald). While the disclosure below is focused on human heads H, as will be discussed in detail below, is capable of being applied to any body part of an individual.

An "energy attenuation assembly" is an assembly of energy attenuating members that are designed to collectively interact to enable the equipment (e.g., protective sports helmet) to attenuate energies, such as linear acceleration and/or rotational acceleration, associated with impacts received by the equipment while it is worn by the player P or wearer. For example, the football helmet 5000 includes the internal energy attenuation assembly 3000 that attenuates energies, such as linear acceleration and/or rotational acceleration, from impacts received by the shell 5010 of the helmet 5000.

An "energy attenuation member(s)" is a three-dimensional (3D) element of the energy attenuation assembly. In some embodiments, the energy attenuation members: (i) include a component of the variable layer, and (ii) typically include a component of the fixed layer (except the energy attenuation member configured for the jaw region of the helmet). On a regional basis of the helmet, the combination of the variable layer and the fixed layer forms the volume and outer periphery of the energy attenuation member in a helmet region. The volume of the energy attenuation member is configured such that it: (i) is pre-compressed when the helmet 5000 is worn by the player and prior to an impact being received, and (ii) extends between the player's head H and an inner surface of a shell of the football helmet 5000 when it is worn on the player's head.

The term "energy attenuation component" is a three-dimensional (3D) structure that (i) has both a volume and an outer periphery, and (ii) reduces or attenuates energy arising from impacts received by the protective sports helmet. Multiple energy attenuation components comprise the fixed layer, and multiple energy attenuation components comprise the variable layer. The energy attenuation components includes material that is elastically deformable and designed to attenuate energies, such as linear acceleration and/or rotational acceleration, from impacts received by the protective sports helmet.

The term "fixed layer" is a layer formed from a collection of energy attenuation components that: (i) are positioned adjacent to the player's head when the helmet is worn and (ii) have a volume defined by a X, Y and Z Cartesian coordinate system, where the Z direction is defined "out of the X-Y plane" to provide the energy attenuation components with a height or thickness. The height or thickness of the fixed layer, as provided by its components, is set at a predetermined range of values (e.g., 5-20 mm) in an uncompressed state (i.e., before the protective sports helmet is worn by the player). In the embodiments shown in the Figures, the fixed layer is comprised of: (i) a fixed front component, (ii) fixed crown component, (iii) fixed rear component, and (iv) fixed left and right side components.

The term "variable layer" is a layer formed from a collection of energy attenuation components that: (i) are positioned between the fixed layer and the inner surface of the helmet shell and (ii) have a volume defined by a X, Y and Z Cartesian coordinate system where the Z direction is defined out of the X-Y plane to provide the energy attenuation components with a height or thickness. The height or thickness of the variable layer components is not uniform and as such it can vary significantly (e.g., over 50 mm) between two locations of the variable layer in the uncompressed state. In the embodiments shown in the Figures, the variable layer is comprised of: (i) lower front component, (ii) a upper front component, (iii) a crown component, (iv) a rear component, (v) an occipital component, (vi) left and right side components, (vii) left and right boss components, and (viii) left and right jaw components or members.

The term "component" is a three-dimensional (3D) structure that is a part of the protective sports equipment. Components of a football helmet may include: (i) shell, (ii) an energy attenuation assembly, (iii) an energy attenuation member, (iv) an energy attenuation component, (v) a chin strap, and (vi) a faceguard. The football helmet may also include other component, such as a visor.

The term "shell" is a three-dimensional (3D) structure configured to receive the energy attenuation assembly.

The term "helmet worn, but pre-impact state" and "worn, pre-impact state" occurs when the helmet is properly worn by the player P but no impact to the helmet H has yet been received during the course of play. The helmet worn, but pre-impact state can occur when the player P is wearing the helmet but not actively engaged in the sporting activity, such as standing or sitting on the sidelines and not playing football. In this state, the inner surface of the energy management assembly is in contact with the player's head H, the frontal edge of the shell is positioned approximately one inch above the player's eyebrows, the mid-sagittal and coronal planes $P_{MS}$, $P_{CR}$ are substantially vertical and as a result, the helmet has preferably a zero degree tilt. Also, in the helmet worn, pre-impact state, the helmet H applies less than 15 psi of pressure on the player's head H and preferably between 0.25 psi and 3 psi. In certain Figures in this Application, the helmet is shown in the pre-impact state but the helmet is not being worn by the player P, nevertheless, the helmet is still oriented such that the mid-sagittal and coronal planes $P_{MS}$, $P_{CR}$ are substantially vertical and as a result, the helmet has a zero degree tilt in the relevant Figures.

The term "pre-manufactured" means a component that is not individually designed or manufactured based upon a specific player's anatomical features and data. In other words, a pre-manufactured component is not a custom or bespoke component that is purposely designed, configured and manufactured to match anatomical features of the player's head H. Instead, pre-manufactured component are intended to fit a substantial number of player's head H or a specific group of players' heads H.

A "locus" is a collection of points that whose spatial location in an X, Y and Z Cartesian coordinate system for a three-dimensional space satisfies or is determined by a specified condition. The specified condition is an outer periphery or surface the body part data that was collected using, or a combination of, the described or incorporated spatial data collection methods. It should be understood that said outer periphery or surface may not necessarily be digitally created, defined, or determined in order to determine the locus. Instead, in certain embodiments, the system 10 may assume that the outermost points contained in the body part data lie along said outer periphery or surface and thus form part of the locus. In other embodiments, the outer periphery or surface may be defined and then the locus may be derived from said outer periphery or surface. It should also be understood that the outer periphery or surface the body part data may not be a 1:1 representation of the outer periphery or surface the player's body part. For example, the inclusion of the data collection member will cause the outer periphery or surface the body part data to be larger than the outer periphery or surface the player's body part.

D. OVERVIEW OF THE SYSTEM

Figure 3:
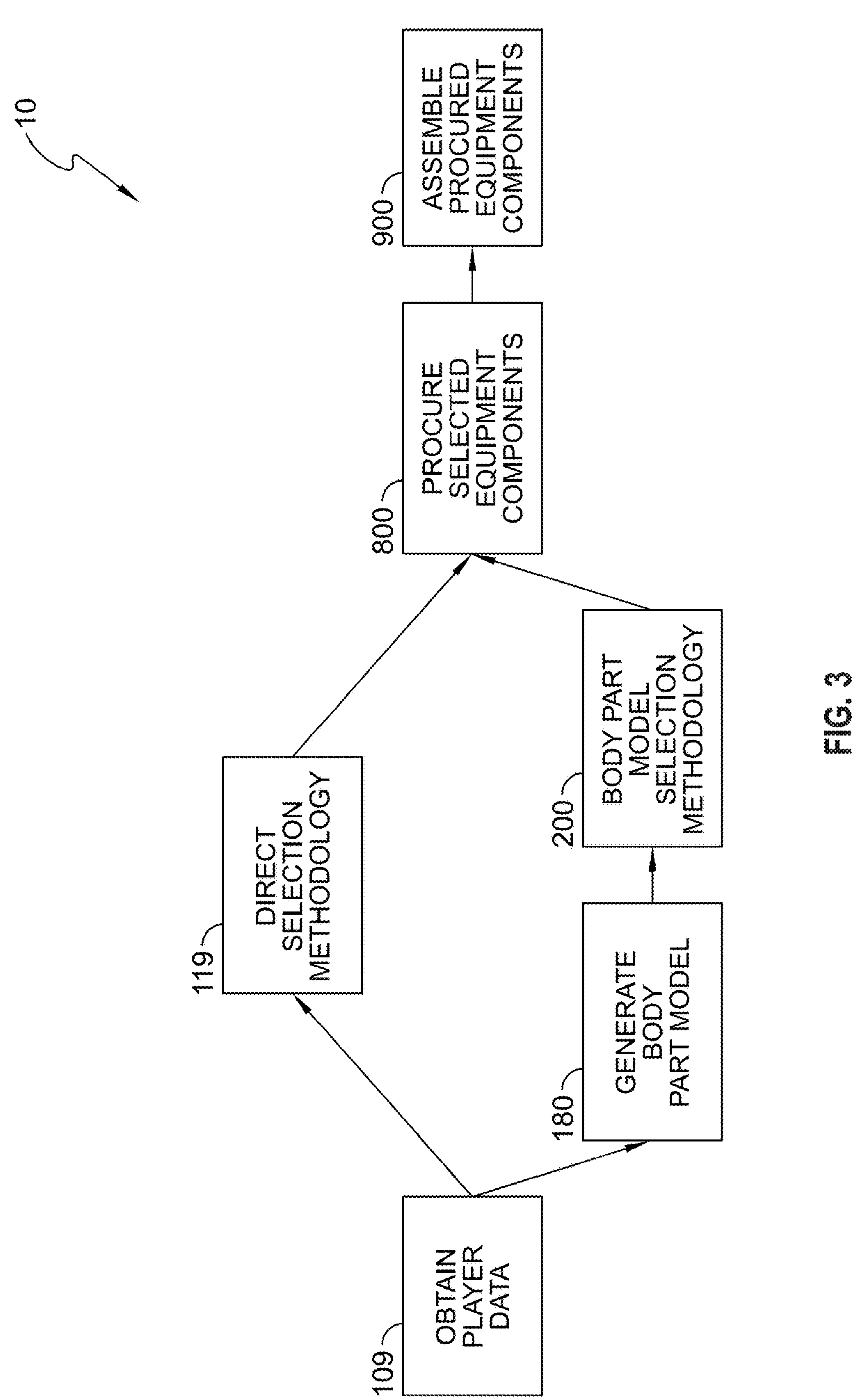
FIG. 3 is a flow chart showing the spatial data collection, processing and fitment system for a protective sports helmet, where the system involves, among other things: (i) digitally selecting helmet components based on data collected from the anatomical features of a specific player, (ii) acquiring the selected helmet components, and (iii) assembling the acquired and selected helmet components to form the protective sports helmet.

FIG. 3 shows a flow chart that illustrates primary aspects of the inventive spatial data collection, processing and fitment system 10 disclosed herein. The system 10 primarily involves: (i) collecting data from a specific player P (step 109), (ii) using the collected data to select an optimal, or combination of, pre-manufactured component based on data collected from the anatomical features of a specific player P, (ii) acquiring the selected optimal pre-manufactured component(s) (step 800), and (iii) assembling the acquired optimal pre-manufactured component(s) (step 900) to form the protective sports equipment for the specific player. This spatial data collection, processing and fitment system 10 is designed to improve: (i) the comfort and fit of said protective sports equipment, (ii) the efficiency of the design, selection and build process of the protective sports equipment, and (iii) how the protective sports equipment responds when an impact or series of impacts are received by the protective sports equipment when worn by the specific player P. The spatial data collection, processing and fitment system 10 specifically tailors the configuration of the protective sports equipment to the anatomical features of the specific player's body part. It should be understood that FIG. 3 shows primary aspects of the spatial data collection, processing and fitment system 10, while FIGS. 4-67 describe sub-steps of different embodiments of said spatial data collection, processing and fitment system 10. While FIG. 3 shows a number of different embodiments of this process and system, other embodiments of this spatial data collection, processing and fitment system 10 are contemplated by this disclosure. As such, one or more of the aspects or steps disclosed in FIG. 3 may be omitted, combined with another aspect or step, or performed in a different order.

E. PLAYER DATA

As part of the system 10, to select the components of the protective sports equipment that best fit the player, it is desirable to collect player data 109.99 about the player in step 109. The player data 109.99 may include: (i) player information (e.g., name, contact information, prior injuries) 109.2.99, (ii) player body part data (e.g., shape, topography, contour(s), curvature(s), arcs, and/or location of points on a player's body part(s)) 110.99, and/or (iii) player impact data (e.g., historical and present impacts received by the player while playing the sport) 109.4.99. The player data 109.99 may be collected, transmitted, analyzed, and/or stored using any known means, some of which are disclosed below in step 109. However, it should be understood that a method that utilizes a portion, combination or alteration of any portion or component of the below disclosed examples falls within the scope of this Application. Likewise, omitting the use of any technology, portion of any technology, any disclosed example, or any portion of any disclosed example also falls within the scope of this Application.

1. Player Information

Figure 4:
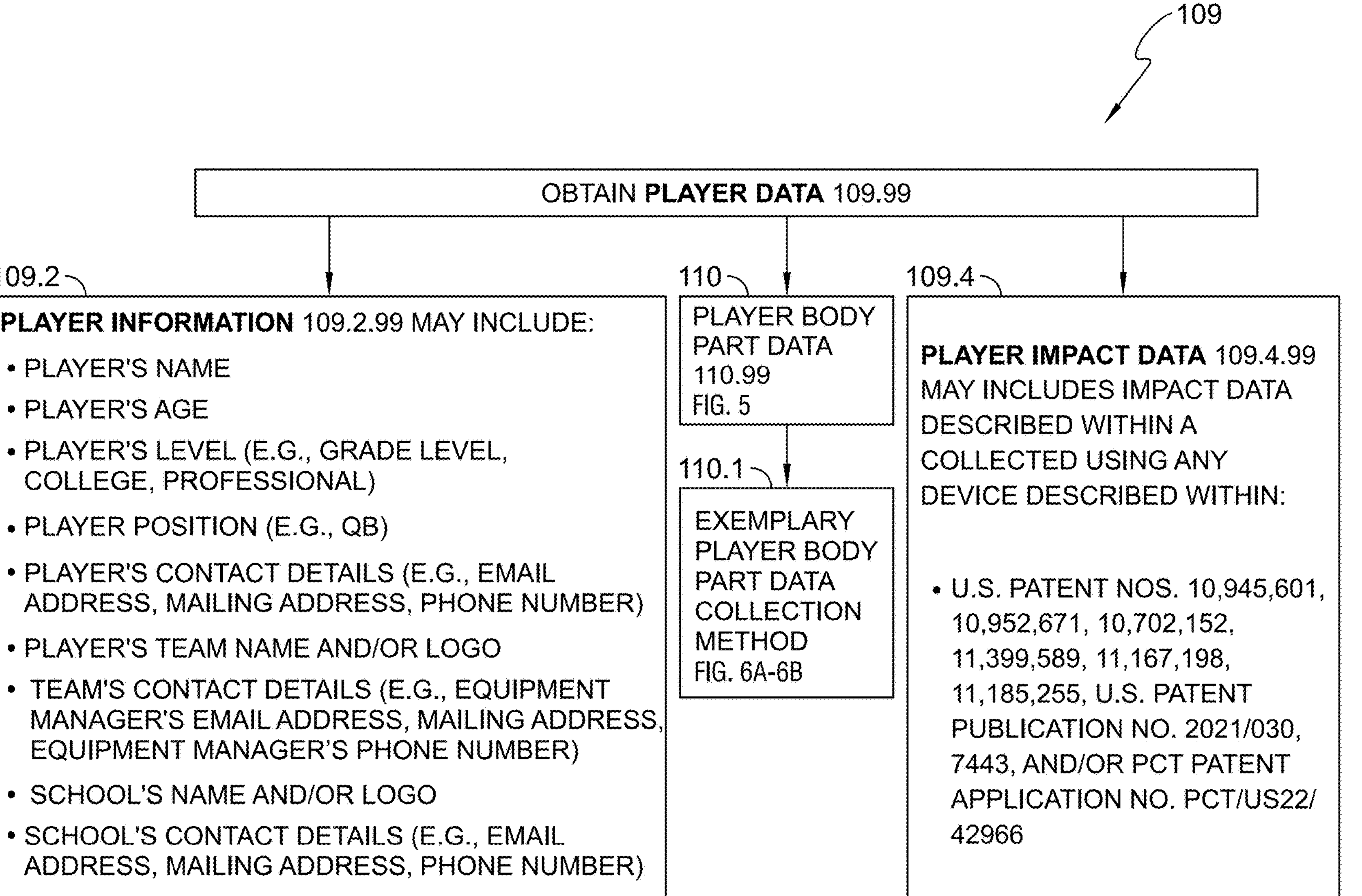
FIG. 4 is a flow chart of a portion of the spatial data collection, processing and fitment system, showing that the player data may include: (i) player information, (ii) player body part data, and/or (iii) player impact data.
Figure 5A:
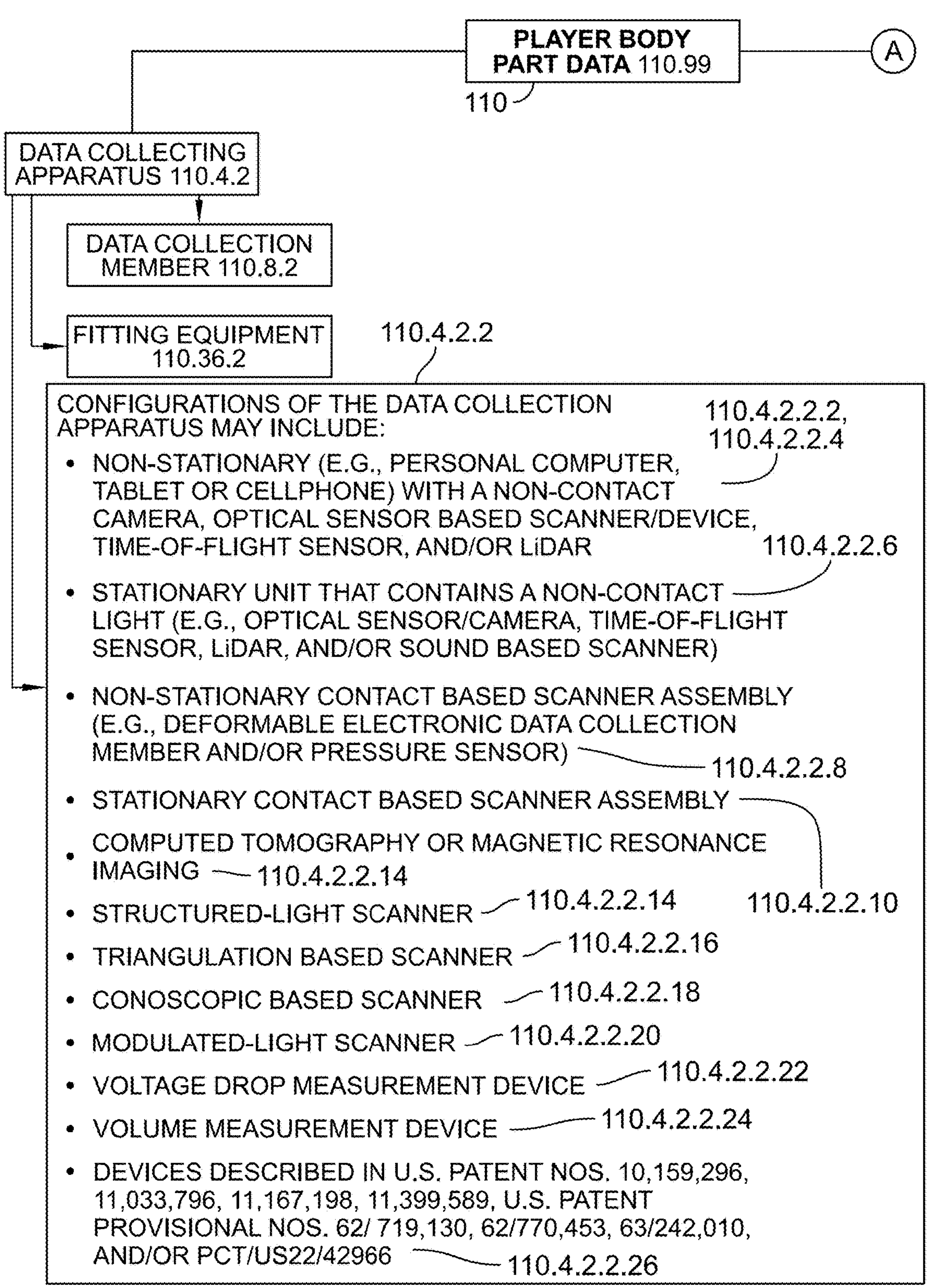

As shown in FIG. 4, player information 109.2.99 that may be gathered in step 109.2 may include, but is not limited to: (i) player's name, (ii) player's age, (iii) player's level (e.g., grade level, college, professional), (iv) player position (e.g., QB), (v) player's contact details (e.g., email address, mailing address, phone number), (vi) player's guardian (e.g., parent), (vii) player's coach, (viii) player's team name and/or logo, (ix) team's contact details (e.g., equipment manager's email address, mailing address, equipment manager's phone number), (x) school's name and/or logo, (xi) school's contact details (e.g., email address, mailing address, phone number), (xii) player's, team's, or school's billing information, and/or (xiii) any other information that would be helpful or needed when ordering, designing, manufacturing, and shipping a piece of a protective sports equipment, and/or components for a protective sports equipment. The player information 109.2.99 may be collected in any known manner in step 109.2. Examples of said known manners, include but are not limited to: (i) use of applications installed on mobile devices or computers, (ii) internet based communications, including web based forms, (iii) in person by a sales representative, (vi) over the phone, (vii) any portion, combination or alteration of these disclosed manners, and/or (viii) any other known method. As discussed, above it should be understood that this Application contemplates that player information 109.2.99 may omit any of the above described categories of information or includes additional information that is not listed above. Additionally, player information 109.2.99 may not be collected, may be collected and not included within the player data 109.99, or may be collected and included within the player data 109.99, but not utilized by the system 10 during the selection/fitment process.

2. Player Body Part Data

As shown in FIGS. 4-13B, the spatial data acquisition process 110 may involve collection of data that is spatially located in an X, Y and Z Cartesian coordinate system for a three-dimensional space. The spatial data acquisition process 110 may require different steps depending on the configuration of the device—namely, the data collecting apparatus 110.4.2 and the technology that is utilized by said data collecting apparatus 110.4.2. As such, the spatial located in an X, Y and Z Cartesian coordinate system for a three-dimensional space may include, but is not limited to, data that discloses, relates to, or is used to derive the shape, topography, contour(s), curvature(s), arcs, and/or location of points on a player's body part. If the player's body part that is being analyzed is the player's head, then the body part data 110.99 that is collected may be referred to as spatial head data or head data. In another example, if the player's body part that is being analyzed is the player's torso, then the body part data 110.99 that is collected may be referred to as spatial torso data or torso data. In an even further other example, if the player's body part that is being analyzed is the player's foot, then the body part data 110.99 that is collected may be referred to as spatial foot data or foot data.

It should be understood that the player body part data 110.99 may be collected using any technology, a portion of a technology, a component of a technology, a combination of technologies, and/or any alteration of any portion of the technologies that are disclosed below (110.4.2.2).

i. Data Collecting Apparatus

Figure 10:
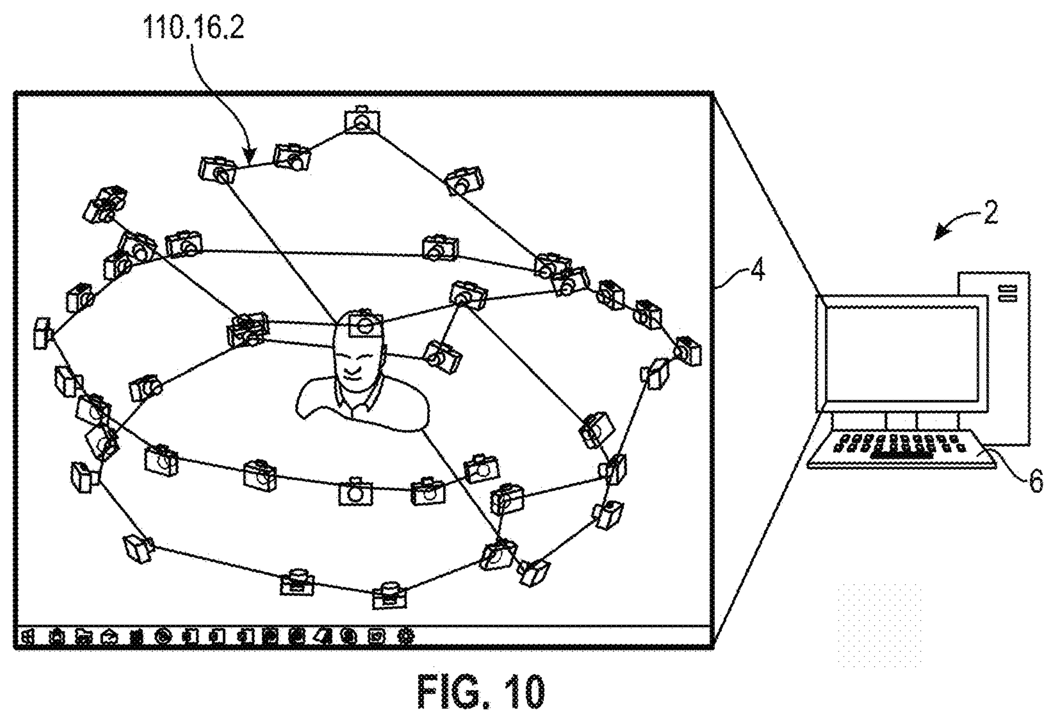
FIG. 10 is an electronic device displaying a graphical representation of the path that the first or second exemplary data collecting apparatuses may take during the process of obtaining player body part data.

The body part data apparatus or data collecting apparatus 110.4.2 may be a hand-held unit (e.g., personal computer, tablet or cellphone) that includes a non-contact camera or optical sensor based scanner/device 110.4.2.2.2. In this embodiment, the operator may: (i) take a single image of the player from one direction (e.g., front, side or top), (ii) take two images of the player from two different directions (e.g., front and side), (iii) take a plurality of images of the player while walking around the player with the data collecting apparatus 110.4.2, or (iv) take a video of the player while walking around the player with the data collecting apparatus 110.4.2. In this embodiment, FIG. 10 displays an exemplary path 110.16.2 that the data collecting apparatus 110.4.2 may follow during the data acquisition process. In particular, the data collecting apparatus 110.4.2 is shown in approximately 40 different locations around a player's head H. These different locations are at different angles and elevations when compared to one another. Placing the data collecting apparatus 110.4.2 in these different locations during the acquisition of body part data 110.99 helps ensure that the data that will later be made from this acquisition process does not have gaps or holes contained therein. It should be understood that the discrete locations are shown in FIG. 10 are exemplary and are simply included herein to illustrate the path that the data collecting apparatus 110.4.2.2.2, 110.4.2 may follow during the acquisition of body part data 110.99. There is no requirement that the data collecting apparatus 110.4.2.2.2, 110.4.2 pass through these points or gather body part data 110.99 at these points during the acquisition process.

In an alternative embodiment, the data collecting apparatus 110.4.2 may be a hand-held unit (e.g., personal computer, tablet or cellphone) that includes a non-contact LiDAR or time-of-flight sensor 110.4.2.2.4. In this embodiment, the operator may: (i) scan one side (e.g. front) of the player's body part, (ii) scan two sides (e.g., front and side) of the player's body part, or (iii) scan the entirety of the player's body part by will walking/moving the non-contact LiDAR or time-of-flight sensor around said body part. In particular, the LiDAR or time-of-flight sensor sends and receives light pulses in order to typically create a point cloud that contains body part data 110.99.

In another embodiment, the data collecting apparatus 110.4.2 may be a stationary unit that contains a non-contact light or sound based scanner 110.4.2.2.6. In this embodiment, the body part data 110.99 can be captured or obtained: (i) in a single instant: (a) using a light/sound sensor focused on a single side of the player's body part, (b) multiple light/sound sensors positioned around the player's body part that can all operate at the same time, or (ii) over an amount of time: (a) using light/sound sensor (e.g., camera) focused on a multiple sides (e.g., front and side) of the player's body part, (b) one or more light/sound sensors that independently move (without an operator) around the player's body part.

In another embodiment, the data collecting apparatus 110.4.2 may be a non-stationary contact based scanner 110.4.2.2.8. In this embodiment, body part data 110.99 may be collected using a deformable electronic data collection member 110.4.2.2.8, 110.80 that include a number of nodes 110.80.2. When said deformable electronic data collection member 110.4.2.2.8, 110.80 is placed on a player's body part, said deformable electronic data collection member 110.4.2.2.8, 110.80 can measure how far each node 110.80.2 is deformed from its original position. Said deformation can then be used to calculate the location of the points contained in the body part locus, distances between body part locus, coordinates, distances between coordinates, and/or other data (see FIG. 13A-13B). Alternatively, the data collecting apparatus 110.4.2.2.8, 110.4.2 may include at least one pressure sensor that may capture the body part data 110.99 over a predefined time by moving the pressure sensor over the player's body part.

In an even further embodiment, the data collecting apparatus 110.4.2 may be a stationary contact based scanner assembly 110.4.2.2.10. In this embodiment, once the contact sensors are placed in contact with the player's head, they can capture the body part data 110.99 in a single instant (e.g., multiple pressure sensors may be positioned in contact with the player's body part to enable the collection of the body part data 110.99 at one time). For example, body part data 110.99 may be collected using a system 110.4.2.2.10, 110.60 that includes a plurality of deformable or movable pins 110.60.2. Said system 110.4.2.2.10, 110.60 can record how far each pin 110.60.2 is deformed or moved (see FIG. 12). Alternatively, the data collecting apparatus 110.4.2.2.10, 110.4.2 may include at least one pressure sensor that may capture the body part data 110.99 over a predefined time by moving the pressure sensor over the player's body part.

In other embodiments, body part data 110.99 may be collected using: (i) computed tomography or magnetic resonance imaging 110.4.2.2.12, (ii) structured-light scanner 110.4.2.2.14, (iii) triangulation based scanner 110.4.2.2.16, (iv) conoscopic based scanner 110.4.2.2.18, (v) modulated-light scanner 110.4.2.2.20, (vi) voltage drop measurement device 110.4.2.2.22, (vii) volume measurement device 110.4.2.2.24, (viii) devices described in U.S. Pat. Nos. 10,159,296, 11,033,796, 11,167,198, 11,399,589, U.S. Patent Provisional Nos. 62/719,130, 62/770,453, 63/242,010, and/or PCT/US22/42966 (110.4.2.2.26), (ix) any combination of the above techniques and/or technologies, or (x) any technology or system that is configured to capture body part data 110.99. For example, the hand-held scanner may utilize both a camera and a time-of-flight sensor to collect the body part data 110.99.

It should be understood that the body part data 110.99 may include: (i) a point or coordinate in 2D space, (ii) a point or coordinate in 3D space, (iii) a locus in 2D space, (iv) a locus in 3D space (e.g., point cloud), (v) a line in 2D space, (vi) a line in 3D space, (vii) a plurality of points or coordinates in 2D space, (vii) a plurality of points or coordinates in 3D space, (ix) a plurality of loci in 2D space, (x) a plurality of loci in 3D space, (xi) a plurality of lines in 2D space, (xii) a plurality of lines in 3D space (e.g., wire-frame, which adjacent points using line segments)), (xiii) partial surface in 2D space, (xiv) partial surface in 3D space, (xv) partial surfaces in 2D space, (xvi) partial surfaces in 3D space, (xvii) complete surface in 2D space, (xviii) complete surface in 3D space, (xix) numerical values contained within a table (e.g., stl file(s)), (xx) partial area(s) in 2D or 3D space, (xxi) complete area in 2D or 3D space, (xxii) partial volume(s) in 2D or 3D space, (xxiii) complete volume in 2D or 3D space, (xxiv) distance(s) in 2D or 3D space, (xxv) contour locus/loci in 2D or 3D space, (xxvi) contour line(s) in 2D or 3D space, (xxvii) curvature locus/loci in 2D or 3D space, (xxviii) curvature line(s) in 2D or 3D space, (xxix) any data collected and/or stored by any known data collection apparatus or any data collection apparatus 110.4.2 disclosed herein, and/or (xxx) any combination of the above listed items. Additionally, said body part data 110.99 be stored, manipulated, altered, and/or displayed in: (i) stl file(s), (ii) excel file(s) or table(s), (iii) CAD file(s), (iv) object file(s) (i.e., .obj), (v) images or frames of a video, (vi) videos, or (vii) any data format disclosed herein, (viii) any data format collected and/or stored by any known data collection apparatus or any data collection apparatus 110.4.2 disclosed herein, (ix) a graphical (e.g., 3D model in a CAD program) or non-graphical form (e.g., values contained within a spreadsheet), and/or (x) any combination of the above.

ii. Optional Data Collection Member

Figure 6A:
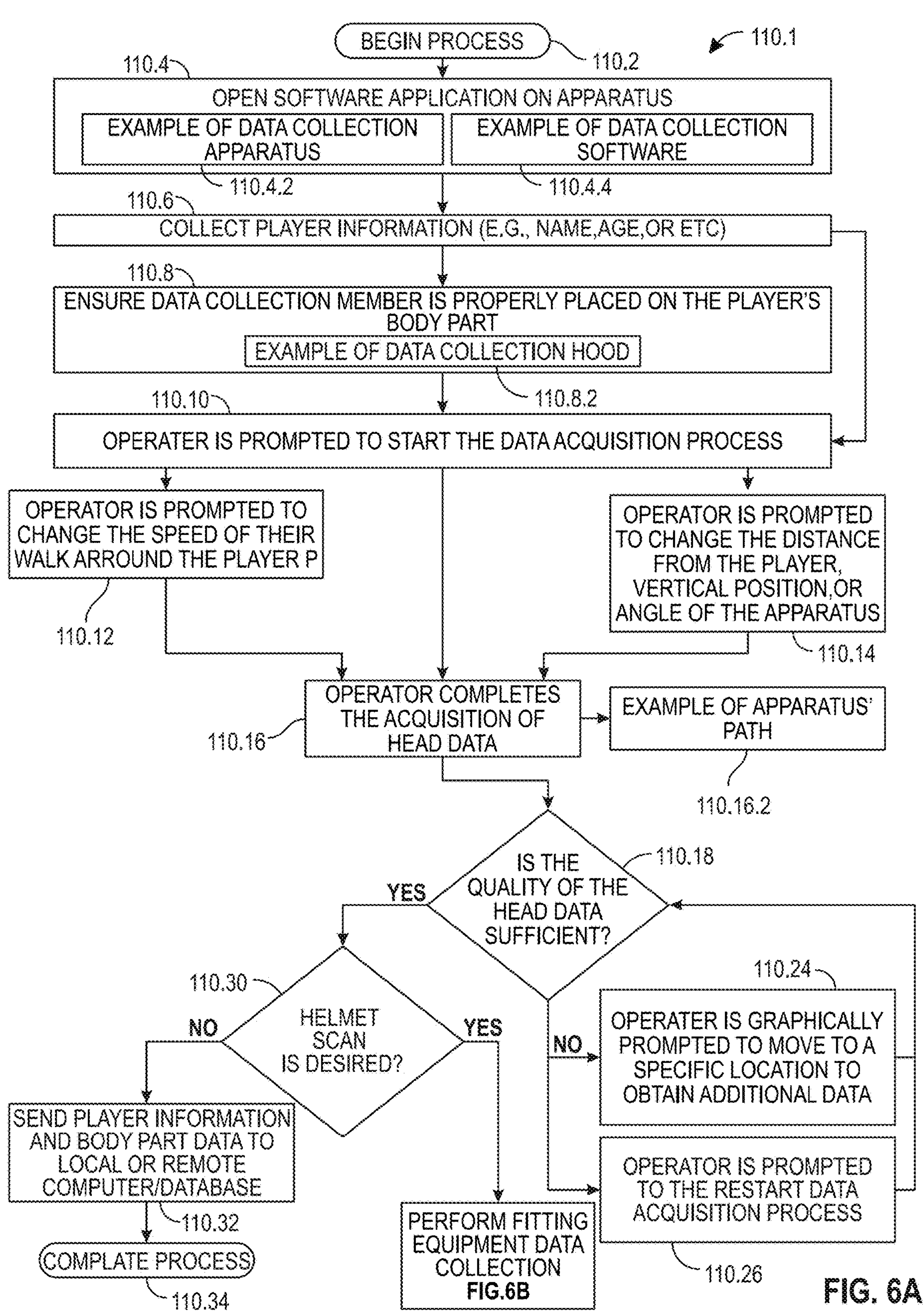
FIG. 6A is a flow chart of a portion of the spatial data collection, processing and fitment system, showing an exemplary method for collecting player body part data.
Figure 6B:
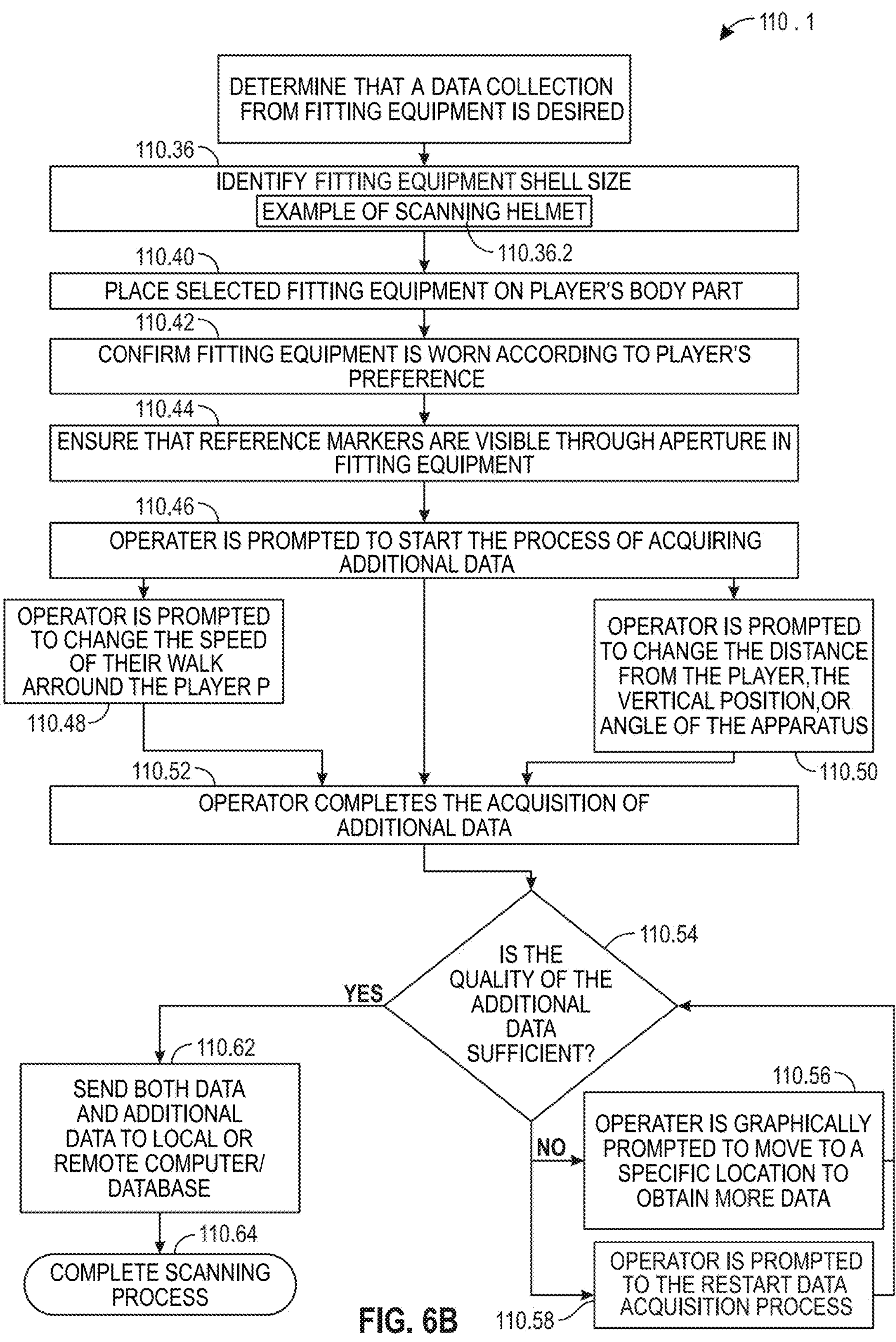
FIG. 6B is a flow chart of a portion of the spatial data collection, processing and fitment system, showing an optional method for collecting additional player body part data using a fitting equipment.
Figure 7:
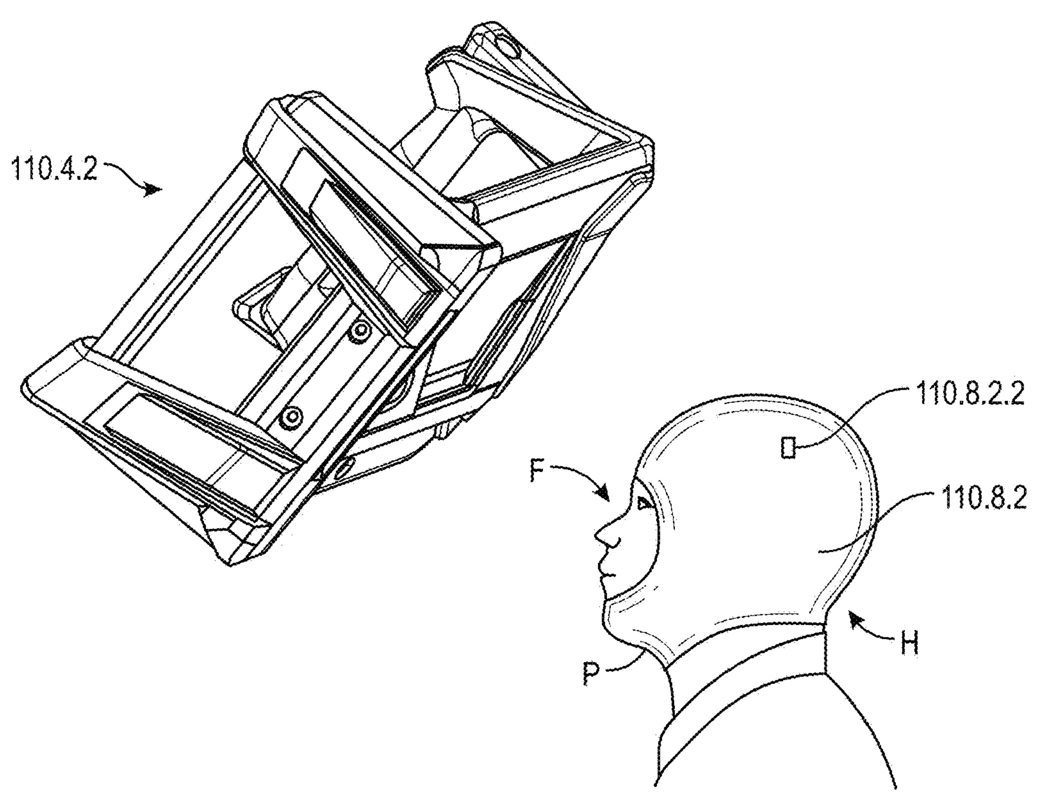
FIG. 7 shows a first exemplary data collecting apparatus that is configured to collect player body part data, wherein said apparatus is shown collecting data from a player's head that is partially covered with a data collection member.
Figure 8:
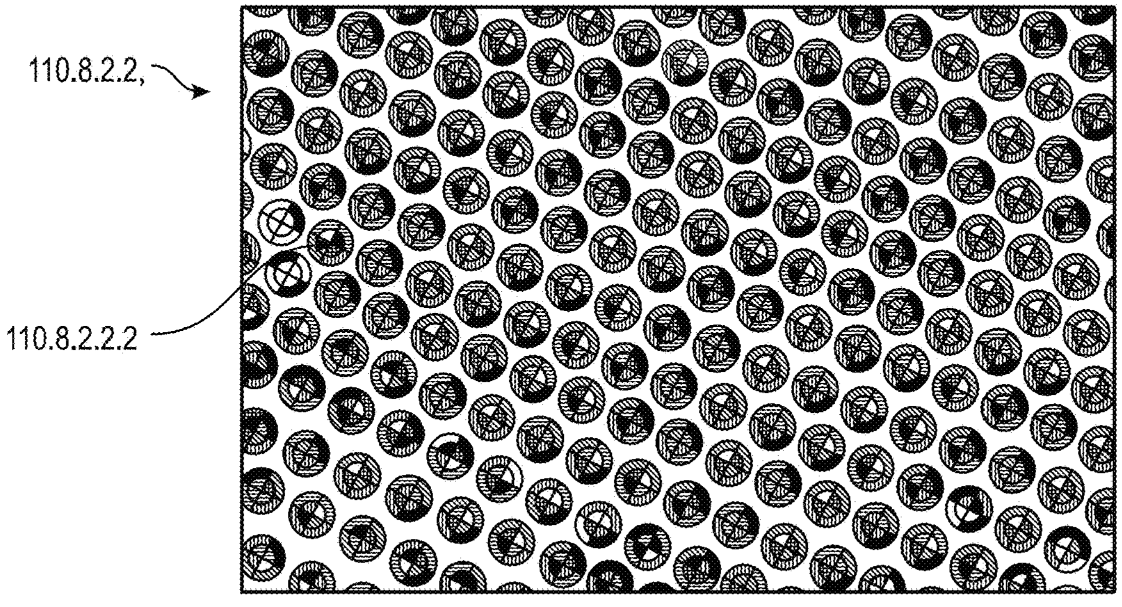
FIG. 8 is an example of a pattern that may be placed on the data collection member shown in FIG. 7.
Figure 9:
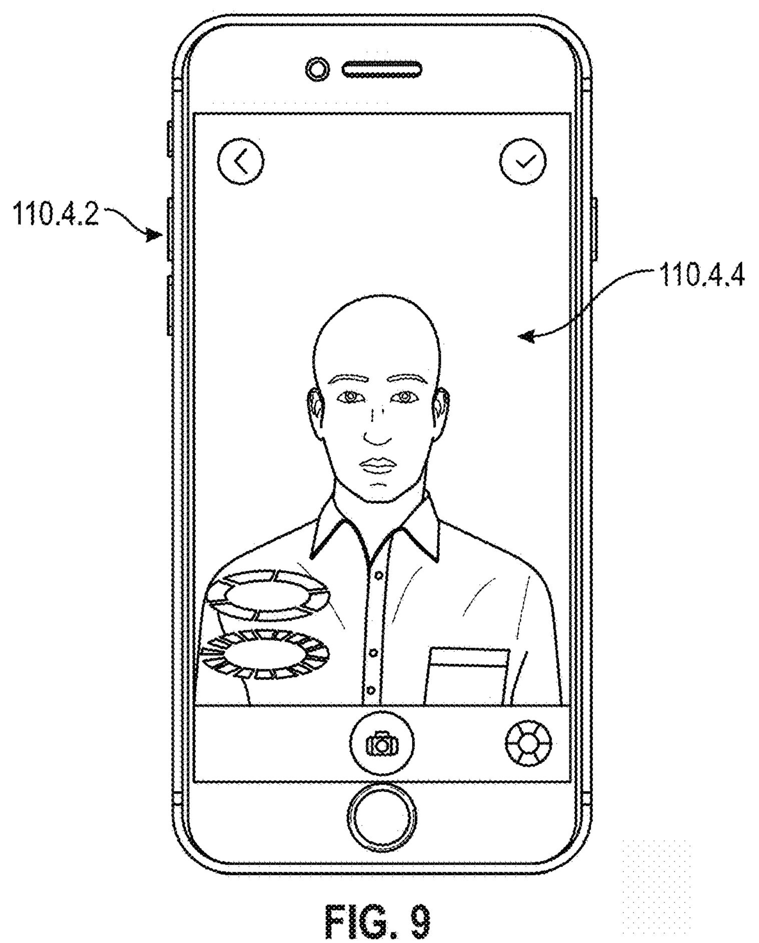
FIG. 9 is a second exemplary data collecting apparatus that is configured to collect player body part data with an exemplary software application displayed on said data collecting apparatus.

As shown in FIGS. 6A, 7, and 8, a data collection hood or member 110.8.2 may be used in certain situation in order to aid in the collection of said player body part data 110.99. The data collection hood or member 110.8.2 may be a flexible apparatus sized to fit over the player's body part (e.g., head H) and achieve a tight or snug fit around the player's body part due to elastic properties and dimensions of the data collection member 110.8.2. The data collection member 110.8.2 is designed to increase accuracy when performing the spatial data acquisition process by conforming to the anatomical features of the player's body part (e.g., head H), namely the topography, contour(s), curvature(s), arcs, and/or location of points on a player's body part while reducing effects of hair. The data collection member 110.8.2 may be made from neoprene, lycra or any other suitable elastic material known to those skilled in the art and may have a thickness that is between 0.1 mm and 10 mm (preferably 1.5 mm). It should be understood that the term data collection member 110.8.2 does not just refer to a hood that is placed over the head H of the player P; instead, it refers to a snug fitting item (e.g., shirt, armband, leg band, or etc.) that has minimal thickness and is placed in direct contact with the player's body part to aid in the collection of body part data 110.99.

FIG. 7 shows an area labeled 110.8.2.2, wherein FIG. 8 show an enlarged view of this area of the data collection member 110.8.2.2. This area 110.8.2.2 includes one or more reference markers 110.8.2.2.2. The reference markers 110.8.2.2.2 may be used to aid in the orientation and positioning of the images or video of the data collection member 110.8.2, as will be described below. The reference markers 110.8.2.2.2 may be: (i) colored, (ii) offset (e.g., raised or depressed) from other portions of the data collection member 110.8.2, (iii) include patterns or textures, (iv) or include electronic properties or features that aid in collection the of body part data 110.99 by the data collecting apparatus 110.4.2. These reference markers 110.8.2.2.2 may be printed on the data collection member 110.8.2 or may be a separate item that is attached to the data collection member 110.8.2 using adhesives or using any other mechanical or chemical attachment means. The number of reference markers 110.8.2.2.2 that are used should balance the need for an accurate collection of body part data 110.99 on one hand with processing times on the other hand. In one exemplary embodiment, twelve reference markers 110.8.2.2.2 per square inch may be used. A person skilled in the art recognizes that more or fewer reference markers 110.8.2.2.2 may be used to alter the processing times and the accuracy of the body part data 110.99. In a further embodiment, it should be understood that the data collection member 110.8.2 may not have any reference markers 110.8.2.2.2 or it may have reference markers 110.8.2.2.2 that are uniform in color and their distribution over said member 110.8.2.

Because the use of the data collection member 110.8.2 is optional, it may not be used when collecting body part data 110.99 in certain situations. For example, data collection member 110.8.2 may not be needed because: (i) the data analysis steps do not require stitching together photographs, and/or (ii) it is not needed to reduce the effects of hair (e.g., the player lacks hair the body part). In embodiments where a data collection member 110.8.2 is not used, one or more reference markers 110.8.2.2.2 scaling tag, or any other marker or indicia of known size may be placed directly on the player's body part. For example, the one or more reference markers 110.8.2.2.2, scaling tag or any other marker or indicia of known size may have a removable coupling means (e.g., adhesive) that allows them to be removably coupled to the player's body part to aid in collecting the body part data 110.99. Further, a data collection member 110.8.2 may not be used when collecting data using alternative scanning systems (e.g., contact scanner, computed tomography or magnetic resonance imaging, or any combination of these technologies). Finally, in other embodiments, a scaling tag or any other marker or indicia of known size may not be used and instead the data may be collected directly from the player's body part using the data collecting apparatus 110.4.2.

3. Optional Impact Data

As shown in FIG. 4, impact data 109.4.99 that collected in step 109.4 may include historical data collected and stored in a database, recently collected data from the player's use of the sports equipment, testing data based on the player's position, level, or skill, and/or projected data that is derived from other impact data. Said projected data may be generated using neural networks, artificial intelligence, machine learning, linear regression analysis, any combination of these, and/or any know method of generating data projections based upon the above described data types (e.g., historical, recently collected, and/or testing). The impact data 109.4.99 may include any impact data 109.4.99 disclosed within or collected using any system, method, or any portion or element of the system or methods disclosed within U.S. Pat. Nos. 10,945,601, 10,952,671, 10,702,152, 11,399,589, 11,167,198, 11,185,255, U.S. Patent Publication No. 2021/030,7443, and/or PCT Patent Application No. PCT/US22/42966, each of which is fully incorporated herein by reference and may be used for any purpose. It should be understood that the impact data 109.4.99 may not be collected, may be collected and not included within the player data 109.99, or may be collected and included within the player data 109.99, but not utilized by the system 10 during the selection/fitment process.

4. Compiling and Transmitting Player Data

The above-described player data 109.99 (e.g., player information 109.2.99, player body part data 110.99, player impact data 109.4.99) may be collected from the player and transmitted to the equipment designer (or the equipment designer's vendors, partners, or etc.) using any known methods. Some methods of collecting said information and data may utilize: (i) an application that can be downloaded on any users electronic device (e.g., mobile phone), (ii) any above described device, and/or (iii) any other known method for collecting said data. Additionally, people that may be involved in collecting the data include, but are not limited to: (i) sales representative from the equipment manufacture, (ii) equipment manager, (iii) coach, (iv) friend, (v) parent, and/or (vi) guardian. Further, said data collection may occur at the player's house, school, team's facility (e.g., locker room), or any other commercial location (e.g., equipment manufacture facility or vendor/partner's facility).

5. Exemplary System—Mobile Application on Hand-Held Device

Now referring to FIG. 6A, an exemplary method 110.1 for collecting player body part data 110.99 may commence in step 110.2 by either: (i) downloading an application from a central database (e.g., Apple App store) to the electronic device 110.4.2, (ii) having an application pushed to the electronic device 110.4.2, or (iii) obtaining an electronic device 110.4.2 that includes an application that is preinstalled on said device. Once the application is installed on the electronic device 110.4.2, the operator can open the software application 110.4.4 (exemplary embodiment shown in FIG. 9) in step 110.4 on, or in communication with, a data collecting apparatus 110.4.2 (exemplary embodiment shown in FIGS. 7, 9, 11-13B). Upon opening the software application 110.4.4, the operator may be prompted in step 110.6 to select a player from a list of players who information has been pre-entered into the system, or enter player information 109.2.99 (e.g., the above described information). After the information is selected or entered, the player may sign a consent, provide their signature for addition to a component of the protective sports helmet, confirm the selected product and/or it components, and/or change or add additional products or components to its order.

After all of the products and/or components have been selected, the system 1 will determine which of the following steps to perform. In particular, said system will at least choose from: (i) collecting body part data 110.99 without a data collection member 110.8.2, (ii) collect body part data 110.99 using a data collection member 110.8.2, (iii) collect body part data 110.99 without using a piece of fitting equipment (e.g., fitting helmet 110.36.2), (iv) collect body part data 110.99 using a piece of fitting equipment, (v) collect impact data 109.4.99, (vi) collect additional player information 109.2.99 (e.g., injury history). If the system 1 determines from the selected products or components that the use of the data collection member 110.8.2, the application will instruct the user how to place said data collection member 110.8.2 on the player's body part.

Once the data collection member 110.8.2 is properly placed on the player's body part in step 110.8, the operator is prompted to start the spatial data acquisition process in step 110.10. Referring back to FIG. 6A, during the acquisition of body part data 110.99 using the electronic device 110.4.2, the software application 110.4.4 may instruct the operator to: (i) change the speed at which they are moving around the player (e.g., slow down the pace) to ensure that the proper level of detail is captured in step 110.12, (ii) change the vertical position and/or angle of the data collecting apparatus 110.4.2 in step 110.14, and/or (iii) change the operator's position in relation to the player P (e.g., move forward or back up from the player) in step 110.14. Once the acquisition of body part data 110.99 is completed in 110.16, the software application 110.4.4 analyzes the data to determine if the quality is sufficient to meet the quality requirements that are preprogrammed within the software application 110.4.4. If the quality of the body part data 110.99 is determined to be sufficient in step 110.18, then the software application 110.4.4 will send, via a wire or wirelessly, to a local or remote computer/database (e.g., team database 100.2.10), the body part data 110.99 in step 110.32. This local or remote computer/database may then be locally or remotely accessed by technicians/designers who perform the next steps in designing and manufacturing the American football helmet 5000.

Alternatively, if the software application 110.4.4 determines that the body part data 110.99 lacks sufficient quality to meet the quality requirements preprogrammed within the software application 110.4.4, then the software application

110.4.4 may prompt the operator to obtain additional data in steps 110.24, 110.26. Specifically, in steps 110.24, the software application 110.4.4 may graphically show the operator: (i) the location to stand, (ii) what elevation to place the data collecting apparatus 110.4.2, and/or (iii) what angle to place the data collecting apparatus 110.4.2. Once the operator obtains the additional data at that specific location, the software application 110.4.4 then analyzes the original collection of data along with this additional data to determine if the quality of the combined collection of data is sufficient to meet the quality requirements of the software application 110.4.4. This process is then repeated until the quality of the data is sufficient. Alternatively, the software application 110.4.4 may request that the operator restart the body part data 110.99 acquisition process. The software application 110.4.4 then analyzes the first collection of body part data 110.99 along with the second collection of body part data 110.99 to see if the combination of data is sufficient to meet the quality requirements that are preprogrammed within the software application 110.4.4. This process is then repeated until the quality of the data is sufficient. After the body part data 110.99 is determined to be sufficient, the software application 110.4.4 performs the step 110.30 of prompting the operator to determine if a helmet scan is desired.

If the operator or the application has determined a data collection using a piece of fitting equipment 110.36.2 is needed or may be useful, then the application will allow the operator to collect data while the player is wearing the fitting equipment 110.36.2. The process of acquiring the collect data while the player is wearing the fitting equipment 110.36.2 is described in connection with FIG. 6B, which is includes collecting data from a player while said player is wearing a physical piece of fitting equipment 110.36.2 that has been modified in order to obtain additional data from the player's body part. An example of where collect data while the player is wearing the fitting equipment 110.36.2 (e.g., a helmet scan) may be useful is when the player P desires a unique protective sports equipment configuration, such as if the player decides to have the American football helmet 5000 positioned lower on their head than where a wearer traditionally places the American football helmet 5000.

The first step in this process is 110.36, which is accomplished by identifying the proper size fitting equipment 110.36.2. As an example for a player P, the fitting equipment (e.g., a helmet scan) 110.36.2 shell sizes may include small, medium, large and extra-large, although additional or intermediate sizes are certainly within the scope of this disclosure. The selection of the fitting equipment 110.36.2 shell size may be determined by the position the player plays, previous player experiences, or by estimations or measurements taken during or before the acquisition of the body part data 110.99. Once the size of the fitting equipment 110.36.2 is selected in step 110.36, the fitting equipment 110.36.2 is placed over the player's head H while the player P is wearing the data collection member 110.8.2 in step 110.40. After the fitting equipment 110.36.2 is placed on the player's head H in step 110.40 the player adjusts the fitting equipment 110.36.2 to a preferred wearing position or configuration, which includes adjusting the chin strap assembly by tightening or loosening it. It is not uncommon for a player P to repeatedly adjust the fitting equipment 110.36.2 to attain his or her preferred wearing position because this position is a matter of personal preference. For example, some players prefer to wear their helmet lower on their head H with respect to their brow line, while other players prefer to wear their helmet higher on their head H with respect to their brow line.

Figure 11:
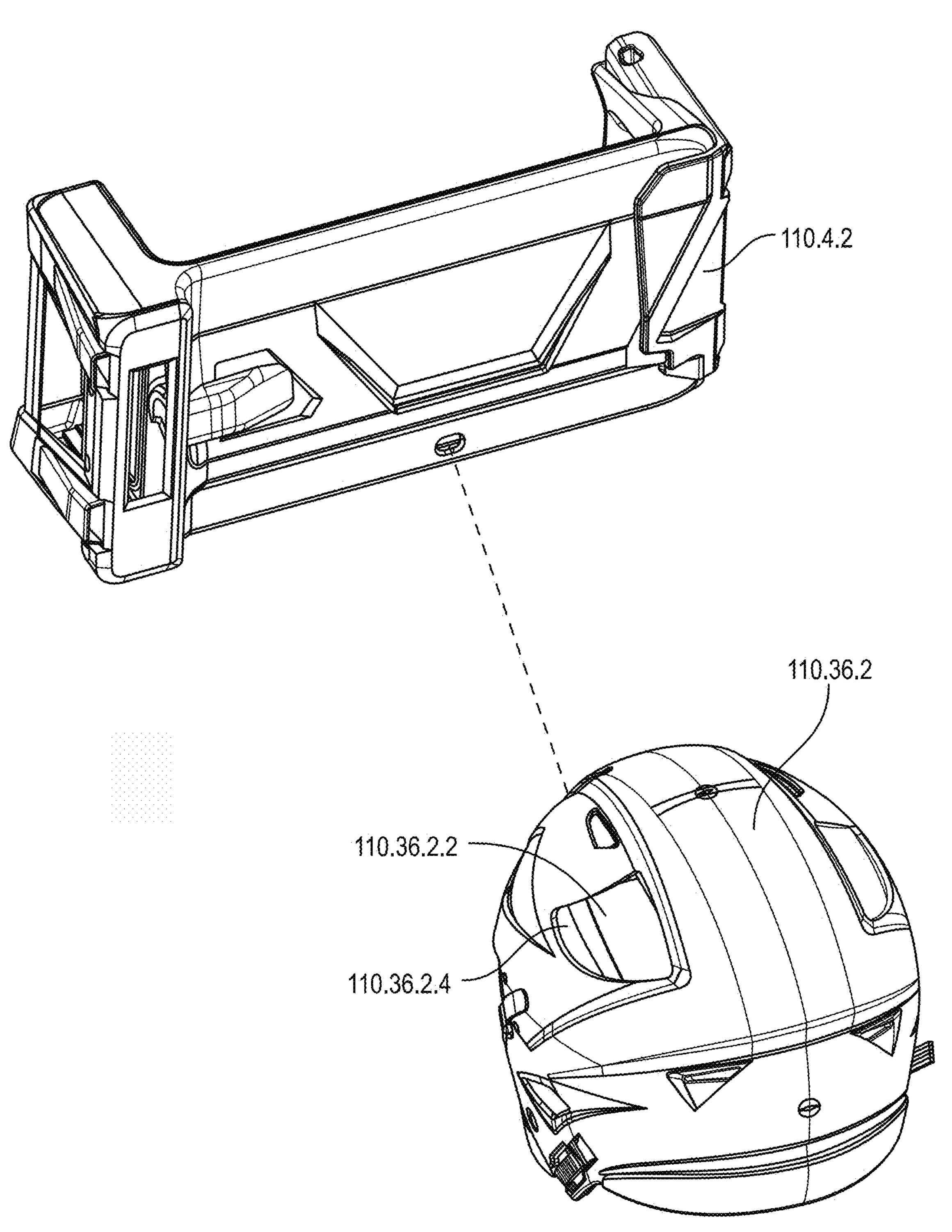
FIG. 11 shows the first exemplary data collecting apparatus collecting additional body part data when said player is wearing the optional fitting equipment.
Figure 12:
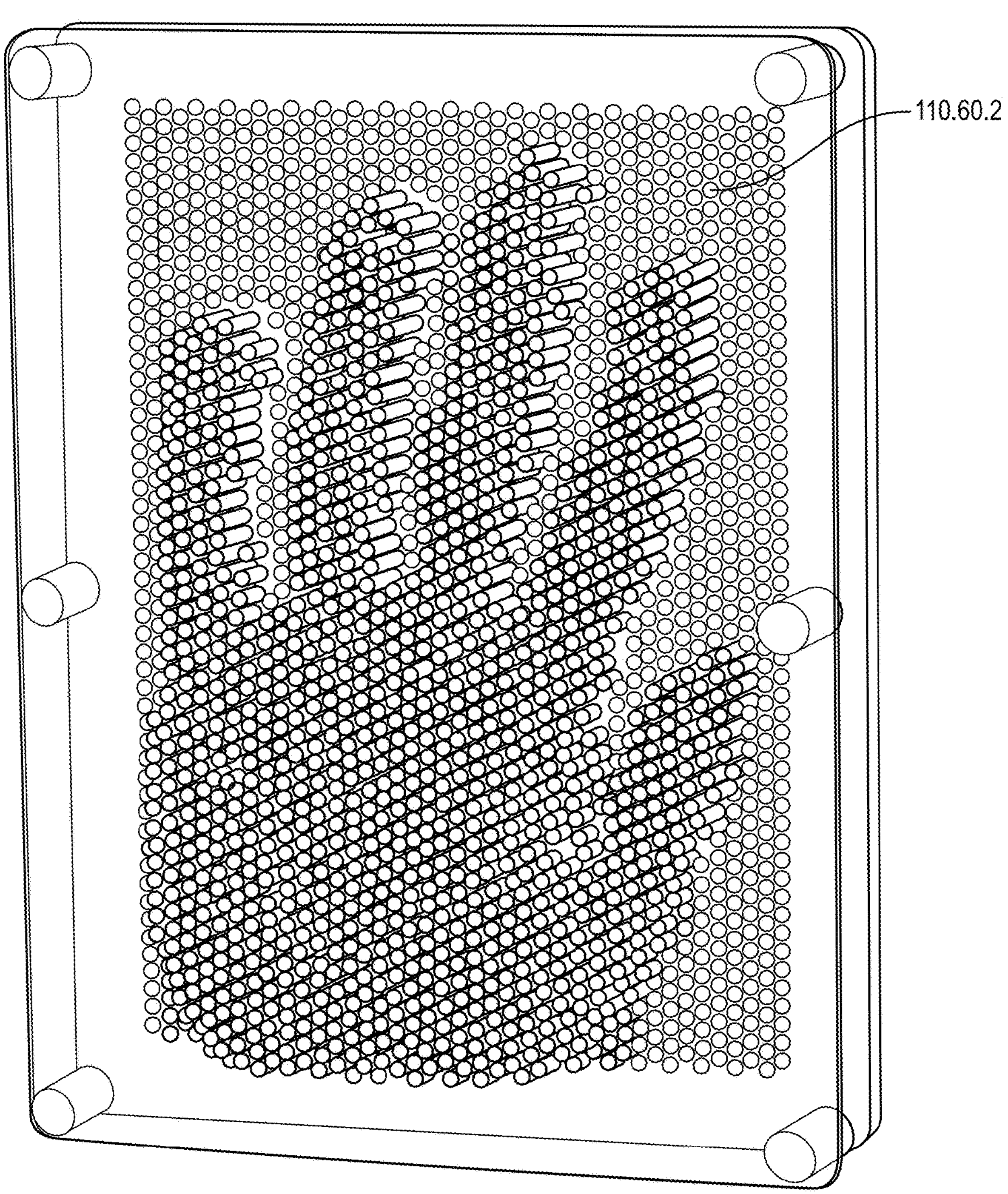
FIG. 12 shows a third exemplary data collecting apparatus, which is used in the collection of body part data by placing a component of said data collecting apparatus in direct contact with the player's body part.
Figures 13A, 13B:
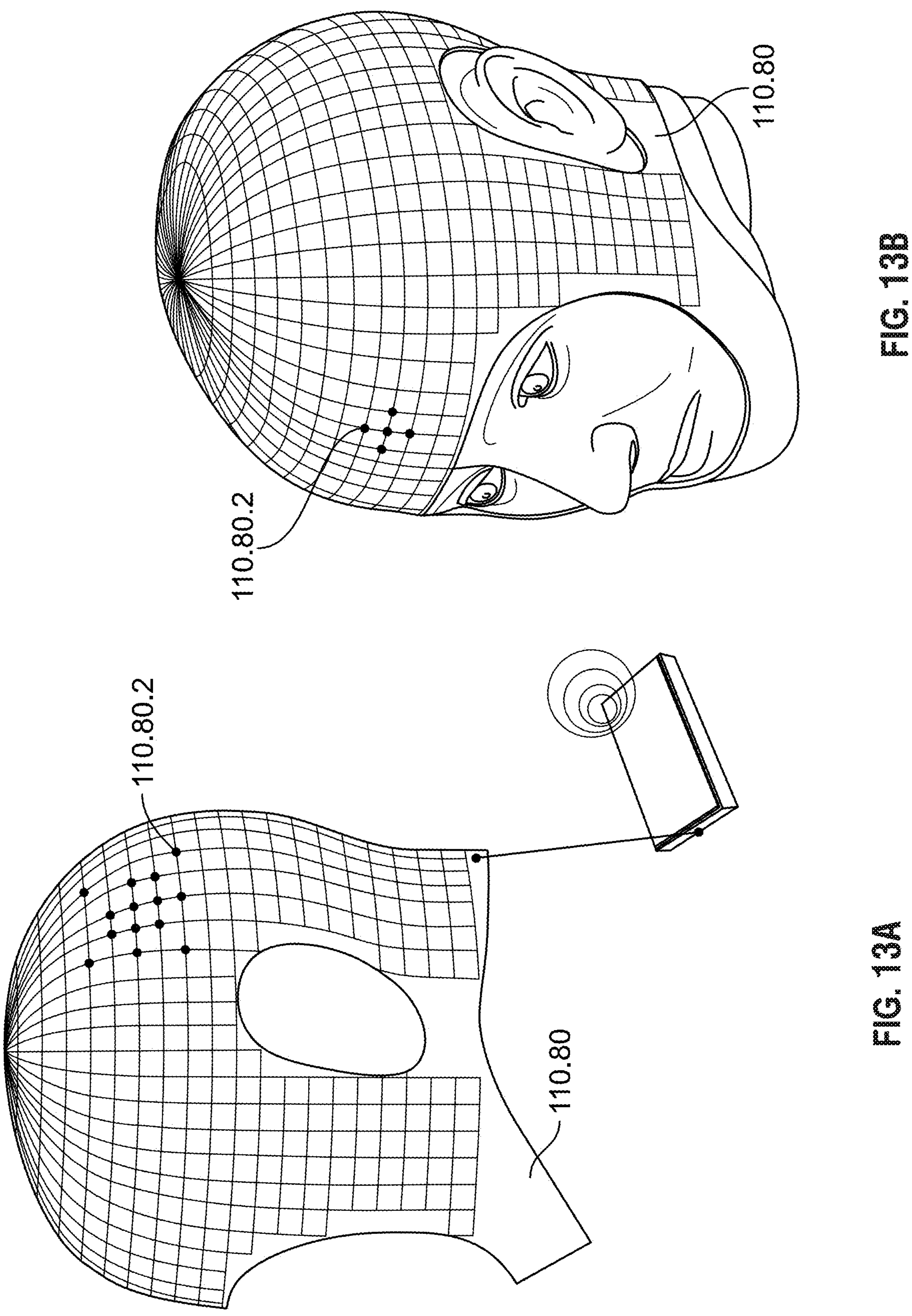
FIG. 13A-13B shows a fourth exemplary data collecting apparatus, which is used in the collection of additional body part data by placing a component of said data collecting apparatus in contact with the player's body part.

As shown in FIG. 11, the fitting equipment 110.36.2 includes the chin strap 110.36.2.1, one or more apertures 110.36.2.2 formed in a shell 110.36.2.3 of the helmet 110.36.2 and an internal scanning energy attenuation assembly 110.36.2.4. The position, number, and shape of the apertures 110.36.2.2 in the fitting equipment 110.36.2 are not limited by this disclosure. For example, the fitting equipment 110.36.2 may have one aperture 110.36.2.2 that is smaller than the aperture 110.36.2.2 shown in FIG. 8, the fitting equipment 110.36.2 may have twenty apertures that are positioned in various locations throughout the shell, or the fitting equipment 110.36.2 may have three apertures. These apertures 110.36.2.2 allow certain portions of the data collection member 110.8.2 to be seen when the fitting equipment 110.36.2 is worn over the data collection member 110.8.2 on the player's head H. As mentioned above, the fitting equipment 110.36.2 includes the faceguard that is removably attached to a forward portion of the fitting equipment 110.36.2. The faceguard may be used by the player, when wearing the fitting equipment 110.36.2 to assist the player in determining a preferred helmet wearing position. Once the player positions the fitting equipment 110.36.2 such that a preferred helmet wearing position is achieved, the faceguard is removed to increase the accuracy of the helmet scan by allowing a data collecting apparatus 110.4.2 to capture a greater, and less obscured, a portion of the player's face. To aid in the attachment and removal of the faceguard, easy to open and close clips may be utilized. Although the faceguard is removed, the chin strap assembly remains secured around the player's chin and jaw thereby securing the fitting equipment 110.36.2 in the preferred helmet wearing position.

Referring back to FIG. 8B, after the fitting equipment 110.36.2 is properly positioned on the player's head in steps 110.42, 110.44, the operator is prompted by the software application 110.4.4 to start the data acquisition process. Similar to the above process, the software application 110.4.4 may instruct the operator to: (i) change the speed at which they are moving around the player (e.g., slow down the pace) to ensure that the proper level of detail is captured in step 110.48, (ii) change the vertical position and/or angle of the data collecting apparatus 110.4.2 in step 110.50, and/or (iii) change the operators position in relation to the player P (e.g., move forward or back up from the player) in step 110.50. Once the operator completes the acquisition of additional body part data 110.99 in step 110.52, the software application 110.4.4 analyzes the data to determine if the quality of the data is sufficient to meet the quality requirements that are preprogrammed within the software application 110.4.4 in step 110.54. If the software application 110.4.4 determines that the quality of the data is sufficient 110.54, then the data collecting apparatus 110.4.2 will send, via a wire or wirelessly, to a local or remote computer/database (e.g., team database 100.2.10), the body part data 110.99. This local or remote computer/database may then be locally or remotely accessed by technicians who perform the next steps in designing and manufacturing the American football helmet 5000.

Alternatively, if the software application 110.4.4 determines that the quality of the body part data 110.99 lack sufficient quality to meet the quality requirements that are preprogrammed within the software application 110.4.4, then the software application 110.4.4 may prompt the operator to obtain additional data in steps 110.56, 110.58. Specifically, in step 110.56 the software application 110.4.4 may graphically show the operator: (i) the location to stand, (ii) what elevation to place the data collecting apparatus 110.4.2, and/or (iii) what angle to place the data collecting apparatus 110.4.2. Once the operator obtains the additional body part data 110.99 at that specific location, the software application 110.4.4 will then analyze the original collection of body part data 110.99 along with this additional body part data 110.99 to determine if the quality of the combined collection of body part data 110.99 is sufficient to meet the quality requirements that are preprogrammed within the software application 110.4.4. This process is then repeated until the quality of the data is sufficient. Alternatively, the software application 110.4.4 may request that the operator restart the data acquisition process in step 110.58. The software application 110.4.4 then analyzes the first collection of body part data 110.99 along with the second collection of body part data 110.99 to see if the combination of data is sufficient to meet the quality requirements that are preprogrammed within the software application 110.4.4. This process is then repeated until the quality of the data is sufficient. After the data is determined to be sufficient, the software application 110.4.4 performs step 110.62. It should be understood that some of the steps in the process of acquiring body part data 110.99 may be performed in a different order. For example, the acquisition of data in connection with the data collection member 110.8.2 may be performed after the acquisition of data in connection with the fitting equipment 110.36.2.

F. SELECTING PROTECTIVE EQUIPMENT COMPONENTS

1. Direct Selection Methods

Figure 14:
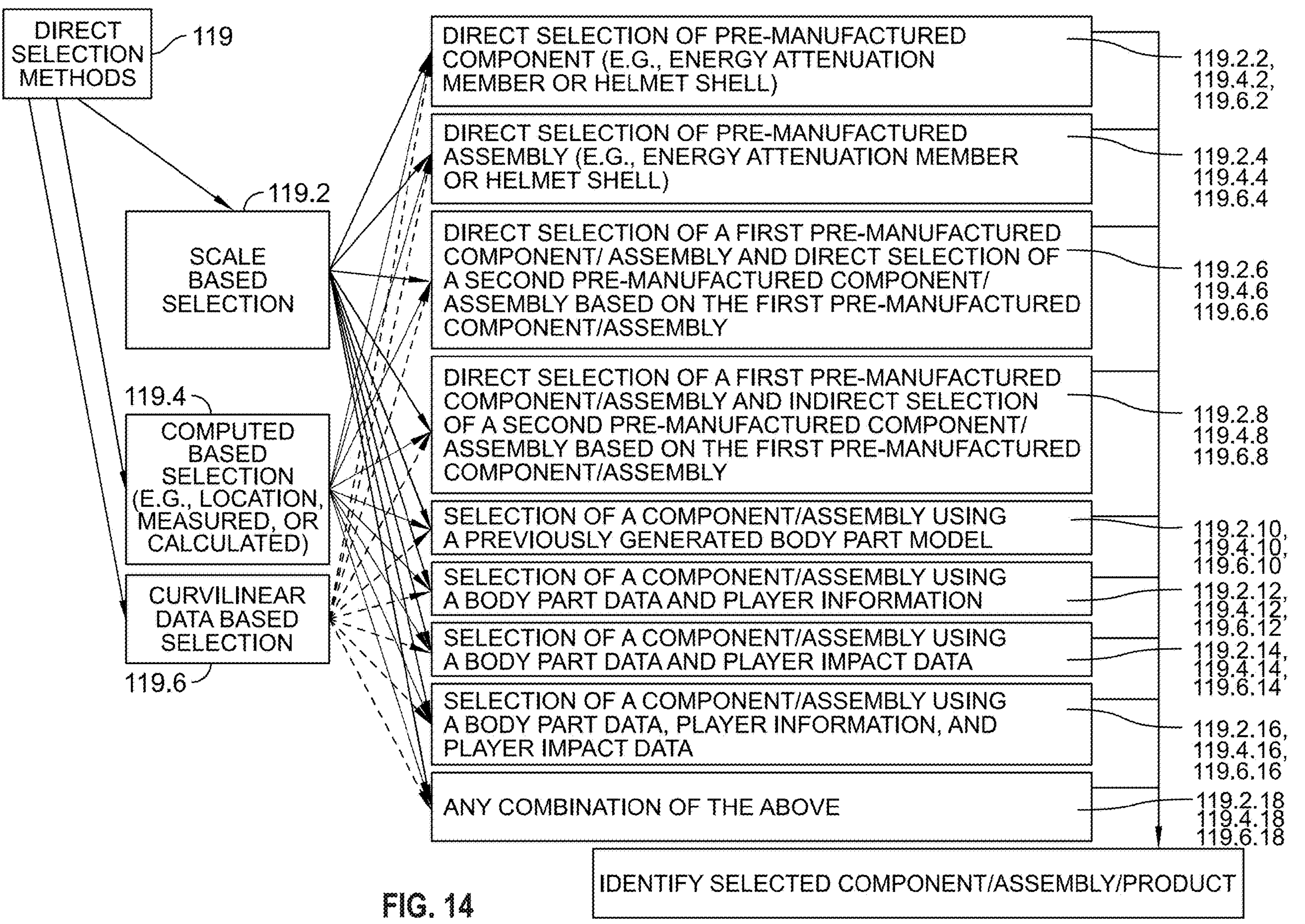
FIG. 14 is a flow chart showing various direct selection methods that may be used by the spatial data collection, processing and fitment system for selecting components, assemblies, and/or products for a specific player.
Figure 15:
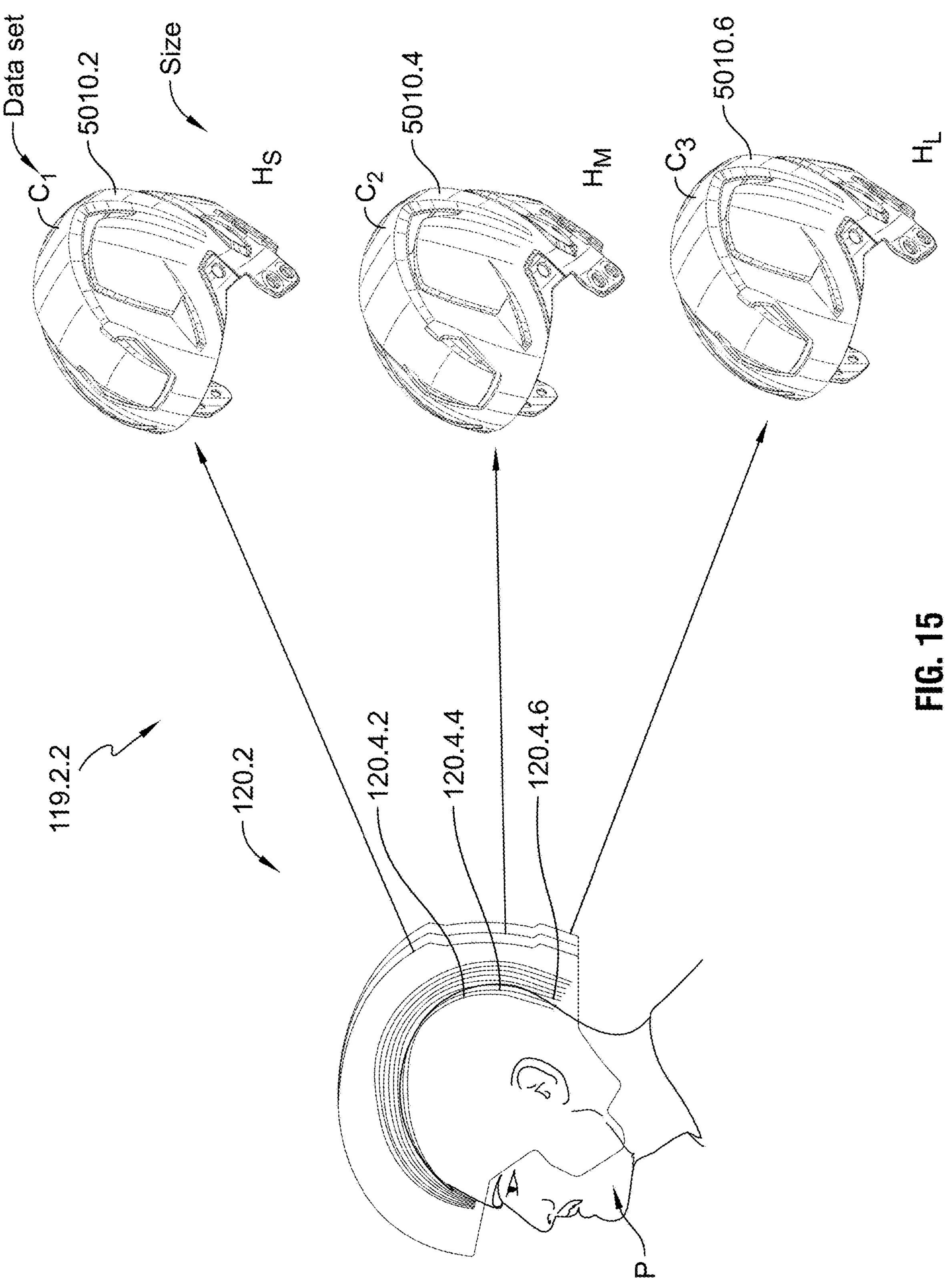
FIG. 15 is a graphical flow chart showing a direct selection of a component of from a plurality of components using a scale based selection methodology.
Figure 16:
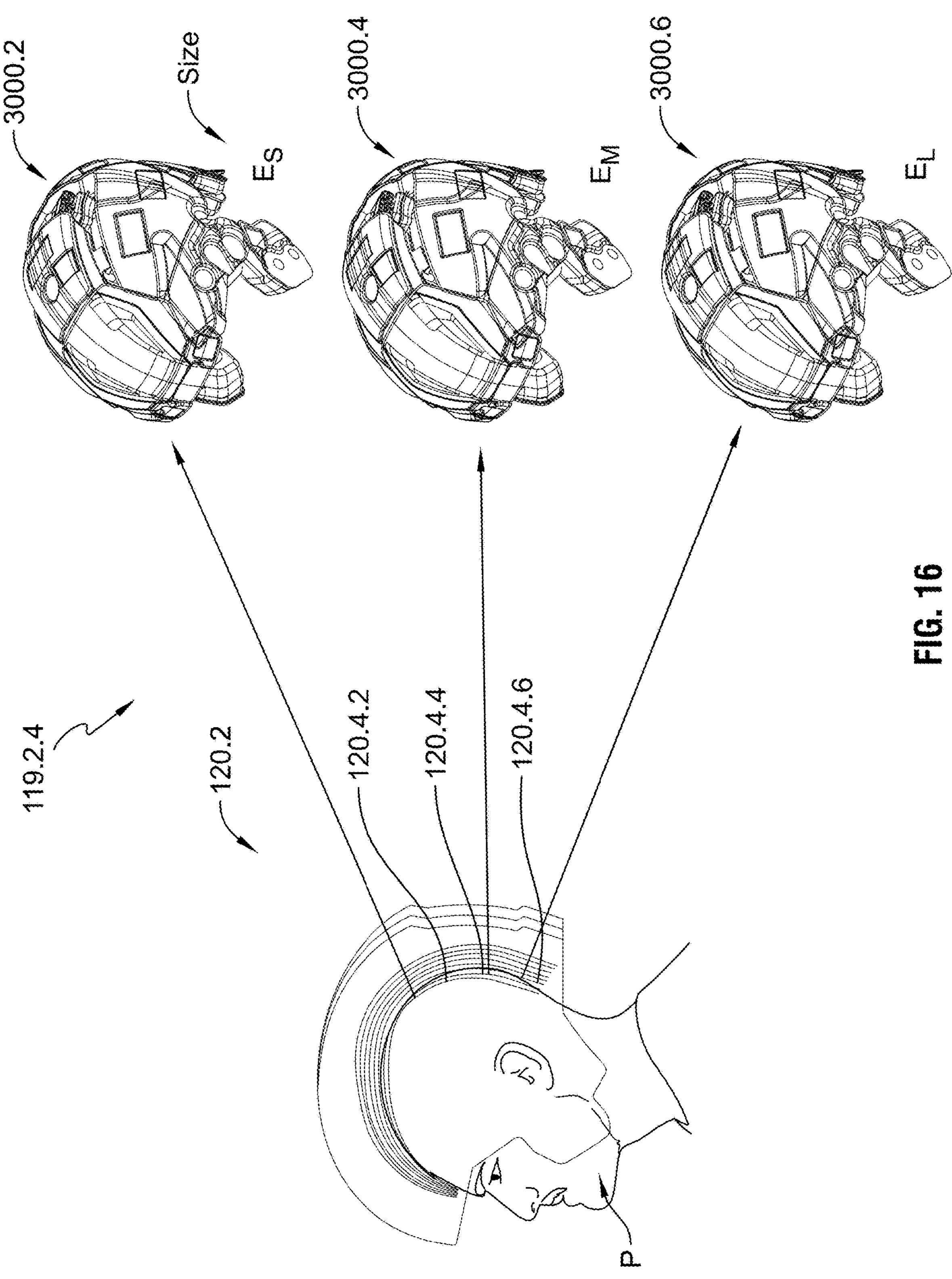
FIG. 16 is a graphical flow chart showing the direct selection of an assembly from a plurality of assemblies using the scale based selection methodology.
Figure 17:
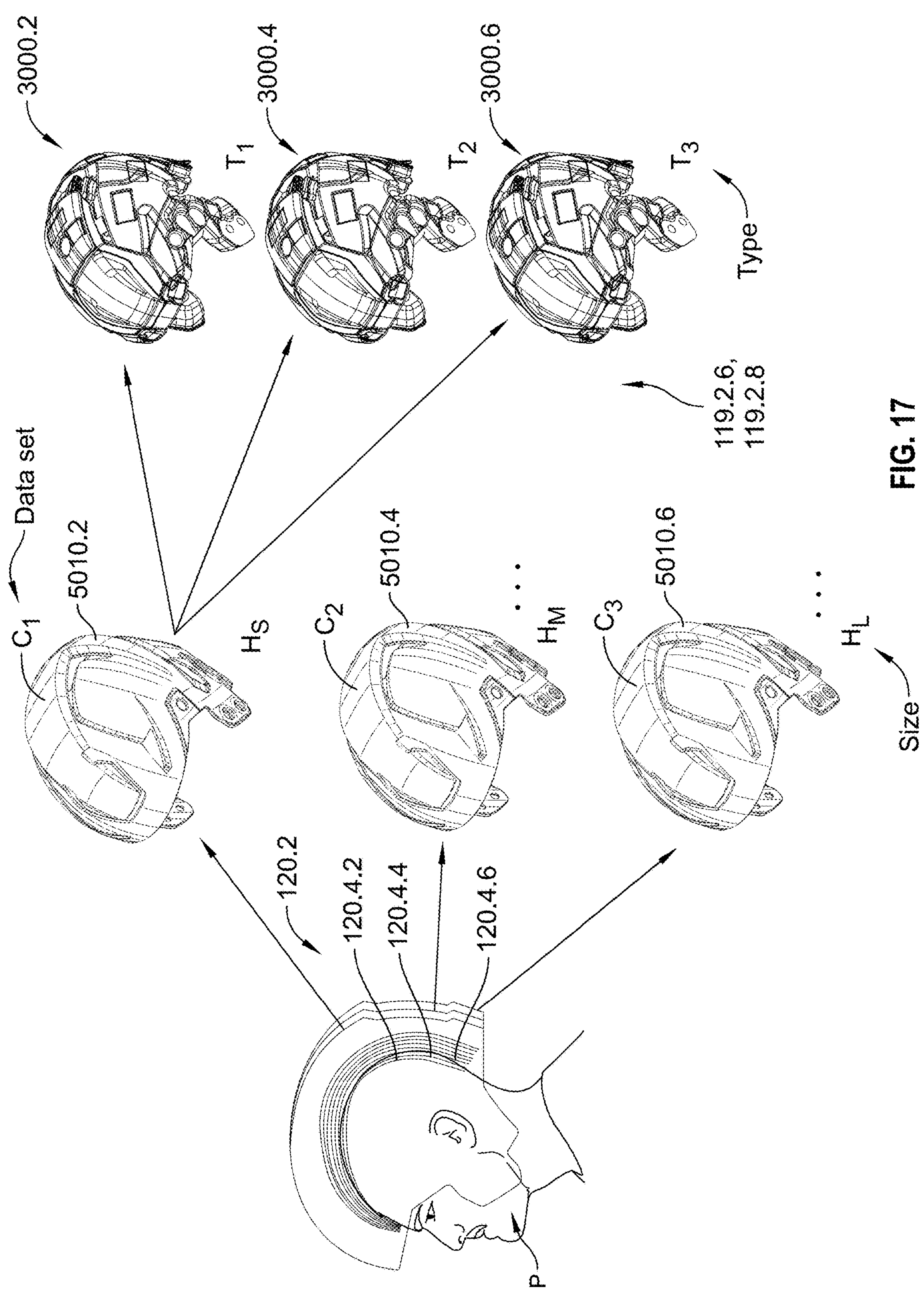
FIG. 17 is a graphical flow chart showing a direct selection of a component from a plurality of components using the scale based selection methodology and a selection of an assembly from a plurality of assemblies based on the selected component.
Figure 18:
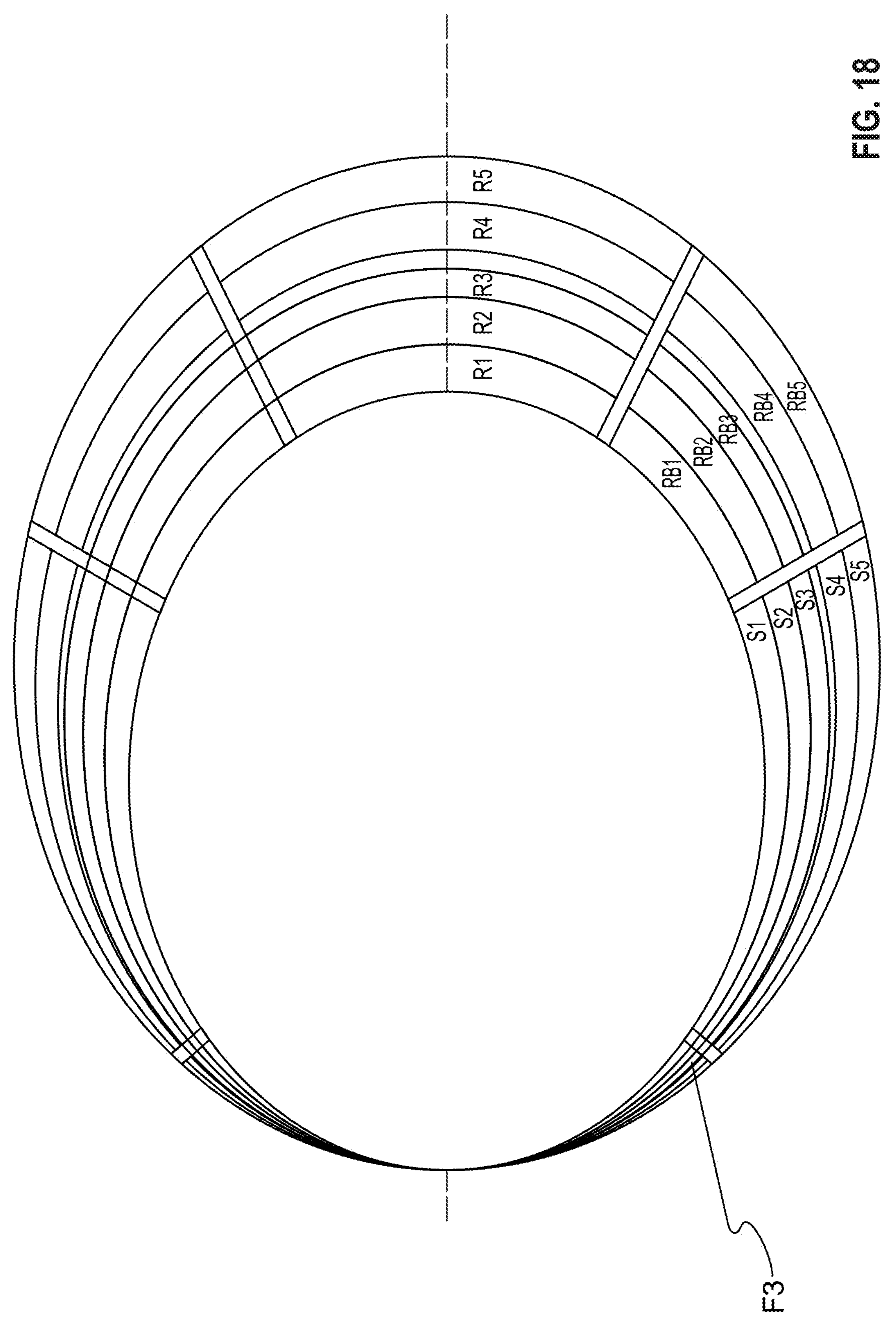
FIG. 18 is a schematic showing the direct selection of multiple component from an arrangement of pluralities of components based upon the selected component.
Figure 29:
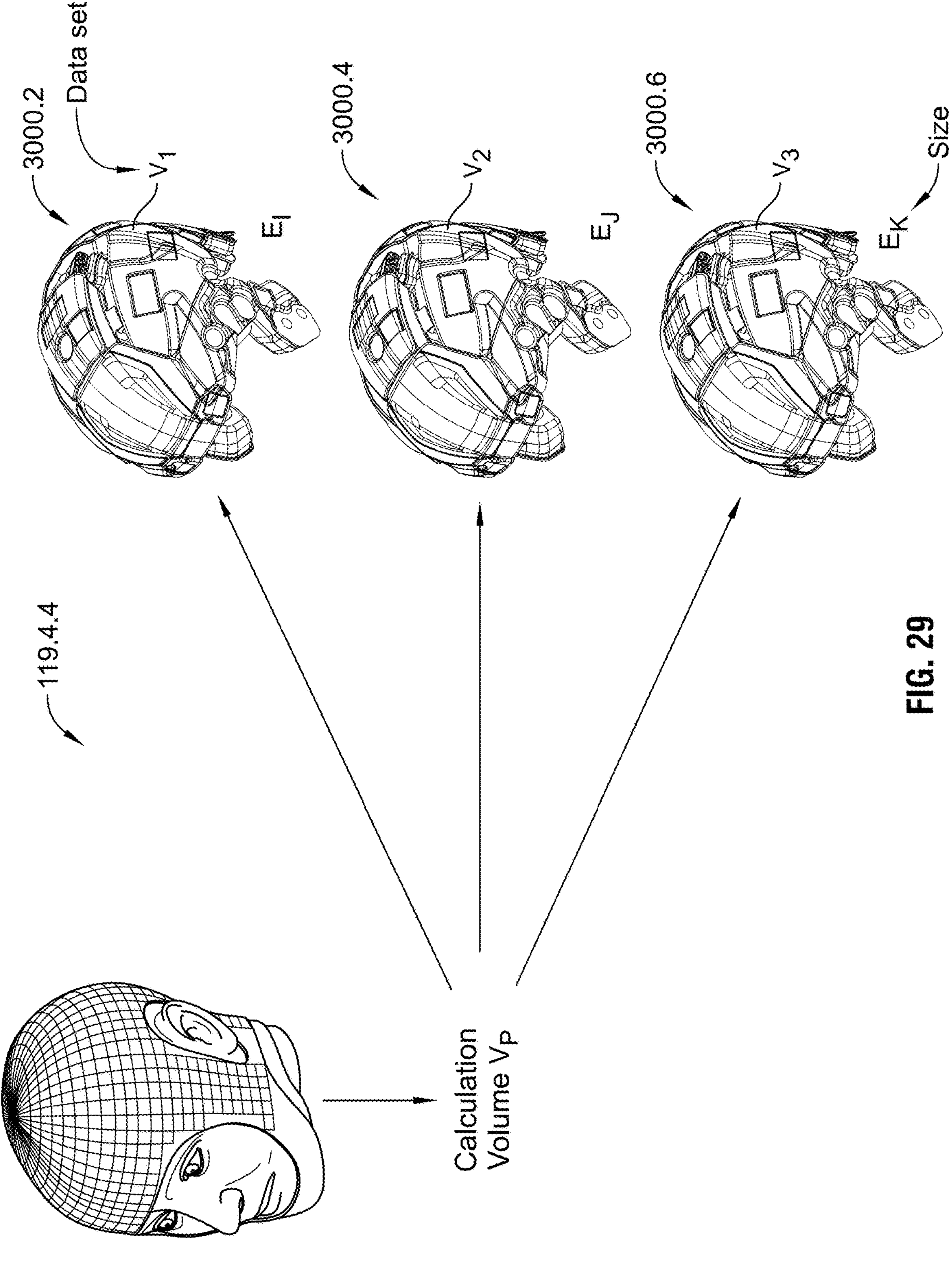
FIG. 29 is a graphical flow chart showing the direct selection of an assembly from a plurality of assemblies using the computed based selection methodology.
Figure 30:
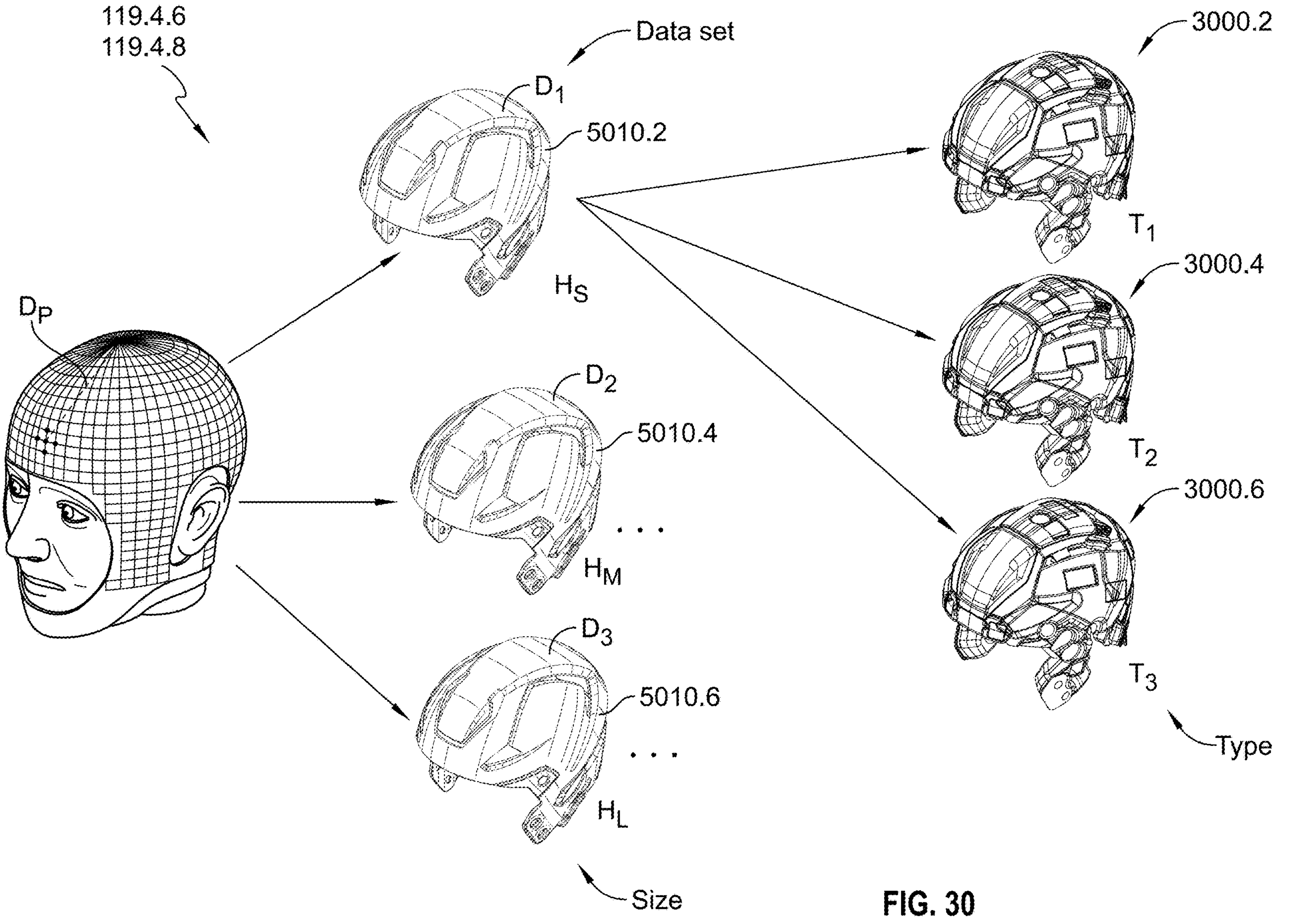
FIG. 30 is a graphical flow chart showing the direct selection of a component of from a plurality of components using the computed based selection methodology and a selection of an assembly from a plurality of assemblies based on the selected component.
Figure 31:
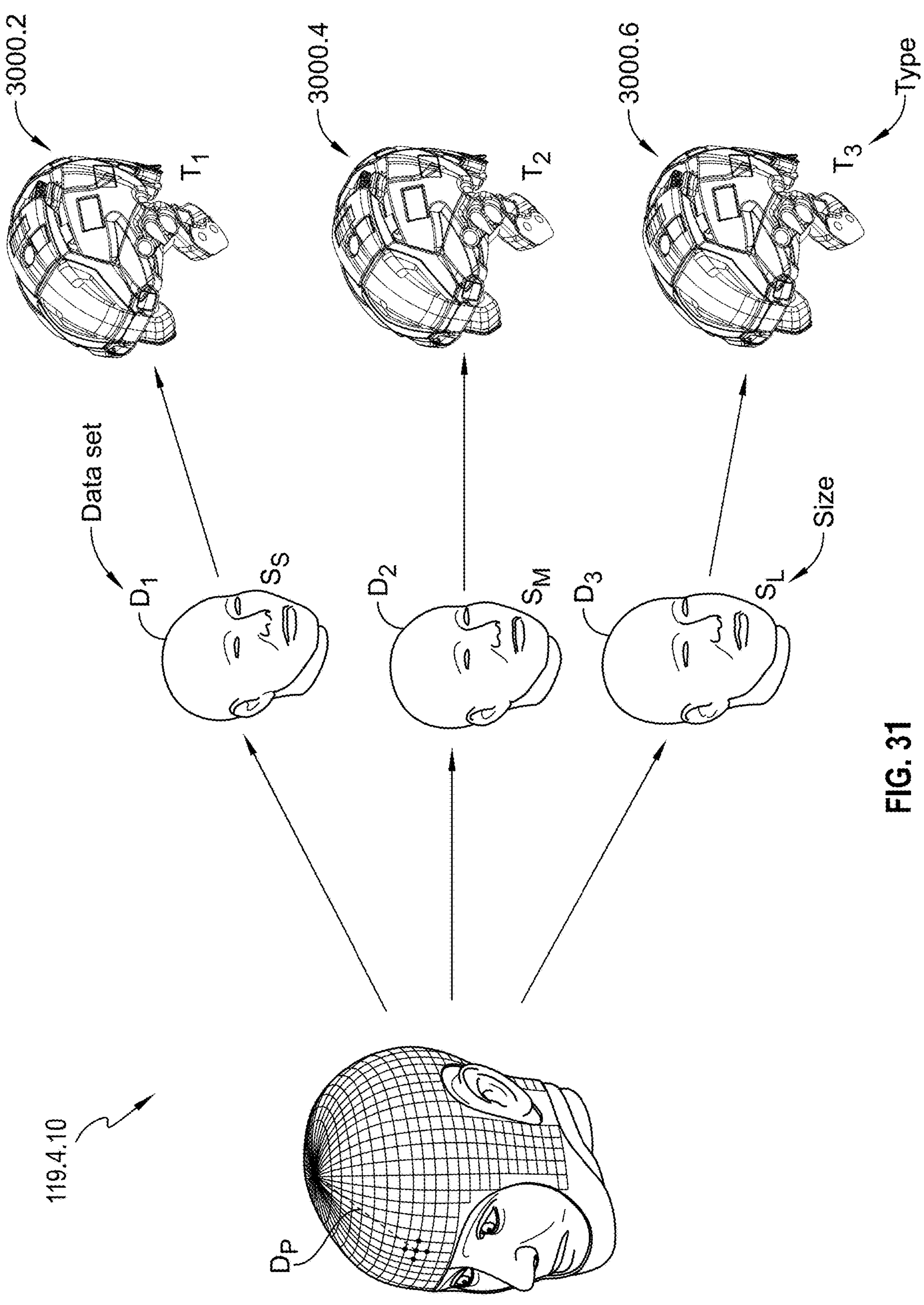
FIG. 31 is a graphical flow chart showing the direct selection of an assembly from a plurality of assemblies using the computed based selection methodology, wherein a previously generated head model: (i) is selected from a plurality of previously generated head model using the player data, and (ii) is associated with the component.
Figure 32:
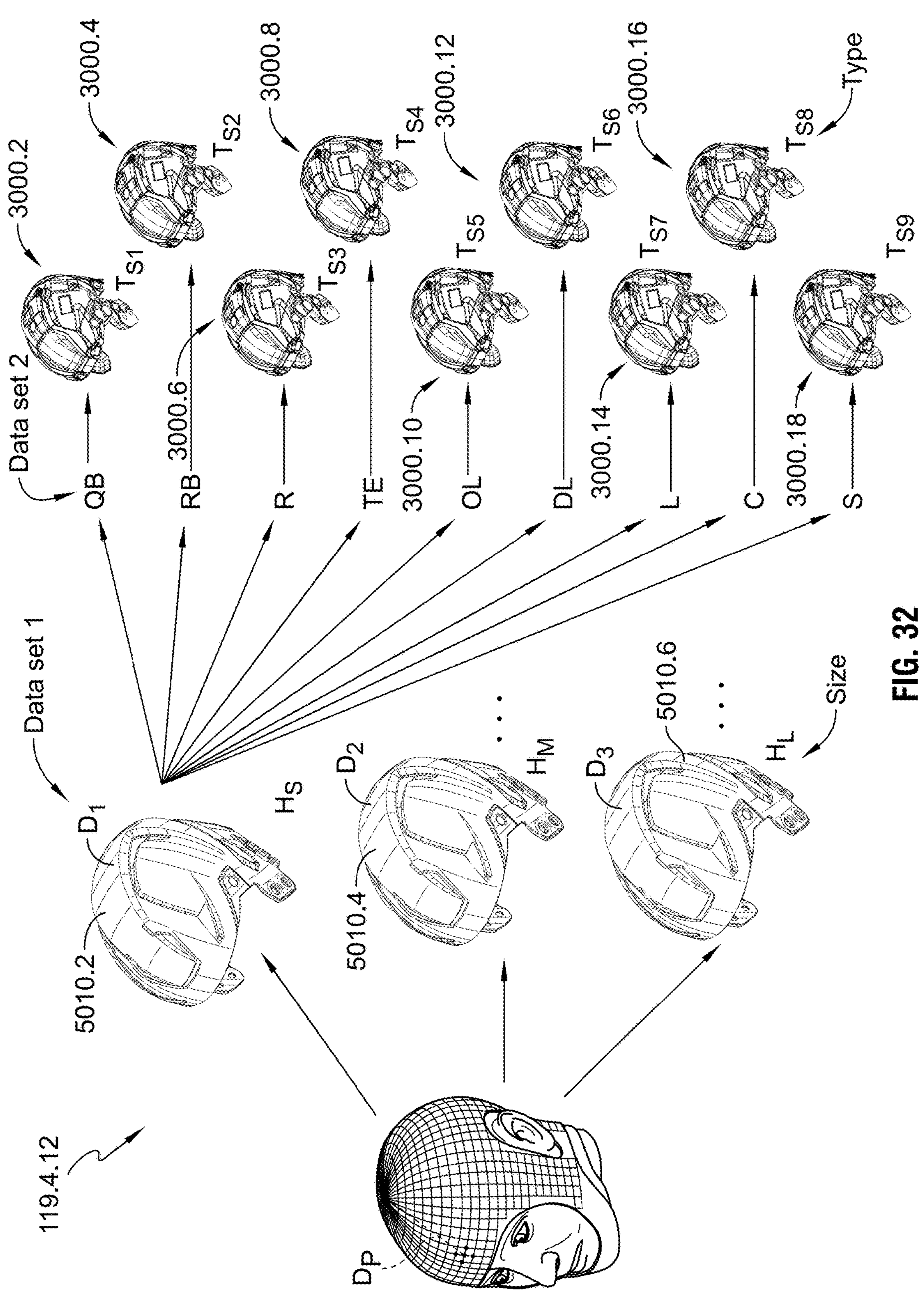
FIG. 32 is a graphical flow chart showing the direct selection of a component of from a plurality of components using the computed based selection methodology and a selection of an assembly from a plurality of assemblies based on the selected component and player information.
Figure 33:
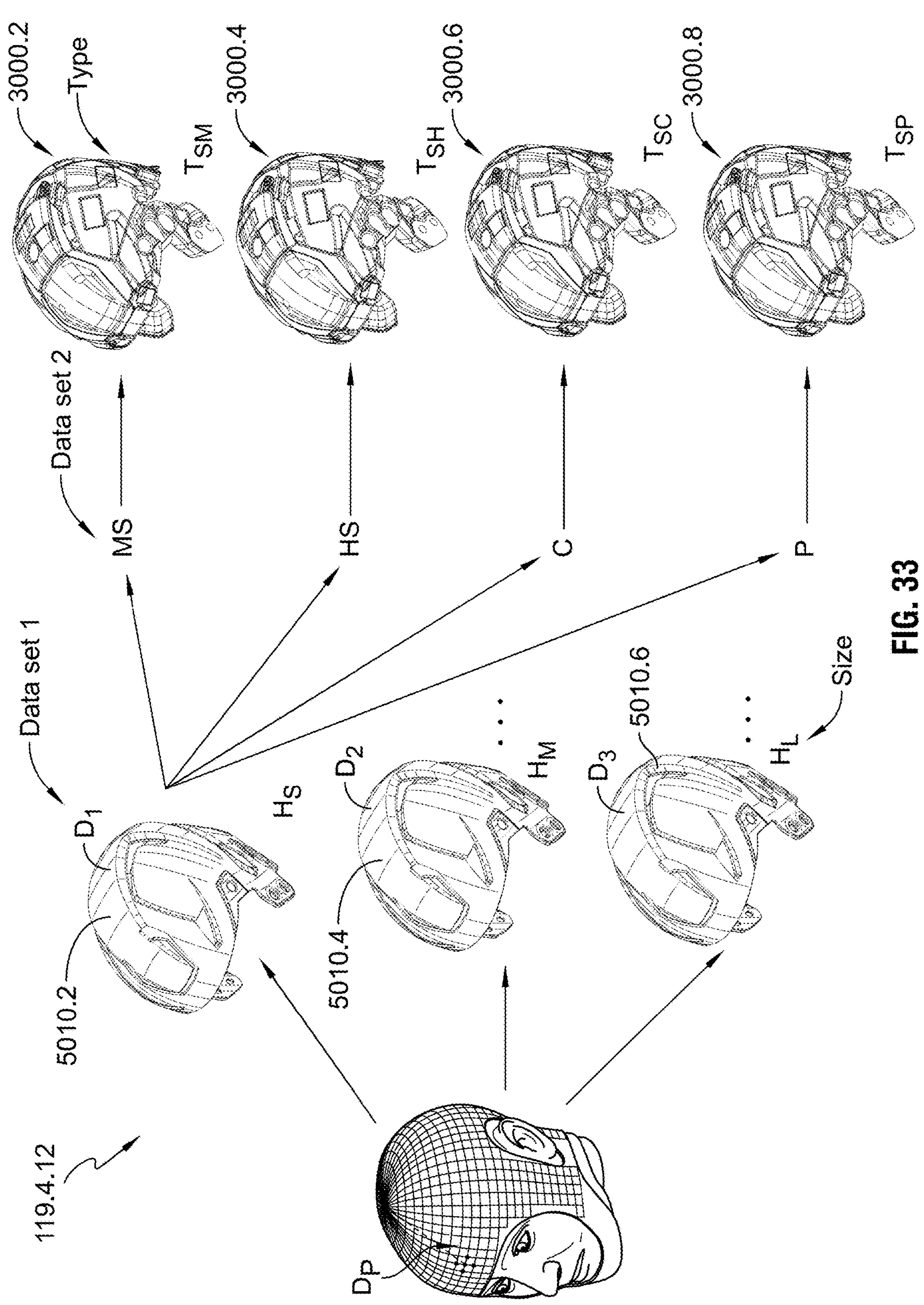
FIG. 33 is a graphical flow chart showing the direct selection of a component from a plurality of components using the computed based selection methodology and a selection of an assembly from a plurality of assemblies based on the selected component and player impact data.
Figure 34:
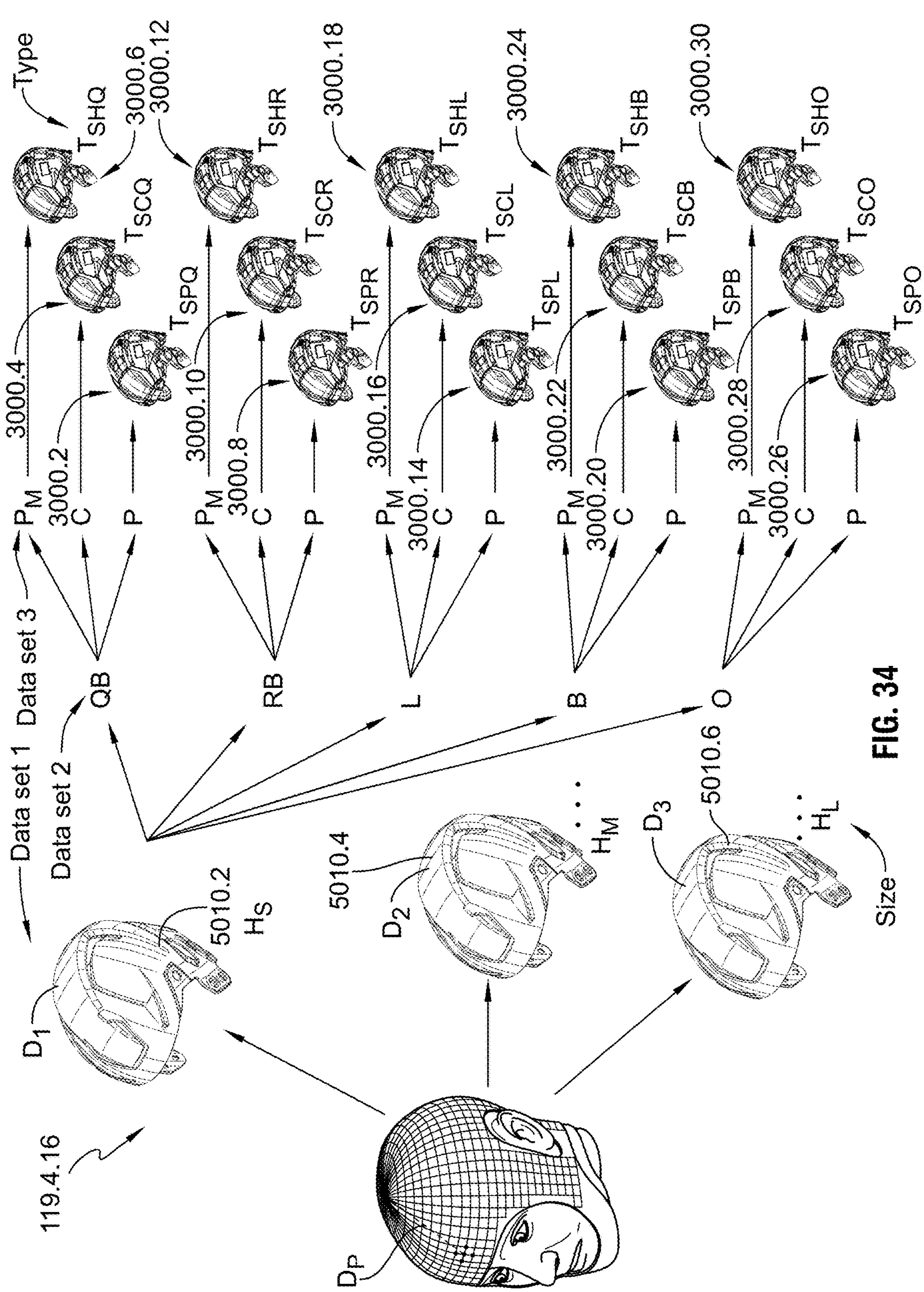
FIG. 34 is a graphical flow chart showing the direct selection of a component from a plurality of components using the computed based selection methodology and a selection of an assembly from a plurality of assemblies based on the selected component, player information, and impact data.
Figure 37:
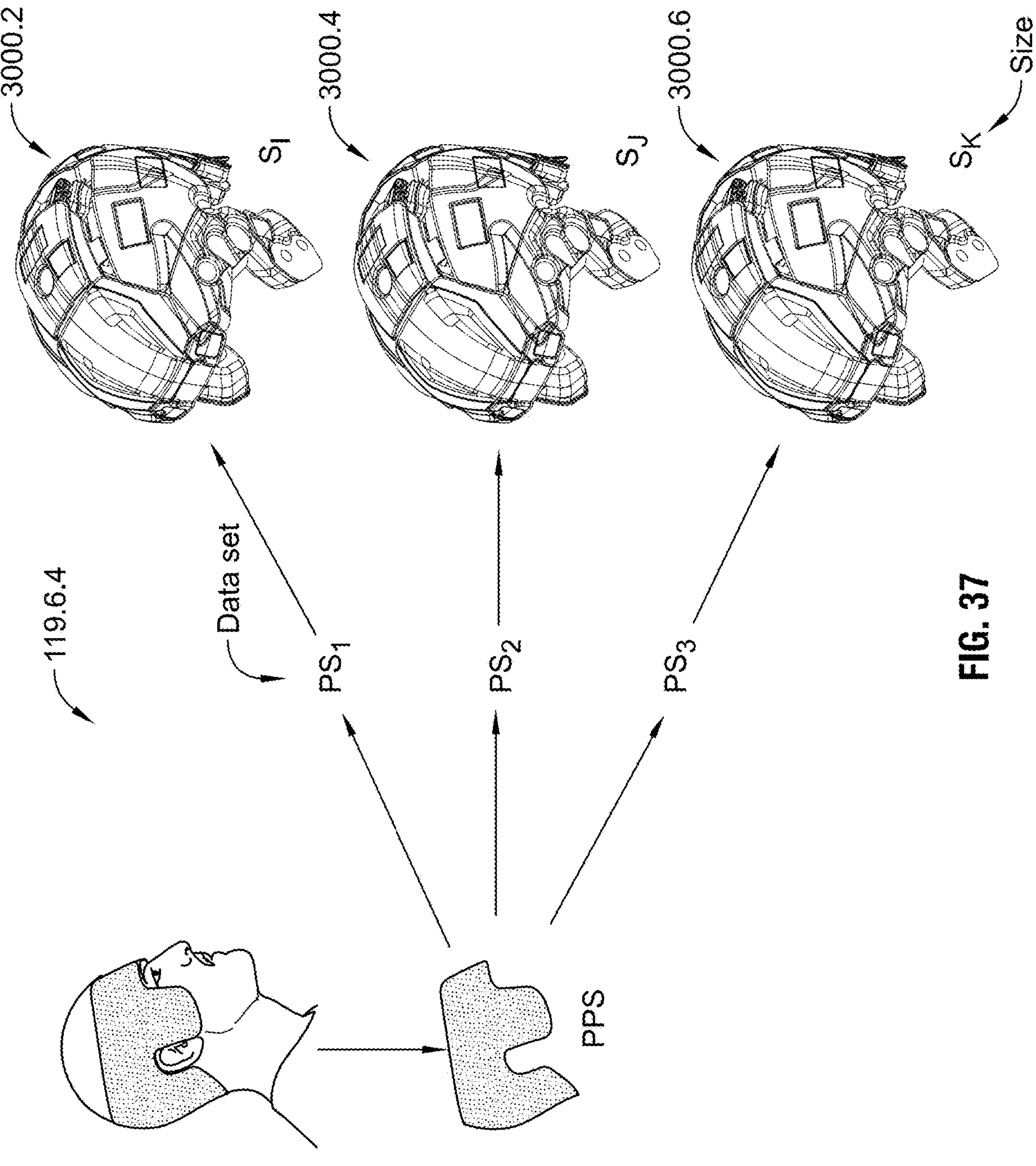
FIG. 37 is a graphical flow chart showing the direct selection of an assembly from a plurality of assemblies using the curvilinear based selection methodology.
Figure 38:
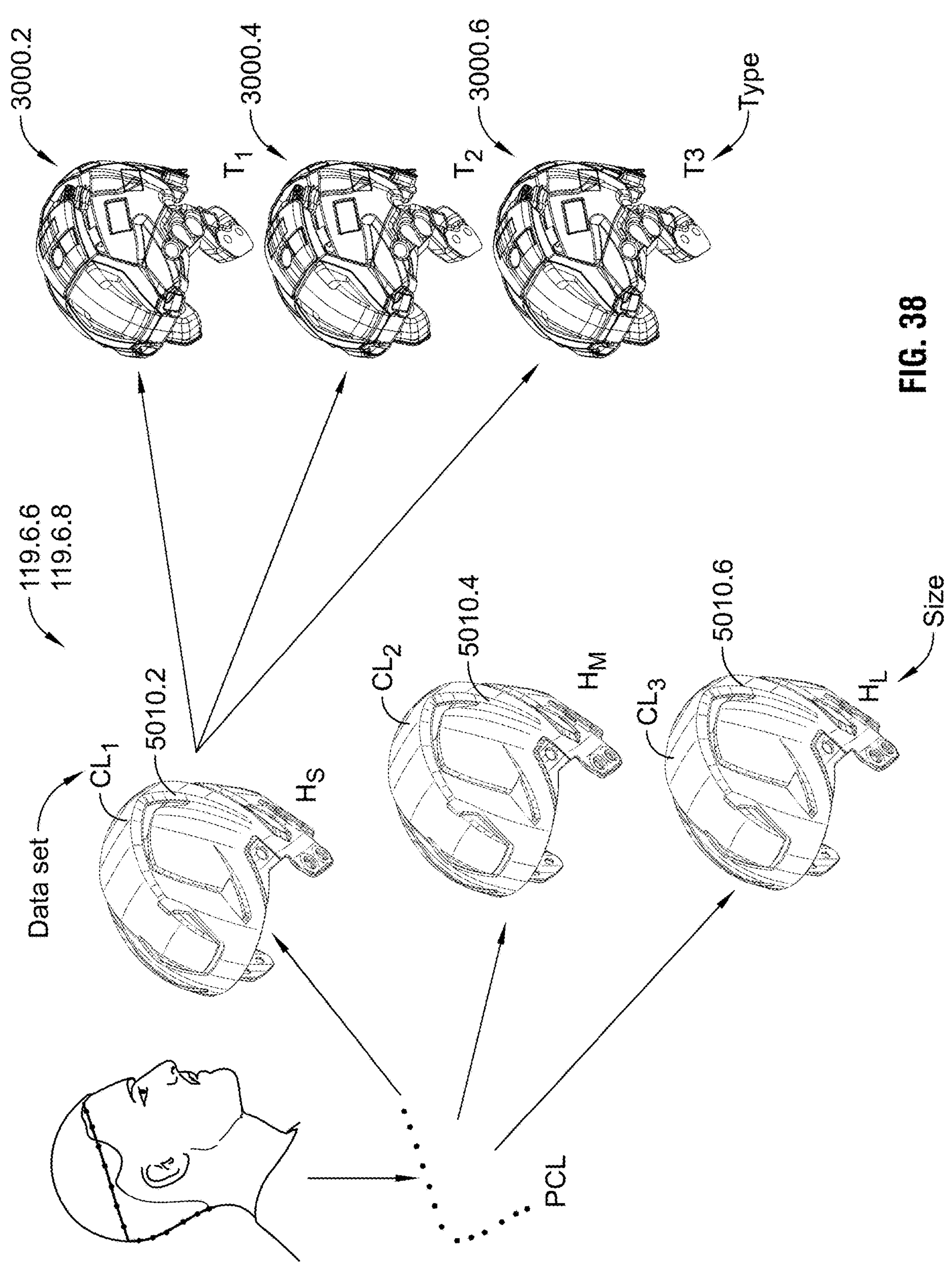
FIG. 38 is a graphical flow chart showing the direct selection of a component of from a plurality of components using the curvilinear based selection methodology and a selection of an assembly from a plurality of assemblies based on the selected component.
Figure 39:
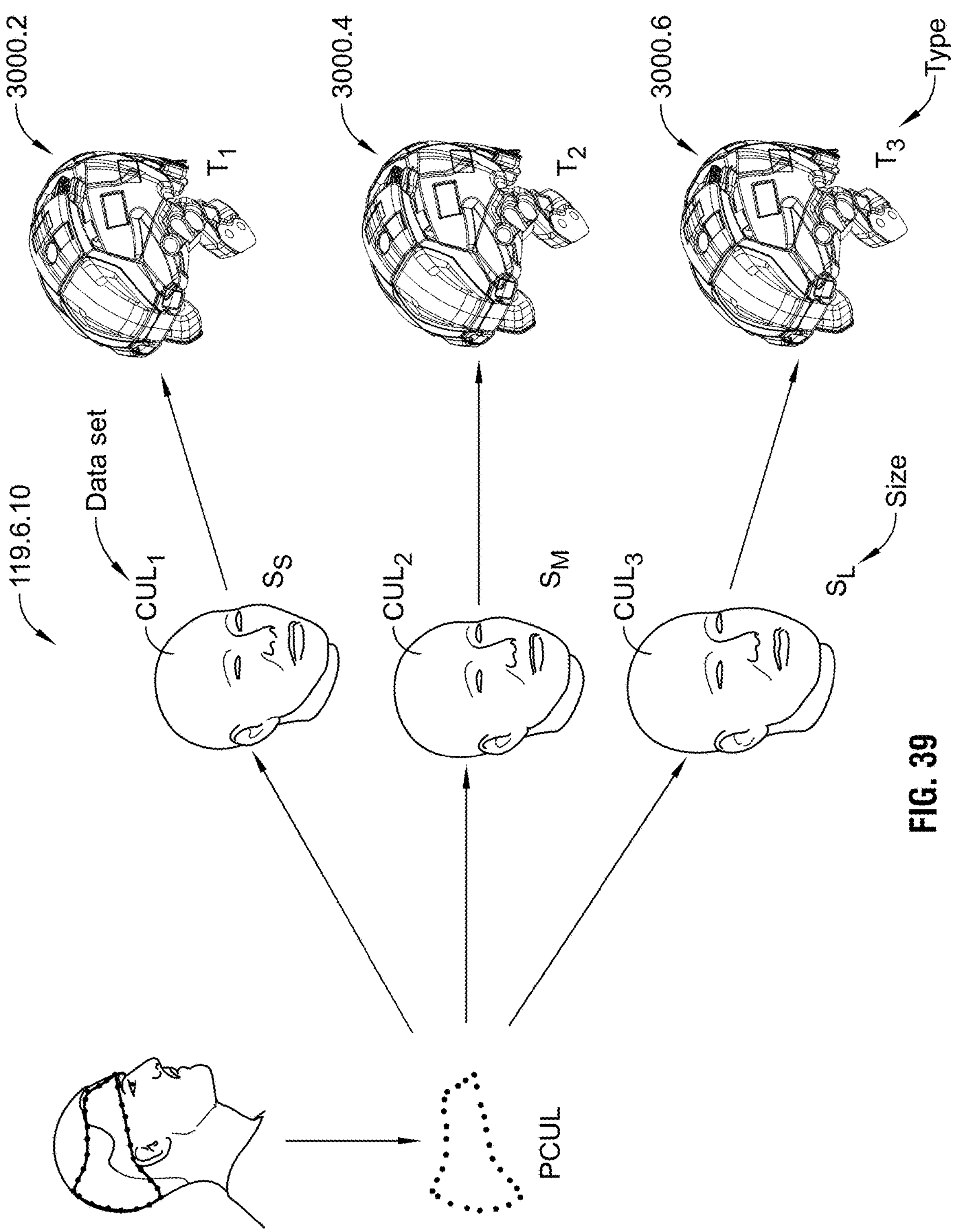
FIG. 39 is a graphical flow chart showing the direct selection of an assembly from a plurality of assemblies using the curvilinear based selection methodology, wherein a previously generated head model: (i) is selected from a plurality of previously generated head model using the player data, and (ii) is associated with the assembly.
Figure 40:
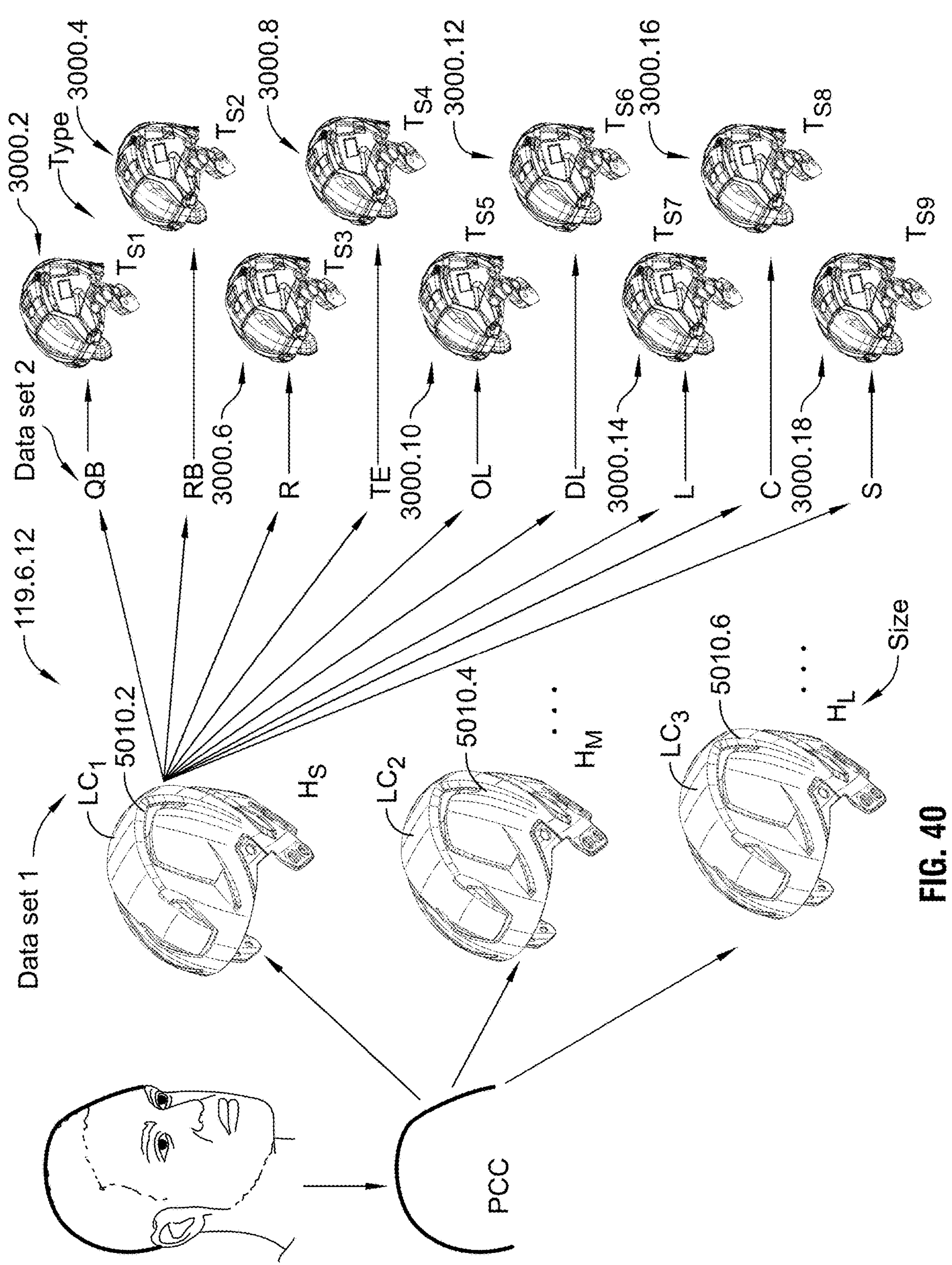
FIG. 40 is a graphical flow chart showing the direct selection of a component of from a plurality of components using the curvilinear based selection methodology and a selection of an assembly from a plurality of assemblies based on the selected component and player information.
Figure 41:
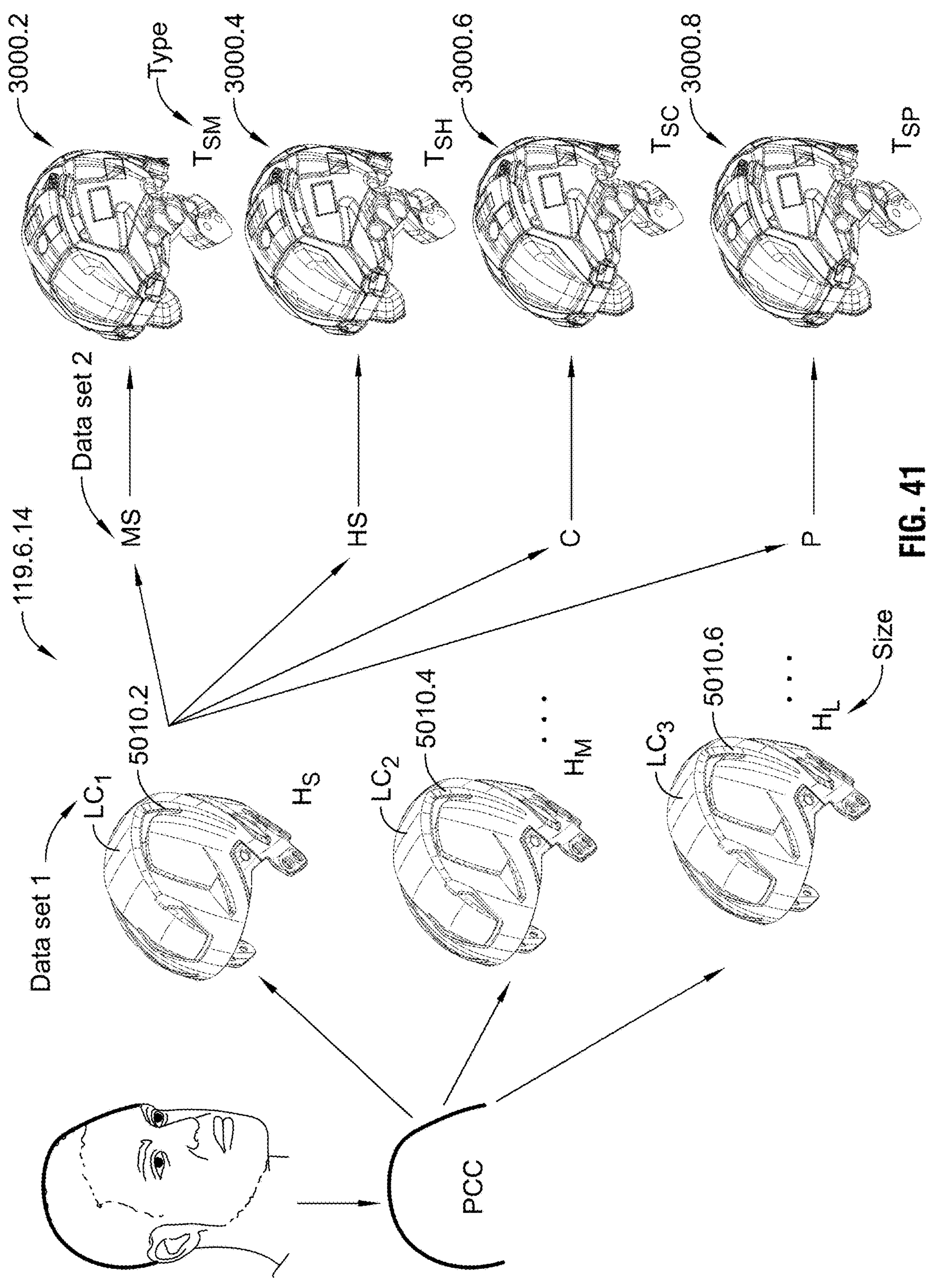
FIG. 41 is a graphical flow chart showing the direct selection of a component from a plurality of components using the curvilinear based selection methodology and a selection of an assembly from a plurality of assemblies based on the selected component and player impact data.
Figure 42:
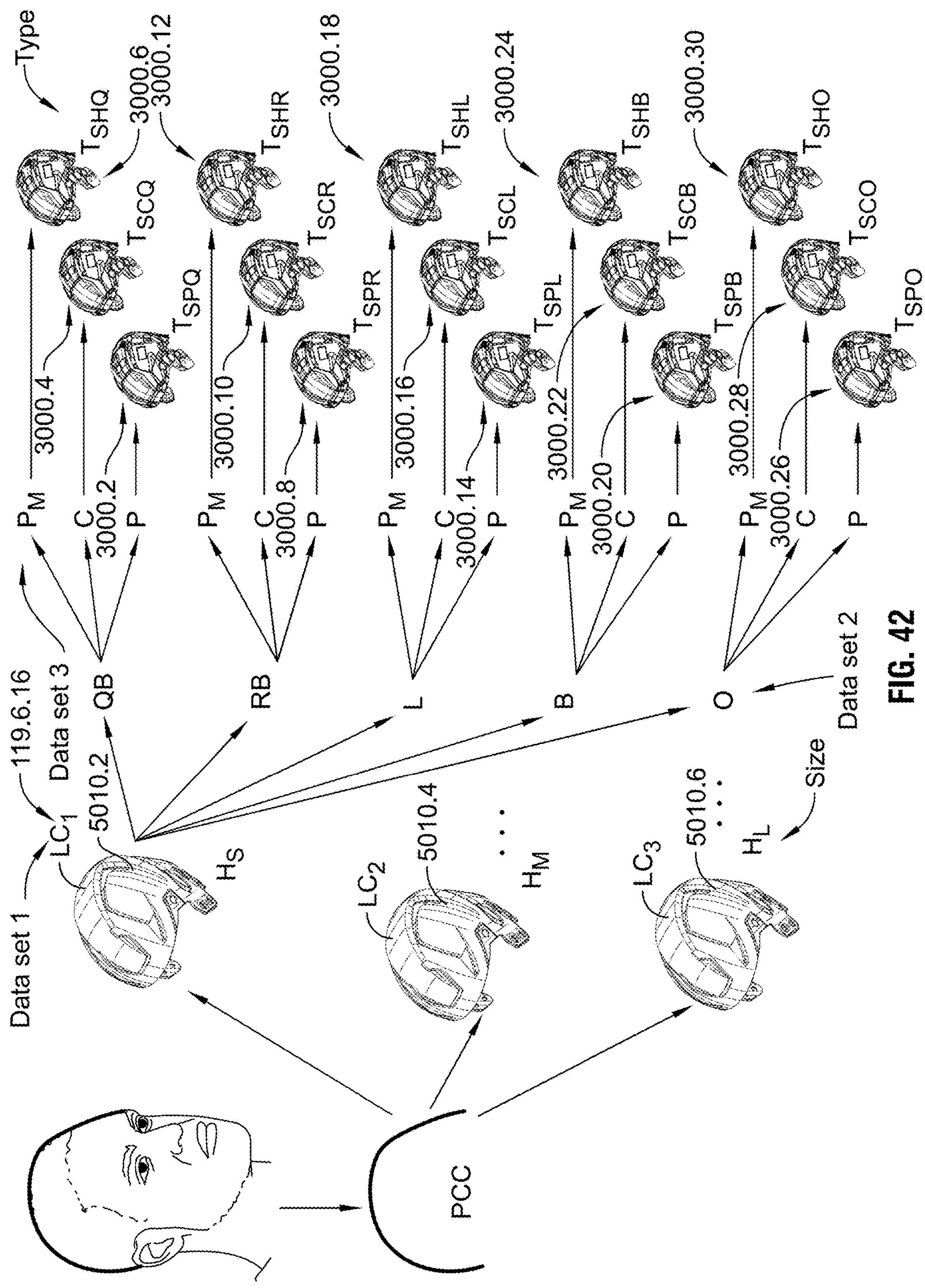
FIG. 42 is a graphical flow chart showing the direct selection of a component from a plurality of components using the curvilinear based selection methodology and a selection of an assembly from a plurality of assemblies based on the selected component, player information, and impact data.

FIG. 14 contains a flow chart that describes various methods of assembling, manufacturing, or creating protective sports equipment in step 119, each of which do not require the system 10 to generate a body part model. Instead, these methods allow for the direct selection of pre-manufactured components that are designed to be installed in or utilized to assemble, manufacture, or create the protective sports equipment. This may be beneficial in certain situations because it minimizes computing requirements, the need for using a computer program to generate a computerized model, and time associated therewith. In particular, FIG. 14 discloses three direct selection methods, which include: (i) a scale based selection method 119.2, (ii) a computed based selection method (e.g., location, measured, and/or calculated) 119.4, and (iii) a curvilinear data based selection method 119.6. Each of these selection methods 119.2, 119.4, 199.6 may be performed in a number of different ways, wherein some of these ways include: (i) direct selection of pre-manufactured component (e.g., energy attenuation member or helmet shell) 119.2.2, 119.4.2, 119.6.2 as shown in FIGS. 15, 22, 28, 35 and 36, (ii) direct selection of pre-manufactured assembly (e.g., energy attenuation member or helmet shell) 119.2.4, 119.4.4, 119.6.4 as shown in FIGS. 16, 29, and 37, (iii) direct selection of a first pre-manufactured component/assembly and direct selection of a second pre-manufactured component/assembly based on the first pre-manufactured component/assembly 119.2.6, 119.4.6, 119.6.6 as shown in FIGS. 17, 30, and 38, (iv) direct selection of a first pre-manufactured component/assembly and indirect selection of a second pre-manufactured component/assembly based on the first pre-manufactured component/assembly 119.2.8, 119.4.8, 119.6.8 and shown in FIGS. 17, 30, and 38, (v) selection of a component/assembly using a selected body part model 119.2.10, 119.4.10, 119.6.10 as shown in FIGS. 18, 31, and 39, (vi) selection of a component/assembly using body part data 110.99 and player information 119.2.12, 119.4.12, 119.6.12 and shown in FIGS. 19, 32, and 40, (vi) selection of a component/assembly using body part data 110.99 and player impact data 119.2.14, 119.4.14, 119.6.14 as shown in FIGS. 20, 33, and 41, and/or (vii) selection of a component/assembly using body part data 110.99, player information 109.2.99, and player impact data 119.2.16, 119.4.16, 119.6.16 as shown in FIGS. 21, 34, and 42, and/or any combination of the above 119.2.18, 119.4.18, 119.6.18.

i. Scale Based Selection

The pre-manufactured component(s)/assemblies of the protective sports equipment can be selected using a scale based selection methodology 119.2, where a player stands in front of, adjacent to, or near a reference object (e.g., a reference poster/scale 120.2) of known size or configuration. In this method, said object—namely, a poster/scale 120.2—may be applied to a reference wall or surface (see FIG. 15). The poster/scale 120.2 includes a reference head shape and number of contour lines 120.4.2, 120.4.4, 120.4.6 drawn thereon, which represent the inner surfaces of different pre-manufactured components/assemblies. The player or helmet wearer P stands in front of the poster 120.2 and aligns their head with the reference head shape of the poster 120.2. The pre-manufactured component associated with that contour line 120.4.2 that is obscured by the player's head H should be selected for the player P from the plurality of pre-manufactured components. In some embodiments, a camera may be utilized to capture and record which contour lines were obscured by the player P. As shown in FIG. 15 (step 119.2.2), the player's head obscures contour line 120.4.6. The system 10 will compare the obscured contour line 120.4.6 with a data set that contains a plurality of contour lines, wherein each contour line contained in said data set is directly associated with a pre-manufactured component. Accordingly, the system 10 will recommend a large shell size for the specific player, as the obscured contour line 120.4.6 is directly associated with the large shell size.

| Data Set (i.e., Contour Lines) | Pre-Manufactured Components |
|---|---|
| Contour Line 120.4.2 | Helmet Shell—Size Small $H_S$ |
| Contour Line 120.4.4 | Helmet Shell—Size Medium $H_M$ |
| Contour Line 120.4.6 | Helmet Shell—Size Large $H_L$ |

In other embodiments, the fitter or equipment manager may simply take note of which contour line(s) were obscured and provide said information (e.g., on a web-based form or on an order form) during the protective sports equipment ordering process. In a further embodiment, a software program loaded onto an electronic device (e.g., mobile phone) may project (actually or digitally) the lines (visible or unvisitable) onto the player in order to determine which contour line(s) are obscured. In another embodiment, an electronic device (e.g., mobile phone) may directed tell the operator in order to instruct the player to move forward or backward in order to best align the player's head with the object (e.g., poster 120.2). In this embodiment, the electronic device may also be capable of recording the obscured contour line(s) 120.4.2 or the fitter or equipment manager may be required to take note of the obscured contour line(s).

As shown in FIG. 16, which depicts step 119.2.4, the player P stands in close proximity to the scale 120.2 such that the player's head H obscures contour line 120.4.6. The system 10 will then compare the obscured contour line 120.4.6 with a data set that contains a plurality of contour lines, wherein each contour line contained in the data set is directly associated with a pre-manufactured component. Accordingly, the system 10 will recommend an energy attenuation assembly with size L, as the obscured contour line 120.4.6 is directly associated with the large energy attenuation assembly.

| Data Set (i.e., Contour Lines) | Pre-Manufactured Assemblies |
|---|---|
| Contour Line 120.4.2 | Energy Attenuation Assembly—Size $E_S$ |
| Contour Line 120.4.4 | Energy Attenuation Assembly—Size $E_M$ |
| Contour Line 120.4.6 | Energy Attenuation Assembly—Size $E_L$ |

The above described method may be used to: (i) select a single pre-manufactured component (e.g., front energy attenuation component or helmet shell), (ii) multiple pre-manufactured components (e.g., front and/or rear energy attenuation member), (iii) an entire pre-manufactured assembly (e.g., energy attenuation assembly), or (iv) a protective sports helmet (e.g., entire cycling helmet or skiing goggles). To accomplish the selection of multiple pre-manufactured components, the system 10 may accomplish this using either: (i) a direct association between pre-manufactured component/assembly, or (ii) an indirect association between pre-manufactured component/assembly. For example, FIG. 18 shows a direct association between multiple components. For example, a player P that is assigned S3 component, will also receive F3, RB3 and R3 components. If an indirect association between pre-manufactured component/assembly is utilized, then said indirect association may be generated by a learning algorithm, determined by a neural network, and/or based on other machine learning techniques.

As shown in FIG. 17, which depicts steps 119.2.6 and 119.2.8, the player's head obscures measured contour line 120.4.6. In this scenario, the system 10 will then compare the obscured contour line 120.4.6 with a data set that contains a plurality of contour lines, wherein each contour line contained in the data set is directly associated with a pre-manufactured component. Accordingly, the system 10 will recommend a shell with size S, as the obscured contour line 120.4.6 is directly associated with the small shell. Additionally, the system 10 will recommend a type 3 energy attenuation assembly because said type 3 energy attenuation assembly is associated with the small size helmet shell and obscured contour line 120.4.6.

| Data Set (i.e., Contour Lines) | Directly Selected Pre-Manufactured Components | Indirectly Selected Pre-Manufactured Components |
|---|---|---|
| Contour Line 120.4.2 | Shell—Size Small $H_S$ | Energy Attenuation Assembly—Type 1 |
| Contour Line 120.4.4 | Shell—Size Medium $H_M$ | Energy Attenuation Assembly—Type 2 |
| Contour Line 120.4.6 | Shell—Size Large $H_L$ | Energy Attenuation Assembly—Type 3 |

Figure 19:
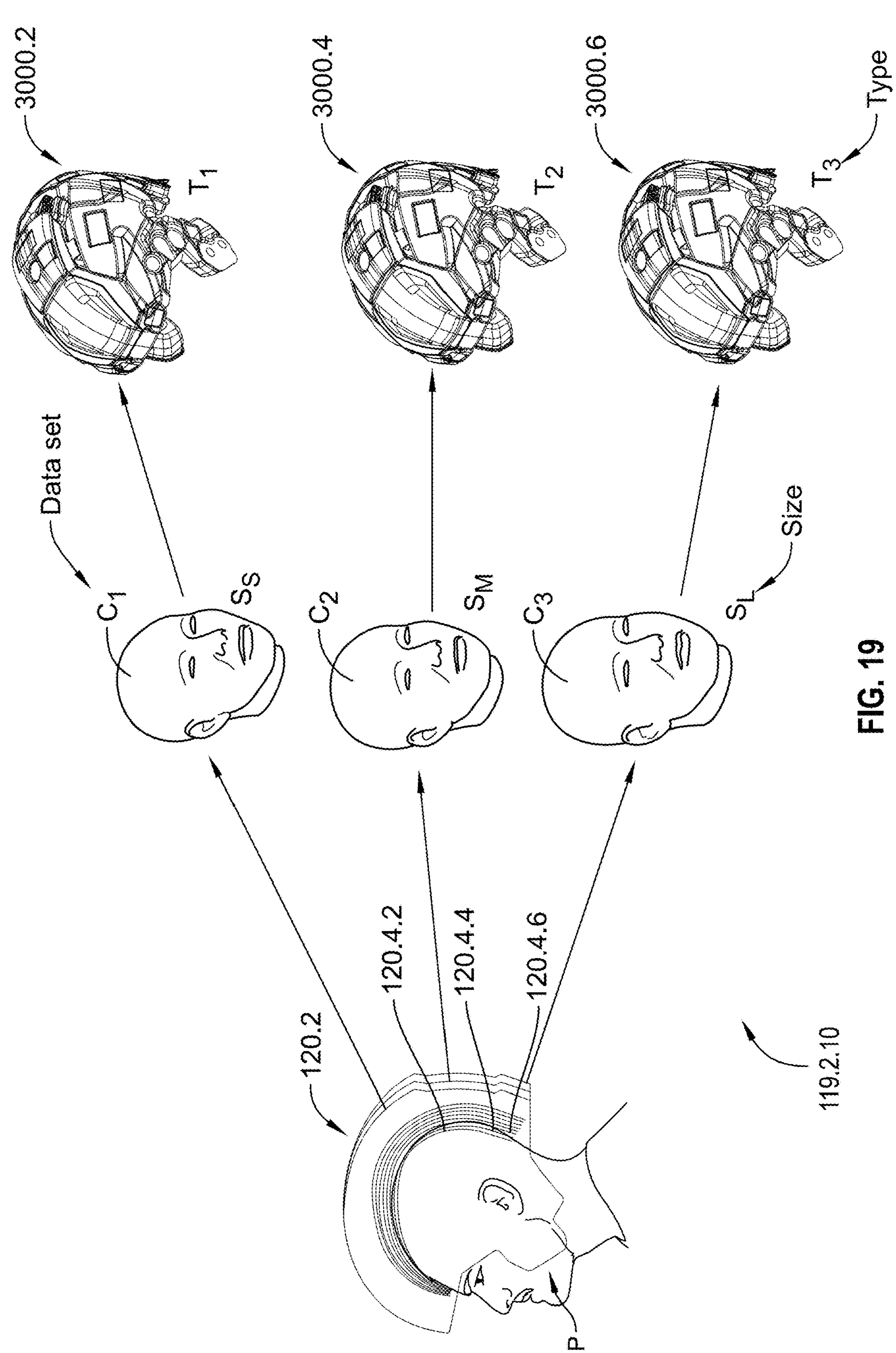
FIG. 19 is a graphical flow chart showing a direct selection of an assembly from a plurality of assemblies using the scale based selection methodology, wherein a previously generated head model: (i) is selected from a plurality of previously generated head model using the player data, and (ii) is associated with the assembly.
Figure 20:
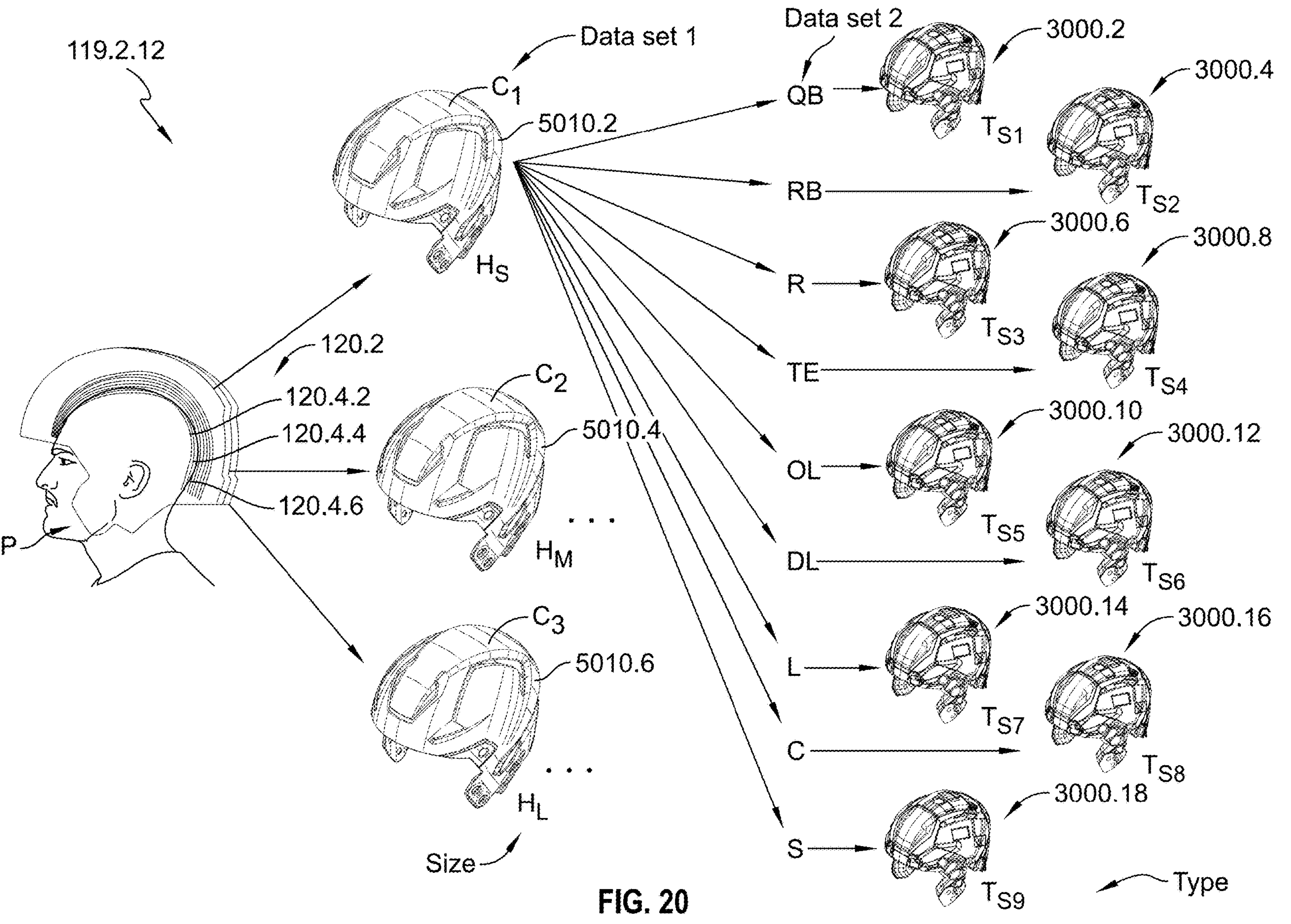
FIG. 20 is a graphical flow chart showing a direct selection of a component from a plurality of components using the scale based selection methodology and a selection of an assembly from a plurality of assemblies based on the selected component and player information.

As shown in FIG. 19 (step 119.2.10), the system may not select a pre-manufactured component based on the obscured contour line 120.4.2. Instead, the obscured contour line 120.4.2 may identify a head model out of a plurality of head models. The identified head model may contain data sets that can be directly associated with pre-manufactured components.

| Data Set (i.e., Contour Lines) | Head Models | Pre-Manufactured Components |
|---|---|---|
| Contour Line 120.4.2 | Small Head Model $S_S$ | Energy Attenuation Assembly—Type 1 |
| Contour Line 120.4.4 | Medium Head Model $S_M$ | Energy Attenuation Assembly—Type 2 |
| Contour Line 120.4.6 | Large Head Model $S_L$ | Energy Attenuation Assembly—Type 3 |

As shown in FIG. 20, which depicts step 119.2.12, the contour line 120.4.6 that is obscured by the player's head may be used to predict all other pre-manufactured components contained in the protective sports equipment due to an indirect association between the selected pre-manufactured component, and player information 109.2.99, and other pre-manufactured components contained in the equipment. For example, the obscured contour line 120.4.6 may be directly associated with a small size helmet shell. Said data relating to the obscured contour line 120.4.6 may then be used with player information 109.2.99 (e.g., player position) to determine that the player should receive a combination of pre-manufactured components (e.g., energy attenuation assembly type 1) that is best suited for an offensive lineman. The indirect association between the obscured contour line and the combination of pre-manufactured components (e.g., energy attenuation assembly) may be determined manually, by a formula, a learning algorithm, a neural network, other machine learning techniques and/or artificial intelligence.

| Data Set 1 (i.e., Contour Lines) | Shell Sizes | Player Information (Data Set 2) | Energy Attenuation Assemblies |
|---|---|---|---|
| Contour Line 120.4.2 | Small $H_S$ | Quarterback | Type S1 |
| | | Running Back | Type S2 |
| | | Receiver | Type S3 |
| | | Tight End | Type S4 |
| | | Offensive Linemen | Type S5 |
| | | Defensive Linemen | Type S6 |
| | | Linebacker | Type S7 |
| | | Cornerback | Type S8 |
| | | Safety | Type S9 |
| Contour Line 120.4.4 | Medium $H_M$ | Quarterback | Type M1 |
| | | Running Back | Type M2 |
| | | Receiver | Type M3 |
| | | Tight End | Type M4 |
| | | Offensive Linemen | Type M5 |
| | | Defensive Linemen | Type M6 |
| | | Linebacker | Type M7 |
| | | Cornerback | Type M8 |
| | | Safety | Type M9 |

-continued

| Data Set 1 (i.e., Contour Lines) | Shell Sizes | Player Information (Data Set 2) | Energy Attenuation Assemblies |
|---|---|---|---|
| Contour Line 120.4.6 | Large $H_L$ | Quarterback | Type L1 |
| | | Running Back | Type L2 |
| | | Receiver | Type L3 |

-continued

| Data Set 1 (i.e., Contour Lines) | Shell Sizes | Player Information (Data Set 2) | Energy Attenuation Assemblies |
|---|---|---|---|
| | | Tight End | Type L4 |
| | | Offensive Linemen | Type L5 |
| | | Defensive Linemen | Type L6 |
| | | Linebacker | Type L7 |
| | | Cornerback | Type L8 |
| | | Safety | Type L9 |

Figure 21A:
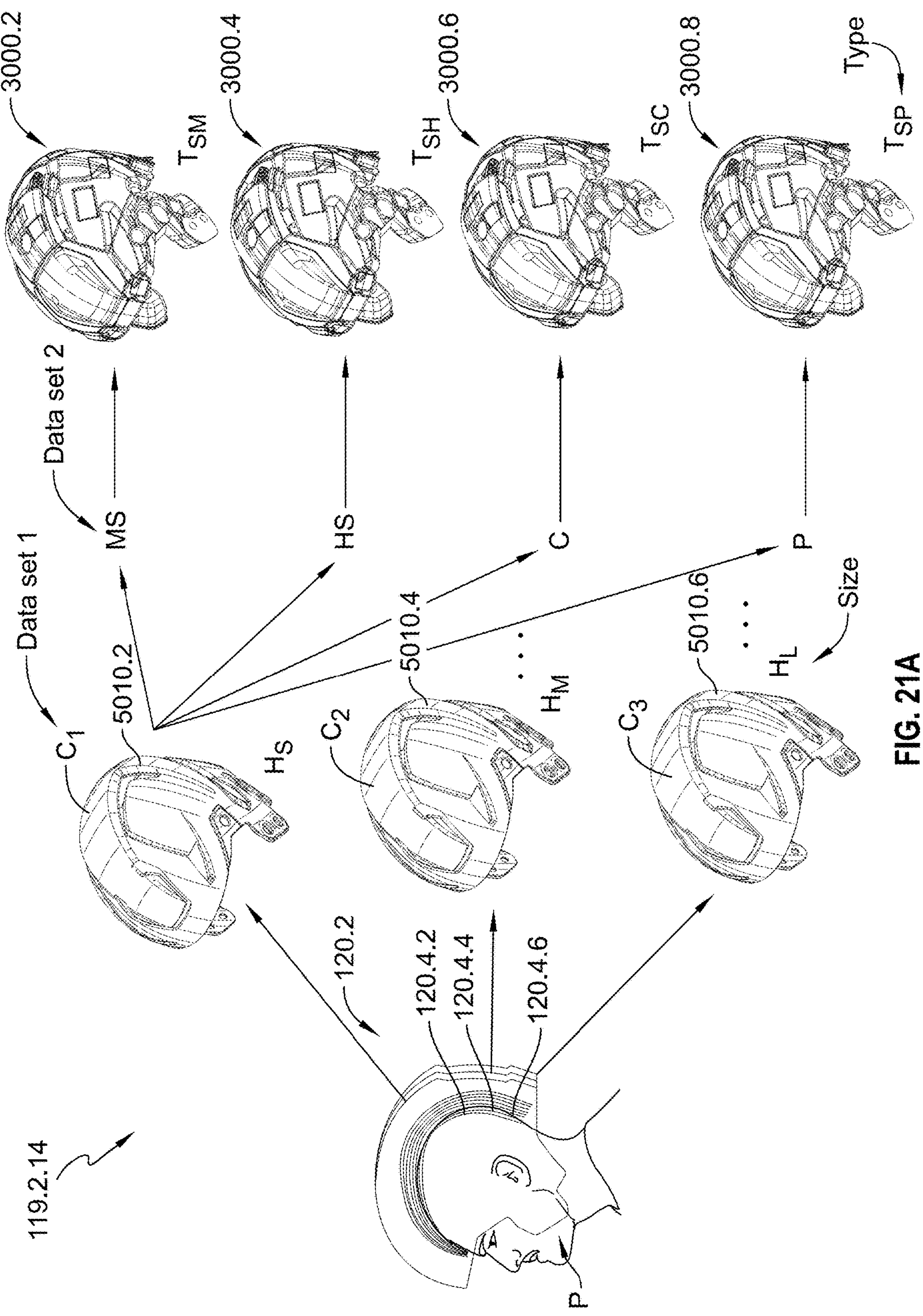
FIG. 21A is a graphical flow chart showing a direct selection of a component from a plurality of components using the scale based selection methodology and a selection of an assembly from a plurality of assemblies based on the selected component and player impact data.

As shown in FIG. 21A, which depicts step 119.2.14, the obscured contour line 120.4.6 may be directly associated with a small size helmet shell. Said data relating to the obscured contour line 120.4.2 may then be used with player impact data 109.4.99 (e.g., impact data used to determine player level) to determine that the player should receive a combination of pre-manufactured components (e.g., energy attenuation assembly type 1) that are best suited for a middle school level player.

| Data Set 1 (i.e., Contour Lines) | Shell Sizes | Player Information (Data Set 2) | Energy Attenuation Assemblies |
|---|---|---|---|
| Contour Line 120.4.2 | Small $H_S$ | Middle School | Type SM |
| | | High School | Type SH |
| | | College | Type SC |
| | | Professional | Type SP |
| Contour Line 120.4.4 | Medium $H_M$ | Middle School | Type MM |
| | | High School | Type MH |
| | | College | Type MC |
| | | Professional | Type MP |
| Contour Line 120.4.6 | Large $H_L$ | Middle School | Type LM |
| | | High School | Type LH |
| | | College | Type LC |
| | | Professional | Type LP |

Figure 21B:
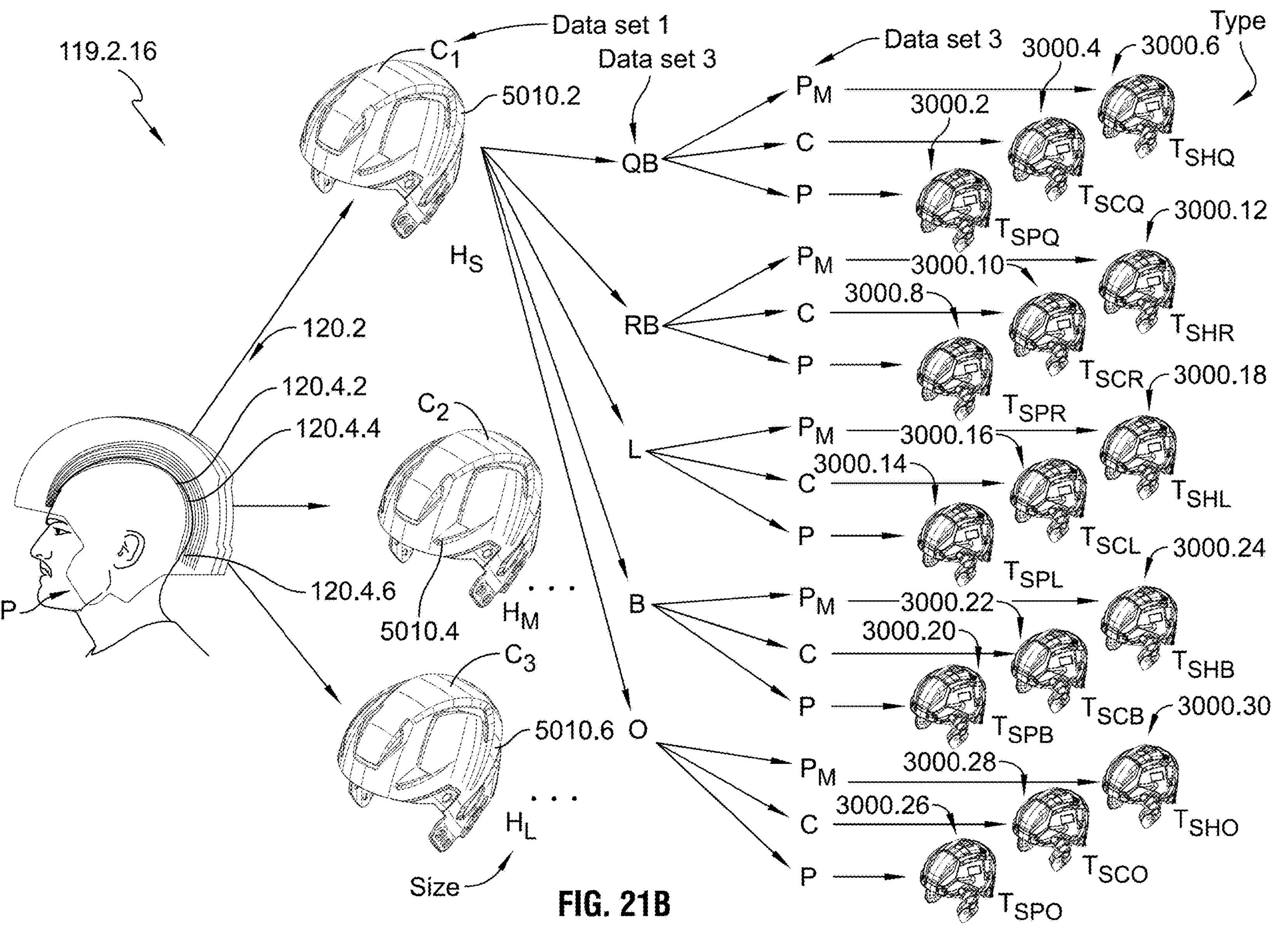
FIG. 21B is a graphical flow chart showing a direct selection of a component from a plurality of components using the scale based selection methodology and a selection of an assembly from a plurality of assemblies based on the selected component, player information, and impact data.

As shown in FIG. 21B, which depicts step 119.2.16, the obscured contour line 120.4.2 may be directly associated with a small size helmet shell. Said data relating to the obscured contour line 120.4.2 may then be used with player impact data 109.4.99 (e.g., impact data used to determine player position) and player information 109.2.99 (e.g., player level) to determine that the player should receive a combination of pre-manufactured components (e.g., energy attenuation assembly type 4) that are best suited for a pre-college (e.g., high school player) that primarily plays running back.

| Data Set 1 (i.e., Contour Lines) | Shell Sizes | Player Information (Data Set 2-Level) | Player Information (Data Set 3-Position) | Energy Attenuation Assemblies |
|---|---|---|---|---|
| Contour Line 120.4.2 | Small $H_S$ | Pre-College | Quarterback | Type SHQ |
| | | College | Quarterback | Type SCQ |
| | | Professional | Quarterback | Type SPQ |
| | | Pre-College | Running Back | Type SHR |
| | | College | Running Back | Type SCR |
| | | Professional | Running Back | Type SPR |
| | | Pre-College | Linemen | Type SHL |
| | | College | Linemen | Type SCL |
| | | Professional | Linemen | Type SPL |
| | | Pre-College | Linebacker | Type SHB |
| | | College | Linebacker | Type SCB |
| | | Professional | Linebacker | Type SPB |
| | | Pre-College | Other | Type SHO |
| | | College | Other | Type SCO |
| | | Professional | Other | Type SPO |

-continued

| Data Set 1 (i.e., Contour Lines) | Shell Sizes | Player Information (Data Set 2-Level) | Player Information (Data Set 3-Position) | Energy Attenuation Assemblies |
|---|---|---|---|---|
| Contour Line 120.4.4 | Medium $H_M$ | Pre-College | Quarterback | Type 1 |
| | | College | Quarterback | Type 2 |
| | | Professional | Quarterback | Type 3 |
| | | Pre-College | Running Back | Type 4 |
| | | College | Running Back | Type 5 |
| | | Professional | Running Back | Type 6 |
| | | Pre-College | Linemen | Type 7 |
| | | College | Linemen | Type 8 |
| | | Professional | Linemen | Type 9 |
| | | Pre-College | Linebacker | Type 10 |
| | | College | Linebacker | Type 11 |
| | | Professional | Linebacker | Type 12 |
| | | Pre-College | Other | Type 13 |
| | | College | Other | Type 14 |
| | | Professional | Other | Type 15 |
| Contour Line 120.4.6 | Large $H_L$ | Pre-College | Quarterback | Type 1 |
| | | College | Quarterback | Type 2 |
| | | Professional | Quarterback | Type 3 |
| | | Pre-College | Running Back | Type 4 |
| | | College | Running Back | Type 5 |
| | | Professional | Running Back | Type 6 |
| | | Pre-College | Linemen | Type 7 |
| | | College | Linemen | Type 8 |
| | | Professional | Linemen | Type 9 |
| | | Pre-College | Linebacker | Type 10 |
| | | College | Linebacker | Type 11 |
| | | Professional | Linebacker | Type 12 |
| | | Pre-College | Other | Type 13 |
| | | College | Other | Type 14 |
| | | Professional | Other | Type 15 |

ii. Computed Based Selection

The pre-manufactured component(s)/assemblies of the protective sports equipment can be selected using a computed based selection methodology, where location(s), measurement(s) (e.g., distances), and/or calculated values (e.g., area, volume, and/or pressure based on a known surface with a known material having a known thickness disposed between the player's head and the known surface) can be extracted from images, point clouds, or from any data that is obtained from any data collecting apparatus 110.4.2 (e.g., deformable electronic data collection member 110.80) disclosed in this application. For example, the deformable electronic data collection member 110.80 can measure the location(s) of the nodes 110.80.2 and/or the distance between said nodes 110.80.2 (see FIG. 11). It should be understood that these location(s), distance(s), area(s), and/or partial volumes may be in a single plane (e.g., coronal), may be in two planes (e.g., sagittal and coronal), or may be in all three planes (e.g., sagittal, transverse, and coronal). Moreover, the location(s) and/or distance(s) may be in 2D or 3D. It should also be understood that the nodes 110.80.2 may or may not be placed at anthropometric points of the player P and that this method does not contemplate collection curvilinear data (e.g., contour locus/loci, contour line(s), curvature locus/loci, curvature line(s), partial surface(s) or complete surfaces).

Once the location(s), distance(s), area(s), and/or volume(s) are collected, determined, or extracted, said location(s), distance(s), area(s), and/or volume(s) can then be directly associated with at least one pre-manufactured component. For example, when the deformable electronic data collection member 110.80 records, measures, determines, or calculates the location(s), distance(s), area(s), and/or volume(s), the system 10 can select at least one pre-manufactured component from the plurality of pre-manufactured components that best fits the player P using the location(s) or distance(s). In addition to the exemplary player's measured distance $D_P$ shown in FIG. 22, it should be understood that other distances (e.g., distances shown in FIGS. 23-27) may be measured and utilized by the system 10 to select the component/assembly.

Figure 22:
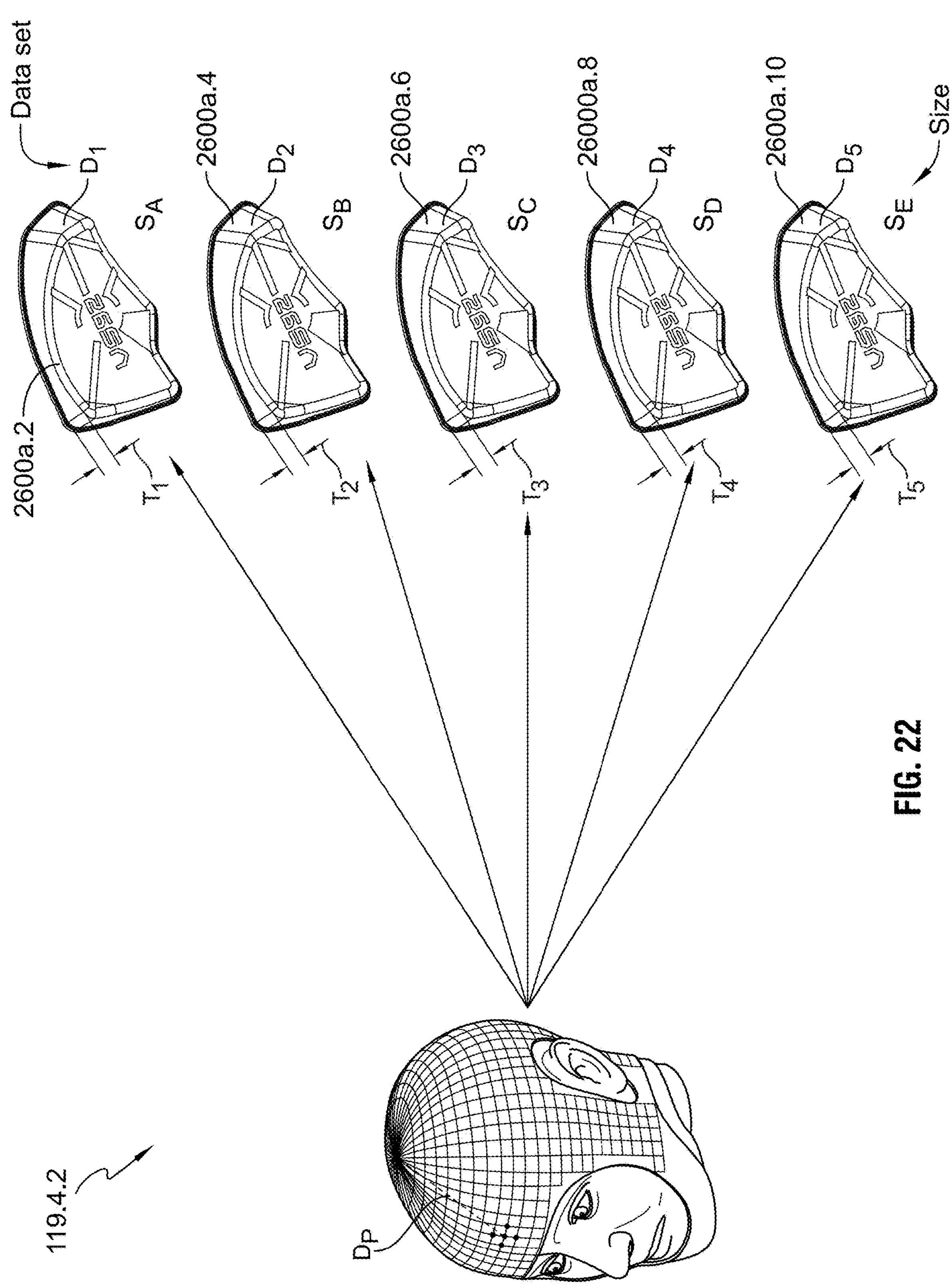
FIG. 22 is a graphical flow chart showing a direct selection of a component from a plurality of components using a computed based selection methodology.
Figures 23, 24, 25, 26, 27:
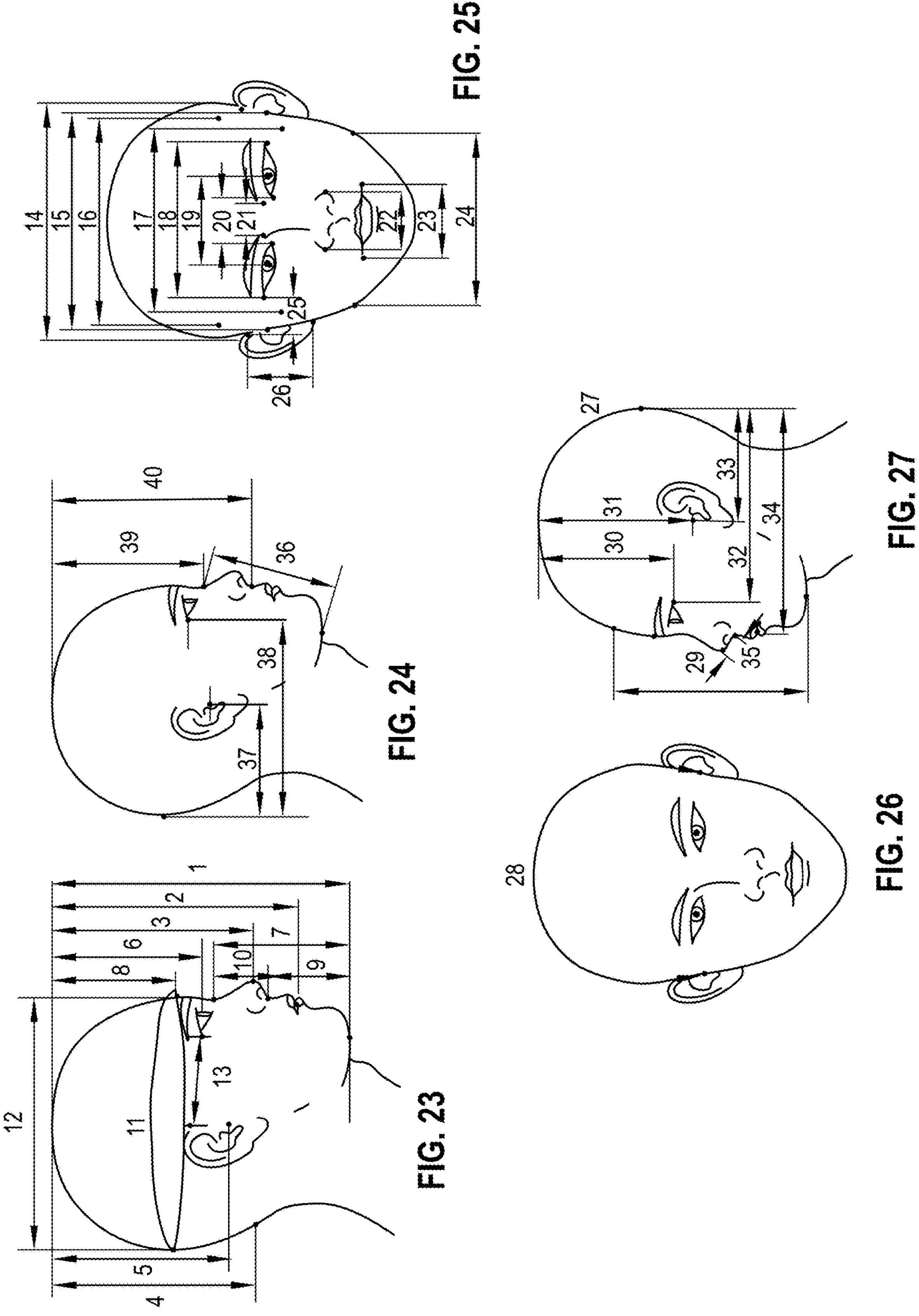
FIG. 23 is a first right side view of a player's head showing distances that said computed based selection methodology may utilize in the selection of the component.
FIG. 24 is a second right side view of a player's head showing distances that said computed based selection methodology may utilize in the selection of the component.
FIG. 25 is a first front view of a player's head showing distances that said computed based selection methodology may utilize in the selection of the component.
FIG. 26 is a second front view of a player's head showing distances that said computed based selection methodology may utilize in the selection of the component.
FIG. 27 is a left side view of a player's head showing distances that said computed based selection methodology may utilize in the selection of the component.

As shown in FIG. 22, which depicts step 119.4.2, the system 10 may calculate the player's measured distance $D_P$. The system 10 then will take said player's measured distance $D_P$ and compare said player's measured distance $D_P$ to a plurality of distances $D_1$-$D_5$ contained in a data set, wherein each distance $D_1$-$D_5$ contained in the data set is directly associated with a pre-manufactured component (e.g., energy attenuation components with sizes $S_A$-$S_E$). In this example, the system 10 recommends the use of an energy attenuation component with size $S_D$, as the player's measured distance $D_P$ falls between $D_3$ and $D_4$. Said system 10 makes this recommendation because it defaults to selecting the larger component (i.e., $S_D$) when a player's measurements fall between $D_3$ that is associated with energy attenuation component size $S_C$ and $D_4$ that is associated with energy attenuation component size $S_D$.

| Data Set (i.e., Component Distances) | Pre-Manufactured Components |
|---|---|
| $D_1$ | Energy Attenuation Component—Size $S_A$ |
| $D_2$ | Energy Attenuation Component—Size $S_B$ |
| $D_3$ | Energy Attenuation Component—Size $S_C$ |
| $D_4$ | Energy Attenuation Component—Size $S_D$ |
| $D_5$ | Energy Attenuation Component—Size $S_E$ |

Figure 28:
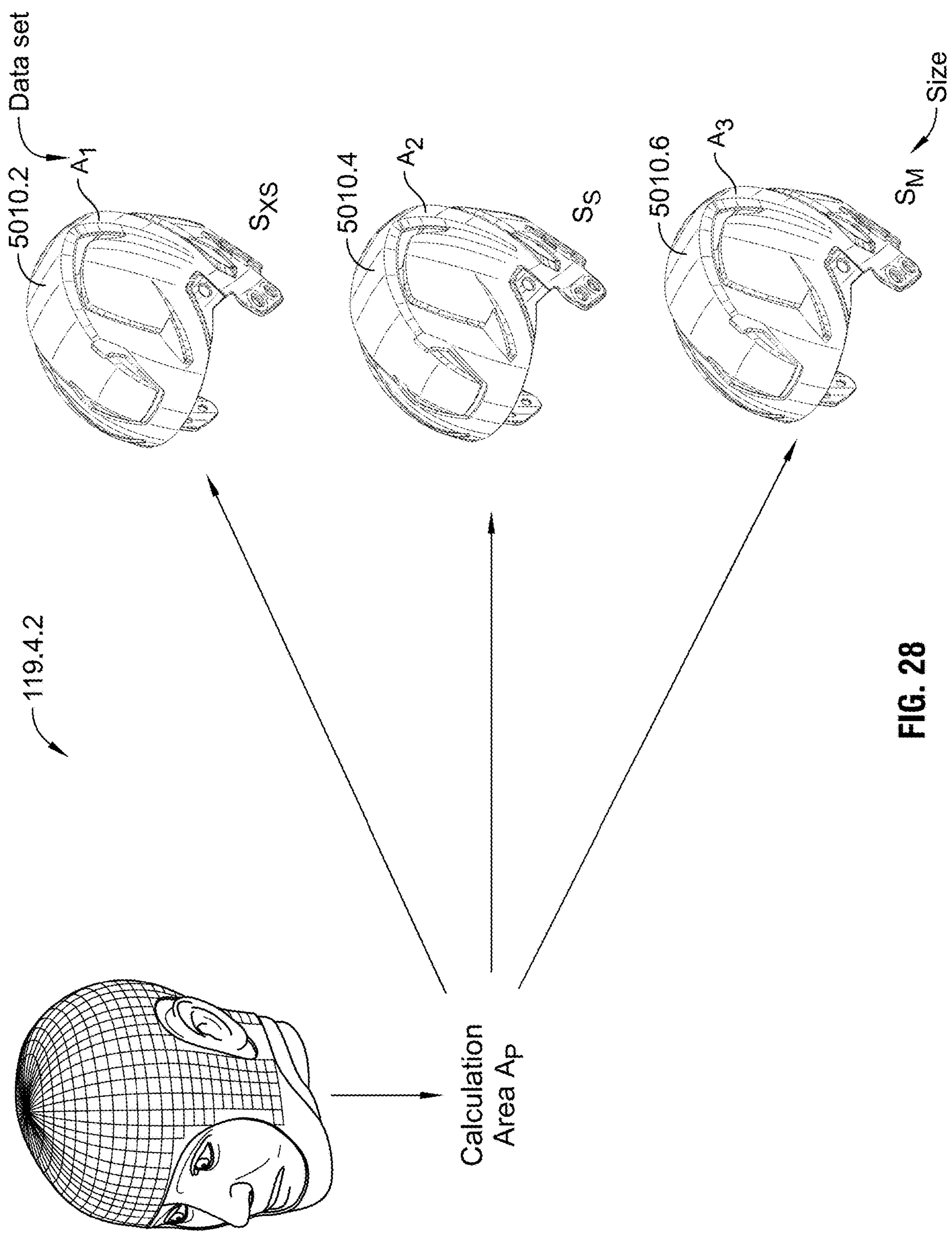
FIG. 28 is a graphical flow chart showing a direct selection of a component from a plurality of components using the computed based selection methodology.

As shown in FIG. 28, which depicts step 119.4.2, pertaining to the player's calculated area $A_P$. The system 10 then will take said player's calculated area $A_P$ and compare said player's calculated area $A_P$ to a plurality of areas $A_1$-$A_3$ contained in a data set, wherein each area $A_1$-$A_3$ contained in the data set is directly associated with a pre-manufactured component (e.g., helmet shells with sizes $S_{XS}$-$S_M$). In this example, the system 10 recommends the use of a helmet shell with size Ss, as the player's calculated $A_P$ falls between $D_2$ and $D_3$. Said system 10 makes this recommendation because it defaults to selecting the smaller component (i.e., Ss) when a player's measurements fall between $A_2$ that is associated with helmet shell size Ss and $A_3$ that is associated with helmet shell size SM.

| Data Set (i.e., Component Areas) | Pre-Manufactured Components |
|---|---|
| $A_1$ | Shell—Size $S_{XS}$ |
| $A_2$ | Shell—Size $S_S$ |
| $A_3$ | Shell—Size $S_M$ |

As shown in FIG. 29, which depicts step 119.4.4, the player's calculated volume $V_P$. The system 10 then will take said player's calculated volume $V_P$ and compare said player's calculated volume $V_P$ to a plurality of volumes $V_1$-$V_3$ contained in a data set, wherein each volume $V_1$-$V_3$ contained in the data set is directly associated with a pre-manufactured assembly (e.g., energy attenuation assemblies with sizes $E_I$-$E_K$). In this example, the system 10 recommends the use of an energy attenuation assembly with size $E_J$, as the player's calculated volume $V_P$ falls between $V_1$ and $V_2$. Said system 10 makes this recommendation because it determines that the player's calculated volume $V_P$ is closer to $V_2$ and $V_2$ is associated with an energy attenuation assembly size $E_J$.

| Data Set (i.e., Assembly Volumes) | Pre-Manufactured Assemblies |
|---|---|
| $V_1$ | Energy Attenuation Assembly—$E_I$ |
| $V_2$ | Energy Attenuation Assembly—$E_J$ |
| $V_3$ | Energy Attenuation Assembly—$E_K$ |

The above described method may be used to: (i) select a single pre-manufactured component (e.g., front energy attenuation component or helmet shell), (ii) multiple pre-manufactured components (e.g., front and/or rear energy attenuation member), (iii) an entire pre-manufactured assembly (e.g., energy attenuation assembly), or (iv) a protective sports helmet (e.g., entire cycling helmet or skiing goggles). To accomplish the selection of multiple pre-manufactured components, the system 1 may accomplish this using either a direct association between pre-manufactured component/assembly, or an indirect association between pre-manufactured component/assembly. If an indirect association between pre-manufactured component/assembly is utilized, then said indirect association may be generated by a learning algorithm, determined by a neural network, and/or based on other machine learning techniques. Wherein said generation of the indirect association may be based on analysis of other data collection from a plurality of players. For example, it may be determined after using a clustering or sorting means that player weight ranges may determine the size of the energy attenuation assembly after the helmet shell size is directly determined using the player's measured distance.

As shown in FIG. 30, which depict steps 119.4.6 and 119.4.8, the system 10 may calculate the player's measured distance $D_P$. The system 10 then will take said player's measured distance $D_P$ and compare said player's measured distance $D_P$ to a plurality of distances $D_1$-$D_3$ contained in a data set, wherein each distance $D_1$-$D_3$ contained in the data set is directly associated with a pre-manufactured component (e.g., helmet shells with sizes $H_S$-$H_L$). In this example, the system 10 recommends the use of a helmet shell with size $H_S$, as the player's measured distance $D_P$ falls between $D_1$ and $D_2$. Said system 10 makes this recommendation because it determined that distance $D_1$ (that is associated helmet shell size $H_S$) with is not statistically different than the player's measured distance $D_P$ and distance $D_2$ (that is associated helmet shell size $H_M$) is statistically different than the player's measured distance $D_P$. Additionally, the system 10 will recommend a type 2 energy attenuation assembly because said type 2 energy attenuation assembly is associated with the small size helmet shell and will best fit the player based upon other associated pieces of player data (e.g., player information, player impact data, player body part data, etc.).

| Data Set (Distances) | Directly Selected Pre-Manufactured Components | Indirectly Selected Pre-Manufactured Components |
|---|---|---|
| $D_1$ | Helmet Shell—Size Small $H_S$ | Energy Attenuation Assembly—Type 1 $T_1$ |
| $D_2$ | Helmet Shell—Size Medium $H_M$ | Energy Attenuation Assembly—Type 2 $T_2$ |
| $D_3$ | Helmet Shell—Size Large $H_L$ | Energy Attenuation Assembly—Type 3 $T_3$ |

As shown above, it should be understood that the location and/or distance measurements (e.g., in a single plane, in two planes, or in three planes) may be utilized to select different types of pre-manufacture components (e.g., shell, energy attenuation components, or assemblies of energy attenuation components) from different pluralities of pre-manufacture components (e.g., shells or energy attenuation components) or assemblies of pre-manufacture components (e.g., energy attenuation assembly). As discussed in greater detail below, the selection of the pre-manufactured component can then be utilized in connection with other systems or methods disclosed herein to select other pre-manufactured components associated with the protective sports equipment. As shown in FIG. 31 (119.4.10), the measured distance can be used to select a head model out of a plurality of head models. The associated head model can be utilized to select all pre-manufactured components contained in the equipment.

| Data Set (Distances) | Head Models | Pre-Manufactured Components |
|---|---|---|
| $D_1$ | Small Head Model $S_S$ | Energy Attenuation Assembly—Type 1 $T_1$ |
| $D_2$ | Medium Head Model $S_M$ | Energy Attenuation Assembly—Type 2 $T_2$ |
| $D_3$ | Large Head Model $S_L$ | Energy Attenuation Assembly—Type 3 $T_3$ |

Alternatively, the player's measured distance $D_P$ may be used to predict all other pre-manufactured component contained in the protective sports equipment due to an indirect association between the selected pre-manufactured component, player information 109.2.99, and other pre-manufactured components contained in the equipment. For example, the player's measured distance $D_P$ may be directly associated with a small size helmet shell. Said data relating to the player's measured distance $D_P$ may then be used with player impact data 109.4.99 and/or player information 109.2.99 (e.g., player position, level, or both) to determine that the player should receive a combination of pre-manufactured components (e.g., energy attenuation assembly type 1) that are best suited for an offensive lineman. The indirect association between the player's measured distance $D_P$ the combination of pre-manufactured components (e.g., energy attenuation assembly) may be determined manually, by a formula, a learning algorithm, a neural network, other machine learning techniques and/or artificial intelligence. Examples of various permutations are shown in FIGS. 32 (119.4.12), 33 (199.4.14), and 34 (119.4.16).

iii. Curvilinear Data Based Selection

The pre-manufactured component(s)/assemblies of the protective sports equipment can be selected using a curvilinear based selection methodology, where the curvilinear data (e.g., contour locus/loci, contour line(s), curvature locus/loci, curvature line(s), partial surface(s) or complete surfaces) can be extracted from images, point clouds, or from any data that is obtained in any form from any data collecting apparatus 110.4.2 (e.g., deformable electronic data collection member 110.80) disclosed in this application. For example, curvilinear data can be extracted from an image. It should be understood that the curvilinear data may be in a single plane (e.g., coronal), may be in two planes (e.g., sagittal and coronal), or may be in all three planes (e.g., sagittal, transverse, and coronal). Moreover, the curvilinear data may be in 2D or 3D. It should also be understood that this method does not contemplate collection linear data (e.g., location(s) or linear distance(s)).

Figure 35:
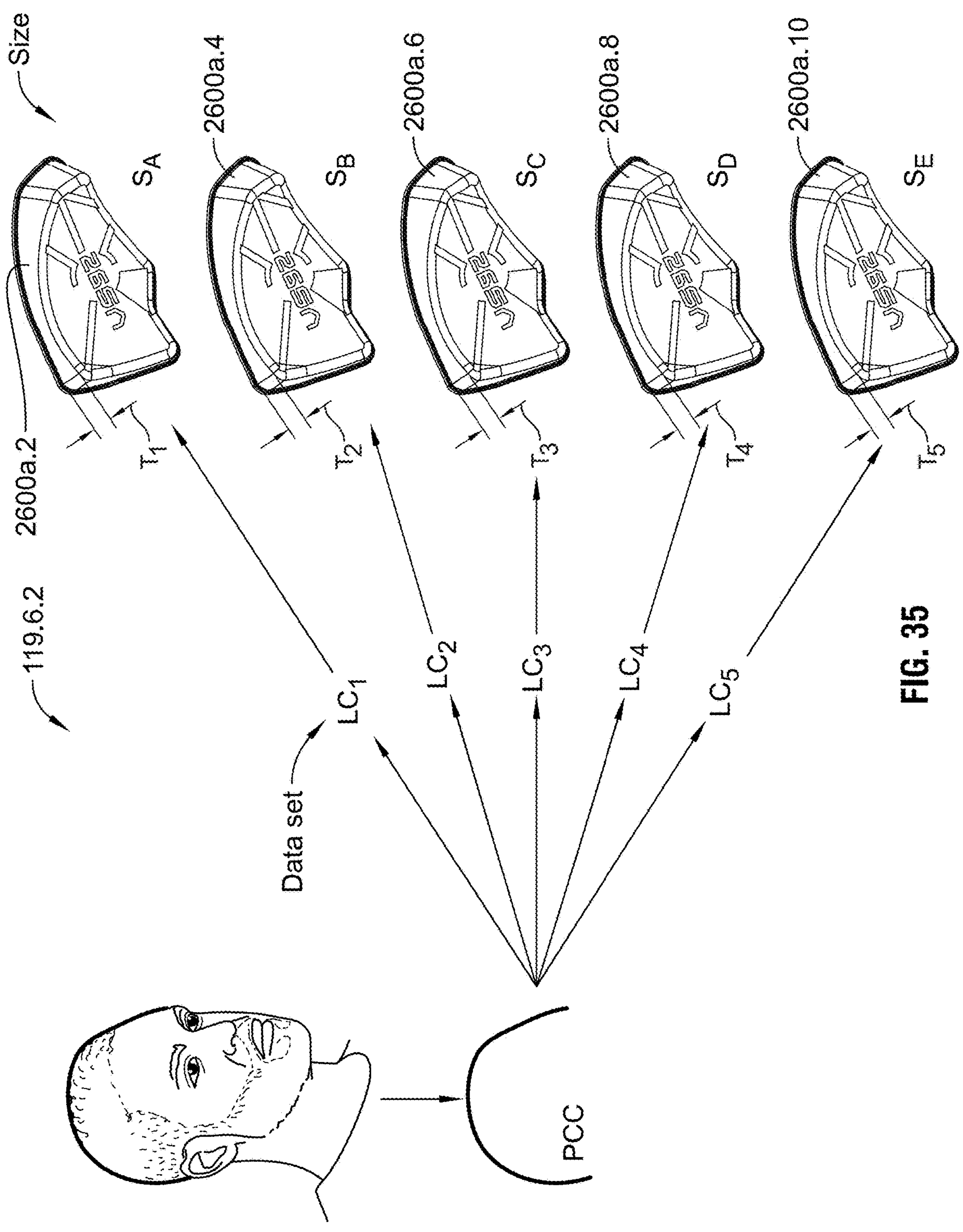
FIG. 35 is a graphical flow chart showing the direct selection of a component from a plurality of components using the curvilinear based selection methodology.

The curvilinear data can then be used to select at least one pre-manufactured component. For example, when the data collecting apparatus 110.4.2 collects information that can be used to determine curvilinear player data, the system 10 can select at least one pre-manufactured component from the plurality of pre-manufactured components that best fits the player or wearer using said curvilinear player data. As shown in FIG. 35 (step 119.6.2), the player's contour line (e.g., PLC) that extends from their ear to the eyebrow can be extracted from an image and then compared against either: (i) a plurality of similar contour lines (e.g., $LC_1$-$LC_5$), wherein each contour line contained in the plurality of similar contour lines is associated with an energy attenuation component contained in the plurality of energy attenuation components, and/or (ii) other collections of curvilinear data—namely, a collection may include contour locus/loci, curvature locus/loci, curvature line(s), partial surface(s) and/or complete surfaces—wherein each component of data contained in a collection of curvilinear data is associated with an energy attenuation component contained in the plurality of energy attenuation components. Based on this comparison, the contour line (e.g., $LC_1$-$LC_5$) or component of data contained in a collection of curvilinear data that best matches the player's contour line (e.g., PLC) will be selected. Based on this selection, the energy attenuation component (e.g., Size A) associated with the selected contour line (e.g., contour line $LC_1$) or selected curvilinear data will be identified, installed, and utilized in the equipment for the player. It should be understood that this disclosure contemplates a number of methods for determining which contour line or inner surface curvature that best matches the player's contour line. One example of how this determination can be made is summing the distance between the contour line or inner surface curvature and the player's contour line at discrete points. The lowest summed value will be the contour line or inner surface curvature that best matches the player's contour line.

| Data Set (i.e., Contour lines) | Pre-Manufactured Components |
|---|---|
| Contour line 1 | Energy Attenuation Component—Size A $S_A$ |
| Contour line 2 | Energy Attenuation Component—Size B $S_B$ |

-continued

| Data Set (i.e., Contour lines) | Pre-Manufactured Components |
|---|---|
| Contour line 3 | Energy Attenuation Component—Size C $S_C$ |
| Contour line 4 | Energy Attenuation Component—Size D $S_D$ |
| Contour line 5 | Energy Attenuation Component—Size E $S_E$ |

Figure 36:
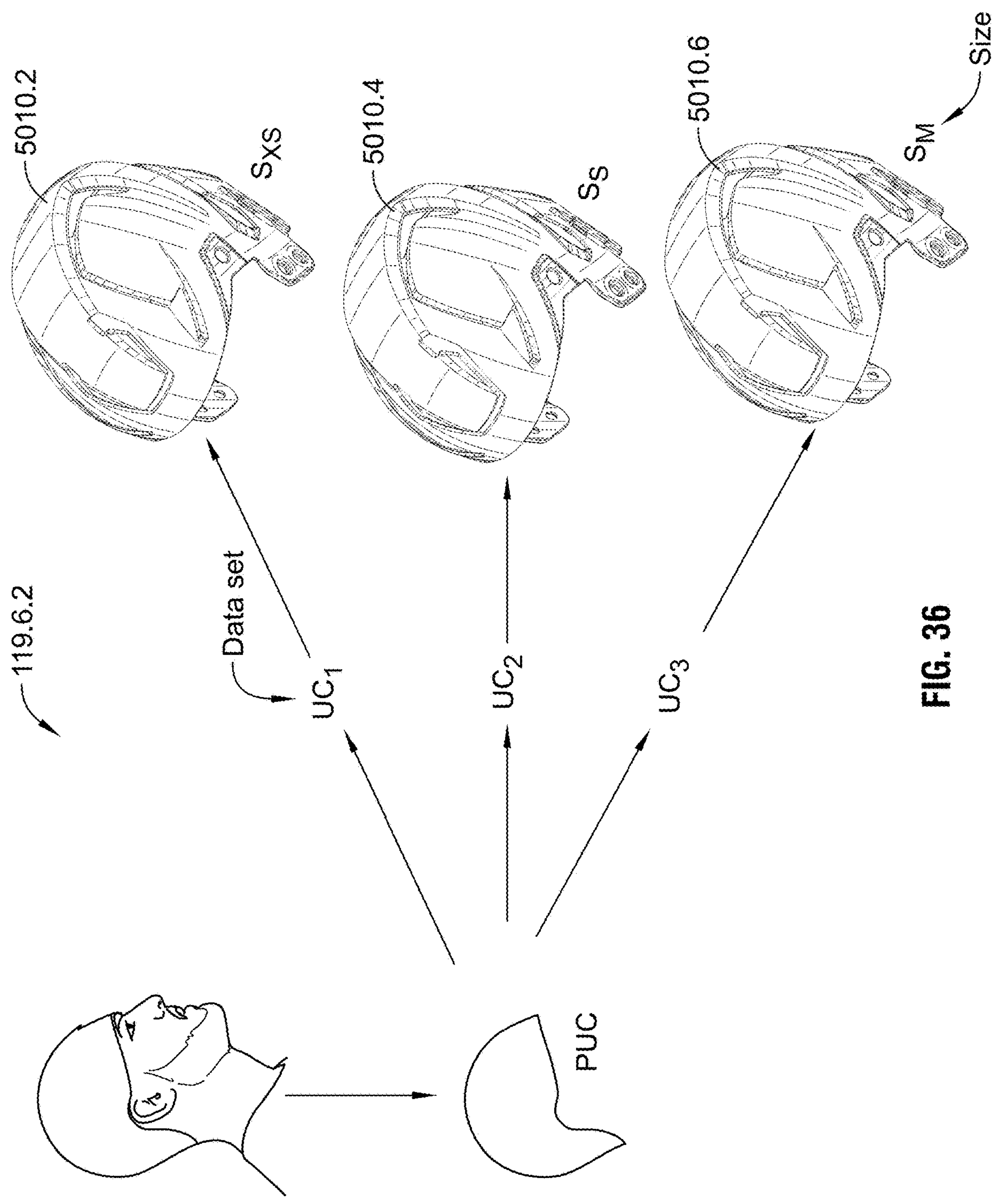
FIG. 36 is a graphical flow chart showing the direct selection of a component from a plurality of components using the curvilinear based selection methodology.

As shown in FIG. 36 (step 119.6.2), the player's line curvature (e.g., PCU) that extends from their neck to eyebrow and back around can be extracted from an image and then compared against either: (i) a plurality of similar curvature lines (e.g., $CU_1$-$CU_3$), wherein each curvature line contained in the plurality of similar curvature lines is associated with an energy attenuation component contained in the plurality of energy attenuation components, and/or (ii) other collections of curvilinear data—namely, a collection may include contour locus/loci, curvature locus/loci, contour line(s), partial surface(s) and/or complete surfaces—wherein each component of data contained in a collection of curvilinear data is associated with an energy attenuation component contained in the plurality of energy attenuation components. Based on this comparison, the curvature line (e.g., $CU_1$-$CU_3$) or component of data contained in a collection of curvilinear data that best matches the player's curvature line (e.g., PCU) will be selected. Based on this selection, the energy attenuation component (e.g., Size XS) associated with the selected curvature line (e.g., curvature line 1) or selected curvilinear data will be identified, installed, and utilized in the equipment for the player.

| Data Set (i.e., Curvature Lines) | Pre-Manufactured Components |
|---|---|
| Curvature Line 1 | Shell-Size $S_{XS}$ |
| Curvature Line 2 | Shell-Size $S_S$ |
| Curvature Line 3 | Shell-Size $S_M$ |

As shown in FIG. 37 (step 119.6.4), a partial surface for a player's head (e.g., PPS) can be extracted from an image and then compared against either: (i) a plurality of similar partial surfaces (e.g., $PS_1$-$PS_3$), wherein each partial surface contained in the plurality of similar partial surfaces is associated with an energy attenuation component contained in the plurality of energy attenuation components, and/or (ii) other collections of curvilinear data—namely, a collection may include contour locus/loci, curvature locus/loci, contour line(s), curvature line(s), and/or complete surfaces—wherein each component of data contained in a collection of curvilinear data is associated with an energy attenuation component contained in the plurality of energy attenuation components. Based on this comparison, the partial surface (e.g., $PS_1$-$PS_3$) or component of data contained in a collection of curvilinear data that best matches the player's partial surface (e.g., PPS) will be selected. Based on this selection, the energy attenuation component (e.g., Size J) associated with the selected partial surface (e.g., $PS_2$) or selected curvilinear data will be identified, installed, and utilized in the equipment for the player.

| Data Set (i.e., Partial Surfaces) | Pre-Manufactured Assemblies |
|---|---|
| $PS_1$ | Energy Attenuation Assembly-Size I $S_I$ |
| $PS_2$ | Energy Attenuation Assembly-Size J $S_J$ |
| $PS_3$ | Energy Attenuation Assembly-Size K $S_K$ |

The above described method may be used to: (i) select a single pre-manufactured component (e.g., front energy attenuation component or helmet shell), (ii) multiple pre-manufactured components (e.g., front and/or rear energy attenuation member), (iii) an entire pre-manufactured assembly (e.g., energy attenuation assembly), or (iv) a protective sports helmet (e.g., entire cycling helmet or skiing goggles). To accomplish the selection of multiple pre-manufactured components, the system 1 may accomplish this using either a direct association between pre-manufactured component/assembly, or an indirect association between pre-manufactured component/assembly. If an indirect association between pre-manufactured component/assembly is utilized, then said indirect association may be generated by a learning algorithm, determined by a neural network, and/or based on other machine learning techniques.

As shown in FIG. 38 (steps 119.6.6, 119.6.8), a locus for a specific contour of a player's head (e.g., PCL) can be extracted from an image and then compared against either: (i) a plurality of similar loci (e.g., $CL_1$-$CL_3$), wherein each locus contained in the plurality of similar loci is associated with an energy attenuation component contained in the plurality of energy attenuation components, and/or (ii) other collections of curvilinear data—namely, a collection may include curvature locus/loci, contour line(s), curvature line(s), partial surface(s) and/or complete surfaces—wherein each component of data contained in a collection of curvilinear data is associated with an energy attenuation component contained in the plurality of energy attenuation components. Based on this comparison, the loci (e.g., $CL_1$-$CL_3$) or component of data contained in a collection of curvilinear data that best matches the player's locus (e.g., PCL) will be selected. Based on this selection, the energy attenuation component (e.g., Size S) associated with the selected loci (e.g., $CL_1$) or selected curvilinear data will be identified, installed, and utilized in the equipment for the player.

| Data Set (Loci) | Directly Selected Pre-Manufactured Component | Indirectly Selected Pre-Manufactured Assemblies |
|---|---|---|
| $CL_1$ | Helmet Shell-Size Small $H_S$ | Energy Attenuation Assembly-Type 1 $T_1$ |
| $CL_2$ | Helmet Shell-Size Medium $H_M$ | Energy Attenuation Assembly-Type 2 $T_2$ |
| $CL_3$ | Helmet Shell-Size Large $H_L$ | Energy Attenuation Assembly-Type 3 $T_3$ |

As shown above, it should be understood that the location and/or distance measurements (e.g., in a single plane, in two planes, or in three planes) may be utilized to select different types of pre-manufacture components (e.g., shell, energy attenuation components, or assemblies of energy attenuation components) from different pluralities of pre-manufacture components (e.g., shells or energy attenuation components) or assemblies of pre-manufacture components (e.g., energy attenuation assembly). As discussed in greater detail below, the selection of the pre-manufactured component can then be utilized in connection with other systems or methods disclosed herein to select other pre-manufactured components associated with the protective sports equipment.

As shown in FIG. 39 (step 119.6.10), a locus defining the curvature of a player's head (e.g., PCUL) in a specific location can be extracted from an image and then compared against either: (i) a plurality of similar loci (e.g., $CUL_1$-$CUL_3$), wherein each locus contained in the plurality of similar loci is associated with a head model contained in the plurality of head models, and/or (ii) other collections of curvilinear data—namely, a collection may include contour locus/loci, contour line(s), curvature line(s), partial surface(s) and/or complete surfaces—wherein each component of data contained in a collection of curvilinear data is associated with a head model contained in the plurality of head models. The selected head model can be utilized to select all pre-manufactured components contained in the equipment.

| Data Set (Loci) | Head Models | Pre-Manufactured Assemblies |
| --- | --- | --- |
| $CUL_1$ | Small Head Model $S_S$ | Energy Attenuation Assembly-Type 1 $T_1$ |
| $CUL_2$ | Medium Head Model $S_M$ | Energy Attenuation Assembly-Type 2 $T_2$ |
| $CUL_3$ | Large Head Model $S_L$ | Energy Attenuation Assembly-Type 3 $T_3$ |

Alternatively, the player's curvilinear data may be used to predict all other pre-manufactured component contained in the protective sports equipment due to an indirect association between the selected pre-manufactured component, player information 109.2.99, and other pre-manufactured components contained in the equipment. For example, the player's curvilinear data may be directly associated with a small size helmet shell. Said data relating to the player's curvilinear data may then be used with player impact data 109.4.99 and/or player information 109.2.99 (e.g., player position, level, or both) to determine that the player should receive a combination of pre-manufactured components (e.g., energy attenuation assembly type 1) that are best suited for an offensive lineman. The indirect association between the player's curvilinear data the combination of pre-manufactured components (e.g., energy attenuation assembly) may be determined manually, by a formula, a learning algorithm, a neural network, other machine learning techniques and/or artificial intelligence. Examples of various permutations are shown in FIGS. 40-42.

2. Body Part Model Selection Methodology

Unlike the methods for selecting pre-manufactured component(s) discussed above in step 119, each of the following methods utilize a body part model 180.99 generated in step 180. This may be beneficial in certain situations because it may be more accurate than trying to determine which pre-manufactured equipment components should be suggested for the player without creating an electronic model of the player. It should be understood that the steps described within the method of generating a body part model 180.99, may be performed in a different order, skipped, changed, altered, and/or replaced. For example, the removal of data that is incomplete in steps 180.52 may not be performed or may be performed at any time during the process.

i. Generation of a Body Part Model

Figure 43:
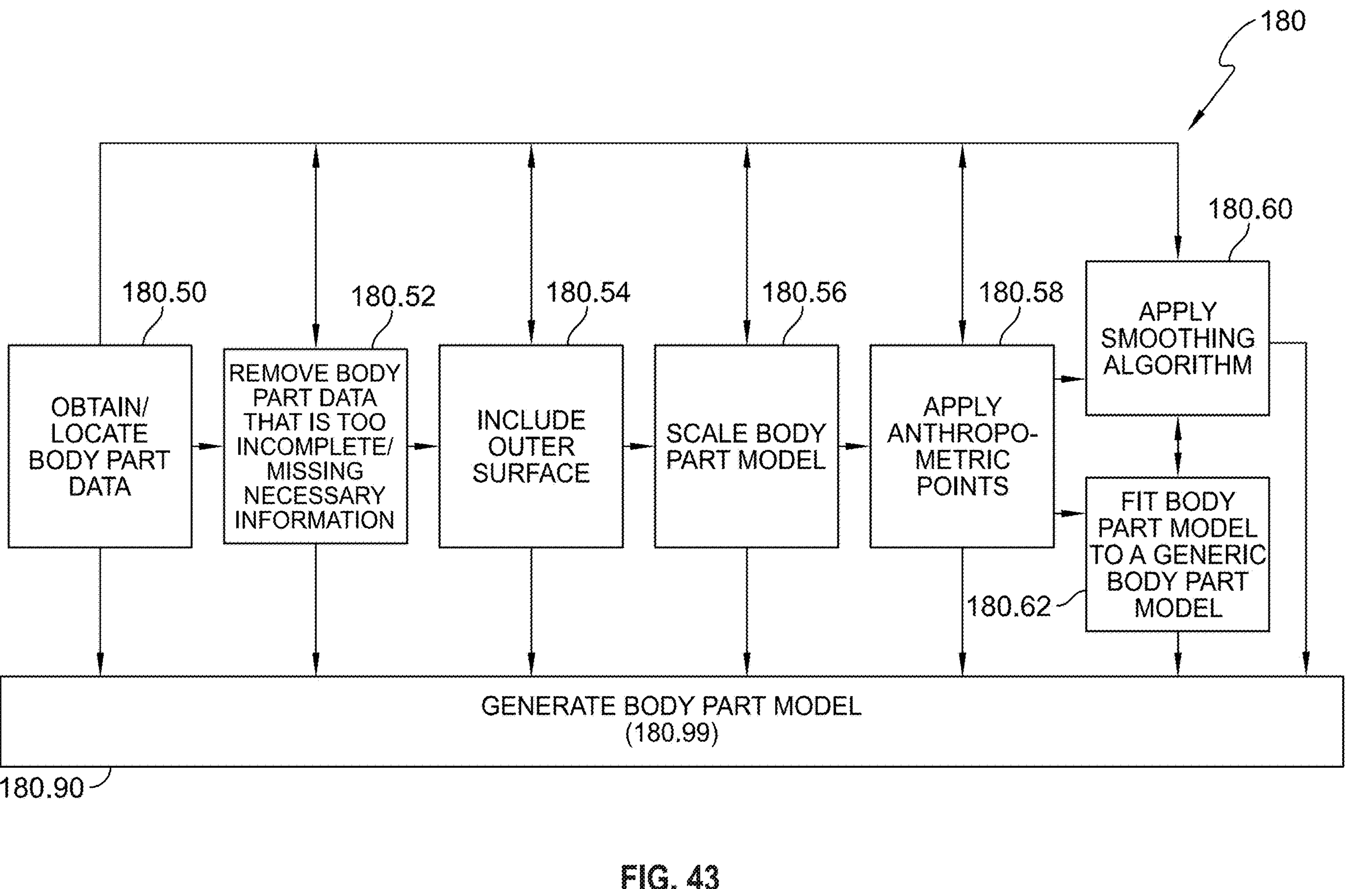
FIG. 43 is a flow chart showing the method of forming a player body part model from the collected player body part data.

As shown in FIG. 43, the process of creating a body part model 180.99 starts with locating the player data 109.99—namely, the player body part data 110.99—in step 180.50. It should be understood that the player data 109.99 may be collect and stored in connection with any system, method, or combination thereof that is disclosed herein, including using the system (110.1) disclosed in connection with FIGS. 6A-6B.

1. Accuracy and Completeness Review

Once the collection of player data 109.99 is identified, it may be reviewed for its accuracy and completeness. If the player body part data 110.99 contained in the player data 109.99 is too incomplete (e.g., contains large holes), said player body part data 110.99 may be removed from the system in step 180.52. If the collection of player body part data 110.99 is removed for any reason, then the system 10 will try and obtain this data by searching the team database, sending an inquiry to the coach, or sending an inquiry to the individual player. Once this missing data is obtained, this equipment selection and/or manufacturing may continue. If this data cannot be obtained, certain protective sports equipment may not be available to the specific player until he provides this additional data.

If the system 10 or designer determines that an interim body part model 180.98 is too incomplete to only use a smoothing algorithm in step 180.60, the interim body part model 180.98 may be overlaid on a generic model in step 180.62. For example, utilizing this generic model fitting in comparison to attempting to use a smoothing algorithm is desirable when the interim body part model 180.98 is missing a large part of the crown region of the player's head. To accomplish this generic model fitting, landmarks (e.g., anthropometric) may be used to aligned the interim body part model 180.98 with the generic model using any of the alignment methods that are disclosed herein (e.g., expectation-maximization, iterative closest point analysis, iterative closest point variant, Procrustes alignment, manifold alignment, and etc.) or methods that are known in the art. After the interim body part model 180.98 and the generic model are aligned, the computerized modeling system creates gap fillers that are based upon the generic model. Similar gap filling technique is discussed within P. Xi, C. Shu, *Consistent parameterization and statistical analysis of human head scans*. The Visual Computer, 25 (9) (2009), pp. 863-871, which is incorporated herein by reference. Said gap fillers may be in the form of: (a) a locus, (b) numerical values or coordinates contained within a table (e.g., stl file(s) or excel), (c) contour locus/loci, (d) contour line(s), (e) curvature locus/loci, (f) curvature line(s), or (g) partial surface(s). It should be understood that a smoothing algorithm from step 180.60 may be utilized after gaps in the interim body part model 180.98 are filled in step 180.62. Additionally, it should be understood that the interim body part model 180.98 may not require smoothing or filling; thus, steps 180.60, 180.62 are skipped.

2. Outer Surface 180.54

In certain embodiments it may be desirable that the body part model 180.99 include an outer surface. The generation of the outer surface may be accomplished in step 180.54 by using either: (i) a method of data collection that is designed to directly generate a body part model 180.99 with an outer surface, or (ii) apply a smoothing or connecting algorithm to the interim body part model 180.98 that is stored in any one of the above disclosed form. Where the body part model 180.99 includes said outer surface, the body part model 180.99 may be a thin 3D shell or 3D solid object that is stored in an object format (i.e., .obj).

3. Scaling Body Part Data or Model

The computerized modeling system may need to alter the size of the body part data 110.99 or interim body part model 180.98 by a scaling factor (step 180.56). This scaling factor may be based upon the size of the reference markers 110.8.2.2.2 or other objects (e.g., coin, ruler, etc.) within the images or frames are known and fixed. Thus, the computerized modeling system determines the scaling factor of the body part data 110.99 by comparing the known size of the reference markers 110.8.2.2.2 to the size of the reference markers in the interim body part model 180.98. Once this scaling factor is determined, the interim body part model 180.98 closely represents the player's body part with a typical inclusion of the data collection member 110.8.2. While the thickness of the data collection member 110.8.2 is typically minimal (e.g., 1.5 mm), it may be desirable to subtract the thickness of the data collection member 110.8.2 from the body part model 180.99. Alternatively, the thickness of the data collection member 110.8.2 may not be subtracted from the body part model 180.99.

4. Anthropometric Landmarks

Once the interim body part model 180.98 is created and scaled in step 180.56, anthropometric landmarks 180.60.2 may be identified or placed on known areas of the interim body part model 180.98 by the computerized modeling system in step 180.58. Specifically, FIG. 45-A-45D shows multiple views of an exemplary interim body part model 180.98, including a preset number of anthropometric points 180.60.2. These anthropometric points 180.60.2 typically are placed at locations that can be identified across most interim body part model 180.98. As shown in FIG. 45A-45D, the points 180.60.2 are positioned on the tip of the nose, edges of the eyes, between the eyes, the forwardmost edge of the chin, edges of the lips, and other locations. For example, the following anatomical features may be identified: (i) exocanthion (ex is located at the player's outer commissure of the eye fissure or where the upper eyelid meets with the lower eyelid, (ii) cheilion (ch) is located at the lateral oral commissure or where the upper lip meets with the lower lip, (iii) menton (me) is located at the most inferior midline point of the soft tissue chin, (iv) subnasale (sn) is located at the deepest midline point where the base of the nasal columella meets the upper lip, (vii) labrale superius (1*s*) is located at the midline point of the upper lip, and (viii) palpebrale inferius (pi) is located at the lowest point of each lower eyelid, (ix) supra-aural (sa) is located at the outermost points of the player's ears, (x) nasal tip (nt) is located at the forward most point of the player's nose, (xi) trichion (t) is located at t the intersection of the normal hairline and the middle line of the forehead, (xii) glabella (g) is located at the most prominent midline point of the forehead between the brow ridges, (xiii) coronal suture (cs) is a fibrous connective tissue joint that separates the two parietal bones from the frontal bone of the skull, (xiv) mid-sagittal plane ($P_{MS}$) is a longitudinal plane that divides the player's body, including their head, into two equal halves, and (xv) mid-coronal plane ($P_{MC}$) is a longitudinal plane that divides the player's body, including their head, into ventral and dorsal sections.

5. Smoothing or Fitting

The computer program may apply a smoothing algorithm to said interim body part model 180.98 in any one of the following forms in order to reduce noise (not to generate an outer surface) that was introduced by movement of the player's head H while the body part data 110.99 was obtained or a low resolution scanner was utilized: (a) a body part locus, (b) numerical values or coordinates contained within a table (e.g., stl file(s) or excel), (c) contour locus/loci, (d) contour line(s), (e) curvature locus/loci, (f) curvature line(s), (g) partial surface(s), and/or (h) any other data (listed above) that may be contained in the body part data 110.99 or an extent of a body part model 180.90. Moreover, said smoothing algorithm may be used to simply relocated points or contained in the locus extents of the surface and is not necessarily utilized to generate an new or second outer surface. In specific non-limiting examples, the computerized modeling system may apply a smoothing algorithm to the points within the point cloud generated by a non-contact LiDAR or time-of-flight based scanner. In another specific non-limiting example, said smoothing algorithm may be applied to a body part locus created by collecting a plurality of points using a contact scanning system (e.g., pressure measurements). Exemplary smoothing algorithms that may be applied include: (i) interpolation function, (ii) the smoothing function described within Allen B, Curless B, Popovic Z. *The space of human body shapes: reconstruction and parameterization from range scans*. In: Proceedings of ACM SIGGRAPH 2003, or (iii) other smoothing algorithms that are known to one of skill in the art (e.g., the other methods described within the other papers are attached to or incorporated by reference in U.S. Provisional Patent Application No. 62/364,629, each of which is incorporated herein by reference).

6. Body Part Model Creation

The body part model 180.99 may be created from either: (i) the interim body part model 180.98 (that has been discussed above), or (ii) directly from the player data 109.99—namely, the player body part data 110.99. Said body part model 180.99 may be created using any known method. For example, a photogrammetry based method may be used to generate the body part model 180.99 (in step 180.90). In particular, photogrammetry is a method that creates said body part model 180.99 by electronically combining images or frames of a video. The electronic combination of these images or frames from a video may be accomplished in a number of different ways. For example, Sobel edge detection or Canny edge detection may be used to roughly find the edges of the object of interest (e.g., the data collection member 110.8.2 or fitting equipment 110.36.2). The computerized modeling system may then remove parts of each image or frame that are known not to contain the object of interest. This reduces the amount of data that will need to be processed by the computerized modeling system in the following steps. Additionally, removing parts of the images or frames, which are known not to contain the objects of interest reduces the chance of errors in the following steps, such as the correlating or matches of a reference point contained within the object of interest with the background of the image.

While still in step 180.90, the computerized modeling system processes each image or frame of video to refine the detection of the edges or detect reference markers 110.8.2.2.2. After refining the detection of the edges or detecting reference markers 110.8.2.2.2, the computerized modeling system correlates or aligns the edges or reference markers 110.8.2.2.2 in each image to other edges or reference markers 110.8.2.2.2 in other images or frames. The computerized modeling system may use any one of the following techniques to align the images or frames with one another: (i) expectation-maximization, (ii) iterative closest point analysis, (iii) iterative closest point variant, (iv) Procrustes alignment, (v) manifold alignment, (vi) alignment techniques discussed in Allen B, Curless B, Popovic Z. *The space of human body shapes: reconstruction and parameterization from range scans*. In: Proceedings of ACM SIGGRAPH 2003 or (vii) other known alignment techniques. This alignment informs the computerized modeling system of the position of each image or frame of video, which is utilized to construct a body part model 180.99 based on the acquired body part data 110.99.

7. Features on the Body Part Model

It should also be understood that the terms interim body part model 180.98 or body part model 180.99 may include: (i) a point or coordinate in 2D space, (ii) a point or coordinate in 3D space, (iii) a locus in 2D space, (iv) a locus in 3D space (e.g., point cloud), (v) a line in 2D space, (vi) a line in 3D space, (vii) a plurality of points or coordinates in 2D space, (vii) a plurality of points or coordinates in 3D space, (ix) a plurality of loci in 2D space, (x) a plurality of loci in 3D space, (xi) a plurality of lines in 2D space, (xii) a plurality of lines in 3D space (e.g., wire-frame, which adjacent points using line segments)), (xiii) partial surface in 2D space, (xiv) partial surface in 3D space, (xv) partial surfaces in 2D space, (xvi) partial surfaces in 3D space, (xvii) complete surface in 2D space, (xviii) complete surface in 3D space, (xix) numerical values contained within a table (e.g., stl file(s)), (xx) partial area(s) in 2D or 3D space, (xxi) complete area in 2D or 3D space, (xxii) partial volume(s) in 2D or 3D space, (xxiii) complete volume in 2D or 3D space, (xxiv) distance(s) in 2D or 3D space, (xxv) contour locus/loci in 2D or 3D space, (xxvi) contour line(s) in 2D or 3D space, (xxvii) curvature locus/loci in 2D or 3D space, (xxviii) curvature line(s) in 2D or 3D space, (xxix) pressures, (xxx) any data collected and/or stored by any known data collection apparatus or any data collection apparatus 110.4.2 disclosed herein, and/or (xxxi) any combination of the above listed items.

Said interim body part model 180.98 or body part model 180.99 be stored, manipulated, altered, and/or displayed in: (i) stl file(s), (ii) excel file(s) or table(s), (iii) CAD file(s), (iv) object file(s) (i.e., .obj), (v) images or frames of a video, (vi) videos, or (vii) any data format disclosed herein, (viii) any data format collected and/or stored by any known data collection apparatus or any data collection apparatus 110.4.2 disclosed herein, (ix) a graphical (e.g., 3D model in a CAD program) or non-graphical form (e.g., values contained within a spreadsheet), and/or (x) any combination of the above. Further, it should be understood that the surfaces (e.g., partial or complete) can be represented by a combination of points or lines. In a specific non-limiting example, the body part model 180.99 may be created using a photogrammetry method and additional data may be added to the model 180.99 based on a contact scanning method. In a further non-limiting example, the body part model 180.99 may be created by the computerized modeling system based on the point cloud generated by the LiDAR sensor. Additional data may be added to the body part model 180.99 using a photogrammetry technique.

Figures 44A, 44B, 44C, 44D:
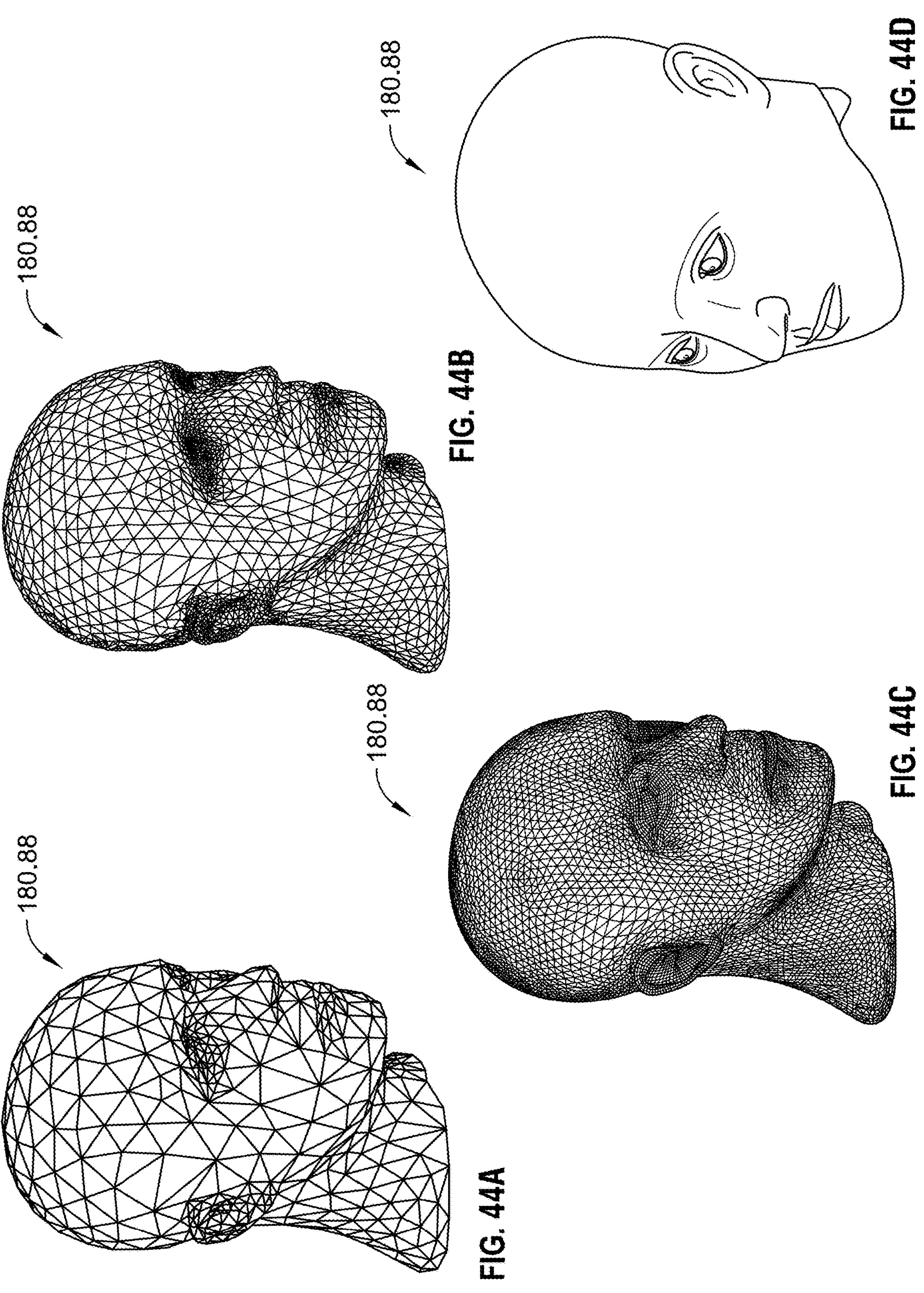
FIGS. 44A-44C show exemplary body part models, wherein the density of the points in the locus of the body part model varies across the body part models.
FIG. 44D shows a body part model that includes an outer surface.
Figures 45A, 45B, 45C, 45D:
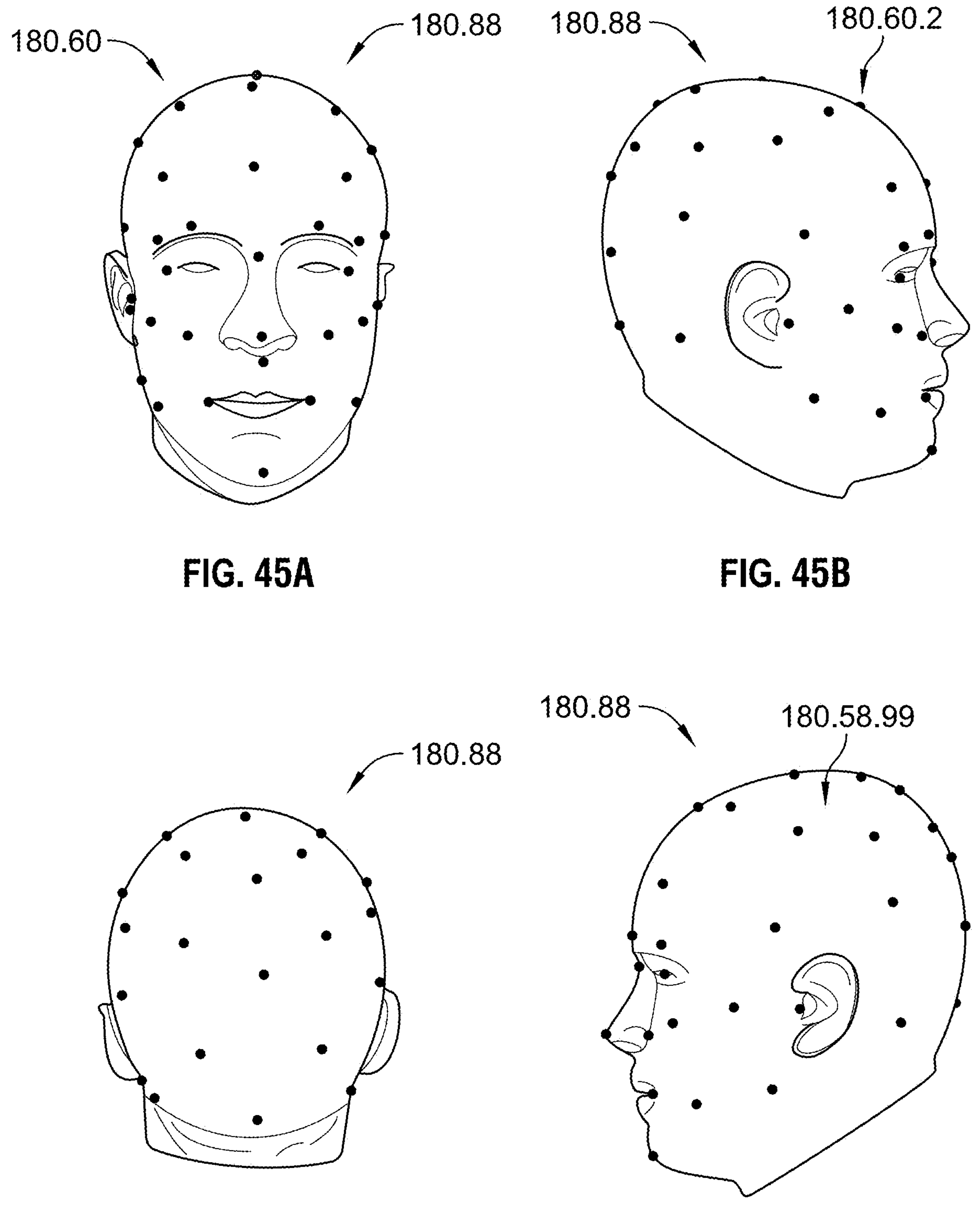
FIGS. 45A-45D show various views of a three-dimensional (3D) player body part model created from the player body part data, which has a number of anthropometric points positioned and denoted thereon.
Figure 46A:
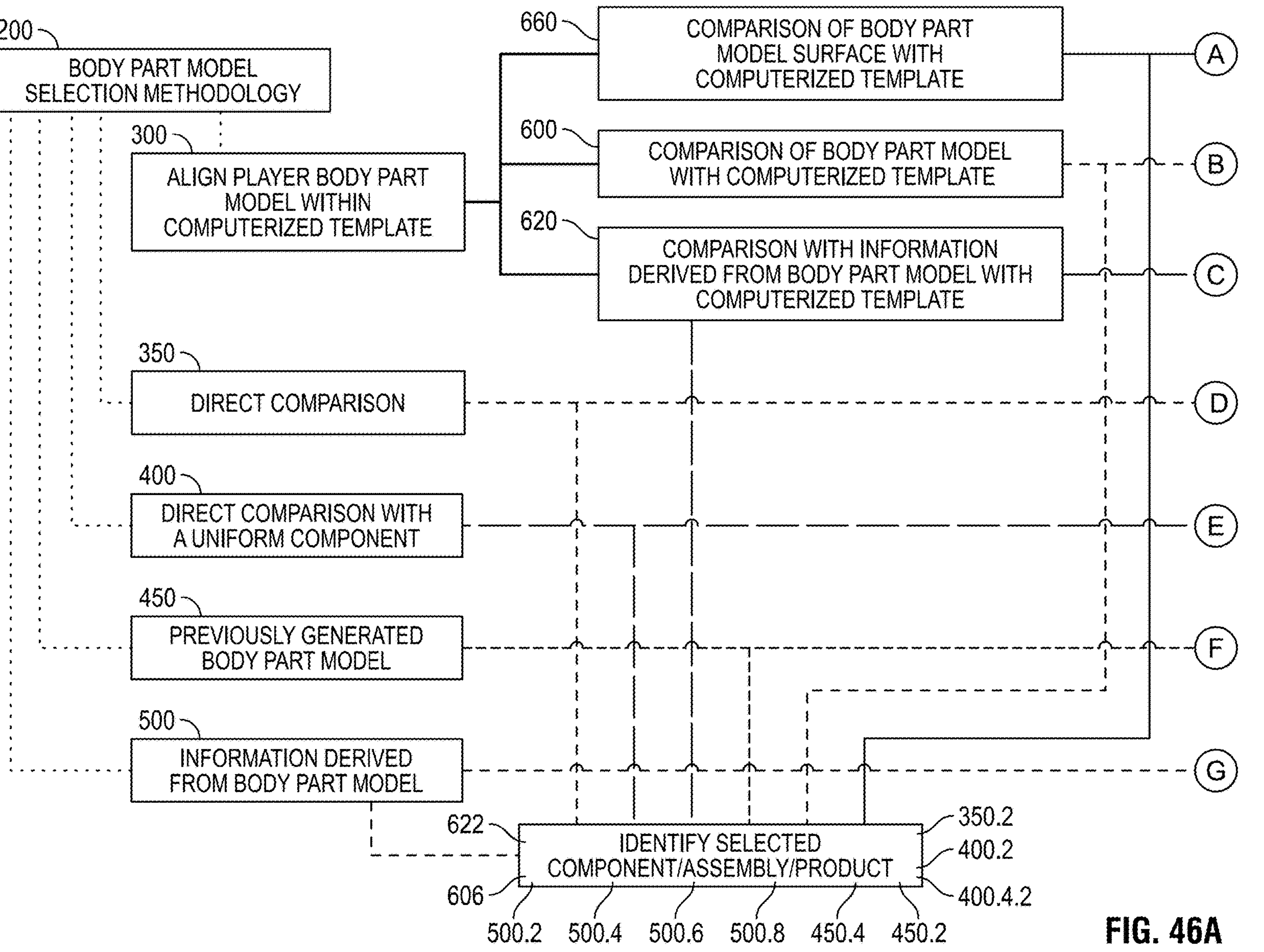
FIGS. 46A-46B are flow charts showing various body part selection methodologies of the spatial data collection, processing and fitment system.
Figure 46B:
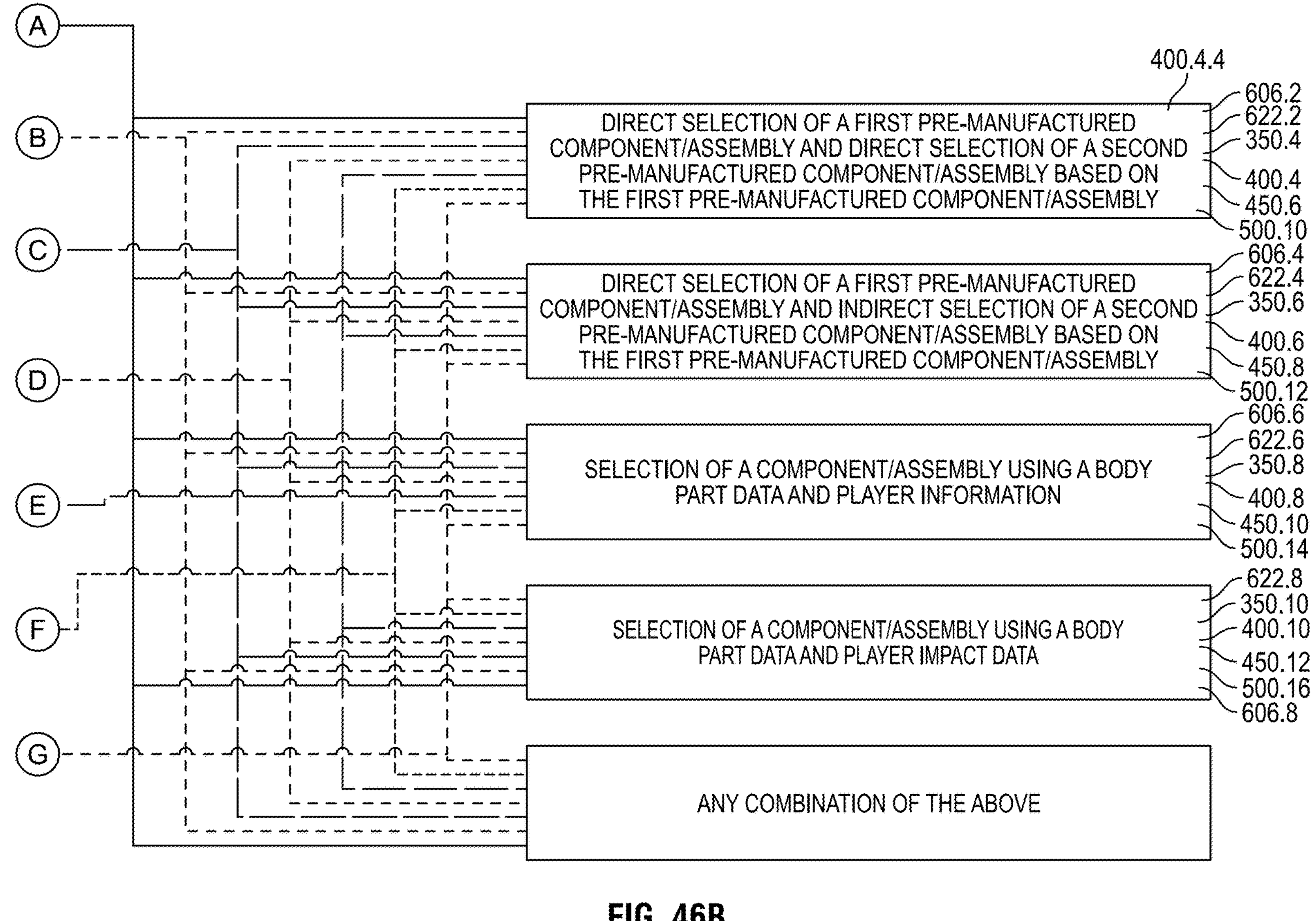

It should be understood that the density of the points contained in the locus, cloud, table, or surface may vary from extremely sparse (e.g., two points contained in the model) to extremely dense (e.g., 100,000,000 points contained in the model) and anything in between. FIG. 44A is an example of a first body part model 180.99 that is defined by a first locus with lines that interconnect said locus points. FIG. 44B is an example of a second body part model 180.99 that is defined by a second locus with lines that interconnect said locus points, wherein the number of points contained in the second locus is greater than the number of points contained in the first locus. Additionally, FIG. 44C is an example of a third body part model 180.99 that is defined by a includes a third locus with lines that interconnect said locus points, wherein the number of points contained in the third locus is greater than the number of points contained in the second locus. As the density of the points contained in the locus increase, the body part model 180.99 includes more data that helps further define a periphery of the player's body part. However, it should be understood that these exemplary body part model 180.99 shown in FIGS. 44A-44C do not include an outer surface. Additionally, it should be understood that the lines interconnecting the points in FIGS. 44A-44C are not a part of the locus and instead are utilized to transform said locus into a wireframe or viewable STL (i.e., standard triangle language or standard tessellation language) image of the model in order to help visually distinguish the 3D location of said points contained in the locus.

It should be understood that a body part model 180.99 may be a model of any body part of the player/helmet wearer, including a head, foot, elbow, torso, neck, and knee. The following disclosure focuses on designing and manufacturing an American football helmet 5000 that is designed to receive and protect a player's head. Thus, the body part model 180.99 discussed below in the next stages of the method is a model of the player's head or a "body part model." Nevertheless, it should be understood that the following discussion involving the body part model 180.99 in the multi-step method is only an exemplary embodiment of the method for the selection and/or design of an American football helmet 5000, and this embodiment shall not be construed as limiting.

ii. Direct Selection Using a Body Part Model

The pre-manufactured component(s)/assemblies of the protective sports equipment can be selected using a direct comparison method, which corresponds to step 350, where said pre-manufactured component(s)/assemblies are selected based upon the body part model 180.99. In this method, the point(s) or coordinate(s), locus/loci, line(s), partial surface(s), complete surface, partial area(s), complete area, partial volume(s), complete volume, distance(s), contour locus/loci, contour line(s), curvature locus/loci, curvature line(s), pressure(s), or any other data contained in the body part model 180.99 are directly compared with one or more point(s) or coordinate(s), locus/loci, line(s), partial surface(s), complete surface, partial area(s), complete area, partial volume(s), complete volume, distance(s), contour locus/loci, contour line(s), curvature locus/loci, curvature line(s), pressure(s), or any other information contained within data set that are associated with the pre-manufactured component(s)/assemblies.

Figure 47:
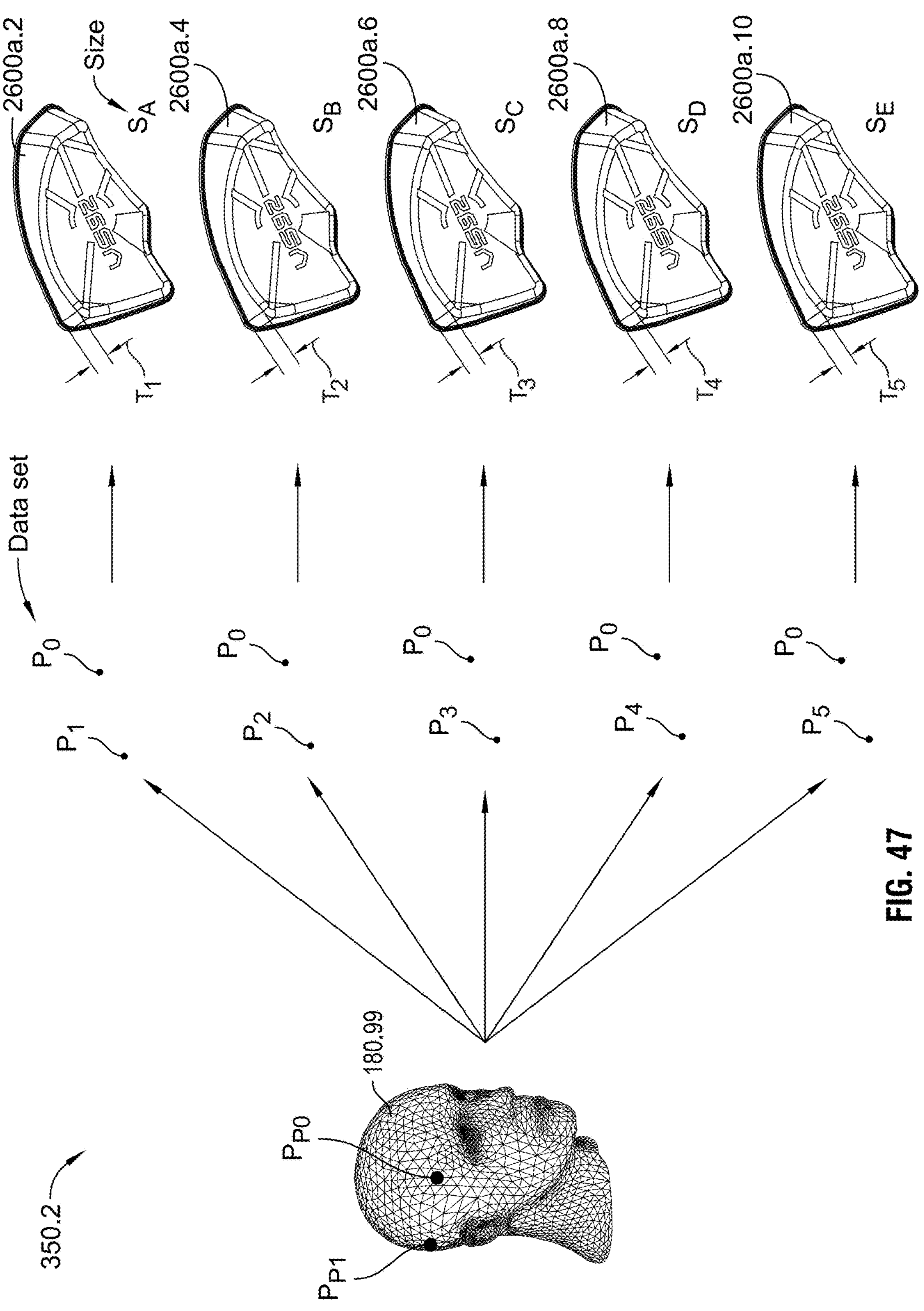
FIG. 47 is a graphical flow chart showing a selection of a component from a plurality of components using a body part model selection methodology of the spatial data collection, processing and fitment system.

It should be understood that direct comparison method (step 350) may compare said data contained in the body part model 180.99 with a data set(s) that it associated with: (i) a single pre-manufactured component (e.g., front energy attenuation component or helmet shell), (ii) multiple pre-manufactured components (e.g., front and/or rear energy attenuation member), (iii) an entire pre-manufactured assembly (e.g., energy attenuation assembly), or (iv) a protective sports helmet (e.g., entire cycling helmet or skiing helmet). As shown in FIG. 47 (step 350.2), the system 10 includes five exemplary data sets that each contain two points. As discussed above, each data set (e.g., $P_1$, $P_0$-$P_5$, $P_0$) is associated with a single pre-manufactured component (e.g., energy attenuation components $S_A$-$S_E$). For example, if a player's body part model 180.99 included a body part locus with points $P_{P0}$, $P_{P1}$ that are closets in space (e.g., smallest distance between $P_{P0}$, $P_{P1}$ and $P_3$, $P_0$) to the points $P_3$, $P_0$ contained in the data set. The selection of the data set $P_3$, $P_0$ will instruct the system 10 to assign the energy attenuation component that is a size C to the player.

| Data Set (e.g., Pre-Manufacture Component Points) | Pre-Manufactured Component |
|---|---|
| $P_1$, $P_0$ | Energy Attenuation Component-Size A $S_A$ |
| $P_2$, $P_0$ | Energy Attenuation Component-Size B $S_B$ |
| $P_3$, $P_0$ | Energy Attenuation Component-Size C $S_C$ |
| $P_4$, $P_0$ | Energy Attenuation Component-Size D $S_D$ |
| $P_5$, $P_0$ | Energy Attenuation Component-Size E $S_E$ |

As discussed in greater detail above, the selection of the pre-manufactured component can then be utilized in connection with other systems or methods disclosed herein to select other pre-manufactured components, assemblies, or products. In particular, said direct selection of the pre-manufactured component can be utilized to: (i) directly select other components, assemblies, or products—namely, the first energy attenuation component can be directly associated with a helmet shell (step 350.4), (ii) indirectly select other component based on algorithms or methodologies that utilize neural networks, artificial intelligence, machine learning, linear regression analysis, combinations of the same, and/or any know method of selecting a component, assembly, or product based on the selection of a first component (step 350.6), (iii) indirectly select other component based player information 109.2.99 (e.g., player level, position, or age), and/or player impact data 109.4.99 (steps 350.8, 350.10). It should be understood that this method only directly selects the first pre-manufactured component based upon information contained in the body part model 180.99. Moreover, this method does not use data that is derived (e.g., distance between two points, area, or volume) from the body part model 180.99.

iii. Uniform Component for All Players

The pre-manufactured component(s)/assemblies of the protective sports equipment can be selected using a direct comparison with a uniform component/assembly method, which corresponds to step 400, where all player's obtain one standard component of the equipment (e.g., the energy attenuation assembly) and another piece of the equipment (e.g., shell) is either: (i) selected from a plurality of pre-manufactured components, or (ii) custom manufactured (e.g., using 3D printing) for the player. Unlike other methods disclosed herein that typically provide a plurality of different components that may be selected for the player (e.g., different helmet shell sizes (S, M, L, XL) and different energy attenuation assemblies (over 40,000 different combinations of energy attenuation components)), this method (step 400) assumes that all players will receive at least one standard piece of equipment. In this method (step 400), the information contained in or derived from the body part model 180.99 can be used to select or manufacture the helmet shell for the player.

Figure 48:
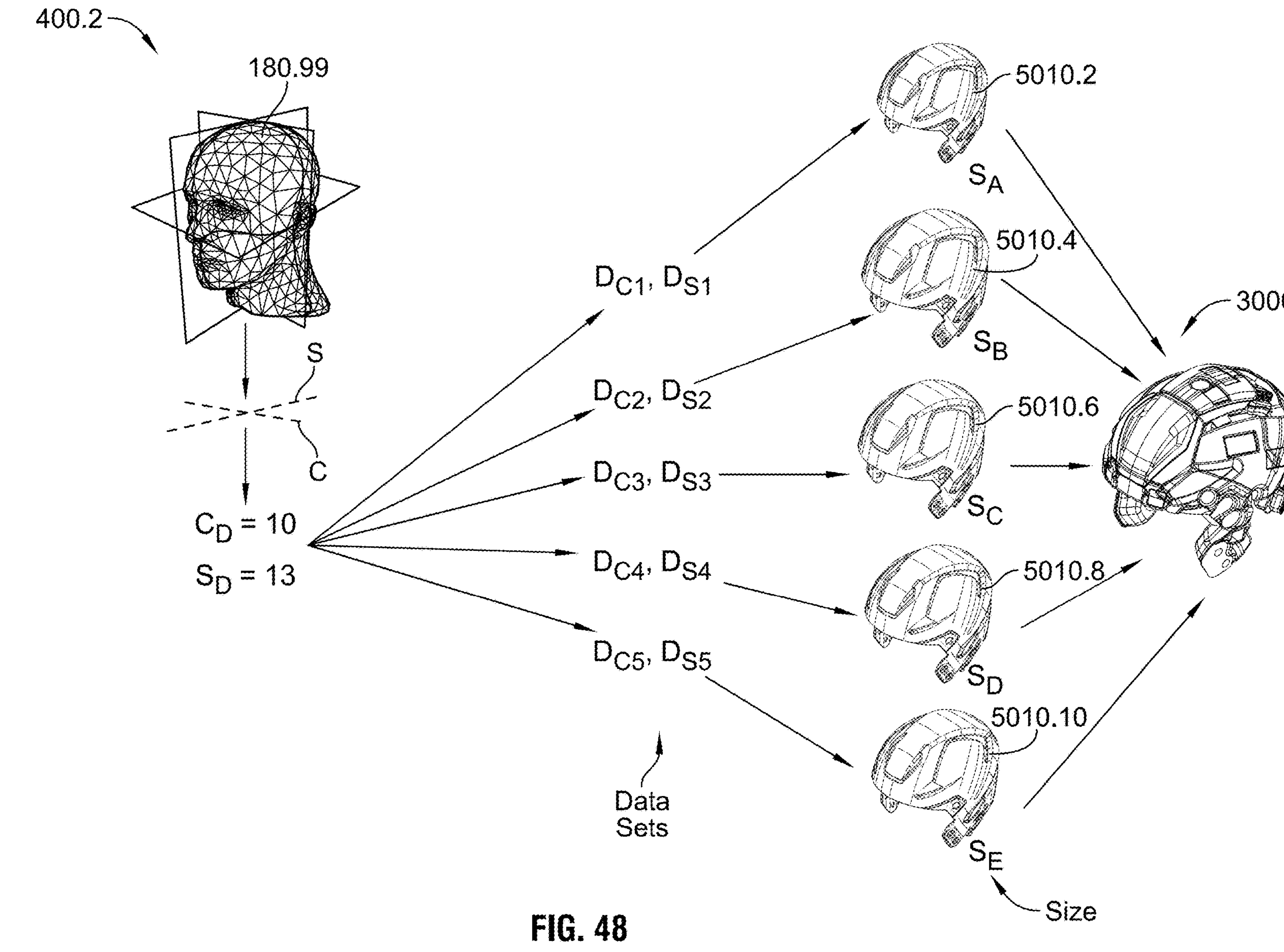
FIG. 48 is graphical flow chart showing a selection of a component from a plurality of components using the body part model selection methodology, wherein all players receive at least one common assembly.

Below is an exemplary table that associates two distances derived from body part model 180.99 with data sets that are associated with different size pre-manufactured helmet shells. As shown in FIG. 48 (step 400.2), if a player's body part model 180.99 included a coronal plane distance (e.g., 10) that is closest to $D_{C2}$ and a sagittal plane distance (e.g., 13) that is closest to $D_{S2}$, then the player will receive an helmet shell that is a size E, while receiving the same energy attenuation assembly as all other players. In this example, $D_{C1}$ is the distance along the player's coronal plane and $D_{S1}$ is the distance along the player's sagittal plane, wherein said distances extend from the outermost extents of the player's body part model 180.99 that are configured to underlie the given helmet.

| Data Set (e.g., Pre-Manufacture Distances) | Pre-Manufactured Component |
|---|---|
| $D_{C1}$, $D_{S1}$ | Helmet Shell-Size A $S_A$ |
| $D_{C1}$, $D_{S2}$ | Helmet Shell-Size B $S_B$ |
| $D_{C1}$, $D_{S3}$ | Helmet Shell-Size C $S_C$ |
| $D_{C2}$, $D_{S1}$ | Helmet Shell-Size D $S_D$ |
| $D_{C2}$, $D_{S2}$ | Helmet Shell-Size E $S_E$ |

Figure 49:
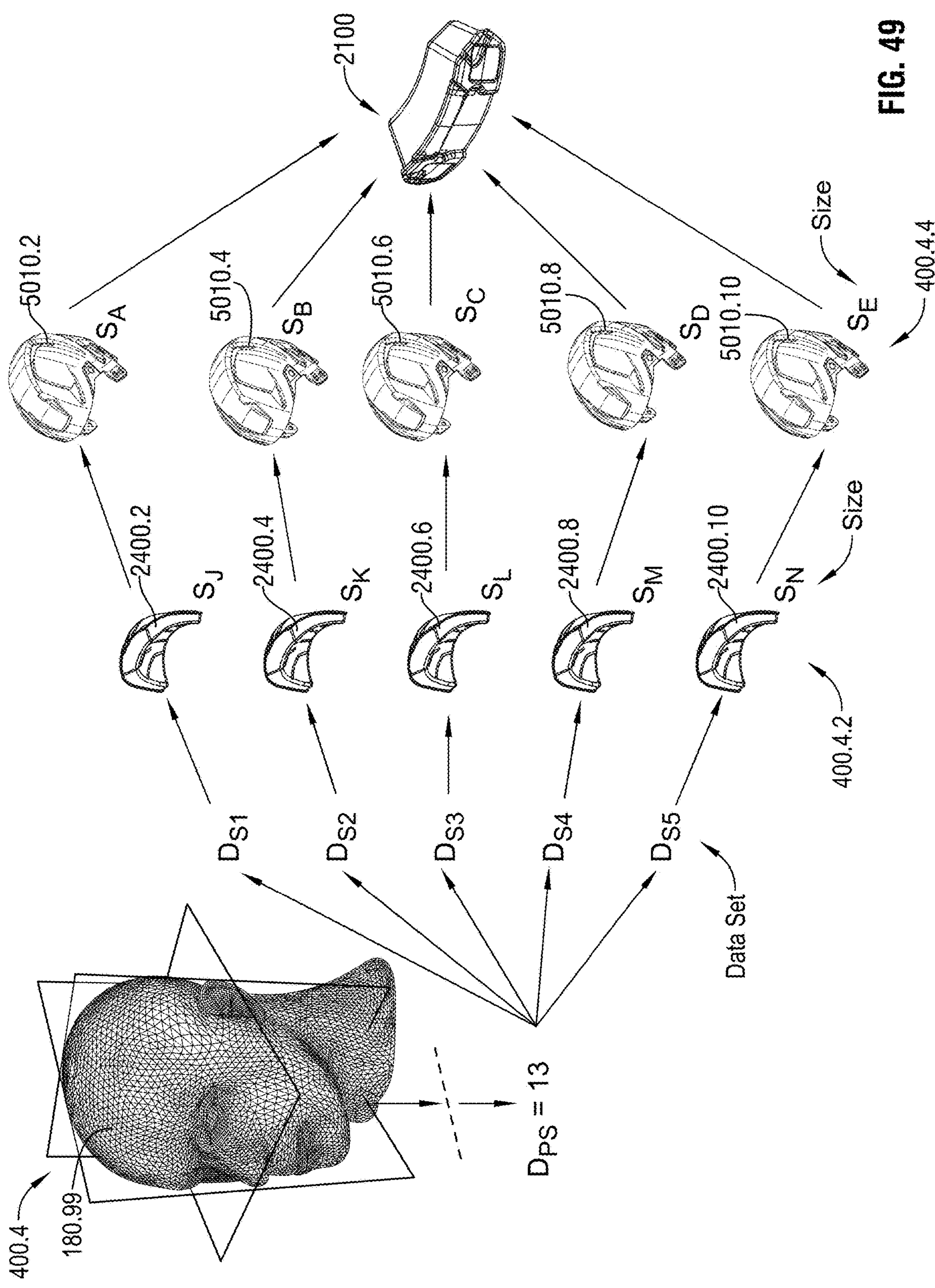
FIG. 49 is a graphical flow chart showing a selection of a first component from a first plurality of components using the body part model selection methodology and a selection of a second component from a second plurality of components based on the first selected component, and wherein all players receive at least one common component.

Instead of selecting a helmet shell size, said pre-manufactured component may be selected is a per-manufactured energy attenuation component (e.g., rear). As shown in FIG. 49 (step 400.4), the standard piece of equipment that all players will receive is a first per-manufactured energy attenuation component (e.g., front). The player's body part model 180.99 included a sagittal plane distance (e.g., 13) that is compared with at least one data point contained in a plurality of data sets. Wherein said data sets include sagittal plane distances that are associated with each pre-manufactured component (e.g., rear energy attenuation component). In this example, sagittal plane distance of the player $D_{PS}$ is closest to $D_{S2}$; therefore, the player will receive an energy attenuation component (e.g., rear) with size K in step 400.4.2. Next, the system 10 directly selected a helmet shell is size B for the player based on the selection of the energy attenuation component having size K in step 400.4.4.

| Data Set (e.g. Pre-Manufacture Distances) | Pre-Manufactured Component | Pre-Manufactured Component |
|---|---|---|
| $D_{S1}$ | Energy Attenuation Component-Size J $S_J$ | Helmet Shell-Size A $S_A$ |
| $D_{S2}$ | Energy Attenuation Component-Size K $S_K$ | Helmet Shell-Size B $S_B$ |
| $D_{S3}$ | Energy Attenuation Component-Size L $S_L$ | Helmet Shell-Size C $S_C$ |
| $D_{S4}$ | Energy Attenuation Component-Size M $S_M$ | Helmet Shell-Size D $S_D$ |
| $D_{S5}$ | Energy Attenuation Component-Size N $S_N$ | Helmet Shell-Size E $S_E$ |

As discussed in greater detail above, the selection of the pre-manufactured component can then be utilized in connection with other systems or methods disclosed herein to select other pre-manufactured components, assemblies, or products. In particular, said direct selection of the pre-manufactured component can be utilized to: (i) directly select other components, assemblies, or products—namely, the first energy attenuation component can be directly associated with a helmet shell (step 400.4), (ii) indirectly select other component based on algorithms or methodologies that utilize neural networks, artificial intelligence, machine learning, linear regression analysis, combinations of the same, and/or any know method of selecting a component, assembly, or product based on the selection of a first component (step 400.6), (iii) indirectly select other component based player information 109.2.99 (e.g., player level, position, or age), and/or player impact data 109.4.99 (steps 400.8, 400.10). It should be understood that this method only directly selects the first pre-manufactured component based upon information derived (e.g., distance between two points, area, or volume) from the body part model 180.99. Moreover, this method does not selection said the pre-manufactured component based solely on data contained in the body part model 180.99.

iv. Selection Based on an Previously Generated Body Part Model

The pre-manufactured component(s) of the protective sports equipment can be selected using a previously generated body part model, a pre-manufactured body part model, or a pre-determined body part model (step 450), where: (i) compare information contained in, associated with, or derived from the body part model 180.99 with at least one data set contained in a plurality of data sets, wherein each data set is associated with a pre-determined model, (ii) select a pre-determined model that is associated with the selected data set, (iii) select the pre-manufactured component(s)/assemblies are associated with the selected previously generated model. In this method, the points contained in the body part locus, distances between the points in the locus, pressure(s), area(s), volume(s), or other information contained in or derived from the model 180.99 can be compared against similar information contained in a plurality of previously generated models in order to select the previously generated model that best represents the player's body part.

Figure 50:
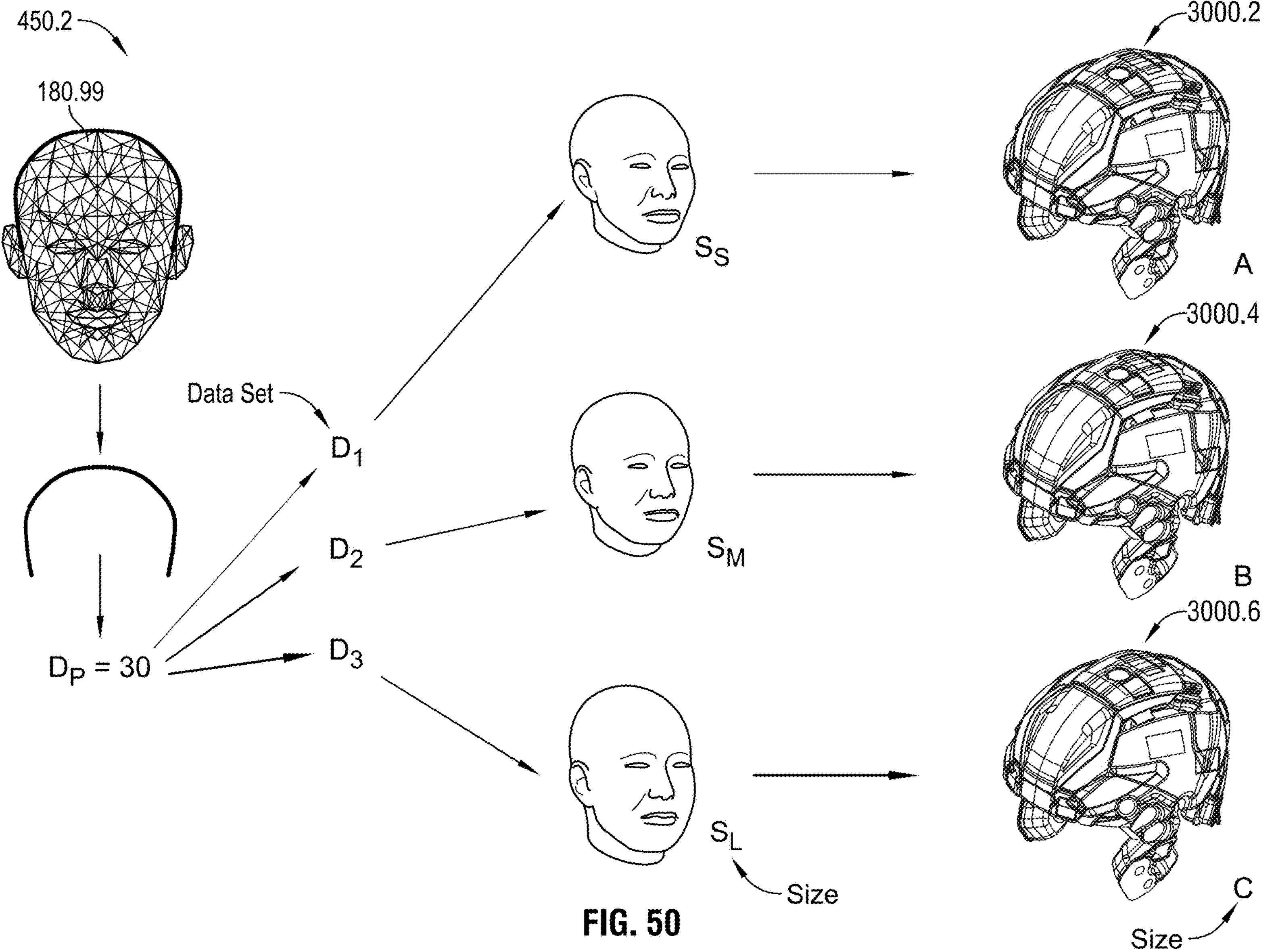
FIG. 50 is a graphical flow chart showing a selection of an assembly from a plurality of assemblies using the body part model selection methodology, wherein a previously generated head model: (i) is selected from a plurality of previously generated head model using the player data, and (ii) is associated with the assembly.

As shown in FIG. 50 (step 450.2), the player's peripheral distance $D_P$ from center of the ear to the center of the opposite ear is 30. The system 10 then will take said player's peripheral distance $D_P$ and compare said player's peripheral distance $D_P$ to a plurality of distances $D_1$-$D_3$ contained in a data set, wherein each distance $D_1$-$D_3$ contained in the data set is directly associated with a body part model having sizes Ss-$S_L$. In this example, the system 10 recommends the use of body part model size $S_L$ because: (i) the peripheral distance $D_P$ 30 is closest, but not above, $D_3$, and (ii) body part model size $S_L$ is directly associated with $D_3$.

| Data Sets (e.g., Pre Determined Distances) | Pre-Determined Models |
|---|---|
| $D_1$ | Pre-Determined Model S $S_S$ |
| $D_2$ | Pre-Determined Model M $S_M$ |
| $D_3$ | Pre-Determined Model L $S_L$ |

After the previously generated model is selected (e.g., body part model size $S_L$), then the pre-manufactured component (s) can be selected from the plurality of pre-manufactured components. For example, if a player is assigned previously generated body part model size $S_L$, then the player will receive an energy attenuation assembly that is a size C.

| Pre-Determined Models | Pre-Manufactured Assembly |
|---|---|
| Pre-Determined Model S $S_S$ | Energy Attenuation Assembly-Size A |
| Pre-Determined Model M $S_M$ | Energy Attenuation Assembly-Size B |
| Pre-Determined Model L $S_L$ | Energy Attenuation Assembly-Size C |

Figure 51:
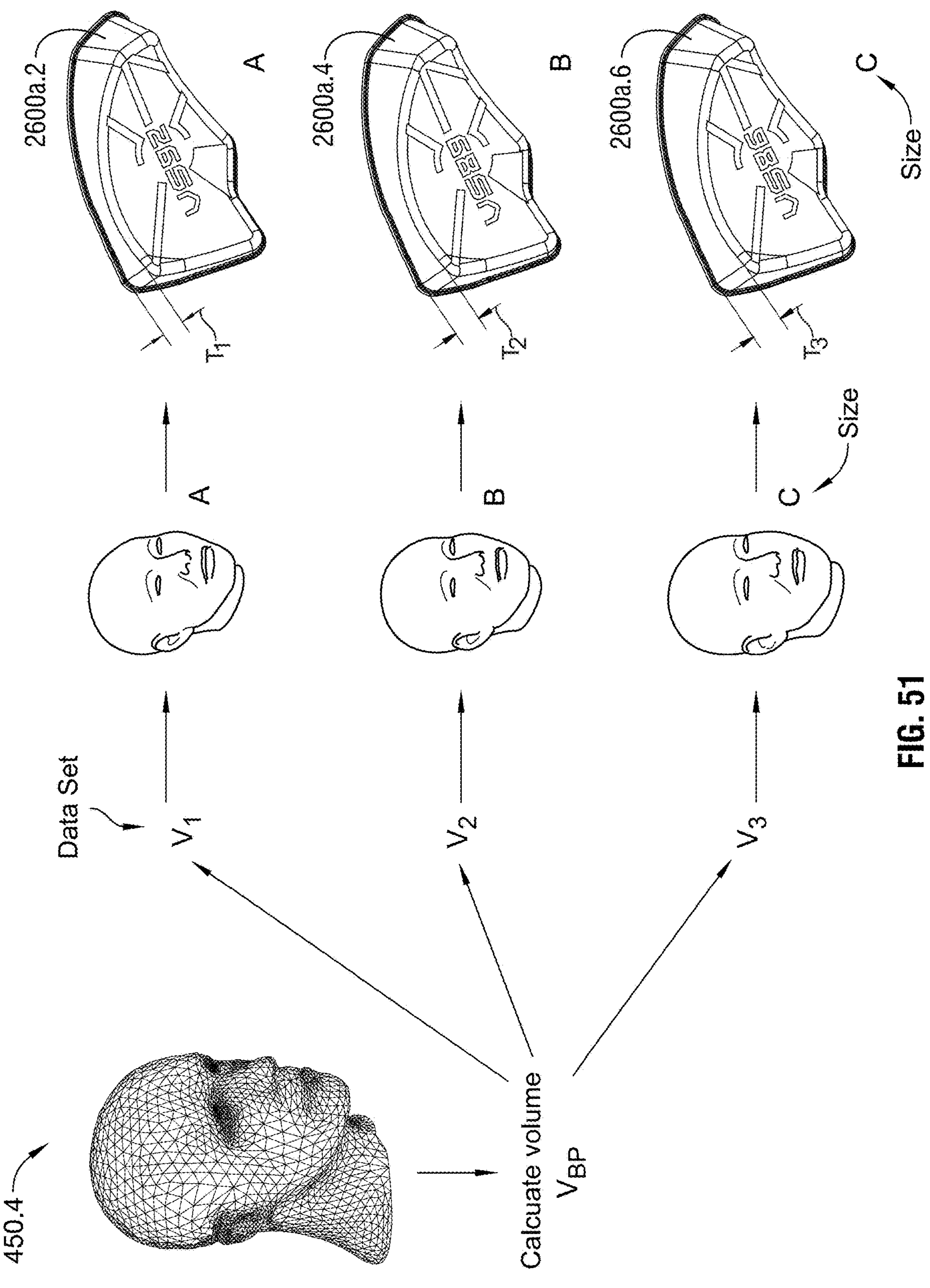
FIG. 51 is a graphical flow chart showing a selection of a component from a plurality of components using the body part model selection methodology, wherein a previously generated head model: (i) is selected from a plurality of previously generated head model using the player data, and (ii) is associated with the component.

As shown in FIG. 51, which depicts step 450.4 and pertains to the player's body part volume $V_{BP}$. The system 10 then will take said player's volume $V_P$ and compare said player's body part volume $V_{BP}$ to a plurality of volumes $V_1$-$V_3$ contained in a data set, wherein each volume $V_1$-$V_3$ contained in the data set is directly associated with a body part model having sizes $S_A$-$S_C$. In this example, the system 10 recommends the use of body part model size $S_B$ because: (i) the player's body part volume $V_{BP}$ is closest, but not below, $V_2$, and (ii) body part model size $S_B$ is directly associated with $V_2$. After the previously generated model is selected (e.g., body part model size $S_B$), then the pre-manufactured component(s) can be selected from the plurality of pre-manufactured components. For example, if a player is assigned previously generated body part model size $S_B$, then the player will receive an energy attenuation component that is a size B. It should be understood that utilization of this method may be beneficial if the reference properties of the component(s) are determined by principle component analysis or the methods disclosed in U.S. Provisional 62/719,130 or U.S. Pat. No. 11,167,198 or 11,399,589, all of which are incorporated herein by reference.

| Data Sets (e.g., Pre-Determined Volumes) | Pre-Determined Models | Pre-Manufactured Component |
|---|---|---|
| $V_1$ | Pre-Determined Model A | Energy Attenuation Component-Size A |
| $V_2$ | Pre-Determined Model B | Energy Attenuation Component-Size B |
| $V_3$ | Pre-Determined Model C | Energy Attenuation Component-Size C |

As discussed in greater detail above, the selection of the pre-manufactured component can then be utilized in connection with other systems or methods disclosed herein to select other pre-manufactured components, assemblies, or products. In particular, said direct selection of the pre-manufactured component can be utilized to: (i) directly select other components, assemblies, or products—namely, the first energy attenuation component can be directly associated with a helmet shell (step 450.6), (ii) indirectly select other component based on algorithms or methodologies that utilize neural networks, artificial intelligence, machine learning, linear regression analysis, combinations of the same, and/or any know method of selecting a component, assembly, or product based on the selection of a first component (step 450.8), (iii) indirectly select other component based player information 109.2.99 (e.g., player level, position, or age), and/or player impact data 109.4.99 (steps 450.10, 450.12). It should be understood that this method only directly selects the first pre-manufactured component based upon information derived (e.g., distance between two points, area, or volume) from the body part model 180.99. Moreover, this method does not selection said the pre-manufactured component based solely on data contained in the body part model 180.99.

v. Information Derived from a Body Part Model

Figure 52:
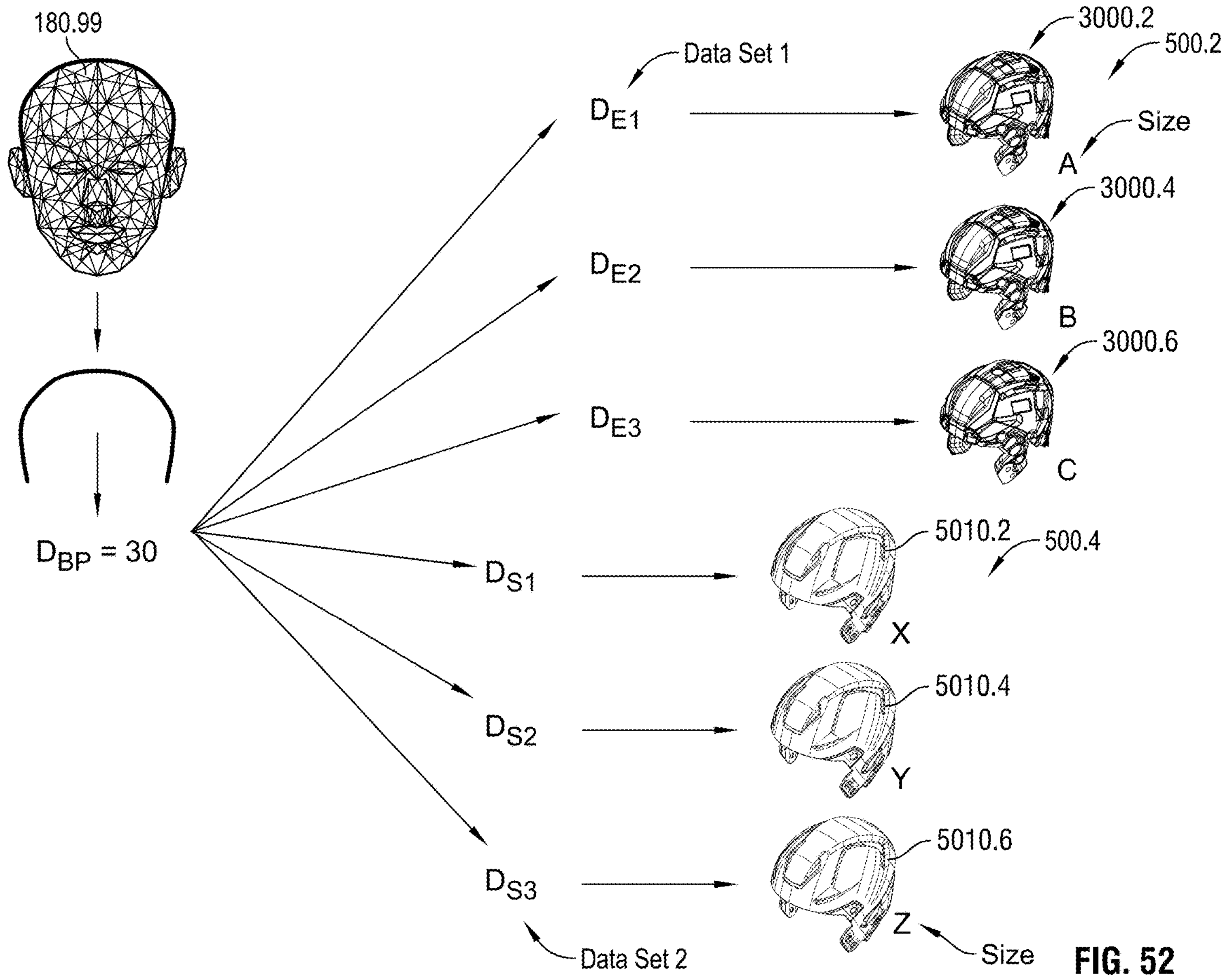
FIG. 52 is a graphical flow chart showing a selection of an assembles from a plurality of assemblies and a component from a plurality of components using the body part model selection methodology of the spatial data collection, processing and fitment system.

The pre-manufactured component(s)/assemblies of the protective sports equipment can be selected using information derived from a body part model (step 500), where said pre-manufactured component(s) are selected based upon information derived from the body part model 180.99. In this method, distance(s) between the points in the locus, area(s), volume or other information derived from the model 180.99 is directly compared with data sets that are associated with the component(s)/assemblies. As shown in FIG. 52 (step 500.2), a player's body part model 180.99 included a peripheral distance $D_{BP}$ (e.g., 30) from center of the ear to the center of the opposite ear can be compared against at least one data set contained in the plurality of data sets, wherein each data set is associated with a pre-manufactured assembly. If player's peripheral distance $D_{BP}$ (e.g., 30) from center of the ear to the center of the opposite ear is closest to $D_{E2}$ after a comparison of $D_{BP}$ to the other distances contained in the first data set (e.g., $D_{E1}$-$D_{E3}$), then the player will receive an energy attenuation assembly that is a size B.

| Data Sets (e.g., Pre-Determined Distances) | Pre-Manufactured Component |
|---|---|
| $D_{E1}$ | Energy Attenuation Component-Size A |
| $D_{E2}$ | Energy Attenuation Component-Size B |
| $D_{E3}$ | Energy Attenuation Component-Size C |

FIG. 52 (step 500.2) also shown that the same peripheral distance $D_{BP}$ that is derived from the player's body part model 180.99 can be also be compared against values contained in a second data set (e.g., $D_{S1}$-$D_{S3}$) in order to select the shell the player will receive. For example, the above described player will receive shell that is a size X because said peripheral distance is closest to $D_{S1}$ (step 500.4).

| Data Set 2 (e.g.) Component Distances) | Pre-Manufactured Component |
|---|---|
| $D_{S1}$ | Shell-Size X |
| $D_{S2}$ | Shell-Size Y |
| $D_{S3}$ | Shell-Size Z |

Figure 53:
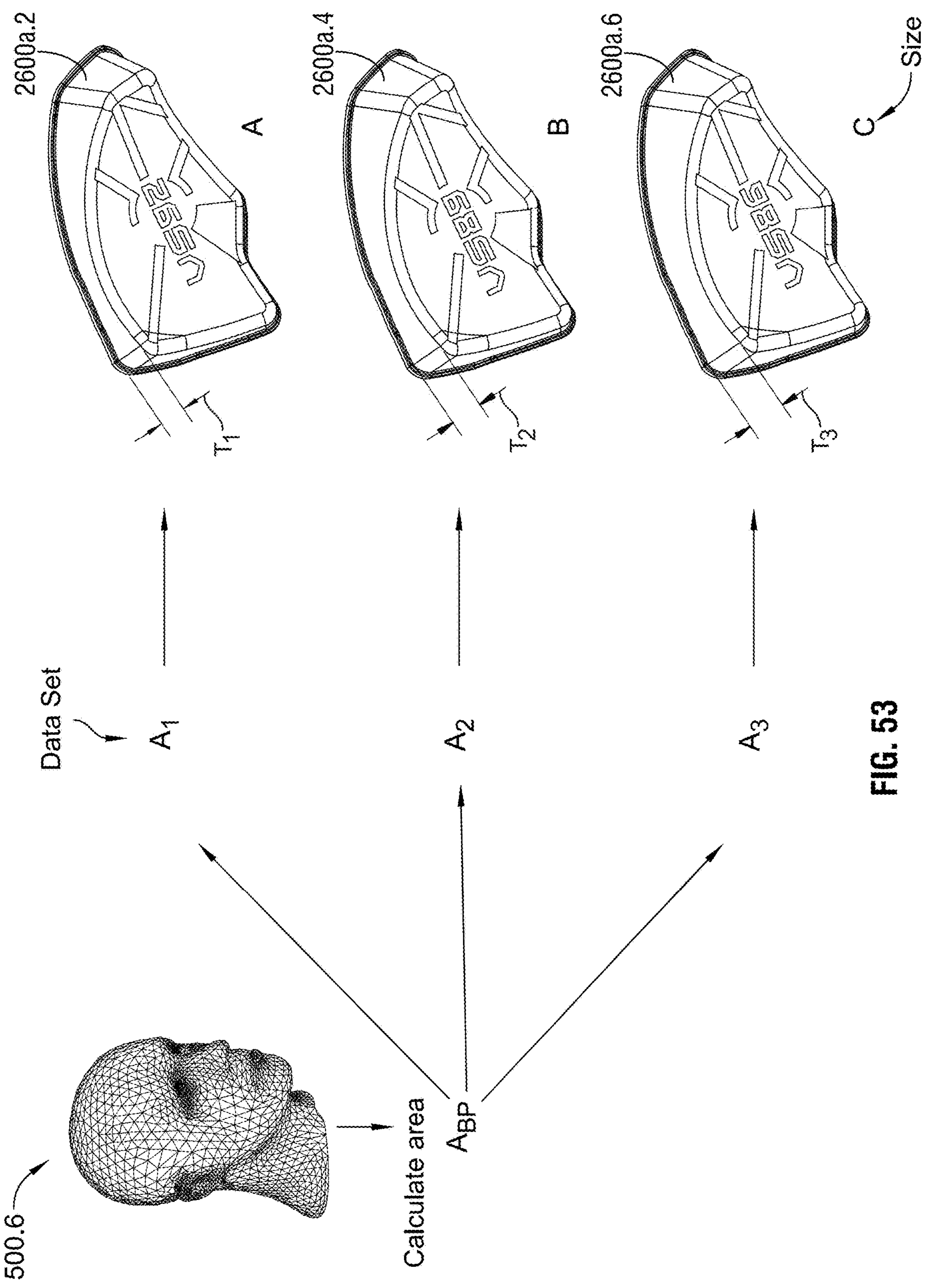
FIG. 53 is a graphical flow chart showing a selection of a component from a plurality of components using the body part model selection methodology.

As shown in FIG. 53, which depicts step 500.6, the system 10 calculates an area $A_{BP}$ for a specific region of the player's body part model 180.99. The system 10 then will take the body part area $A_{BP}$ and compare said body part area $A_{BP}$ to a plurality of areas $A_1$-$A_3$ contained in a data set, wherein each area $A_1$-$A_3$ contained in the data set is directly associated with a pre-manufactured component (e.g., energy attenuation components with sizes $S_A$-$S_C$). In this example, the system 10 recommends the use of an energy attenuation component with size A, as the body part area $A_{BP}$ is approximately equal to $A_1$.

| Data Sets (e.g., Pre-Determined Area) | Pre-Manufactured Component |
|---|---|
| $A_1$ | Energy Attenuation Component-Size A |
| $A_2$ | Energy Attenuation Component-Size B |
| $A_3$ | Energy Attenuation Component-Size C |

Figure 54:
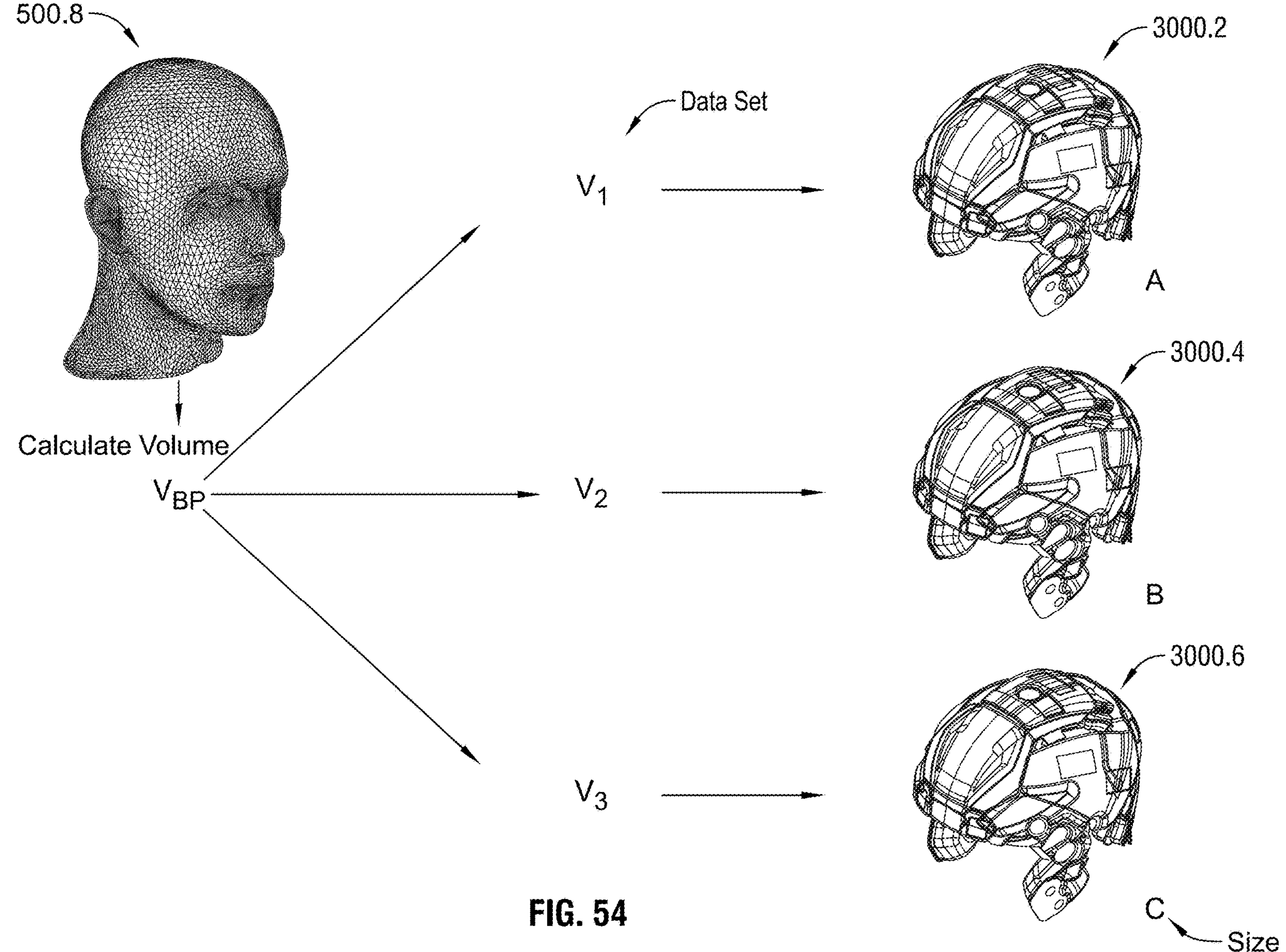
FIG. 54 is a graphical flow chart showing a selection of an assembly from a plurality of assemblies using the body part model selection methodology.
Figure 55:
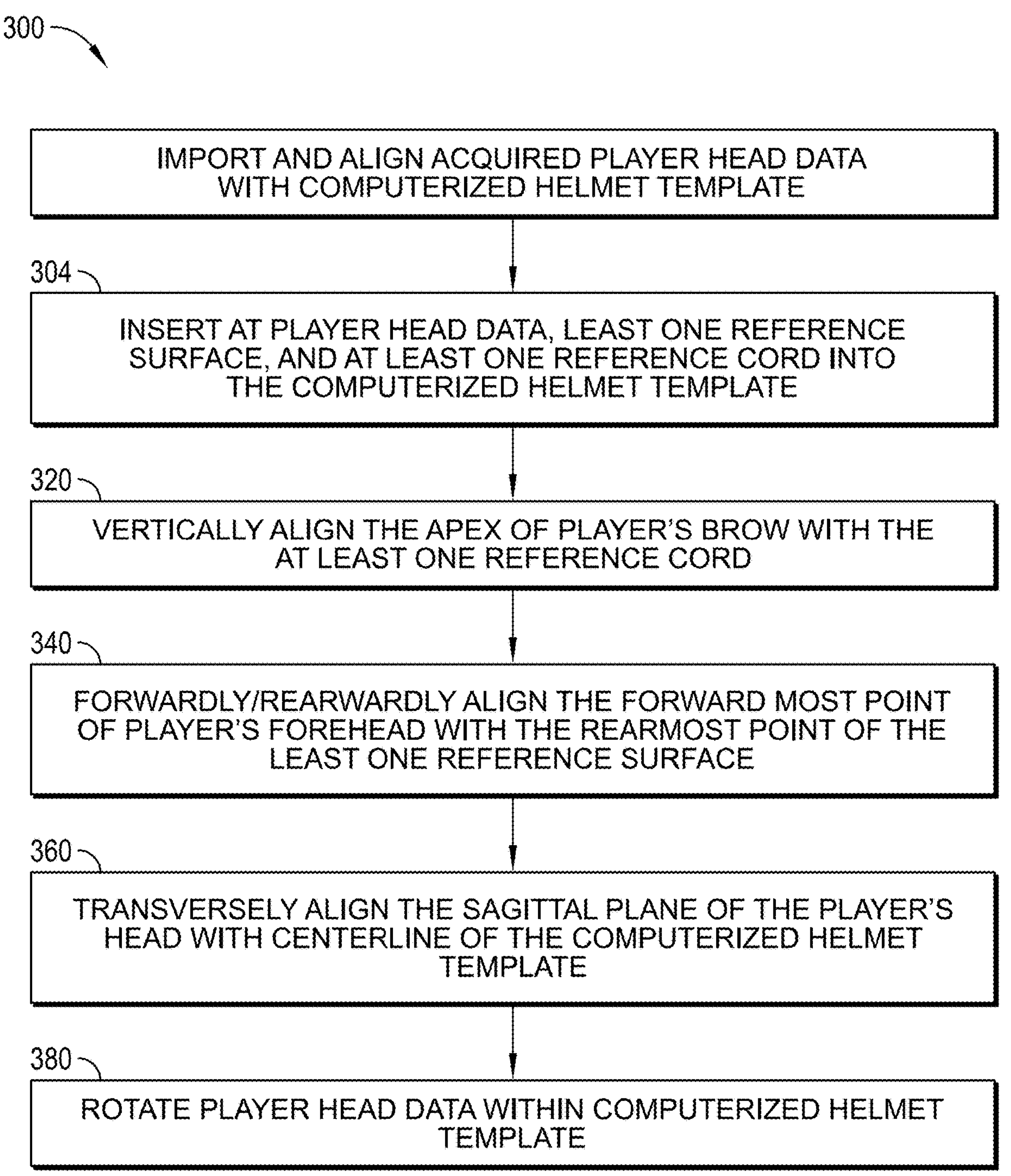
FIG. 55 is a flow chart of the spatial data collection, processing and fitment system showing a method for aligning the specific player's body part model within the computerized template.

As shown in FIG. 54, which depicts step 500.8, the system 10 calculates a volume $V_{BP}$ for a specific portion of the player's body part model 180.99. The system 10 then will take the body part volume $V_{BP}$ and compare said body part volume $V_{BP}$ to a plurality of volumes $V_1$-$V_3$ contained in a data set, wherein each area $V_1$-$V_3$ contained in the data set is directly associated with a pre-manufactured assembly (e.g., energy attenuation assemblies with sizes $S_A$-$S_C$). In this example, the system 10 recommends the use of an energy attenuation assembly with size A, as the body part volume $V_{BP}$ is nearest to $V_1$.

| Pre-Determined Volume | Pre-Manufactured Assembly |
|---|---|
| $V_1$ | Energy Attenuation Assembly-Size A |
| $V_2$ | Energy Attenuation Assembly-Size B |
| $V_3$ | Energy Attenuation Assembly-Size C |

As discussed in greater detail above, the selection of the pre-manufactured component can then be utilized in connection with other systems or methods disclosed herein to select other pre-manufactured components, assemblies, or products. In particular, said direct selection of the pre-manufactured component can be utilized to: (i) directly select other components, assemblies, or products—namely, the first energy attenuation component can be directly associated with a helmet shell (step 500.10), (ii) indirectly select other component based on algorithms or methodologies that utilize neural networks, artificial intelligence, machine learning, linear regression analysis, combinations of the same, and/or any know method of selecting a component, assembly, or product based on the selection of a first component (step 500.12), (iii) indirectly select other component based player information 109.2.99 (e.g., player level, position, or age), and/or player impact data 109.4.99. It should be understood that this method only directly selects the first pre-manufactured component based upon information derived (e.g., distance between two points, area, or volume) from the body part model 180.99 (steps 500.14, 500.16). Moreover, this method does not selection said the pre-manufactured component based solely on data contained in the body part model 180.99.

vi. Selection Based Upon an Aligned Body Part Model

Figure 56A:
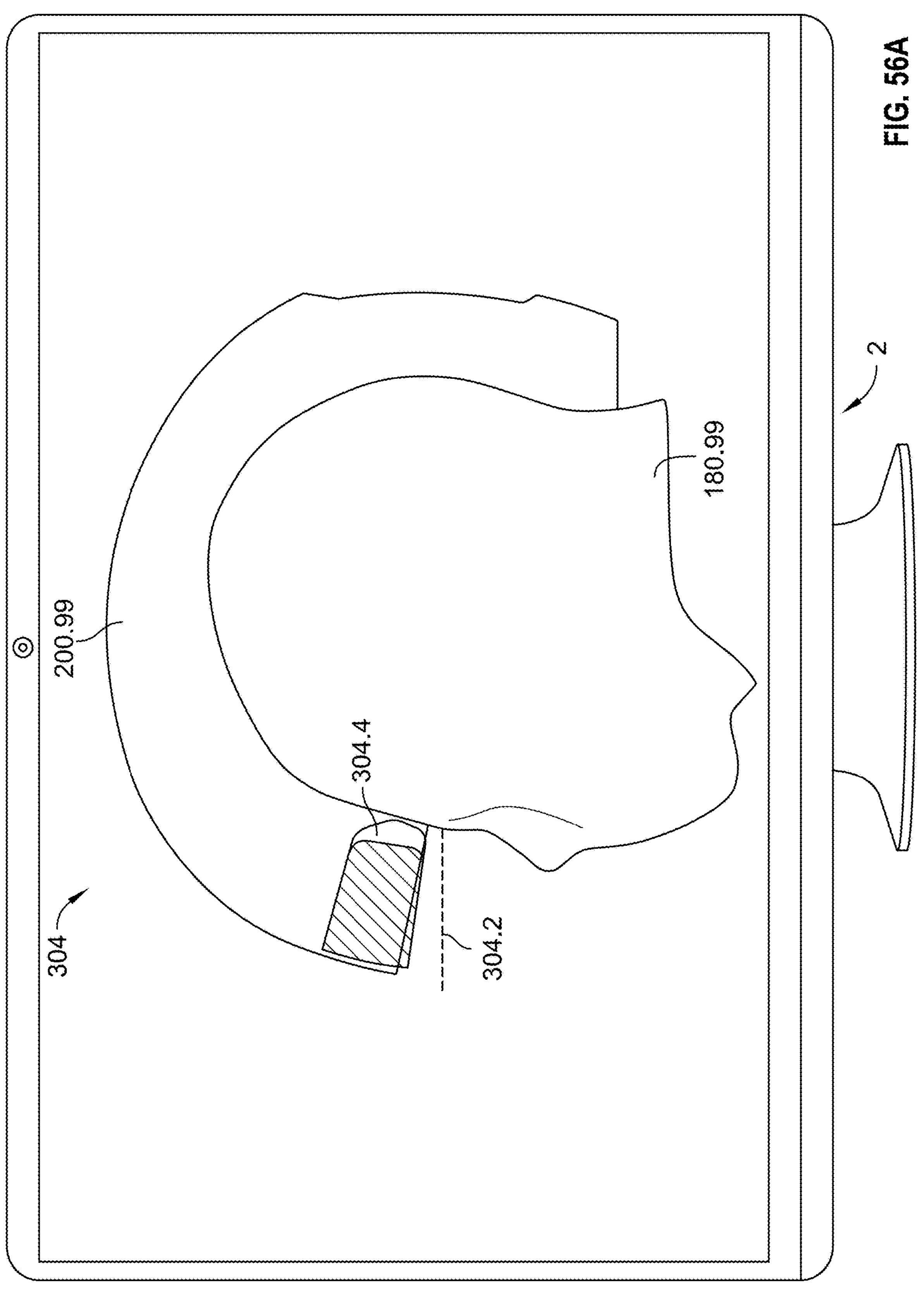
FIG. 56A shows the electronic device displaying a specific player's body model data within the computerized template.
Figure 56B:
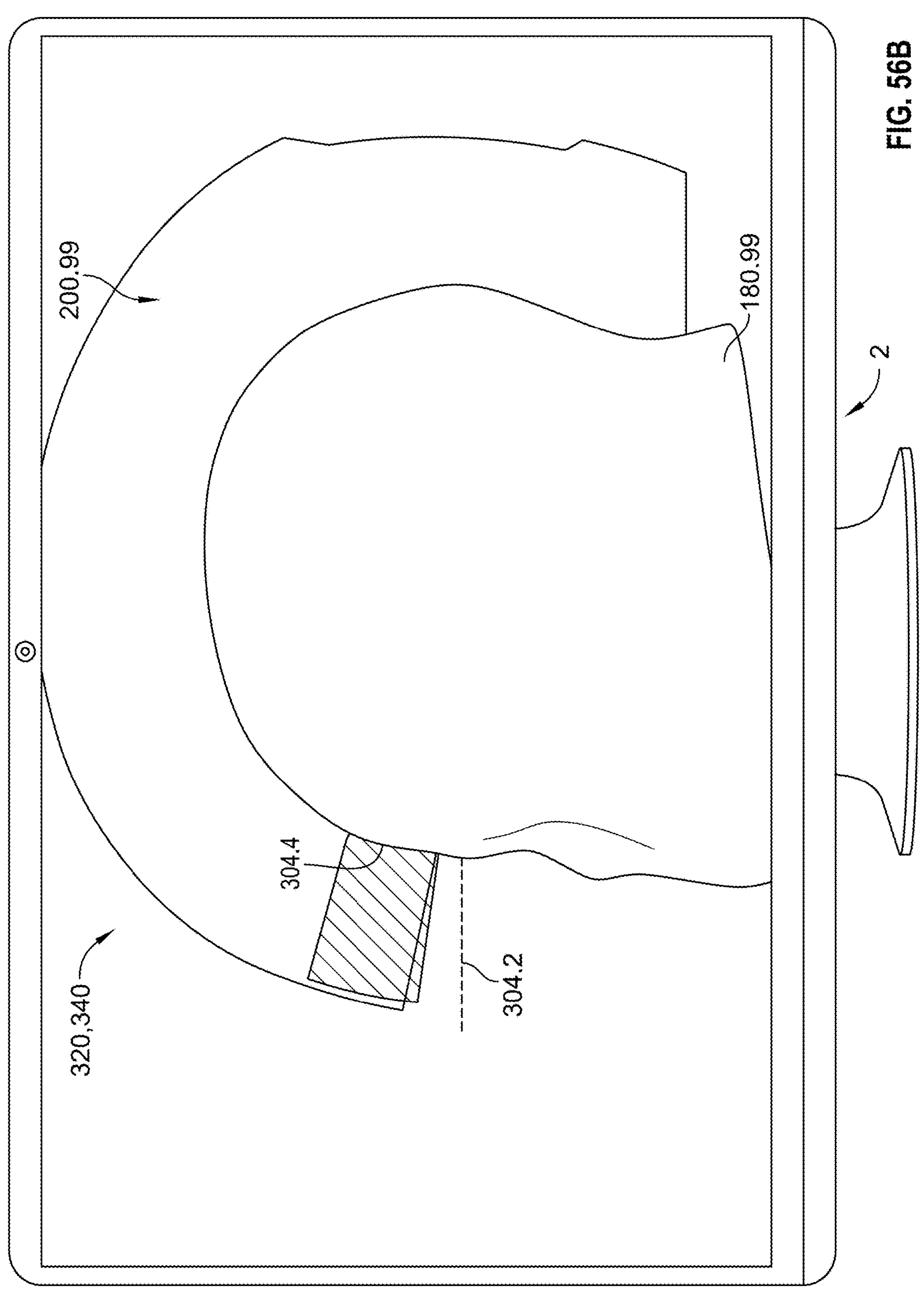
FIG. 56B shows the electronic device displaying the alignment of the specific player's body part model within the computerized template.
Figure 57:
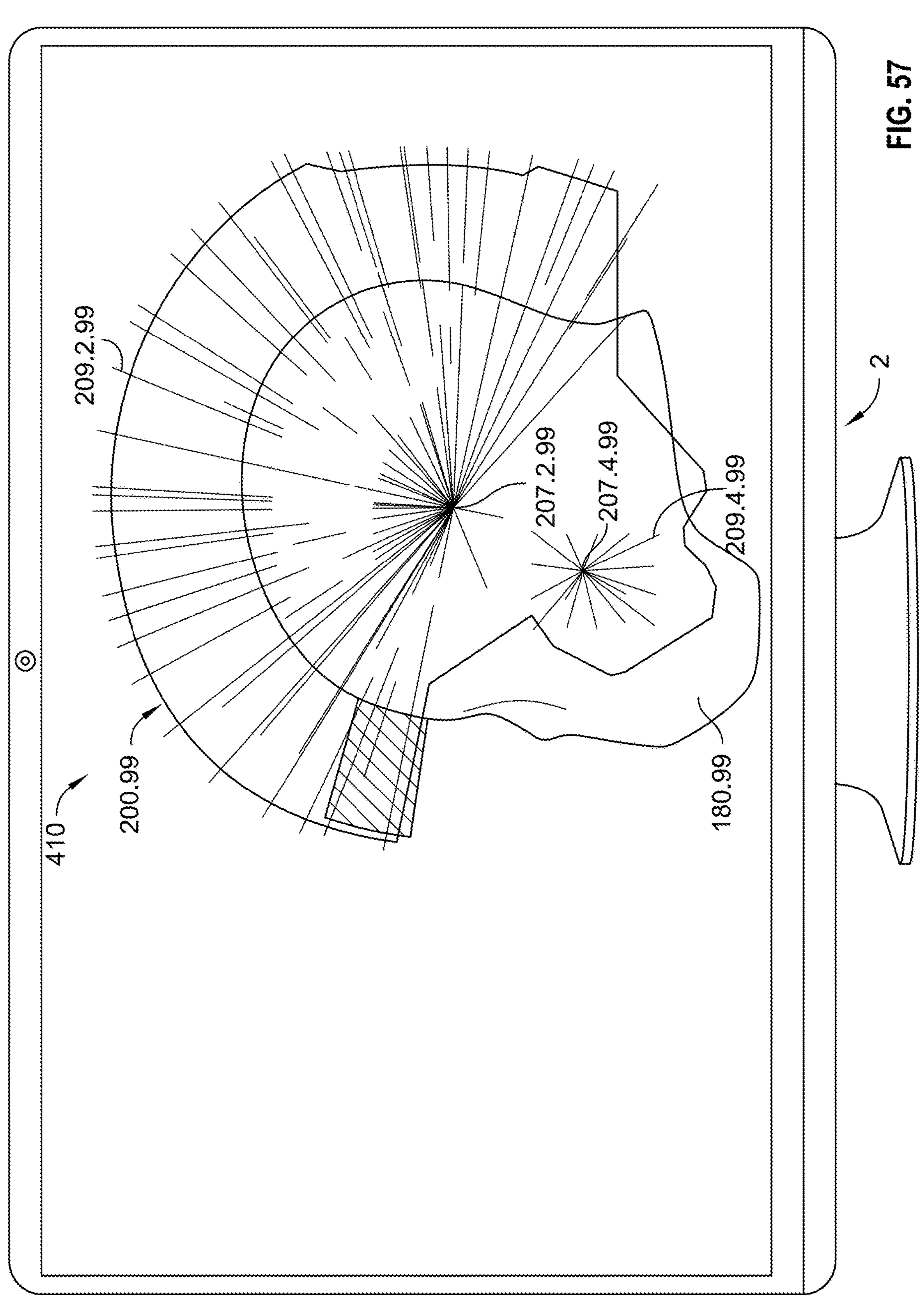
FIG. 57 shows the electronic device displaying the body part model within the computerized template, a first plurality of vectors extending from a first origin point, and a second plurality of vectors extending from a second origin point.

Unlike the methods for selecting pre-manufactured equipment components discussed above, each of the following methods utilize a body part model 180.99 that is: (i) generated in step 180, and (ii) aligned in a computerized template 200.99 in step 300. This may be beneficial in certain situations because it may be more accurate than trying to determine which pre-manufactured equipment components should be suggested for the player without aligning the electronic model of the player's body part in the computerized template 200.99. Like other steps herein, step 300 includes multiple sub-steps shown in FIG. 55. In particular, the body part model 180.99, at least one reference cord 304.2 and at least one reference surface 304.4 are inserted into the computerized template 200.99 in step 304. A graphical display of the body part model 180.99, at least one reference cord 304.2 and at least one reference surface 304.4 is shown in FIG. 56A. Next, in step 320, the body part model 180.99 is aligned with the least one reference cord 304.2 by aligning the player's brow with the cord 304.2. Next, in step 340, the body part model 180.99 is moved forward or rearward in order to align the front extent of the player's brow with the at least one reference surface 304.4. Said reference surface 304.4 may be a digital representation of the inner surface of the front fixed component 4100. A graphical display of step 340 is shown in FIG. 56A-56B. Next, in step 360, the body part model 180.99 is moved transversely aligned, such that the sagittal plane of the body part model 180.99 is aligned with the centerline of the computerized template 200.99. Next, in step 380, the rotational alignment of the body part model 180.99 is checked and altered if necessary. Once steps 304, 320, 340, 360, and 380 are aligned within the computerized template 200.99, the body part model 180.99 can be compared against the computerized template 200.99 to determine the configuration of the variable layer 2000 that will best fit the player P.

In other embodiments, the alignment of the body part model 180.99 and the computerized template 200.99 may be accomplished using different methods. For example, one method of aligning the body part model 180.99 may utilize a rotational-based method to place the anthropometric points 180.60.2. This method is performed by first moving the entire body part model 180.99 to a new location, wherein in this new location one of the anthropometric points 180.60.2 positioned at a zero. Next, two rotations are performed along Z and Y axes so that the left and right tragions lie along the X-axis. Finally, the last rotation is carried out along the X-axis so that the left infraorbital lies on the XY-plane.

An alternative method of aligning the relevant data (e.g., body part model 180.99 and computerized template 200.99) may include aligning anthropometric points 180.60.2 that are positioned on the body part model 180.99 with anthropometric points that are positioned on a generic body part model, which is properly aligned with the template 200.99. The alignment of the anthropometric points may be accomplished using any of the methods that are disclosed above (e.g., expectation-maximization, iterative closest point analysis, iterative closest point variant, Procrustes alignment, manifold alignment, and etc.) or methods that are known in the art. Alternatively, the system 10 may aligning anthropometric points that are positioned on a generic body part model, which are properly aligned with the template 200.99, with anthropometric points 180.60.2 that are positioned on the body part model 180.99.

Another method of aligning the relevant data (e.g., body part model 180.99 and computerized template 200.99) may include determining the a coordinate associated with the body part model 180.99 and aligning said coordinate with a coordinate associated with the template 200.99. Alternatively, the system 10 may determining the a coordinate associated with the template 200.99 and aligning said coordinate with a coordinate associated with the body part model 180.99. It should be understood that one or a combination of the above methods may be utilized to align or register the body part model 180.99 with one another. Further, it should be understood that other alignment techniques that are known to one of skill in the art may also be used in aligning the body part model 180.99 with the computerized template 200.99. Such techniques include the techniques disclosed in all of the papers that are attached to U.S. Provisional Application No. 62/364,629, which are incorporated into the application by reference.

Another method of aligning the relevant data (e.g., body part model 180.99 and computerized template 200.99) includes utilization of an artificial intelligence based learning algorithm. For example, the artificial intelligence program may be trained to identify the proper position of player's head within the computerized template 200.099 from a computerized database of aligned relevant data or from sensors (e.g., positional or pressure based) that are placed in a helmet (e.g., adjacent to an inner surface of the shell, between energy attenuation layers, and/or on the inner surface of the energy attenuation layer that is in contact with the player's head) that best fits the player. Then the trained artificial intelligence program can then align the relevant data. For example, the trained artificial intelligence program can either: (i) align the body part model 180.99 with computerized template 200.99 by moving said model 180.99 within the template 200.99, or (ii) it can align computerized template 200.99 with the body part model 180.99 by moving the template 200.99 around the model 180.99. The designer can then check the alignment using any known tools and provide feedback to the artificial intelligence program re its alignment. This circular process can be continued until the artificial intelligence program can correctly align the relevant data.

Once these alignment methods are utilized, a mathematical, visual and/or manual inspection of the alignment across multiple axes can be performed by a human or computer software. Upon the completion, the next steps of this process can be performed. It should be understood that the steps described within the method of preparing the data 180, may be performed in a different order. For example, the removal of data that is incomplete in steps 180.4, 180.52, and removal of data that is missing other relevant info 180.6, 180.54 may not be performed or may be performed at any time after steps 180.2, 180.50, respectfully.

1. Selection Based Upon Coordinates or Vector Lengths

Figure 58:
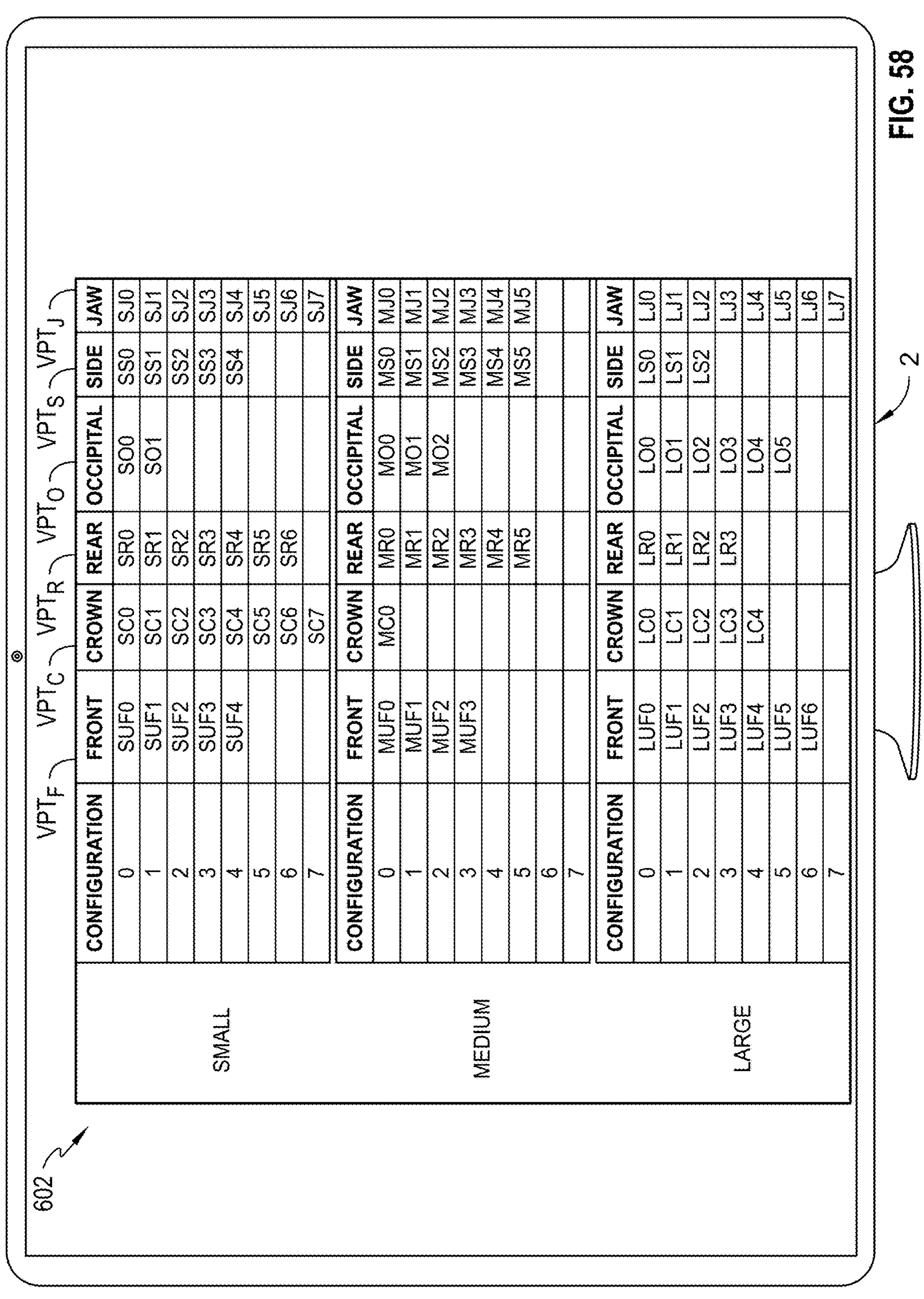
FIG. 58 is a chart showing pre-calculated variable component thicknesses.
Figure 59:
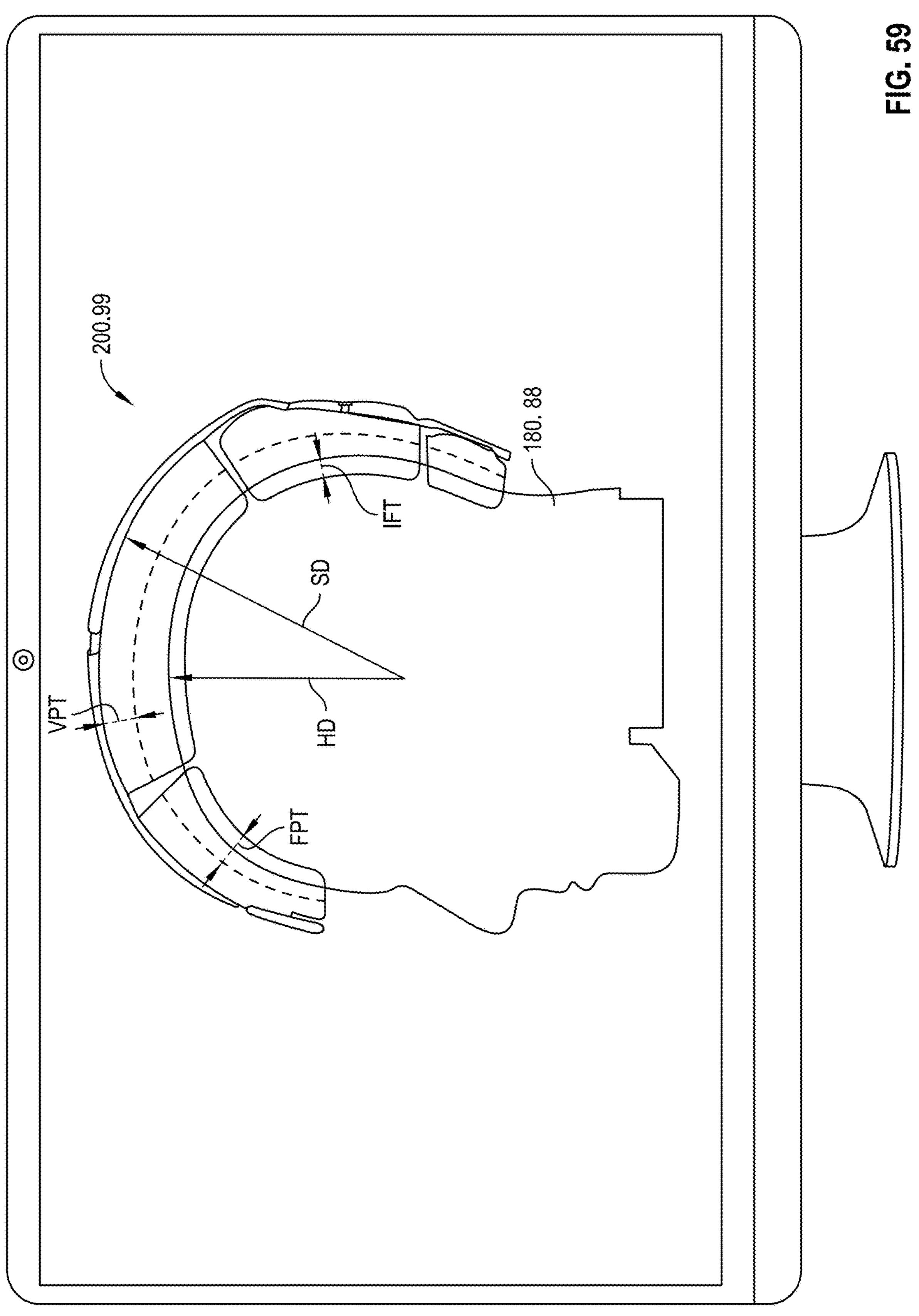
FIG. 59 is a cross sectional view of the specific player's body part model within the computerized template taken along the sagittal plane, and wherein the following measurements are graphically shown in said computerized template: (i) distance from origin to shell (SD), (ii) distance from origin to head (HD), (iii) thickness of the fixed energy attenuation component (FPT), (iv) thickness of the variable energy attenuation component (VPT), and (v) interference fit thickness (IFT)
Figure 60:
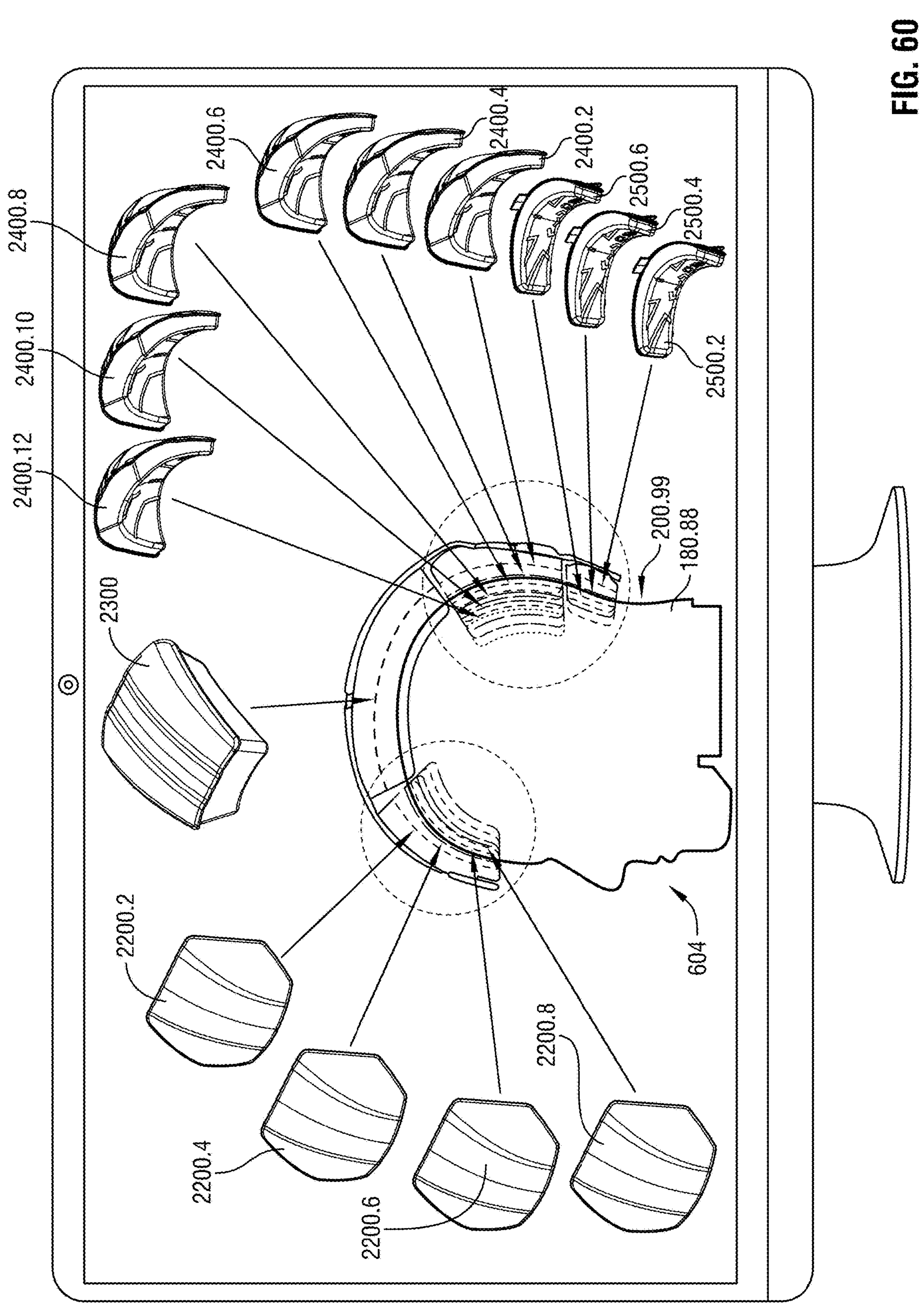
FIG. 60 is a cross sectional view of the specific player's body part model within the computerized template taken along the sagittal plane, and wherein a plurality of components are graphically shown in said computerized template.

After the body part model 180.99 has been imported and aligned within the computerized template 200.99, the pre-manufactured component(s) can be selected based upon coordinate or vector lengths in step 600. While the computerized template 200.99 may have a graphical component (shown in FIGS. 59-61), it should also be understood that the computerized template 200.99 may have a database or workbook 602 that contains pre-calculated data that is not player specific. Instead, said data 602 contained in or associated with the computerized template 200.99 includes generic data that is applicable to all players. This data 602 may include: (i) the distance from origin to shell, (ii) thickness for each fixed energy attenuation component 4100, 4200, 4300, 4400*a, b*, and (iii) thicknesses for each variable energy attenuation component 2200, 2300, 2400, 2500, 2600*a*, 2600*b*. In particular, FIG. 58 shows an exemplary table 602 that includes thicknesses for each variable energy attenuation component 2200, 2300, 2400, 2500, 2600*a*, 2600*b* for small, medium, and large size helmet shells.

As shown in FIGS. 59-62, the aligned body part model 180.99 is positioned in the computerized template 200.99, which includes an array of vectors that extend from at least one origin. Because the distance from origin to shell, thickness of the fixed energy attenuation component, and thicknesses for each variable energy attenuation component 2200, 2300, 2400, 2500, 2600*a*, 2600*b* can be pre-calculated and plugged into the equation shown in FIG. 63, the system 10 the only needs to solve for the interference fit variable in said equation.

| Variables | 1 | 2 | 3 | 4 | 5 | 6 |
|---|---|---|---|---|---|---|
| Distance from origin to shell | SD | | | | | |
| Distance from origin to head | HD | | | | | |
| Thickness of the fixed energy attenuation component | FPT | | | | | |
| Thickness of the variable energy attenuation component | $VPT_{F1}$, $VPT_{C1}$, $VPT_{B1}$, $VPT_{O1}$ | $VPT_{F2}$, $VPT_{B2}$, $VPT_{O2}$ | $VPT_{F3}$, $VPT_{B3}$, $VPT_{O3}$ | $VPT_{F4}$, $VPT_{B4}$ | $VPT_{B5}$ | $VPT_{B6}$ |
| Interference fit thickness | $IFT_{F1}$, $IFT_{C1}$, $IFT_{B1}$, $IFT_{O1}$ | $IFT_{F2}$, $IFT_{B2}$, $IFT_{O2}$ | $IFT_{F3}$, $IFT_{B3}$, $IFT_{O3}$ | $IFT_{F4}$, $IFT_{B4}$ | $IFT_{B5}$ | $IFT_{B6}$ |

As shown in FIGS. 58 and 60-62, the computerized template may include: (i) one crown energy attenuation member 3050 that includes a fixed energy attenuation component 4200 and a variable energy attenuation component 2300, (ii) three occipital energy attenuation members 3010, wherein said members include a fixed energy attenuation component 4300 and three different variable energy attenuation components 2500 (e.g., sizes 1-3), (iii) four font energy attenuation members 3100, wherein said members include a fixed energy attenuation component 4100 and four different variable energy attenuation components 2200 (e.g., sizes 1-4), and (iv) six back energy attenuation members 3012, wherein said members include a fixed energy attenuation component 1302 and six different variable energy attenuation components 2400 (e.g., sizes 1-6). It should be understood that this is only an example, and the energy attenuation assembly may include any number of energy attenuation members (e.g., 1 to 1,000,000,000), wherein the number of fixed energy attenuation components and variable energy attenuation components contained within each energy attenuation member may also be any desirable number (e.g., 1 to 500). Each of the values SD, HD, FPT, VPT, and IFT for each energy attenuation member can then be plugged into the equation disclosed in FIG. 63 in order to calculate the interference fit thickness (IFT) for each energy attenuation member 3012, 3010, 3050, 3100 in step 604. It should be understood that the computerized template may include any number (e.g., typically between 1 and 20) of interference fit thicknesses (IFT) because said helmet may include any number of energy attenuation members.

It should also be understood that the system 10 may not only calculate a single interference fit thickness for each energy attenuation member. Instead, it may also calculate multiple interference fit thickness for a single energy attenuation member. Said calculation of multiple interference fit thickness for a single energy attenuation member typically occurs because multiple vectors, that extend from the origin of the body part model 180.99, may contact a single energy attenuation member. To reduce the number of interference fit thickness for use in the next steps, the system 10 may select/calculate/determine one interference fit thickness that will be directly associated with one energy attenuation member. Moreover, the system 10 will form a 1:1 ratio between energy attenuation members and interference fit thickness. To form this ratio, the system 10 may: (i) select one point contained in each energy attenuation member to utilize for the calculation re said interference fit thickness (IFT), (ii) select multiple points contained in each energy attenuation member to utilize for the calculation re said interference fit thickness (IFT), wherein the design then selection one (e.g., max or min) of the interference fit thicknesses to use in the following steps, or (iii) select multiple points contained in each energy attenuation member to utilize for the calculation re said interference fit thickness (IFT), wherein the design then averages the interference fit thicknesses. It should be understood that this 1:1 ratio simplifies the selection of said energy attenuation member for the player because each energy attenuation member is only associated with a single interference fit thickness.

Figure 61A:
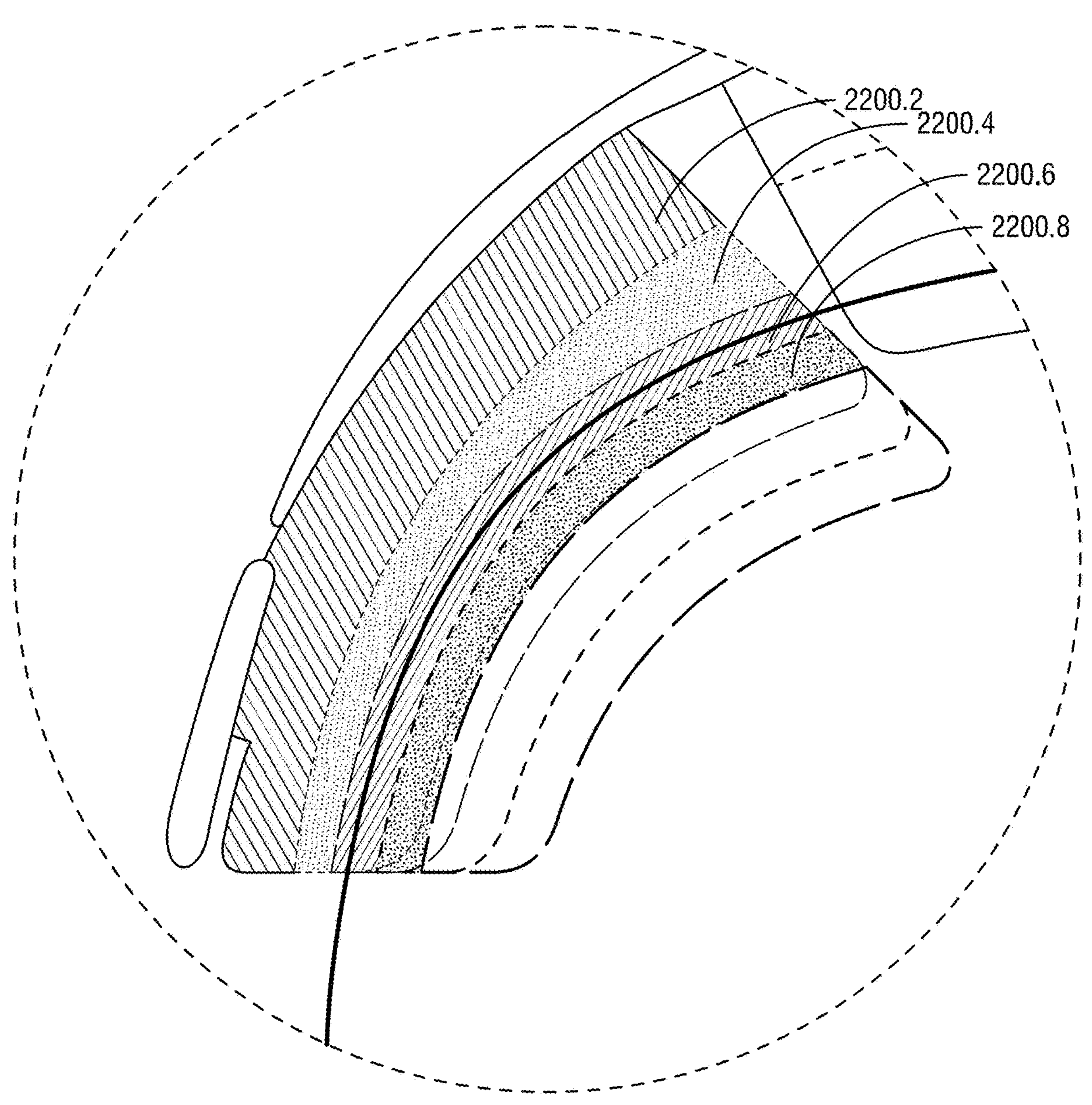
FIG. 61A is a zoomed in view of a frontal portion of the computerized template of FIG. 60, showing a shell and four stacked, distinct frontal energy attenuation members.
Figure 61B:
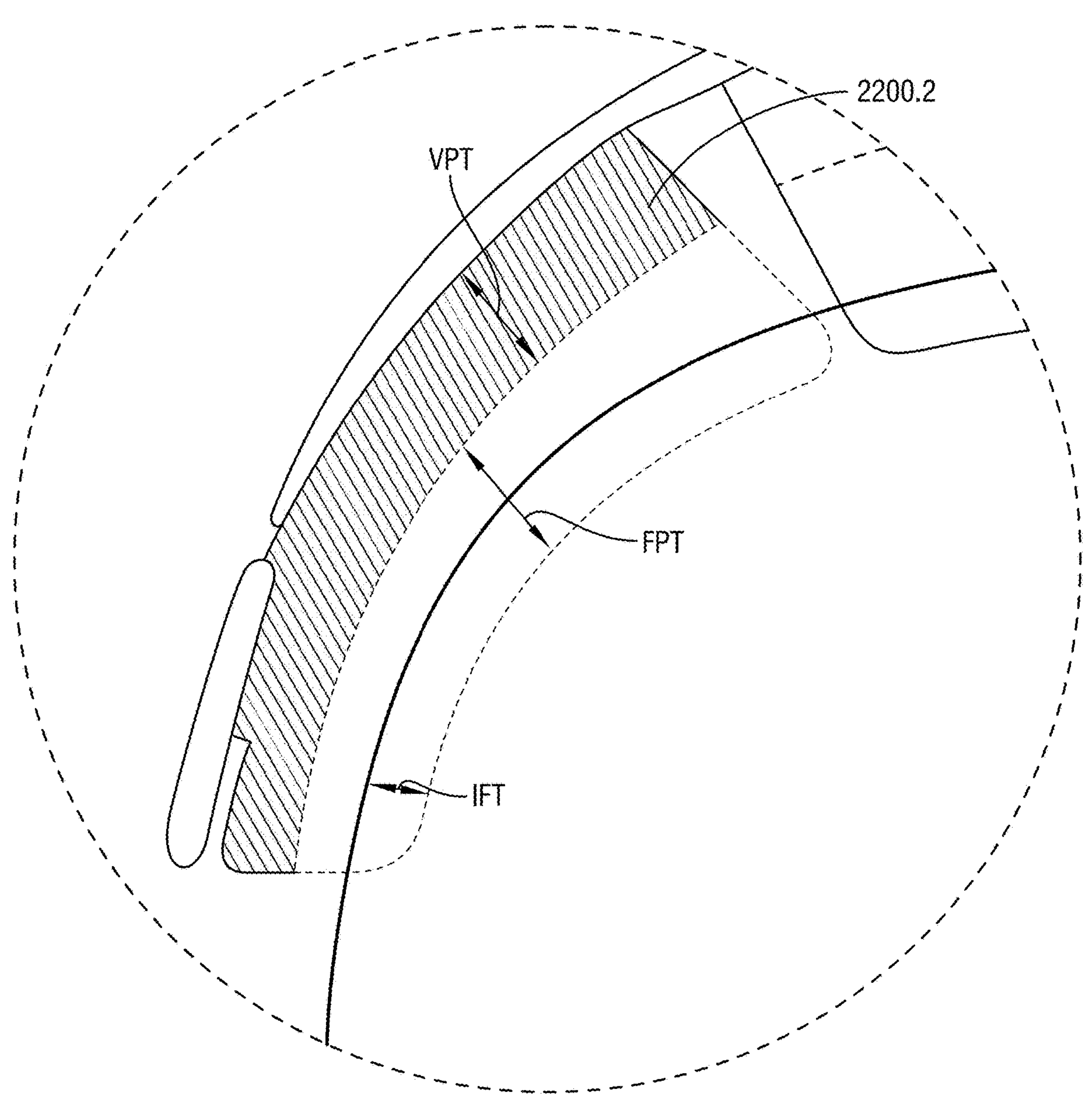
FIG. 61B is a zoomed in view of a frontal portion of the computerized template of FIG. 60, showing a first frontal energy attenuation member and dimensions associated therewith.
Figure 61C:
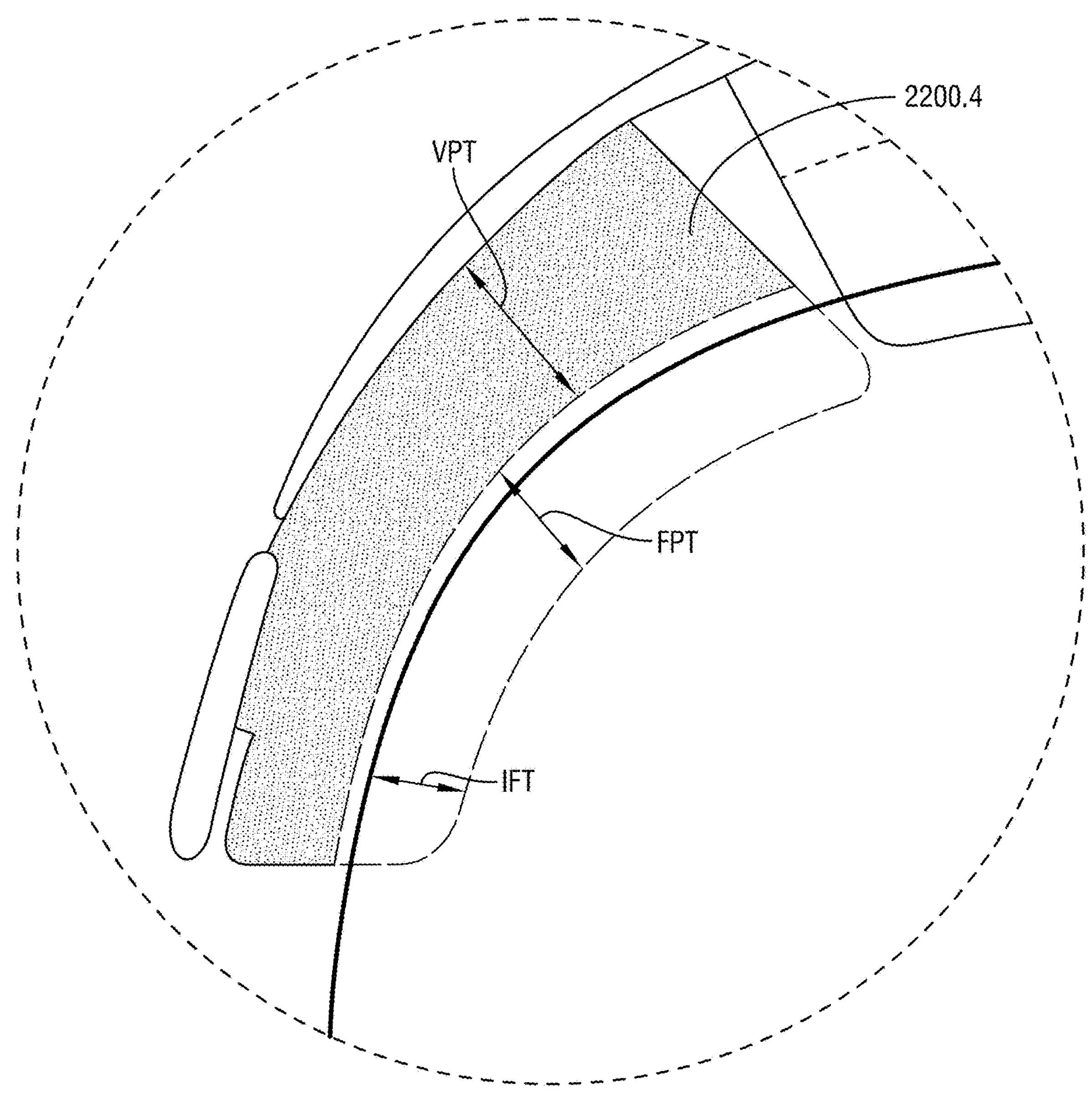
FIG. 61C is a zoomed in view of a frontal portion of the computerized template of FIG. 60, showing a second frontal energy attenuation member and dimensions associated therewith.
Figure 61D:
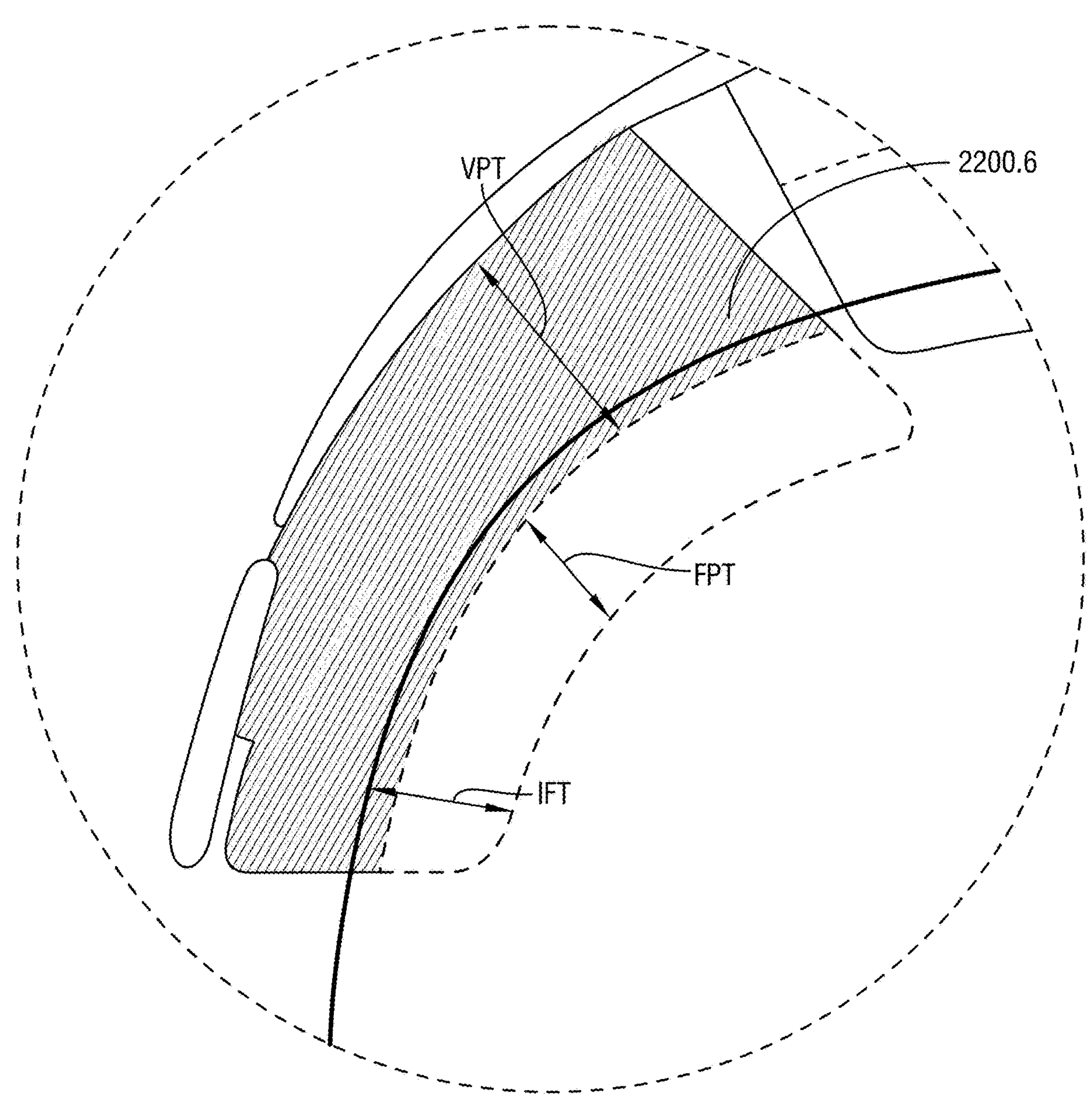
FIG. 61D is a zoomed in view of a frontal portion of the computerized template of FIG. 60, showing a third frontal energy attenuation member and dimensions associated therewith.
Figure 61E:
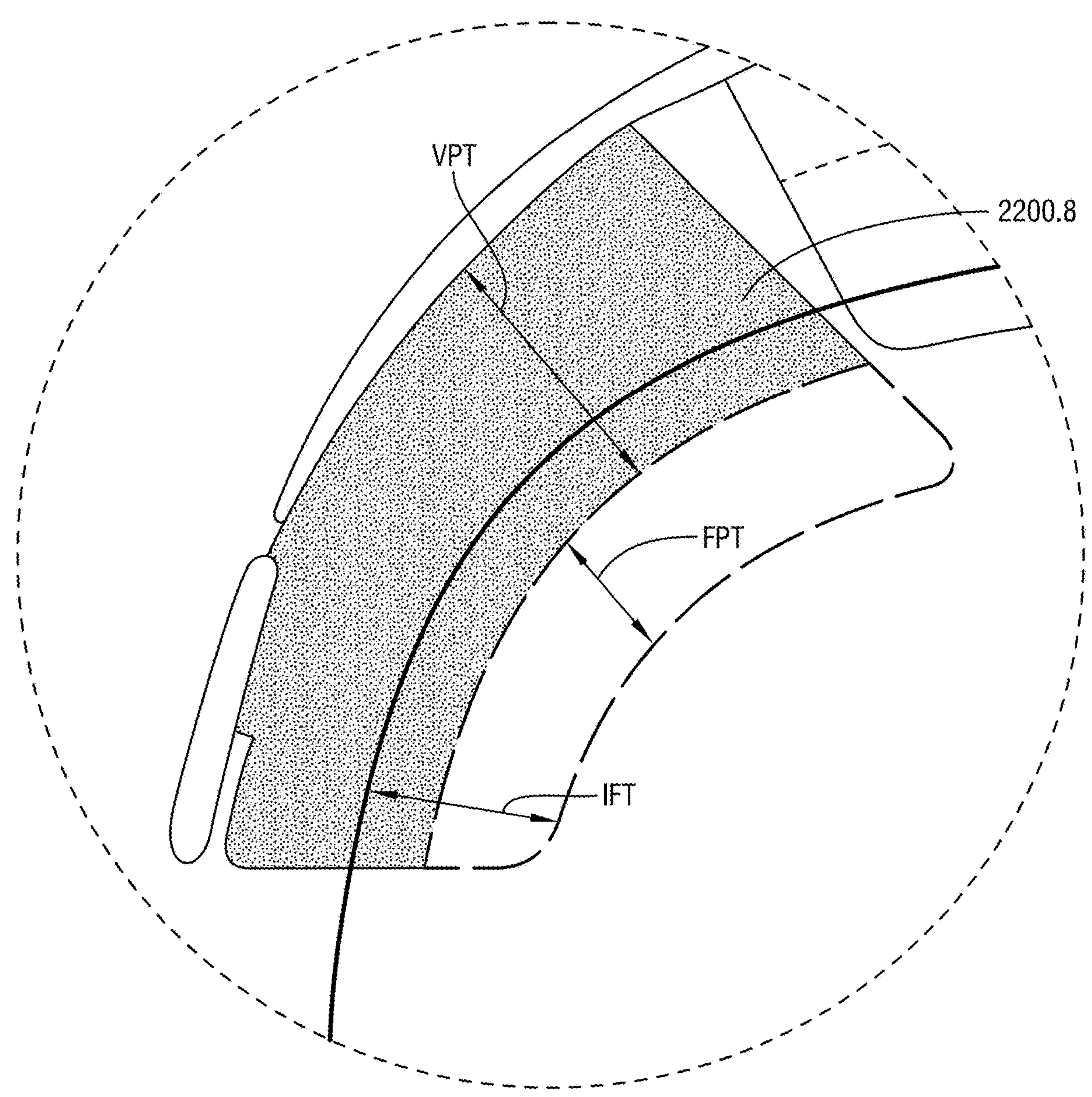
FIG. 61E is a zoomed in view of a frontal portion of the computerized template of FIG. 60, showing the fourth frontal energy attenuation member and dimensions associated therewith.
Figure 61F:
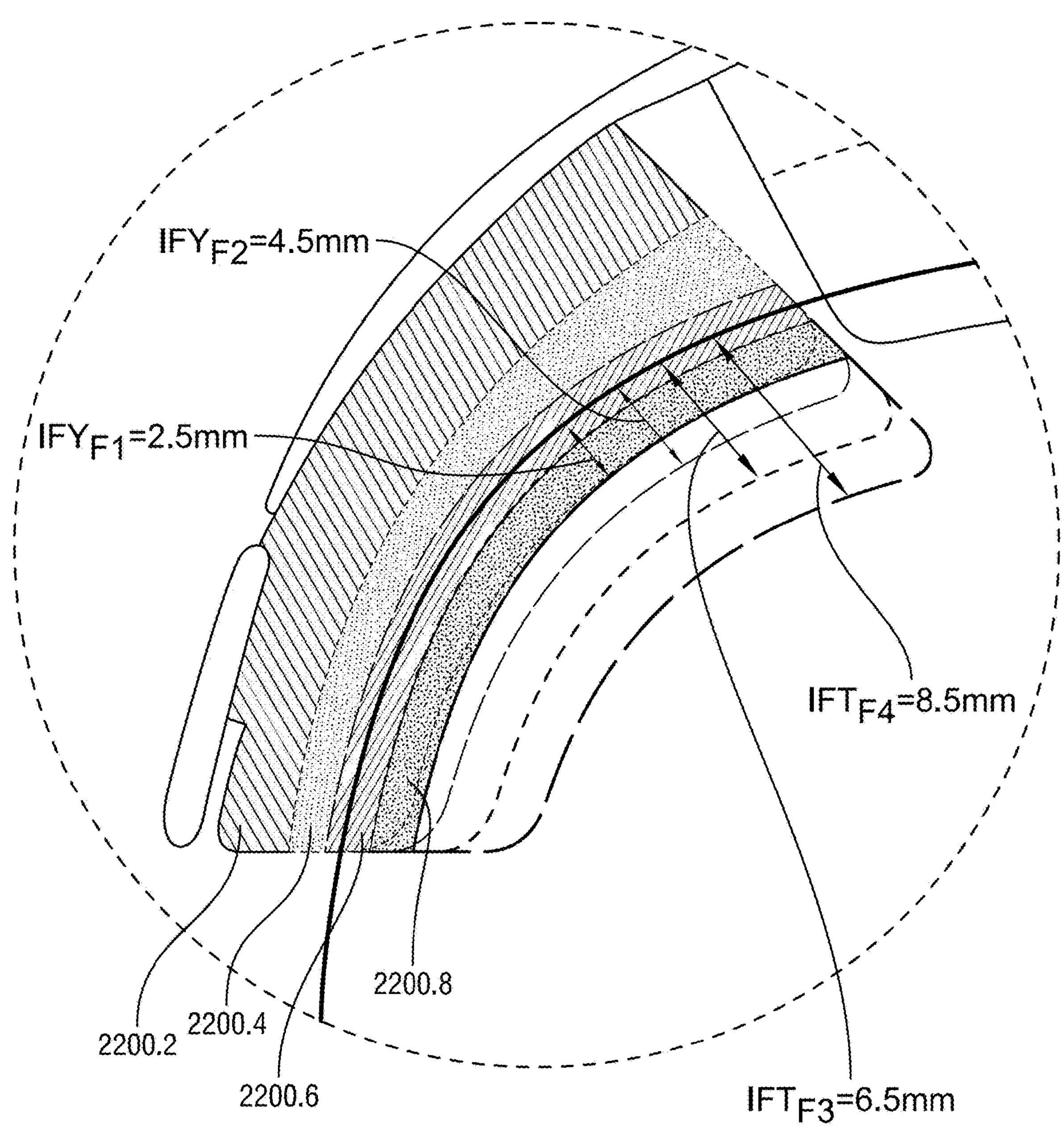
FIG. 61F is a zoomed in view of a frontal portion of the computerized template of FIG. 60, showing the shell, the four stacked frontal energy attenuation members, and interference fit dimensions associated therewith.
Figure 61G:
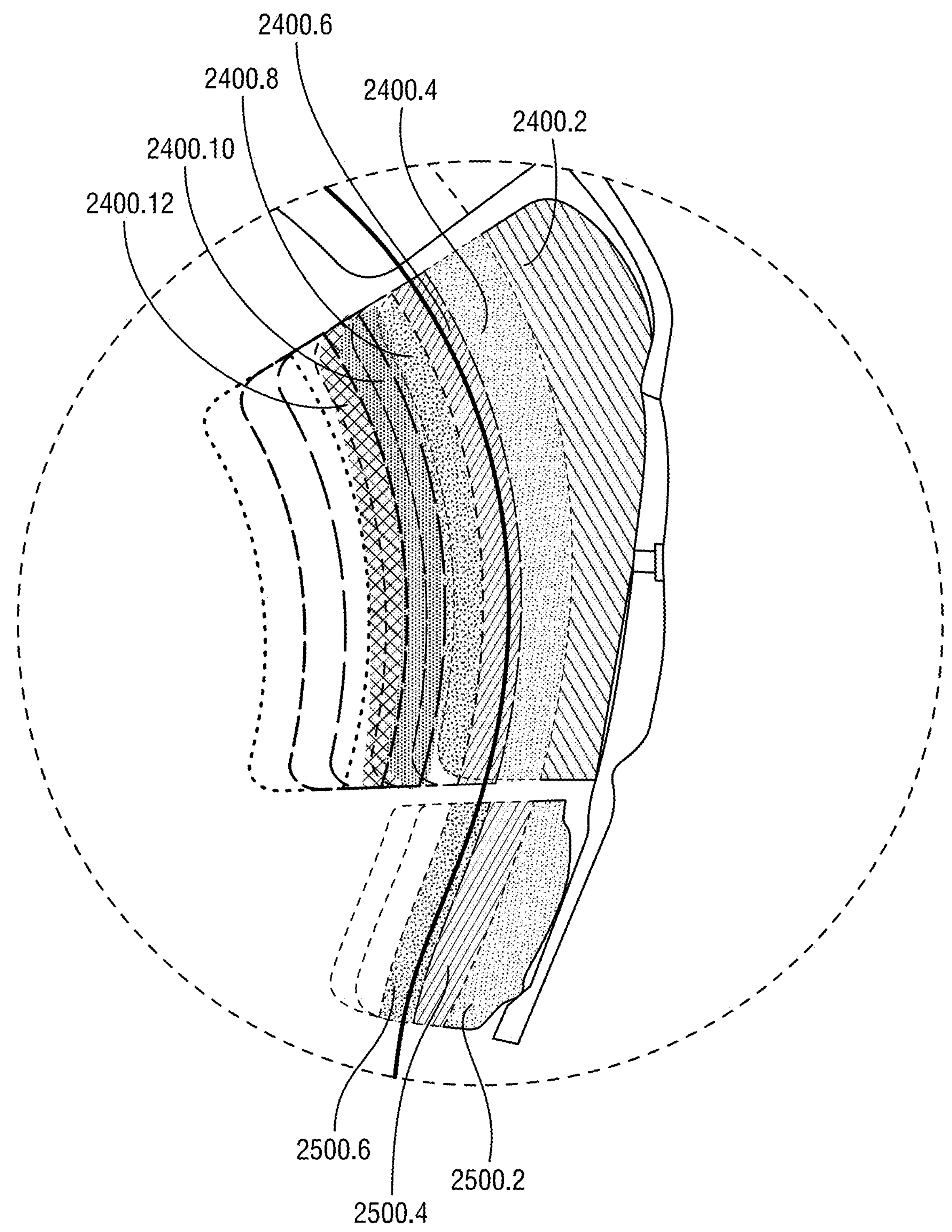
FIG. 61G is a zoomed in view of a rear portion of the computerized template of FIG. 60, showing a shell, six stacked, distinct rear energy attenuation members, and three stacked, distinct occipital energy attenuation members.
Figure 61H:
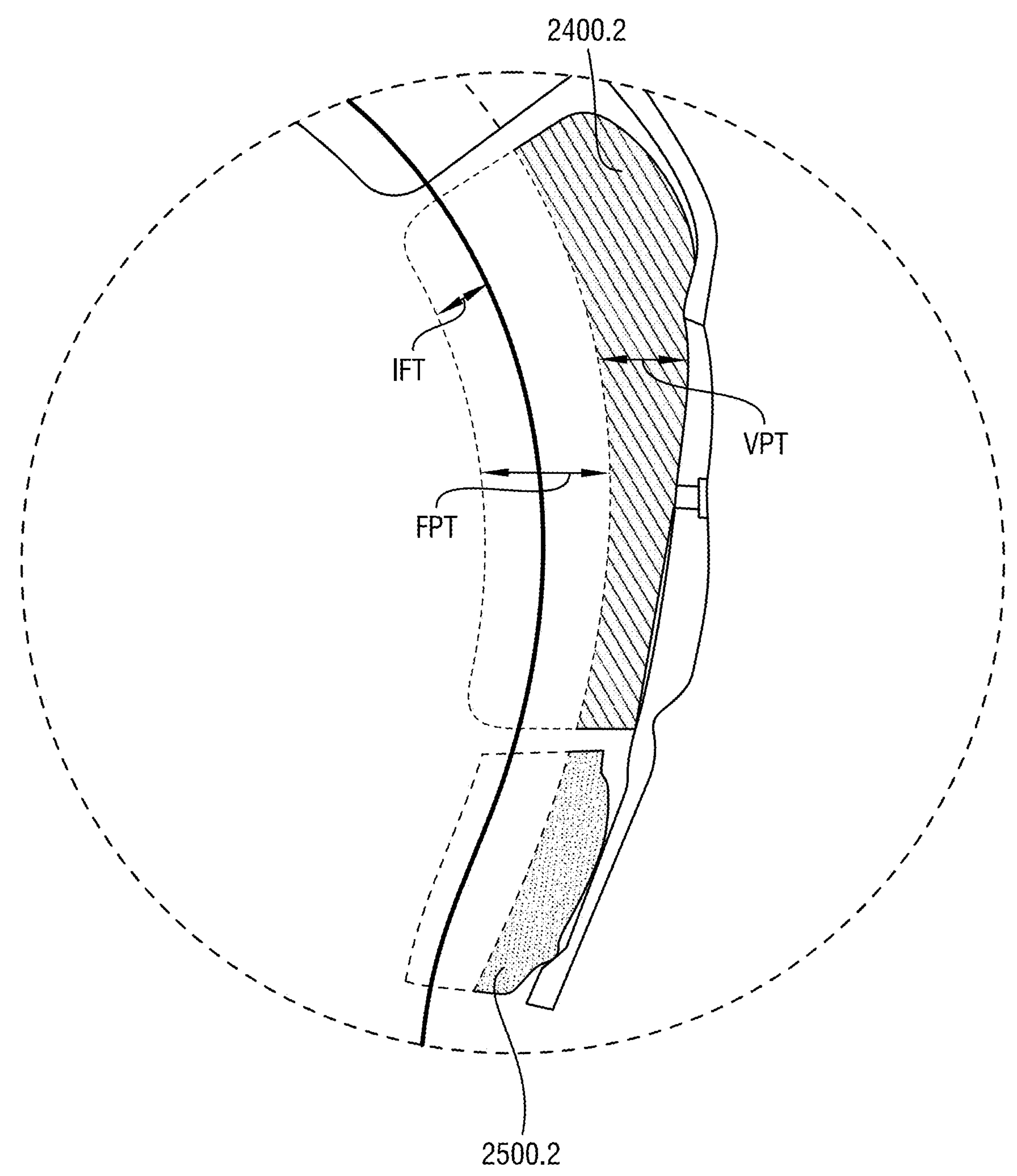
FIG. 61H is a zoomed in view of a rear portion of the computerized template of FIG. 60, showing a first rear energy attenuation member, a first occipital energy attenuation member, and dimensions associated therewith.
Figure 61I:
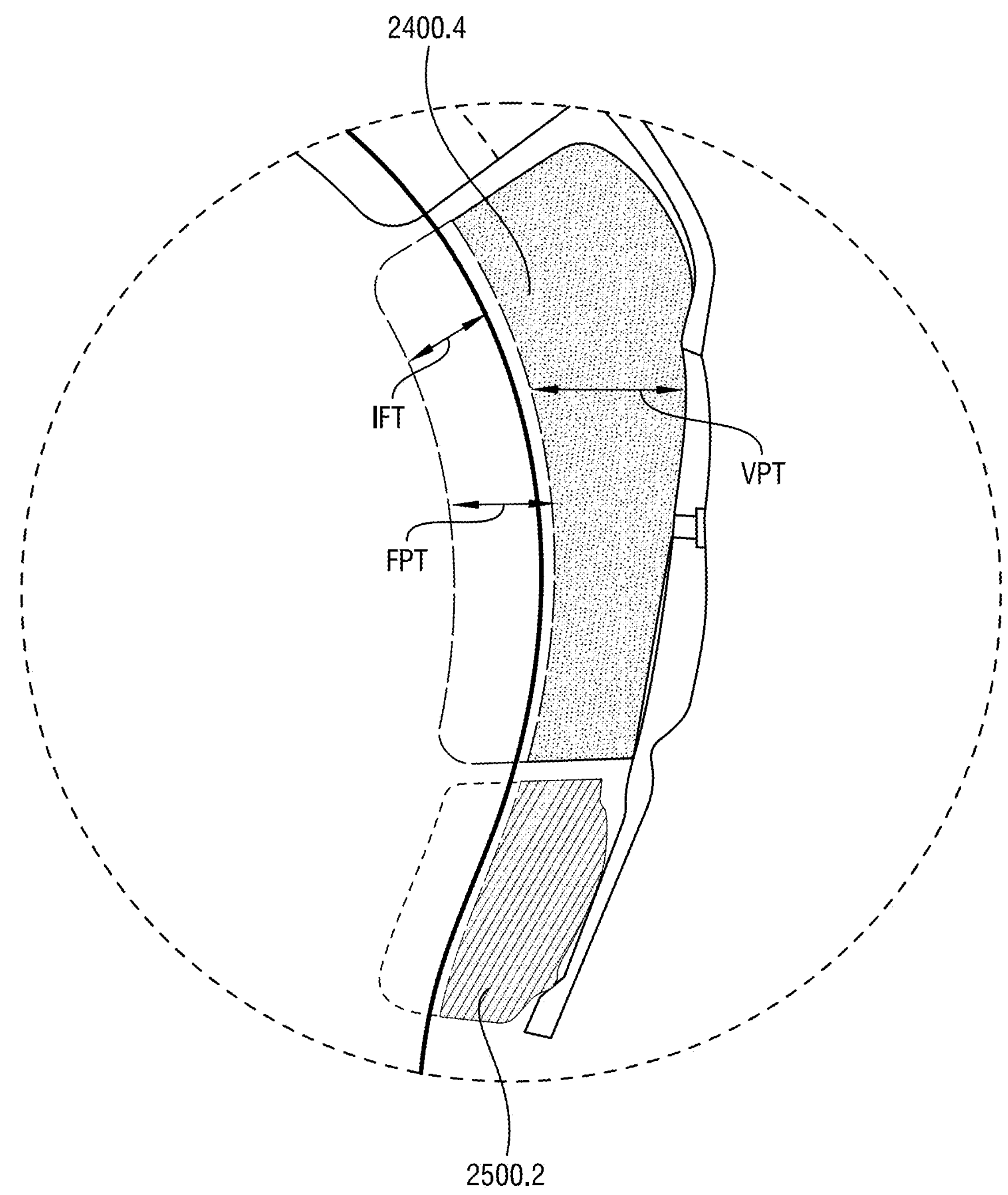
FIG. 61I is a zoomed in view of a rear portion of the computerized template of FIG. 60, showing a second rear energy attenuation member, a second occipital energy attenuation member, and dimensions associated therewith.
Figure 61J:
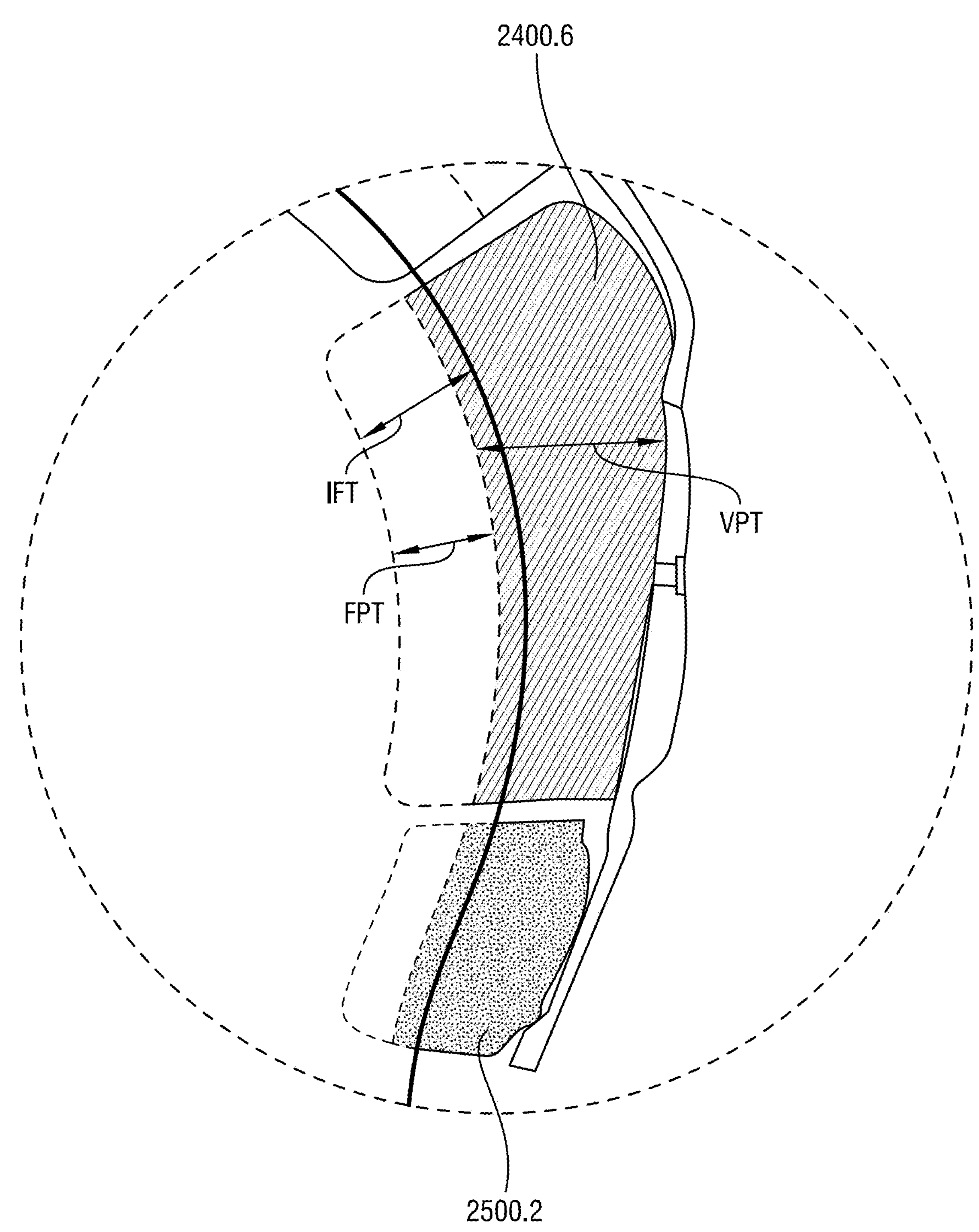
FIG. 61J is a zoomed in view of a rear portion of the computerized template of FIG. 60, showing a third rear energy attenuation member, a third occipital energy attenuation member, and dimensions associated therewith.
Figure 61K:
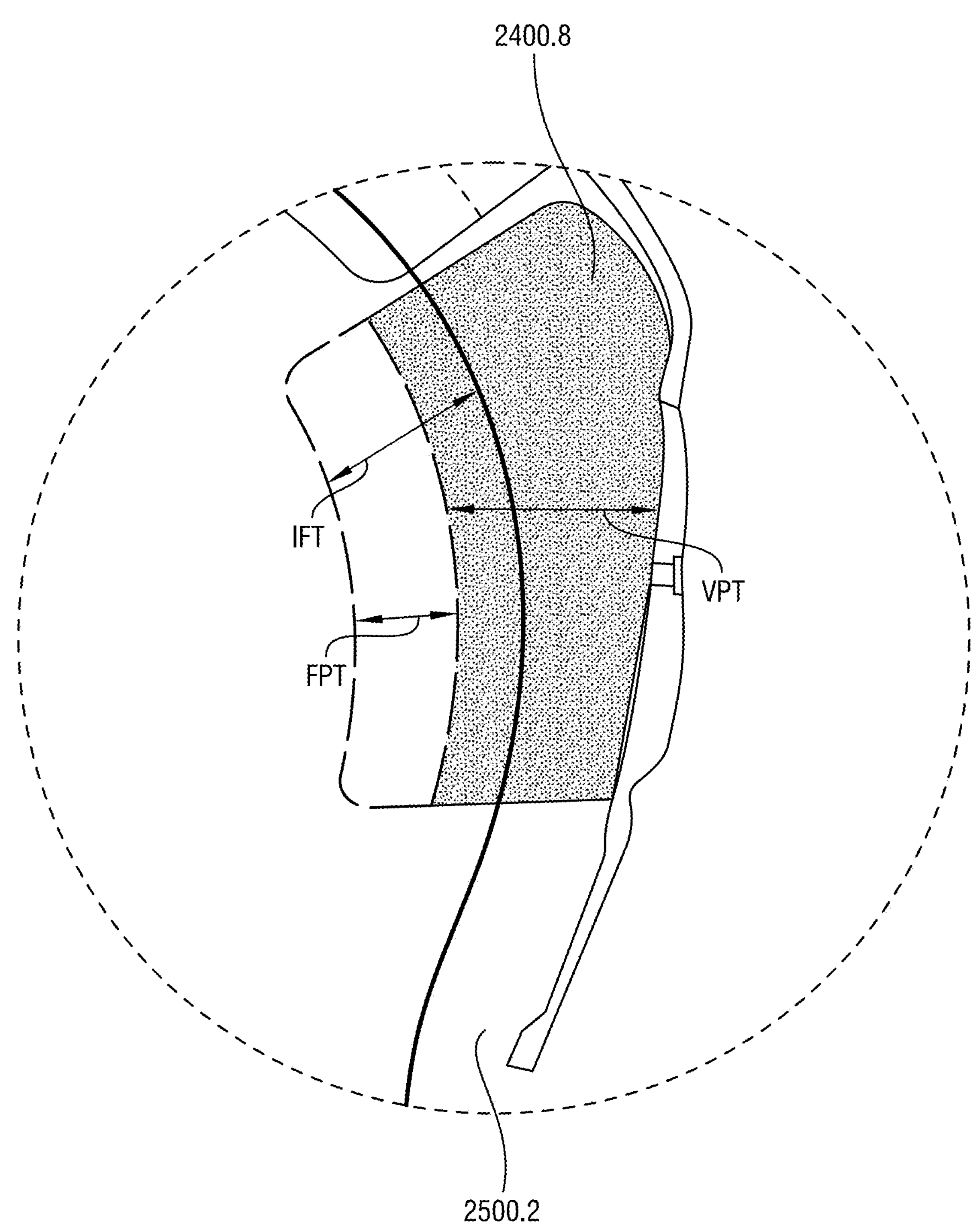
FIG. 61K is a zoomed in view of a rear portion of the computerized template of FIG. 60, showing a fourth rear energy attenuation member, a fourth occipital energy attenuation member, and dimensions associated therewith.
Figure 61L:
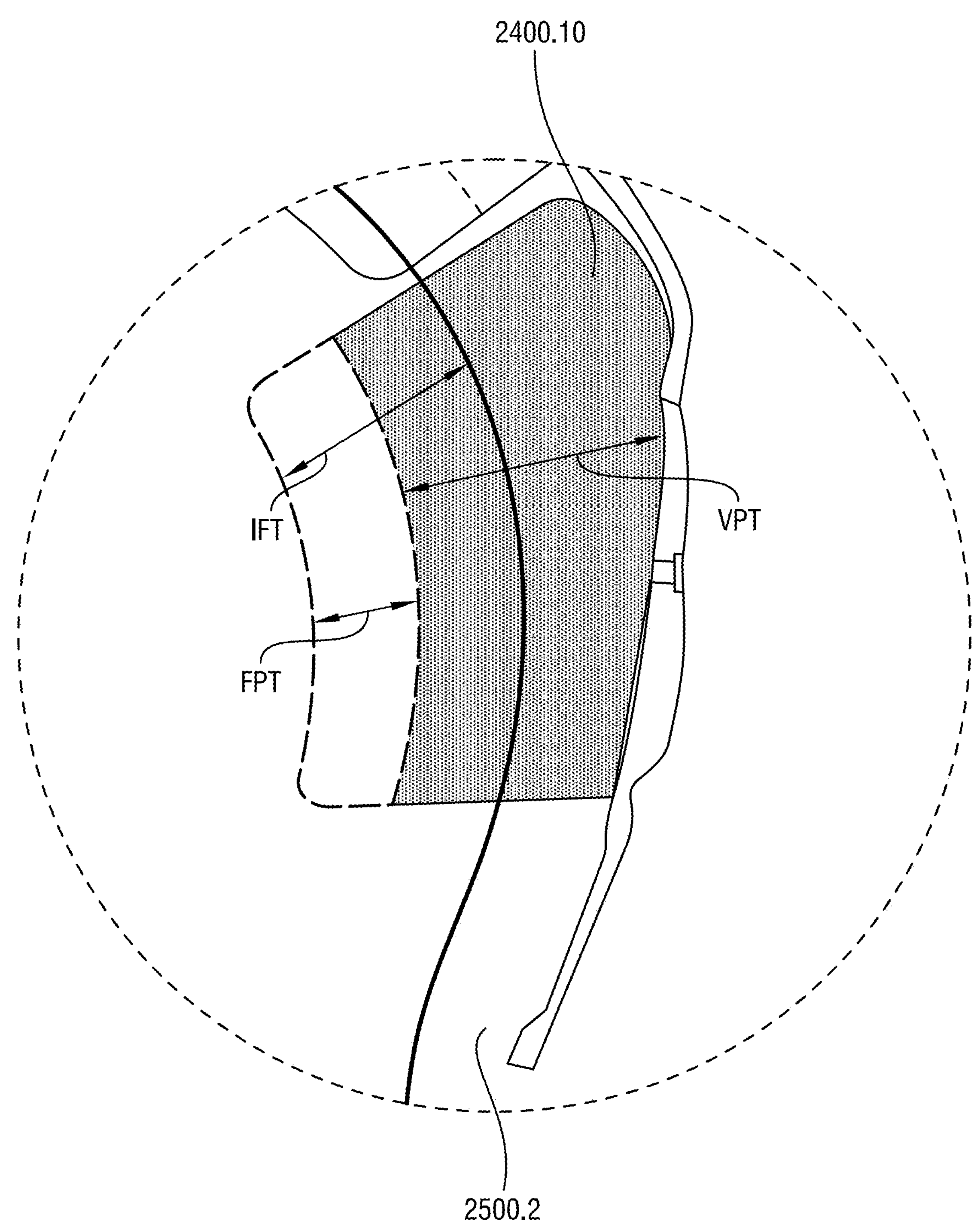
FIG. 61L is a zoomed in view of a rear portion of the computerized template of FIG. 60, showing a fifth rear energy attenuation member, a fifth occipital energy attenuation member, and dimensions associated therewith.
Figure 61M:
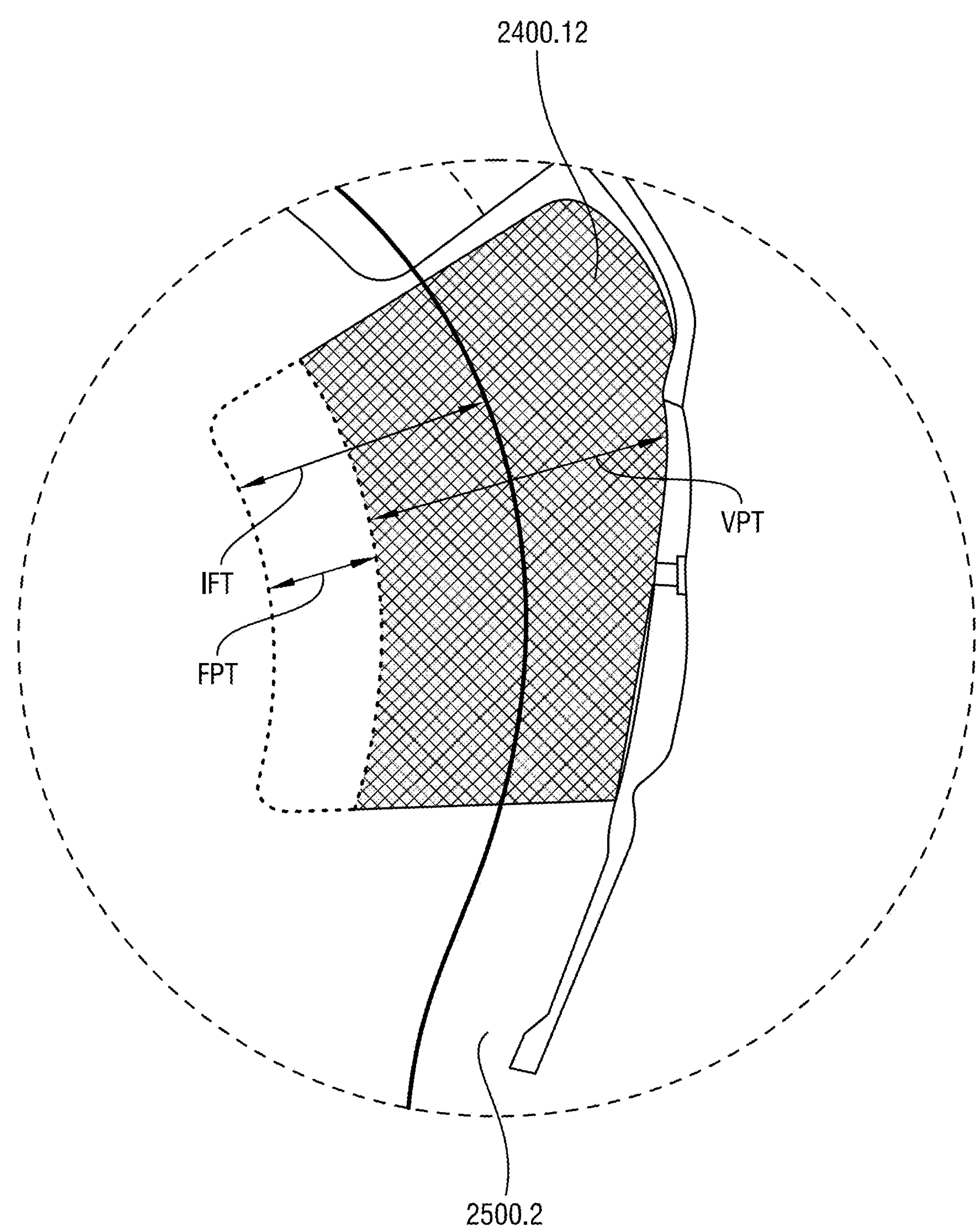
FIG. 61M is a zoomed in view of a rear portion of the computerized template of FIG. 60, showing a sixth rear energy attenuation member, a sixth occipital energy attenuation member, and dimensions associated therewith.
Figure 61N:
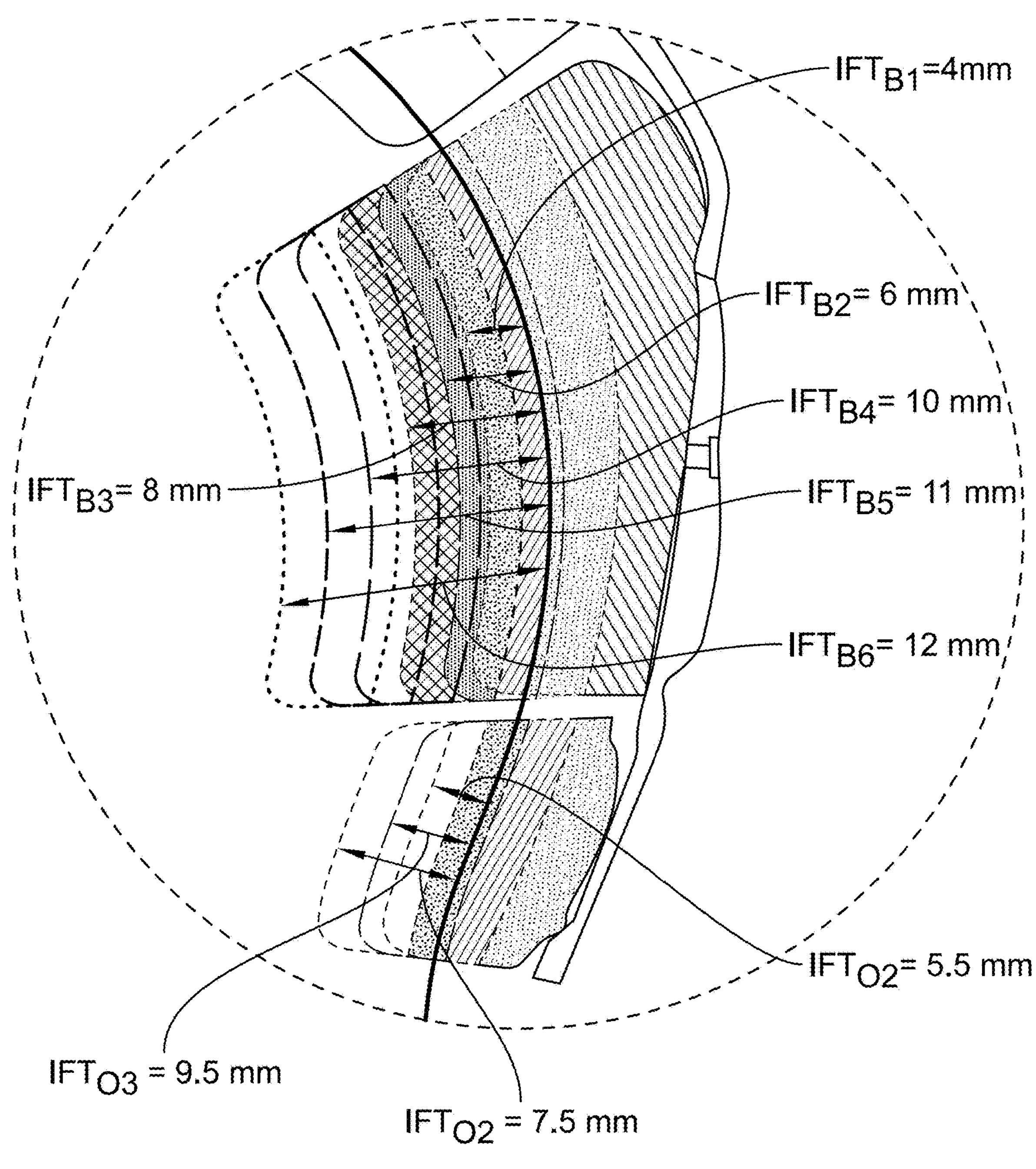
FIG. 61N is a zoomed in view of a rear portion of the computerized template of FIG. 60, showing the shell, the six stacked rear energy attenuation members, three stacked occipital energy attenuation member, and interference fit dimensions associated therewith.

Once the system 10 solves for the interference fit thicknesses (IFT) for each energy attenuation member in step 604, then these values (e.g., between 1 and 6 values, wherein each value is associated with a single energy attenuation member) in step 604. A graphical representation of these relationships and thicknesses are shown in FIGS. 61F and 61N.

| Configuration | Front (mm) | Crown (mm) | Rear/ Back (mm) | Occipital (mm) | Side (mm) | Jaw (mm) |
|---|---|---|---|---|---|---|
| Size 1 | 2.5 | 7 | 4 | 5.5 | 0 | 0 |
| Size 2 (+2 mm from size 1) | 4.5 | | 6 | 7.5 | 2 | 2 |
| Size 3 (+4 mm from size 2) | 6.5 | | 8 | 9.5 | 4 | 4 |
| Size 4 (+6 mm from size 1) | 8.5 | | 10 | | 6 | 6 |
| Size 5 (+7 mm from size 1) | | | 11 | | 7 | 7 |
| Size 6 (+8 mm from size 1) | | | 12 | | 8 | 8 |

Figure 62:
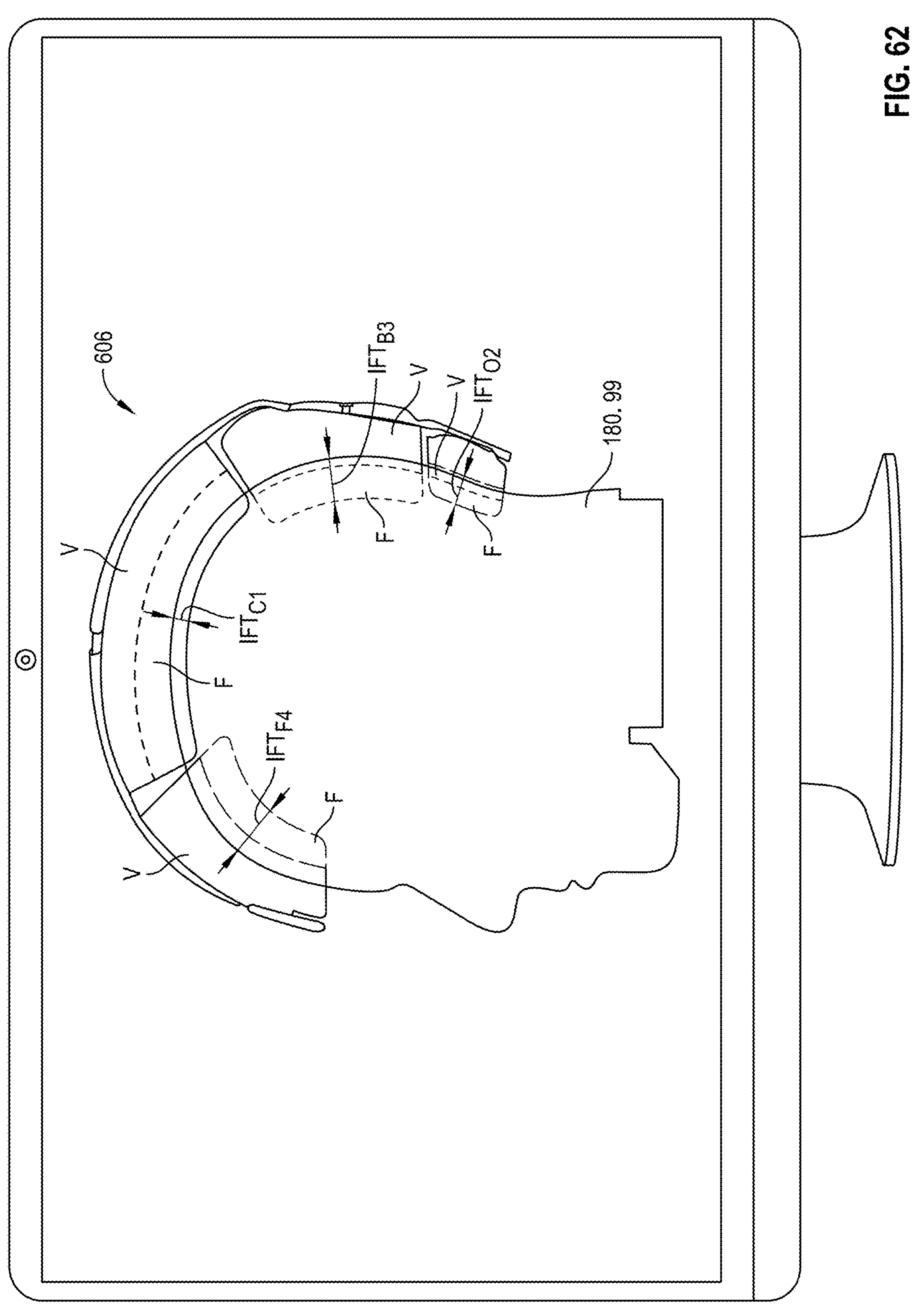
FIG. 62 is a cross sectional view of the specific player's body part model and the components selected for said player, and wherein each of the variable thickness components, fixed thickness components, and interference fit thickness for the specific player are displayed therein.

Once the system 10 solves for the interference fit thicknesses (IFT) for each energy attenuation member in step 604, then these values (e.g., between 1 and 6 values, wherein each value is associated with a single energy attenuation member) are compared against: (i) an ideal value, (ii) a min value, and (iii) max value in step 606. The system 10 will attempt to select the energy attenuation component/member that provides the interference fit thickness (IFT) that is closest to the ideal value, while being greater than the min value and less than the max value. In this embodiment, a predefined hood thickness of 1.5 mm is assumed to be added to the player's head due to the data collection process described above. The addition of this hood thickness, sets the: (i) ideal value for the non-jaw areas to 8 mm (providing 6.5 mm interference fit), the min value to 4.5 mm (providing 3 mm interference fit), and the max value to 11.5 mm (providing 10 mm interference fit), and ideal value for the jaw areas to 6 mm (providing 4.5 mm interference fit), the min value to 3 mm (providing 1.5 mm interference fit), and the max value to 9 mm (providing 7.5 mm interference fit). As described above, the interference fit thickness (IFT) that is closest to the ideal value, is selected for each component to provide a configuration of the variable layer 2000 that best fits the player. As shown in FIG. 62 and in the below table, the system 10 may recommend a medium size shell and the following energy attenuation component configurations contained in the variable layer.

| Configuration | Front (mm) | Crown (mm) | Rear/ Back (mm) | Occipital (mm) | Side (mm) | Front Boss (mm) | Jaw (mm) |
|---|---|---|---|---|---|---|---|
| Size 1 | | X | | | | | |
| Size 2 (+2 mm from size 1) | | | | X | | | |
| Size 3 (+4 mm from size 2) | | | X | | | X | |
| Size 4 (+6 mm from size 1) | X | | | | | | X |
| Size 5 (+7 mm from size 1) | | | | | | | |
| Size 6 (+8 mm from size 1) | | | | | X | | |

It should be understood that the ideal value will not always be achievable for each and every player because pre-manufactured energy attenuation components are being selected for installation in the helmet and said energy attenuation components are not custom manufactured with a custom surface. This being said, the system 10 will do its best to find the closest value. Also, it should be understood the above values may be reduced if a different data collection system was utilized that did not add an offset (i.e., hood) to the player's head or may be increased if the offset is larger or another layer (e.g., skull cap) is included between the fixed layer 4000 and the player's head.

It should be understood that the ideal fit value is chosen based on the configuration of the helmet 5000 in order to ensure that the helmet 5000 will create an between 0.25 psi and 10 psi, preferable between 0.75 psi and 5 psi and most preferable 1 psi and 3 psi. In this embodiment, distances are utilized to determine the pressure that will be applied on the player's head in this state because distances are easier to obtain and check. As such, the disclosed system 10 calculates interference fit thickness (IFT) and compares said interference fit thickness (IFT) to the ideal fit value in order to find the an pre-manufactured energy attenuation component that will be compressed an ideal amount when the helmet 5000 is in the worn, but pre-impact state in order to help ensure that said compressed amount will provide the desired interference fit (i.e., pressure) with the player's head.

Figure 65:
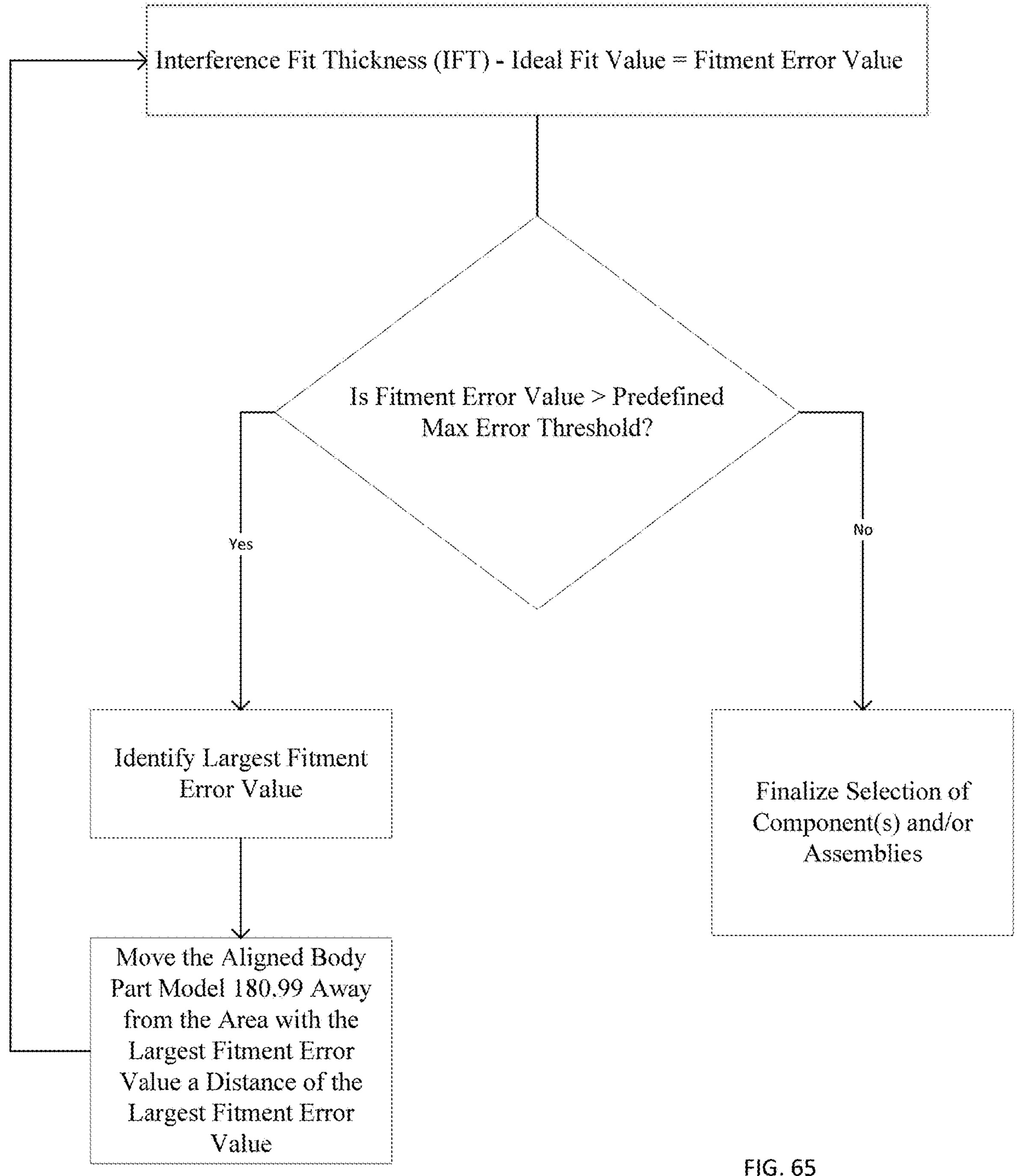
FIG. 65 shows a flow chart showing the repositioning of the body part model within the computerized template based upon the largest fitment error.

Once the components of the variable layer 2000 are selected, obtain the interference fit thickness (IFT) associated with the selected components and subtract the ideal value from said interference fit thickness (IFT) to determine fitment error value. Compare these fitment error value to a predefined under limit (e.g., 1.5 mm) and a predefined over value (e.g., 5 mm) to ensure that the selected components will not apply too much pressure or too little pressure on a player's head, when the helmet is worn. These fitment error values provide additional information about the fit of the helmet for the specific player because the fitment error values may affect how the American football helmet 5000 fits in another region. For example, if the upper front has a high fitment error value, this may push the helmet rearward on the player's head; thereby affecting the rear component. As shown in FIG. 65, the system 10 attempts to minimize the fitment error values helps ensure that the American football helmet 5000 properly fits the player.

It should be understood that the ideal values, max values, min values, predefined under values, and predefined over values are primarily based on the CD of the energy attenuation assembly 3000. As such, if the CD of the energy attenuation assembly 3000 changes, then these values may need to be recalculated based on the CD of this new energy attenuation assembly 3000 to ensure that the proper interference fit is created between the player and the helmet. As such, the ideal value may range from 2 mm to 15 mm, depending on the properties of the components contained within the fixed and variable layers 4000, 2000, in order to form an interference fit with the player's head when the helmet is in the helmet worn, but pre-impact state, wherein this interference fit causes the helmet 5000 to apply between 0.25 psi and 10 psi, preferable between 0.75 psi and 5 psi and most preferable 1 psi and 3 psi on the player's head.

Instead of using the above disclosed equation, an alternative embodiment may use the equation disclosed in FIG. 64, wherein the array of the coordinates are represented by [X], [Y], [Z] and the variables of this equation are as follows:

O=Origin (207.2.99, 207.4.99)

FI=point on the inner surface of the fixed energy attenuation component/member

H=Head

FO=point on the outer surface of the fixed energy attenuation component/member≈VI VI=point on the inner surface of the variable energy attenuation component/member≈FO VO=point on the outer surface of variable energy attenuation component/member≈S S=point on the inner surface of the shell≈VO In a first method, the designer may solve for the point on the inner surface of the variable energy attenuation component (VI), then this value is compared against: (i) an ideal point on the inner surface of the variable energy attenuation component, (ii) a min point on the inner surface of the variable energy attenuation component, and (iii) max point on the inner surface of the variable energy attenuation component. The system 10 will attempt to select the energy attenuation component/member that provides the point on the inner surface of the variable energy attenuation component (VI) that is closest to the ideal point on the inner surface of the variable energy attenuation component, while being greater than the min point on the inner surface of the variable energy attenuation component and less than the max point on the inner surface of the variable energy attenuation component. Alternatively, a second method, the designer may solve for the point on the inner surface of the fixed energy attenuation component (FI), then this value is compared against: (i) an ideal point on the inner surface of the fixed energy attenuation component, (ii) a min point on the inner surface of the fixed energy attenuation component, and (iii) max point on the inner surface of the fixed energy attenuation component. The system 10 will attempt to select the energy attenuation component that provides the point on the inner surface of the fixed energy attenuation component (FI) that is closest to the ideal point on the inner surface of the fixed energy attenuation component, while being greater than the min point on the inner surface of the fixed energy attenuation component and less than the max point on the inner surface of the fixed energy attenuation component. Alternative methods may use this equation to solve for different distances between points and said distances can be compared to ideal distances, min distances, and max distances.

As discussed in greater detail above, the selection of the pre-manufactured component can then be utilized in connection with other systems or methods disclosed herein to select other pre-manufactured components, assemblies, or products. In particular, said direct selection of the pre-manufactured component can be utilized to: (i) directly select other components, assemblies, or products—namely, the first energy attenuation component can be directly associated with a helmet shell, (ii) indirectly select other component based on algorithms or methodologies that utilize neural networks, artificial intelligence, machine learning, linear regression analysis, combinations of the same, and/or any know method of selecting a component, assembly, or product based on the selection of a first component, (iii) indirectly select other component based player information 109.2.99 (e.g., player level, position, or age), and/or player impact data 109.4.99. It should be understood that this method only directly selects the first pre-manufactured component based upon information derived (e.g., distance between two points, area, or volume) from the body part model 180.99. Moreover, this method does not selection said the pre-manufactured component based solely on data contained in the body part model 180.99.

2. Selection Based Upon Curvilinear Distances

After the body part model 180.99 has been imported and aligned within the computerized template 200.99, the pre-manufactured component(s) can be selected based upon curvilinear distances in step 620. In this embodiment, the computerized template 200.99 includes an array of non-parallel vectors that extend from at least one origin and through the aligned body part model 180.99. At least one of the non-parallel vectors may be positioned along a reference section (e.g., midsagittal plane, coronal plane, parasagittal plane/s, coronal). The computer program will then determine the where the non-parallel vectors intersect: (i) the inner surfaces of the components (e.g., shell, fixed layer, and/or variable layer), (ii) the aligned body part model 180.99. Then the system may calculate: (i) the helmet component curved line length(s) that extends between the intersection points of the inner surfaces of the components (e.g., shell, fixed layer, and/or variable layer), (ii) the body part curved line length that extends between the intersection points of the aligned body part model 180.99. Then the system can compare the helmet component curved line lengths against the body part curved line length to select the helmet component curved line length that provides the desired pre-compression for the specific area of the equipment. Once the helmet component curved line length has been selected, then the equipment component associated with said helmet component curved line length can be obtained and then the equipment can be assembled according to the below steps.

Figure 66:
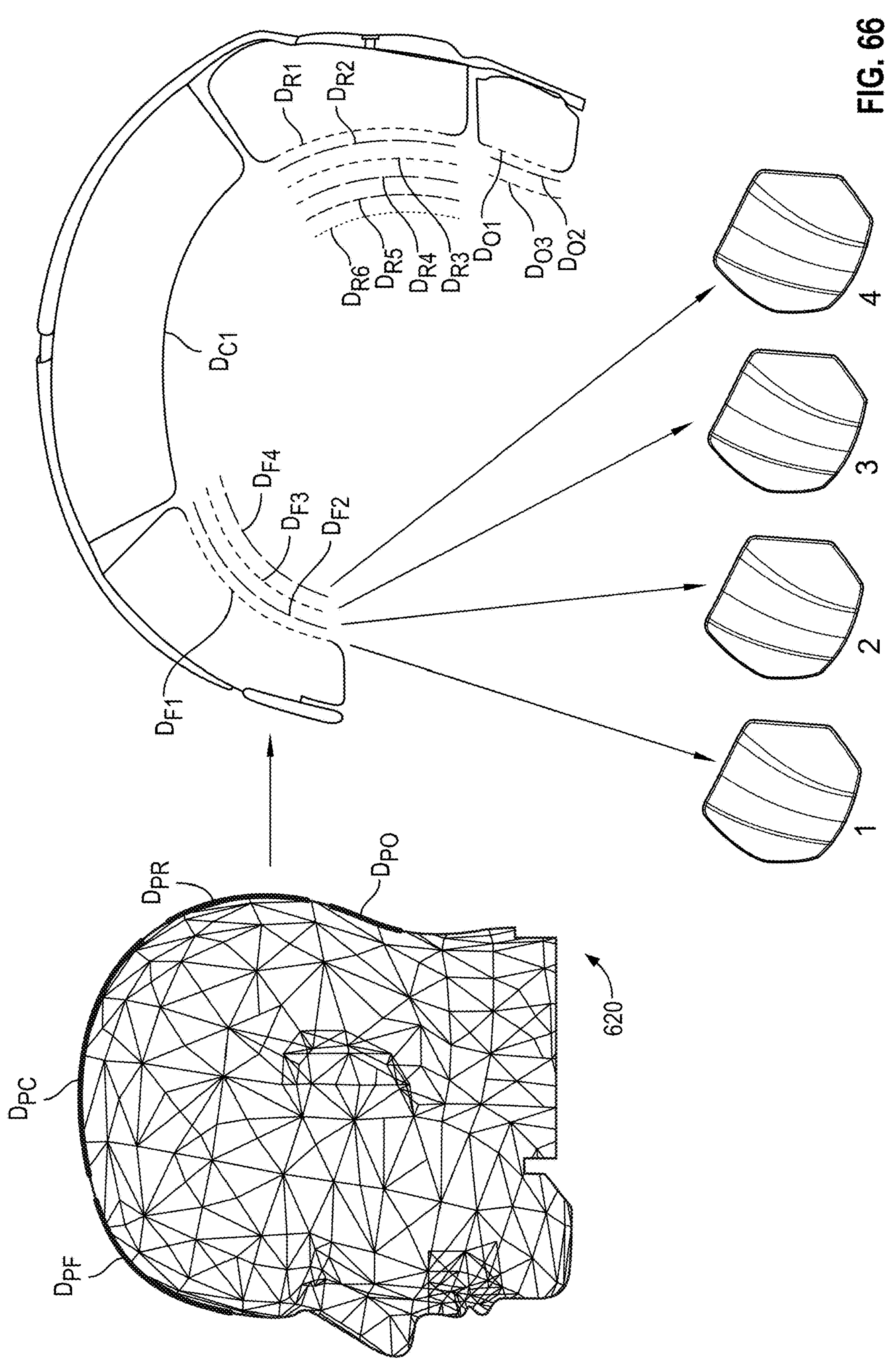
FIG. 66 is a graphical flow chart showing a selection of a component from a plurality of components using the body part model selection methodology, and wherein said body part model selection methodology compares curvilinear distances.

As shown in FIG. 66, the curvilinear player distances (e.g., $D_{PF}$, $D_{PC}$, $D_{PR}$, $D_{PO}$) are measured in the sagittal plane. In step 622, these distances are then compared against a plurality of curvilinear component distances contained in the computerized template (e.g., front ($D_{F1}$, $D_{F2}$, $D_{F3}$, $D_{F4}$), crown ($D_{C1}$), rear ($D_{R1}$, $D_{R2}$, $D_{R3}$, $D_{R4}$, $D_{R5}$, $D_{R6}$), and occipital ($D_{O1}$, $D_{O2}$, $D^{O3}$)). The curvilinear component distance that is selected from the plurality of curvilinear component distances for a specific energy attenuation member (e.g., the fixed layer component and variable layer component are combined into a single member) may be the closest distance to a modified curvilinear player distance, wherein said modified curvilinear player distance is equal to the curvilinear player distance reduced by a pre-determined value (e.g., 15%). Said reduction in the curvilinear player distance is designed to help ensure that the energy attenuation member is pre-compressed when the player wears the protective sports equipment (e.g., helmet). However, if a pre-compression of the energy attenuation member is not desirable, then the curvilinear component distance that is selected from the plurality of curvilinear component distances for a specific energy attenuation member may be the closest distance to the curvilinear player distance.

As discussed in greater detail above, the selection of the pre-manufactured component can then be utilized in connection with other systems or methods disclosed herein to select other pre-manufactured components, assemblies, or products. In particular, said direct selection of the pre-manufactured component can be utilized to: (i) directly select other components, assemblies, or products—namely, the first energy attenuation component can be directly associated with a helmet shell (steps 606.2, 622.2), (ii) indirectly select other component based on algorithms or methodologies that utilize neural networks, artificial intelligence, machine learning, linear regression analysis, combinations of the same, and/or any know method of selecting a component, assembly, or product based on the selection of a first component (steps 606.4, 622.4), (iii) indirectly select other component based player information 109.2.99 (e.g., player level, position, or age), and/or player impact data 109.4.99. It should be understood that this method only directly selects the first pre-manufactured component based upon information derived (e.g., distance between two points, area, or volume) from the body part model 180.99 (steps 606.6, 606.8, 622.6, 622.8). Moreover, this method does not selection said the pre-manufactured component based solely on data contained in the body part model 180.99.

3. Selection Based Upon Measurements Between Surfaces

Figure 67A:
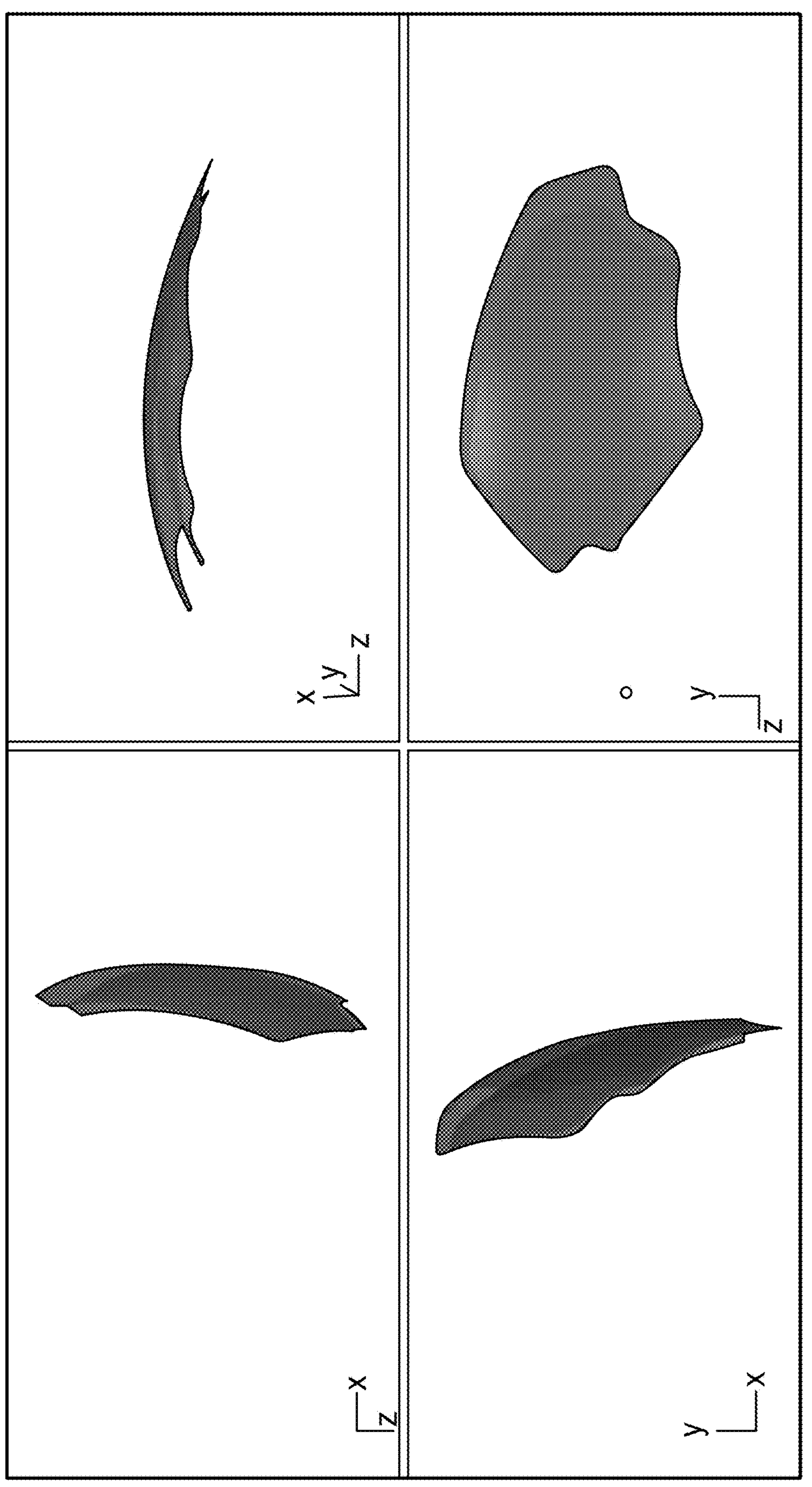
FIG. 67A shows multiple views of a comparison between an outer surface of the body part model and an internal surface of an energy attenuation component.
Figure 67B:
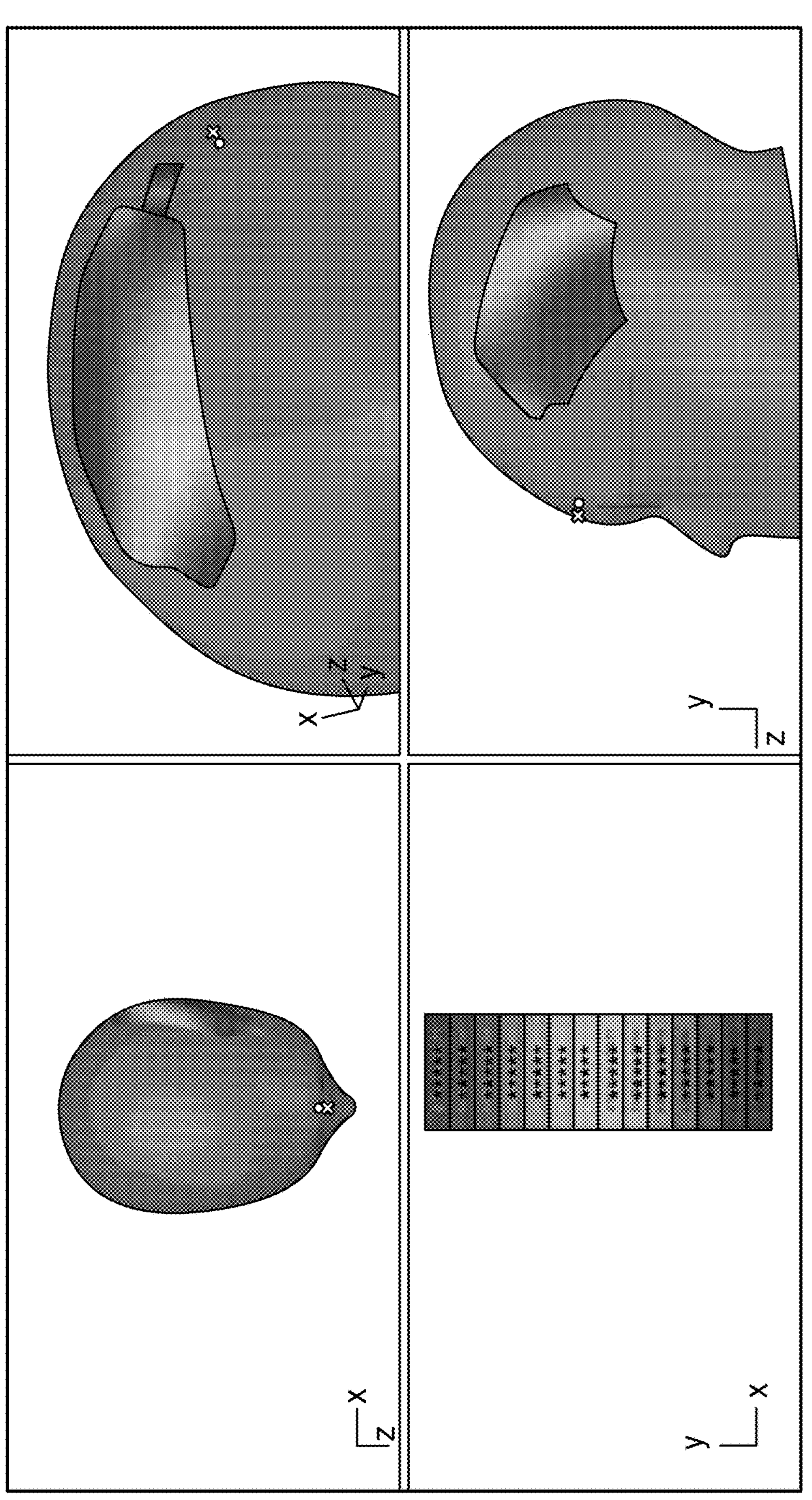
FIG. 67B shows distances calculated between the outer surface of the body part model and the internal surface of an energy attenuation component, both of which are shown in FIG. 66.

After the body part model 180.99 has been imported and aligned within the computerized template 200.99, the pre-manufactured component(s) can be selected based upon the distances between surfaces in step 660. As shown in FIGS. 67A-67B, this embodiment is configured such that the system 1 calculates the distance between the aligned body part model 180.99 and each of the pre-manufactured components. Then the system can compare the distance against: (i) an idea distance, (ii) a max distance, and/or (iii) a min distance to select a distance that provides the desired pre-compression for the specific area of the equipment. Once the distance has been selected, then the equipment component associated with said distance can be obtained and then the equipment can be assembled according to the below steps.

As discussed in greater detail above, the selection of the pre-manufactured component can then be utilized in connection with other systems or methods disclosed herein to select other pre-manufactured components, assemblies, or products. In particular, said direct selection of the pre-manufactured component can be utilized to: (i) directly select other components, assemblies, or products—namely, the first energy attenuation component can be directly associated with a helmet shell, (ii) indirectly select other component based on algorithms or methodologies that utilize neural networks, artificial intelligence, machine learning, linear regression analysis, combinations of the same, and/or any know method of selecting a component, assembly, or product based on the selection of a first component, (iii) indirectly select other component based player information 109.2.99 (e.g., player level, position, or age), and/or player impact data 109.4.99. It should be understood that this method only directly selects the first pre-manufactured component based upon information derived (e.g., distance between two points, area, or volume) from the body part model 180.99. Moreover, this method does not selection said the pre-manufactured component based solely on data contained in the body part model 180.99.

3. Artificial Intelligence based Selection Method

In addition to the above methodologies, an artificial intelligence based learning algorithm may be used to select at least one pre-manufactured components from a plurality of pre-manufactured components based on data (e.g., images, videos, body part models, or any other information disclosed above) obtained from the player. For example, the artificial intelligence program may be trained to identify the outline of a human body part from a plurality of images that have been annotated to identify said outline. Then the trained artificial intelligence program can then identify at least one pre-manufactured components from a plurality of pre-manufactured components based on the identified outline of body part. The designer can then obtain the identified pre-manufactured component(s), install said components in the equipment, and have the player try on the equipment. The designer can then input the player's feedback into the artificial intelligence program to further train the artificial intelligence program. This circular process can be continued until the artificial intelligence program can correctly identify the pre-manufactured components from a plurality of pre-manufactured components that best fits the players.

In another embodiment, an artificial intelligence based learning algorithm may be used to select at least one pre-manufactured components from a plurality of pre-manufactured components based on a previously selected pre-manufactured component. For example, the artificial intelligence program may be trained to identify additional pre-manufactured components based on a previously selected pre-manufactured component by reviewing previously built helmets and identifying/creating associations between the pre-manufactured components. Then the trained artificial intelligence program can then identify at least one pre-manufactured components from a plurality of pre-manufactured components. The designer can then obtain the identified pre-manufactured components, install said components in the equipment, and have the player try on the equipment. The designer can then input the player's feedback into the artificial intelligence program to further train the artificial intelligence program. This circular process can be continued until the artificial intelligence program can correctly identify the pre-manufactured components from a plurality of pre-manufactured components that best fits the players.

G. OBTAIN AND INSTALL SELECTED ENERGY ATTENUATION MEMBERS/COMPONENTS WITHIN THE SELECTED HELMET SHELL

Referring back to FIG. 3, after the system 10 has digitally selected the proper size helmet shell and selected the components of the variable layer, then the system 10 outputs a digital file that can be used to inform an installer of the pre-manufactured physical components that are needed to build the specific player's American football helmet 5000 in steps 800 and 900. In particular, the digital file may include a reference to a pre-manufactured shell size, namely, a small shell 5010.2, a medium shell 5010.4, or a large shell 5010.6. Examples of the helmet shells 5010.2, 5010,4, 5010.6, visors 6000, chin bar 7000, chin straps 8000, other components and their configuration are disclosed in connection with U.S. patent application Ser. Nos. 17/327,641, 17/647,459, 29/829,992, 29/839,498, U.S. Provisional applications Nos. 63/079,476, 63/157,337, 63/188,836, and U.S. Pat. Nos. D946,833, D939,782 D939,151, each of which are hereby incorporated by reference. Additionally, the control module assembly 3200 includes an impact sensor assembly (not shown) that is positioned between the layers 4000, 3000 and an impact control module 3210. Said features and functionality of the control module assembly 3200 is disclosed in U.S. patent application Ser. No. 16/712,879, which is incorporated herein by reference.

After the proper size helmet shell 5010 is obtained, the assembler may reference the digital file to determine the pre-manufactured components needed to assemble the fixed layer 4000. As discussed above, the components of the fixed layer 4000 are at least standard across a particular helmet shell size and may be standard across multiple helmet shell sizes. Moreover, at least all player's that wear medium helmet shells 5010, will have the same fixed layer 4000. In particular, the fixed layer 4000 includes: (i) front fixed component 4100, (ii) crown fixed component 4200, (iii) rear fixed component 4300, and (iv) opposed left and right side fixed components 4400*a, b*. Each of these components have a substantially uniform or constant CD that is equal to or less than the CD of the components contained within the variable layer 2000, and a configuration that prevents the component to be properly positioned multiple regions of the helmet.

Figures 73, 74:
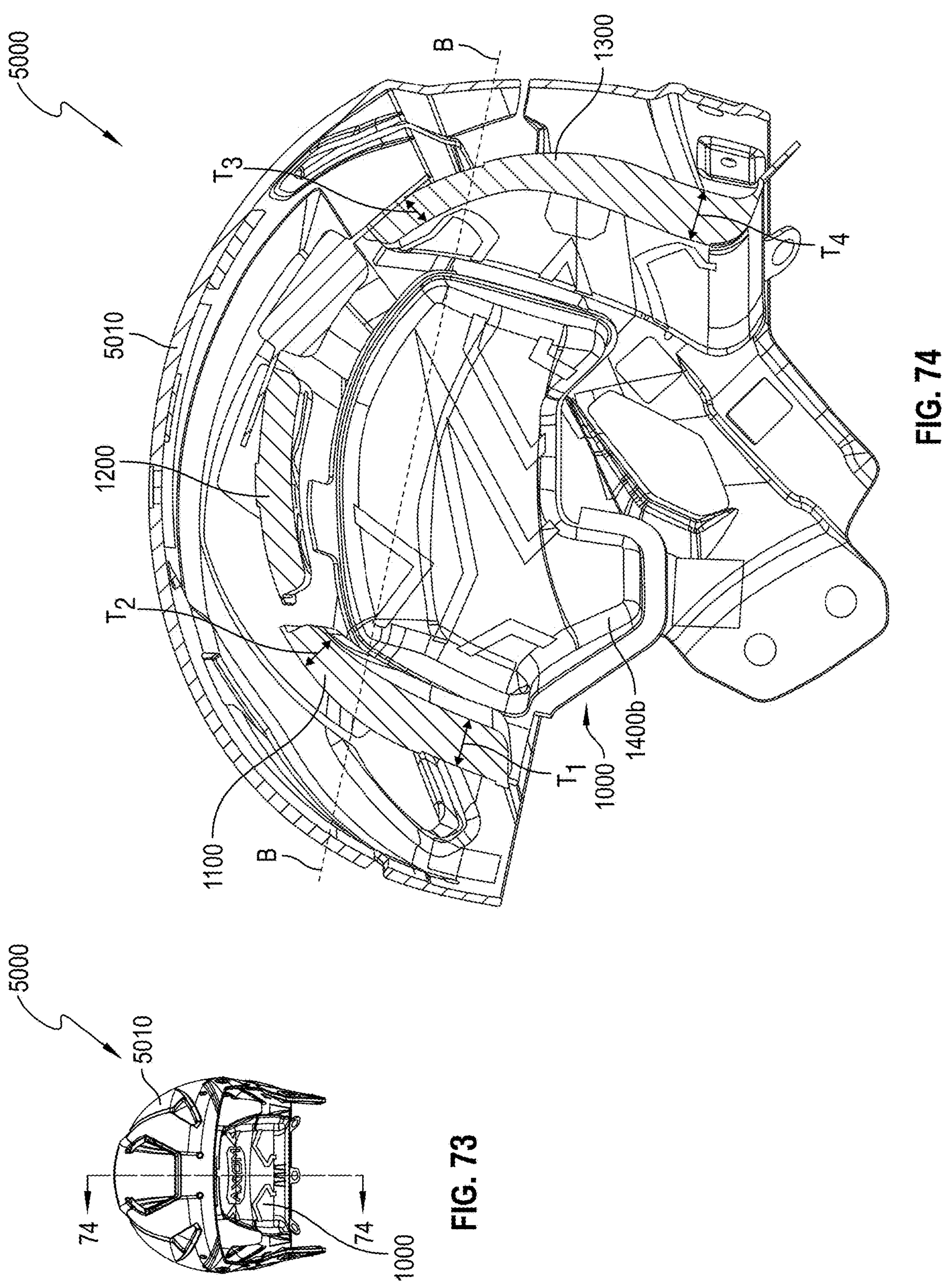
FIG. 73 is a front view of a helmet shell with the fixed layer of the energy management assembly for the protective sports helmet designed from the spatial data collection, processing and fitment system.
FIG. 74 is a cross-section view of the helmet shell taken along line 74-74 of FIG. 73.
Figures 75, 76, 77:
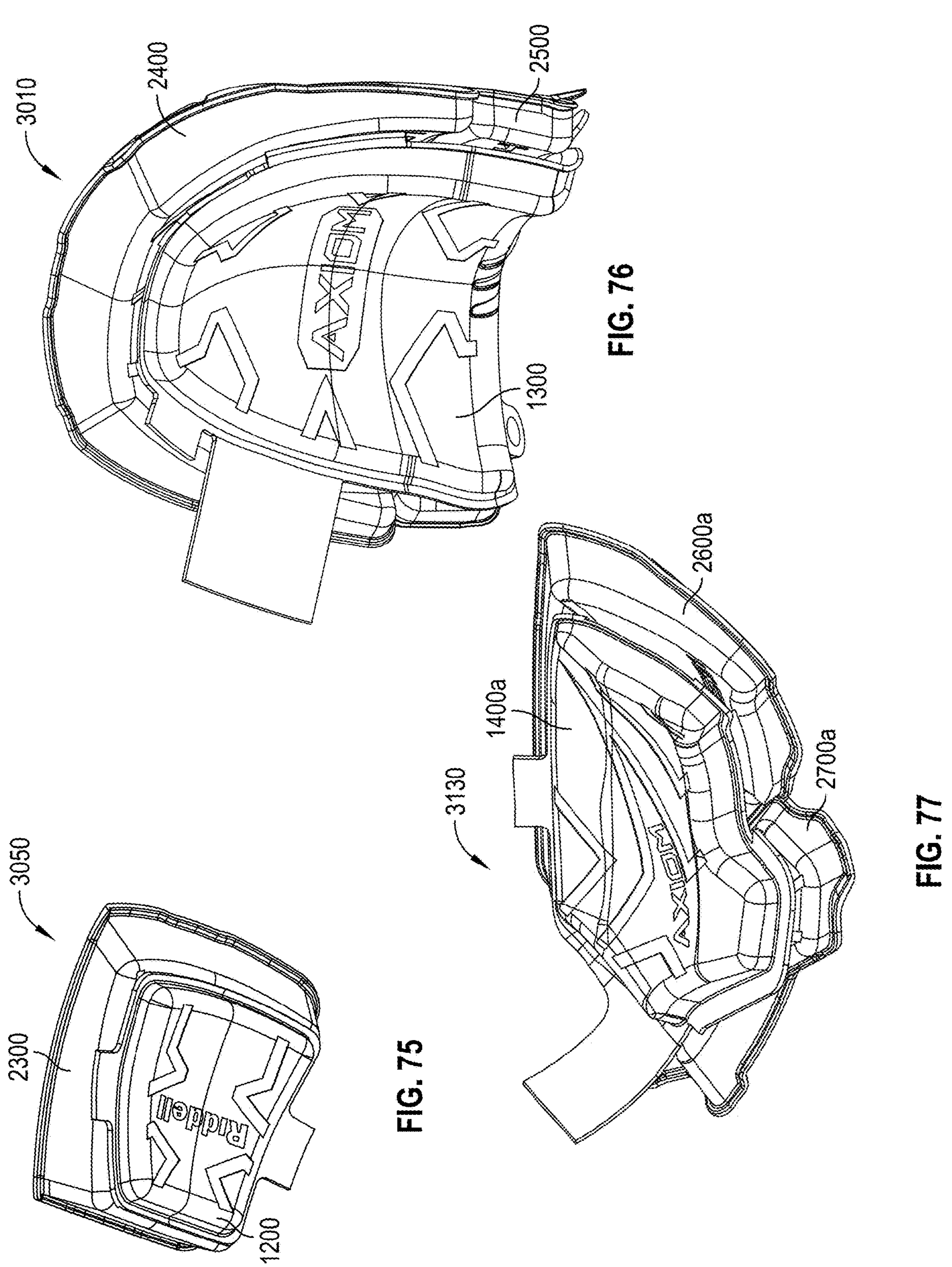
FIG. 75 is a perspective view of a crown member of the energy management assembly of the protective sports helmet designed from the spatial data collection, processing and fitment system, where the crown member includes: (i) a fixed layer, and (ii) a variable layer, wherein the fixed layer resides against the player's head when the helmet is worn and the variable layer resides between the fixed layer and the helmet shell.
FIG. 76 is a perspective view of a rear member of the energy management assembly of the protective sports helmet designed from the spatial data collection, processing and fitment system, where the rear member includes: (i) a fixed layer, and (ii) a variable layer, both positionally arranged as described in FIG. 75.
FIG. 77 is a perspective view of a side member of the energy management assembly of the protective sports helmet designed from the spatial data collection, processing and fitment system, where the side member includes: (i) a fixed layer, and (ii) a variable layer, both positionally arranged as described in FIG. 75.

As best shown in FIG. 74, the thickness of the fixed layer 4000 changes between components and even within components. The front fixed component 4100 has a thickness that changes from $T_1$ (e.g., 19.5 mm) at a first point at to $T_2$ (e.g., 13.5 mm) at a second point, where $T_2$ is less (e.g., 30%) than $T_1$. Additionally, the rear fixed component 4300 has a thickness that changes from $T_3$ (e.g., 13.5 mm) at a first point at to $T_4$ (e.g., 19.5 mm) at a second point, where $T_3$ is less (e.g., 30%) than $T_4$. The non-uniformity or variability of the thickness of the fixed layer 4000 is beneficial over uniform or consistent thicknesses because it applies less pressure on the player's head H above line B-B, when the helmet is worn by the player P. Application of less pressure on the player's head H above line B-B is beneficial because it helps ensure that the helmet does not "ride up" or require the chin strap to keep the helmet 5000 in the proper location on the player's head. Moreover, the helmet 5000 may apply: (i) between 0.5 psi and 10 psi, preferable between 1 psi and 5 psi and most preferable 1 and 3 psi on the player's head below line B-B, and (ii) between 0 psi and 5 psi, preferable between 0 psi and 3 psi and most preferable 0 and 2 psi on the player's head above line B-B. As shown in FIG. 74, line B-B is parallel with the frontal edge of the shell 5010 opening. As such, said protective sports equipment is designed and configured to have variable: (i) pre-compression of the energy attenuation assembly, (ii) interference fit ("IF"), and (iii) pressures that are exerted on the player's head. Moreover, said protective sports equipment may not have consistent: (i) pre-compression of the energy attenuation assembly, (ii) interference fit, and (iii) pressures that are exerted on the player's head. Nevertheless, in other configurations the fixed layer 4000 may have a uniform or consistent thicknesses and the variable layer 2000 may be altered to adjusted to apply less pressure above line B-B. In further configurations, the line B-B may not be parallel with the frontal edge of the shell 5010.

FIGS. 71-81, 84, and 88 show various views of this fixed layer 4000 in different orientations and installations. To note, the fixed layer 4000 is configured to be positioned adjacent to the player's head when the helmet is worn by the specific player. This configuration is: (i) opposite of conventional football helmets that place the variable layer adjacent to the player's head, and (ii) beneficial because it helps ensure that the helmet is positioned in the same place for all players. Positioning in a constant place for all players is beneficial because it helps optimize the field of view for all players and helps ensure that the helmet is properly configured for optimal impact absorption. Once the shell 5010 and fixed layer 4000 are obtained, the assembler can obtain the components for the variable layer 2000. It should be understood that in other embodiments, the components of the fixed layer 4000 may not have: (i) a non-uniformity or variability thickness (e.g., thickness may be constant across the entire layer 4000), (ii) a substantially uniform or constant CD (e.g., CD may vary throughout the layer 4000, may vary between components, or may vary within a single component), and/or (iii) may have a CD that is equal to or greater than the CD of the components contained within the variable layer 2000 (e.g., the CD of the crown variable component may be less than the CD of the crown fixed component).

After the proper size helmet shell 5010 is obtained and the components of the fixed layer 4000 are selected, the assembler may reference the digital file to determine the pre-manufactured components needed to assemble the variable layer 2000 (which are shown in FIGS. 66A-66E, 67-68, and 71-86). As described in detail above, each component contained in the variable layer 2000: (i) includes multiple configurations (e.g., between one and ten configurations, preferably seven configurations), (ii) does not have uniform thicknesses across the components, (iii) each configuration of a component has a different configuration (e.g., thickness, CD, etc.), and (iv) has a CD that is equal to or greater than the CD of most of the components contained within the fixed layer 4000. For example, FIGS. 68A-68E shows five different configurations 2600*a*.2-2600*a*.10 of the left side variable component 2600*a*. Here, the thinnest configuration 2600*a*.2 has a thickness $T_1$ at one point, approximately 16.3 mm, while the thickest configuration 2600*a*.10 has a thickness $T_5$ at the same point that is approximately 31.1 mm. Moreover, there is approximately a 14 mm (i.e., 52%) difference between these components 2600*a*.2, 2600*a*.10 at this specific location. Additionally, the changes in these thickness profiles can be seen in FIG. 70, wherein the thinnest configuration 2600*a*.2 is shown in yellow and the thickness configuration 2600*a*.10 is shown in blue. It should be understood that the thicknesses disclosed in connection with the left side variable component 2600*a* are only exemplary and are non-limiting. As such, the thicknesses of this component may be increased or decreased.

In another example, the plurality of energy attenuation component may include 16 different configuration to choose from, wherein one specific configuration is selected for the player using the above described system 10. Here, the plurality of energy attenuation components include two different thicknesses (thick and thin), two different CDs (larger and small), two different inner surface curvatures (large and small), and two different materials (foam and plastic (3D printed)). It should be understood that this is only an example and the plurality of energy attenuation components for a specific location within the protective sports equipment may include significantly more (e.g., 10,000 components) or less (2 components).

| Thickness | CD | Curvature of Inner Surface | Material |
|---|---|---|---|
| $T_1$ | $CD_1$ | $S_1$ | $M_1$ |
| $T_1$ | $CD_1$ | $S_1$ | $M_2$ |
| $T_1$ | $CD_1$ | $S_2$ | $M_1$ |
| $T_1$ | $CD_1$ | $S_2$ | $M_2$ |
| $T_1$ | $CD_2$ | $S_1$ | $M_1$ |
| $T_1$ | $CD_2$ | $S_1$ | $M_2$ |
| $T_1$ | $CD_2$ | $S_2$ | $M_1$ |
| $T_1$ | $CD_2$ | $S_2$ | $M_2$ |
| T2 | $CD_2$ | $S_1$ | $M_1$ |
| T2 | $CD_2$ | $S_1$ | $M_2$ |
| T2 | $CD_2$ | $S_2$ | $M_1$ |
| T2 | $CD_2$ | $S_2$ | $M_2$ |
| T2 | $CD_1$ | $S_1$ | $M_1$ |
| T2 | $CD_1$ | $S_1$ | $M_2$ |
| T2 | $CD_1$ | $S_2$ | $M_1$ |
| T2 | $CD_1$ | $S_2$ | $M_2$ |

It should be understood that similar configurations and thickness variations that are shown in connection with the left side variable component 2600*a* are also contained within the configurations associated with the upper front component 2200, crown component 2300, rear component 2400, occipital component 2500, sides component 2600*a*-2600*b*, frontal boss variable component 2700*a*-2700*b*, and jaw component 2800*a*-2800*b*. It should be understood in alternative embodiments, components contained in the variable layer 2000: (i) may include a single configuration (e.g., lower front component), (ii) has a uniform thickness across at least one component, (iii) has a substantially uniform or constant CD or may have a CD that varies throughout the component, and/or (iv) may have a CD that is equal to or less than the CD of the components contained within the fixed layer 4000 (e.g., the CD of the crown variable component may be less than the CD of the crown fixed component). Further, it should be understood that the differences between the configurations may be based upon any one or a combination of the following: (i) lengths, (ii) widths, (iii) heights or thicknesses, (iv) compression deflections, (v) contours of the internal, external, or side surfaces, (vi) concavities of the internal, external, or side surfaces, (vii) angles, (viii) radii of the internal, external, or side surfaces, (ix) attachment systems, (x) colors, (xi) materials, (xii) isocyanate to resin ratios, (xiii) shape of periphery, and/or (ivx) number of internal layers.

Figure 79:
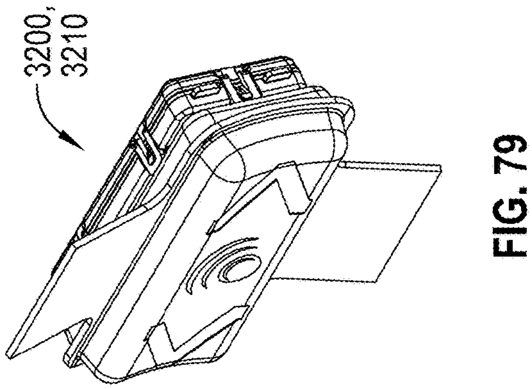
FIG. 79 is a perspective view of a control module assembly of the energy management assembly of the protective sports helmet designed from the spatial data collection, processing and fitment system.
Figure 80:
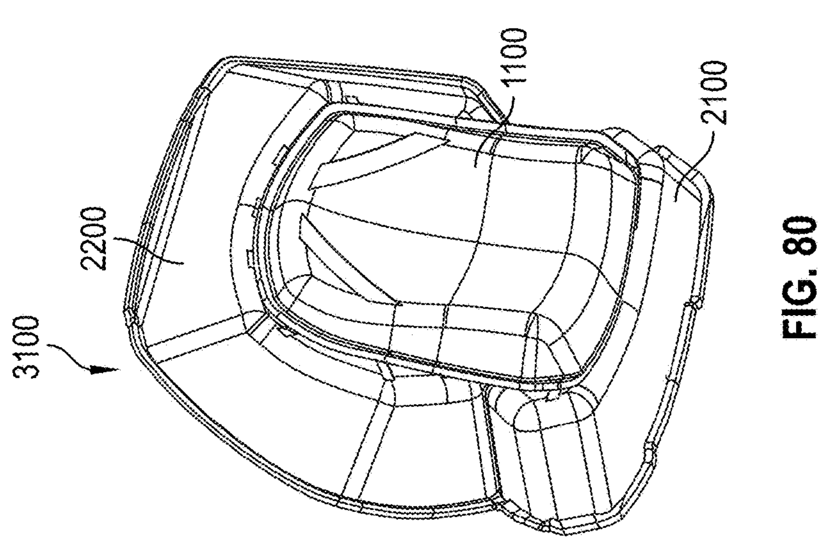
FIG. 80 is a perspective view of a front member of the energy management assembly of the protective sports helmet designed from the spatial data collection, processing and fitment system, where the front member includes: (i) a fixed layer, and (ii) a variable layer both positionally arranged as described in FIG. 75.
Figure 78:
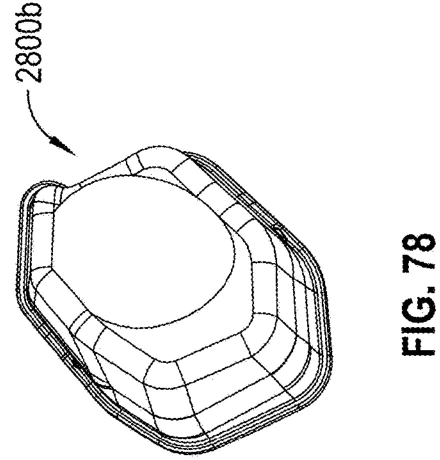
FIG. 78 is a perspective view of a jaw component or member of the energy management assembly of the protective sports helmet designed from the spatial data collection, processing and fitment system.
Figure 81:
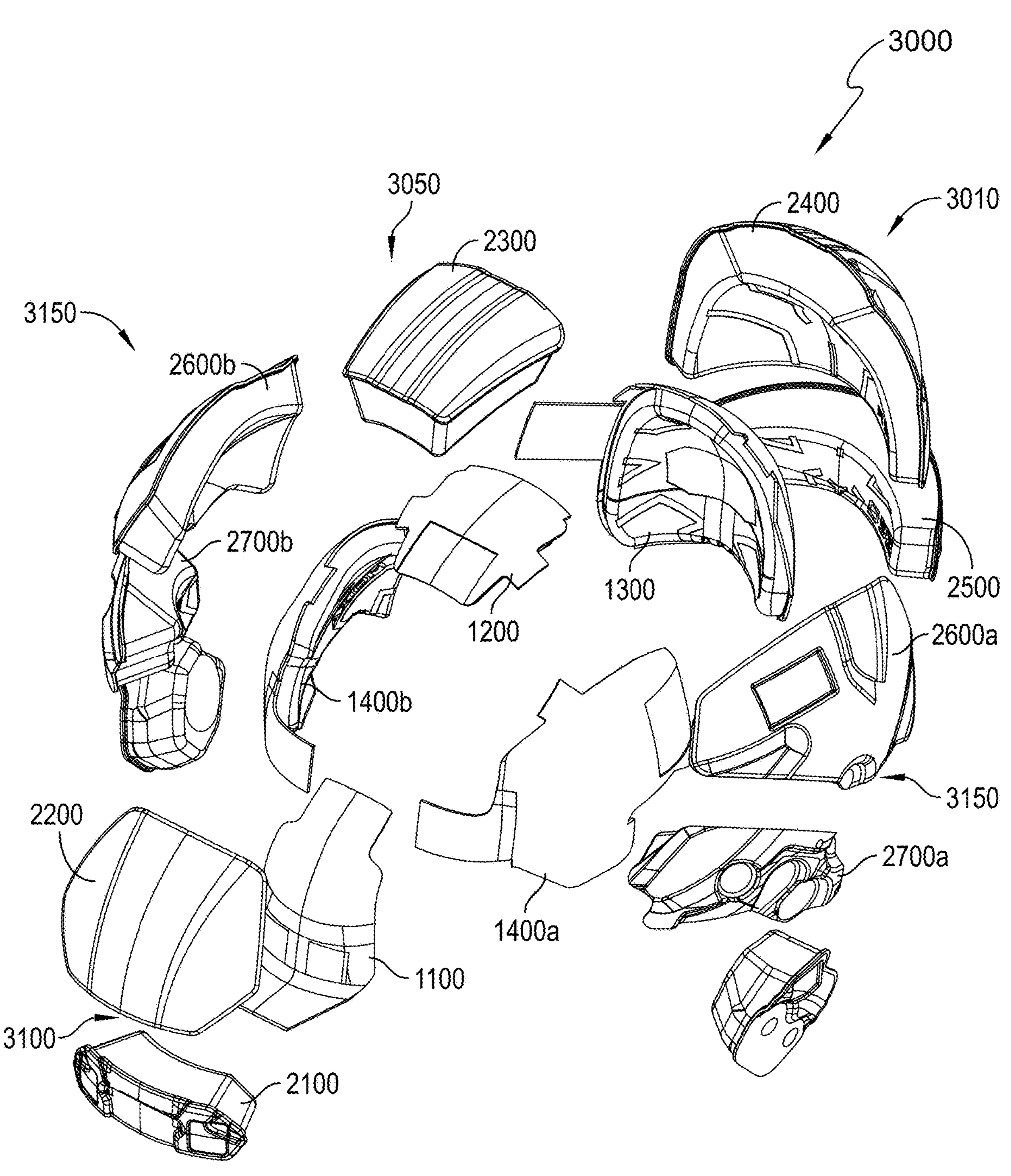
FIG. 81 is an exploded view of the energy management assembly of the protective sports helmet designed from the spatial data collection, processing and fitment system, where the energy management assembly includes a plurality of fixed layer members and variable layer members.
Figure 82:
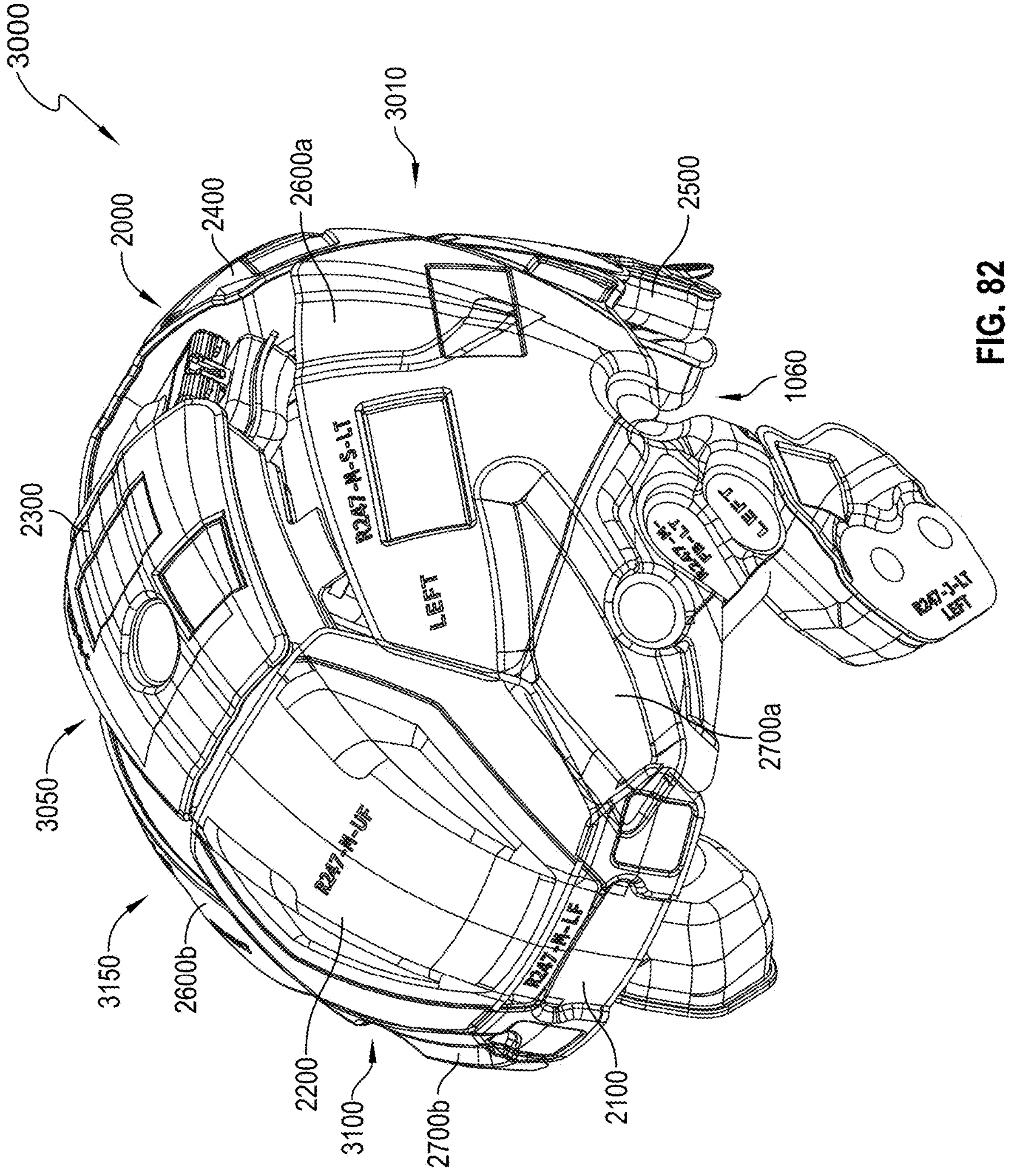
FIG. 82 is a perspective view of the fully assembled components of the fixed layer of the energy management assembly of the protective sports helmet designed from the spatial data collection, processing and fitment system.
Figures 83, 84:
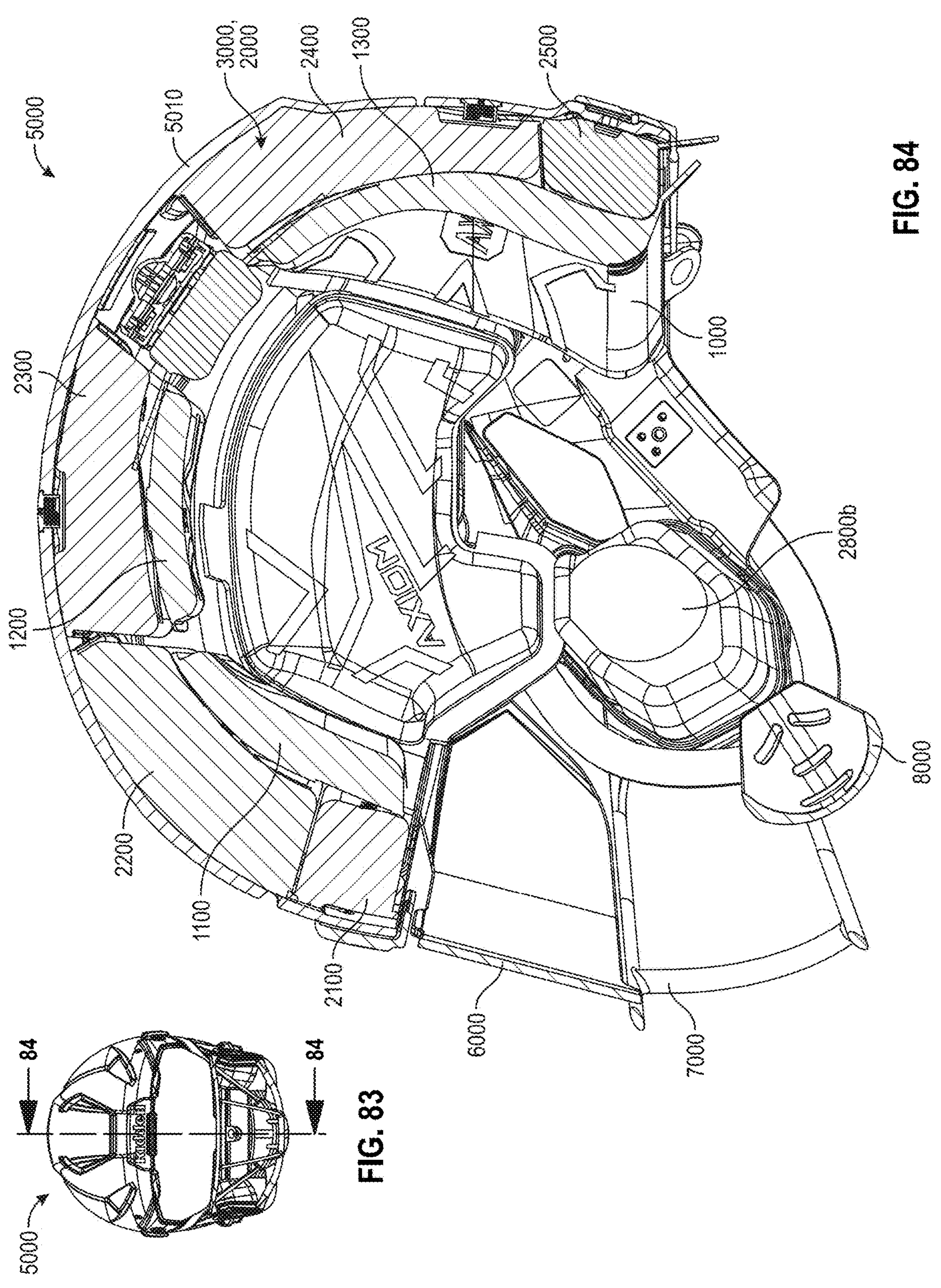
FIG. 83 is a front view of the helmet shell and the energy management assembly of the protective sports helmet designed from the spatial data collection, processing and fitment system.
FIG. 84 is a cross-section view of the helmet shell and the energy management assembly taken along line 84-84 of FIG. 83.
Figure 86:
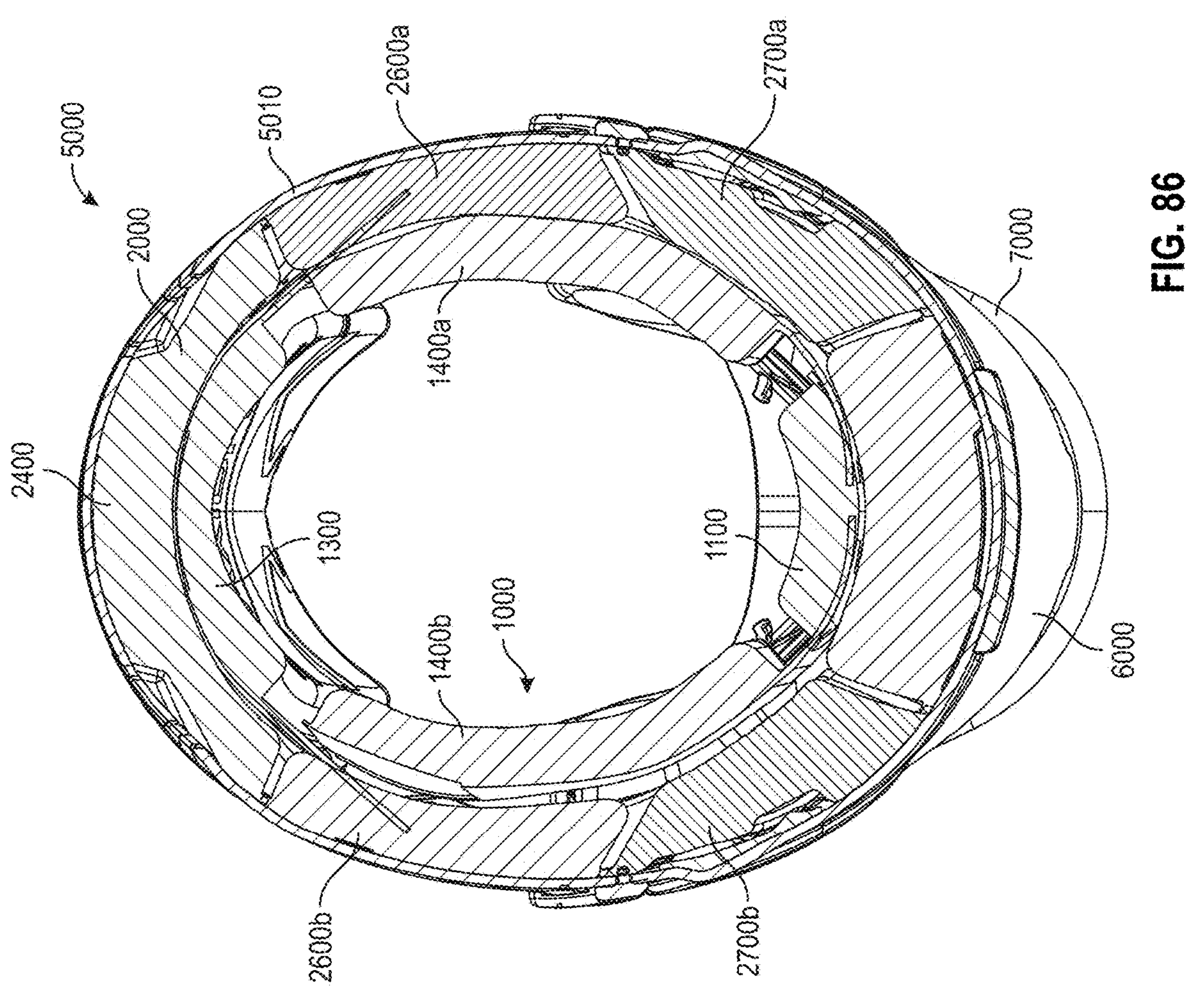
FIG. 86 is a cross-section view of the helmet shell and the energy management assembly taken along line 86-86 of FIG. 85.
Figure 85:
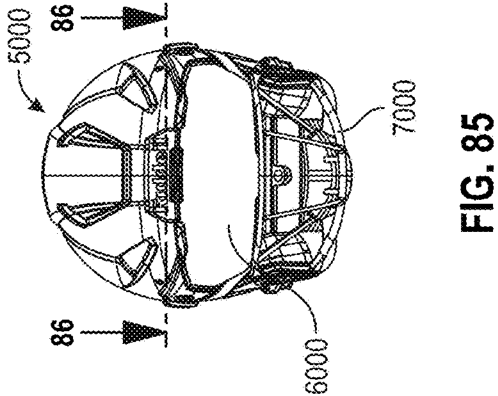
FIG. 85 is a front view of the helmet shell and the energy management assembly of the protective sports helmet designed from the spatial data collection, processing and fitment system.
Figures 87, 88:
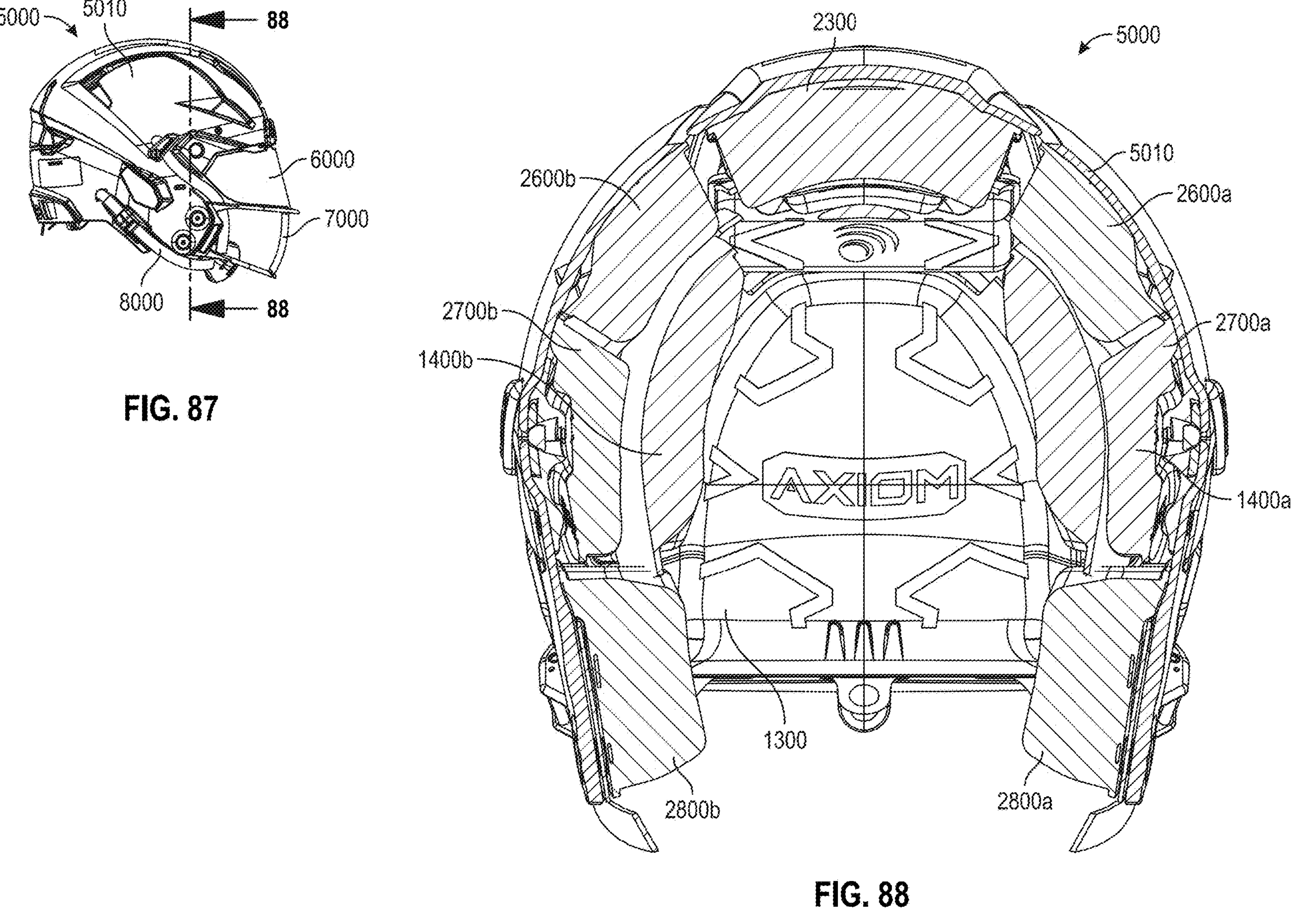
FIG. 87 is a side view of the helmet shell and the energy management assembly of the protective sports helmet designed from the spatial data collection, processing and fitment system.
FIG. 88 is a cross-section view of the helmet shell and the energy management assembly taken along line 88-88 of FIG. 87.

Once the components of the variable layer 2000 and the components of the fixed layer 4000 have been obtained, the energy attenuation assembly 3000 may be created by combining the components of the fixed layer 4000 and components of the variable layer 2000. In particular, the energy attenuation assembly 3000 include: (i) a rear energy attenuation member 3010 comprised of: (a) rear fixed component 4300, and (b) rear variable component 2400 and occipital variable component 2500, (ii) left and right side energy attenuation member 3150 comprised of: (a) side fixed component 4400*a, b*, and (b) side variable component 2600*a, b* and frontal boss variable component 2700*a, b*, (iii) a crown energy attenuation member 3050 comprised of: (a) crown fixed component 4200, and (b) a crown variable component 2300, and (iv) a front energy attenuation member 3100 comprised of: (a) fixed front component 4100, and (b) a lower front component 2100 and a upper front component 2200. Each of the rear, sides, crown, and front members 3010, 3050, 3100, and 3150 and the control module assembly 3200 can be assembled to form the energy attenuation assembly 3000, which is shown in FIG. 79. It should be understood that the energy attenuation assembly 3000 may have more or less components described herein. Once the energy attenuation assembly 3000 has been assembled, it can be installed in the selected helmet shell 5010 and secured therein by the energy attenuation connector 3300. Said energy attenuation connector 3300 is disclosed in U.S. Pat. No. 11,399,588 and is incorporated herein by reference.

It should be understood that the inner surface of the fixed layer 4000 typically does not have a topography that substantially matches the topography of the payer's head in an uncompressed state. Moreover, the energy attenuation assembly 3000 is not bespoke for the player; Instead, the pre-manufactured components that provide an optimal fit for the player have been selected based on the body part data 110.99 that was obtained from the player. As such, the pressure exerted on the player's head by the energy attenuation assembly 3000, when the helmet is in a worn, but pre-impact state, may have slight variations between the energy attenuation members 3010, 3050, 3100, 3150. Nevertheless, these compressions and pressures should be isotropic, homogeneous, or even as possible in certain regions of the protective sports equipment. Additionally, said compressions and pressures should ideally be: (i) between 0.25 psi and 10 psi, preferable between 0.75 psi and 5 psi and most preferable 1 and 3 psi and (ii) between 1.5 mm and 10 mm, preferable between 2.5 mm and 6 mm most preferable between 3.5 mm and 6.5 mm. These compressions and pressures can be accurately determined due to the unique configuration of the energy attenuation assembly and do not require complex calculations that are prone to inaccuracies.

Figure 90:
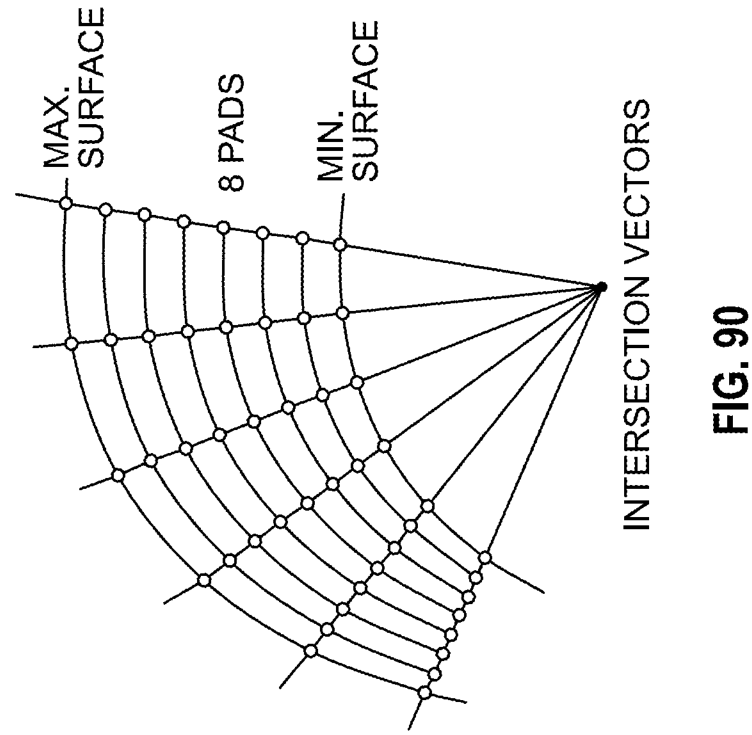
FIG. 90 shows a eight size options for a specific energy attenuation component in the variable layer of the energy management assembly of the protective sports helmet selected using the spatial data collection, processing and fitment system.
Figure 89:
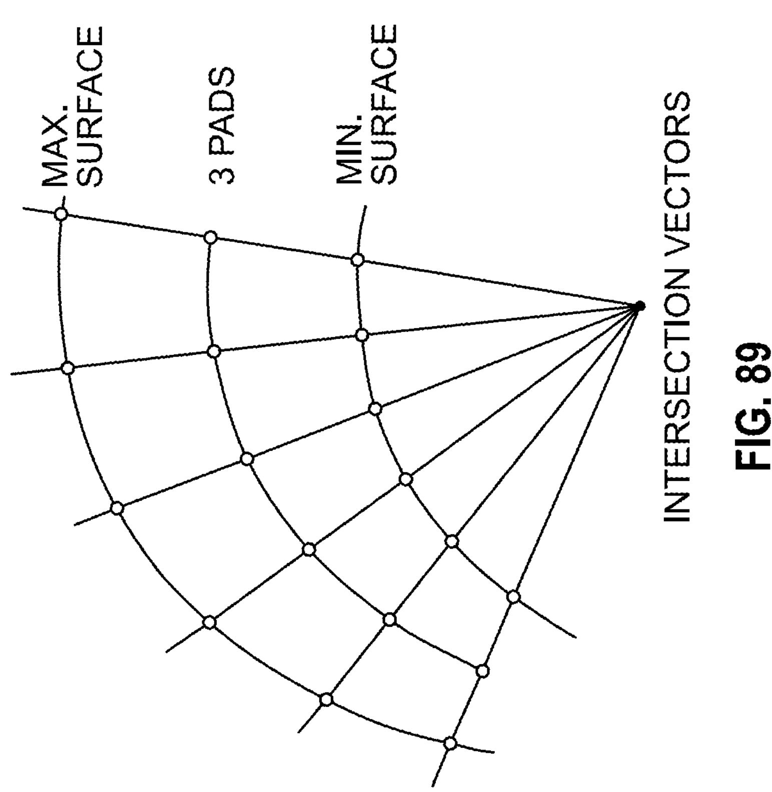
FIG. 89 shows three size options for a specific energy attenuation component in the variable layer of the energy management assembly of the protective sports helmet selected using the spatial data collection, processing and fitment system.
Figures 91, 92, 93:
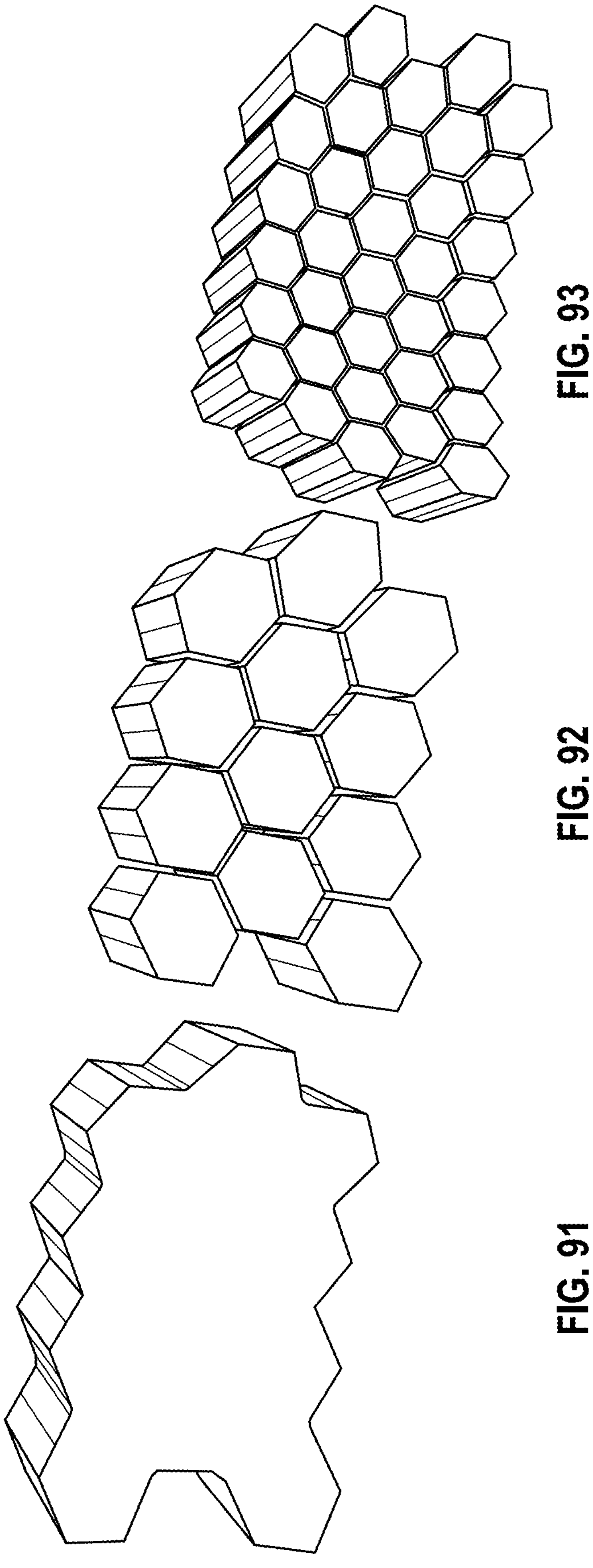
FIG. 91 shows a single, integrated side energy attenuation component of the energy management assembly of the protective sports helmet designed from the spatial data collection, processing and fitment system.
FIG. 92 shows twelve distinct components that are contained in a side energy attenuation component of the energy management assembly of the protective sports helmet designed from the spatial data collection, processing and fitment system.
FIG. 93 shows thirty-four distinct components that are contained in a side energy attenuation component of the energy management assembly of the protective sports helmet designed from the spatial data collection, processing and fitment system.
Figure 94:
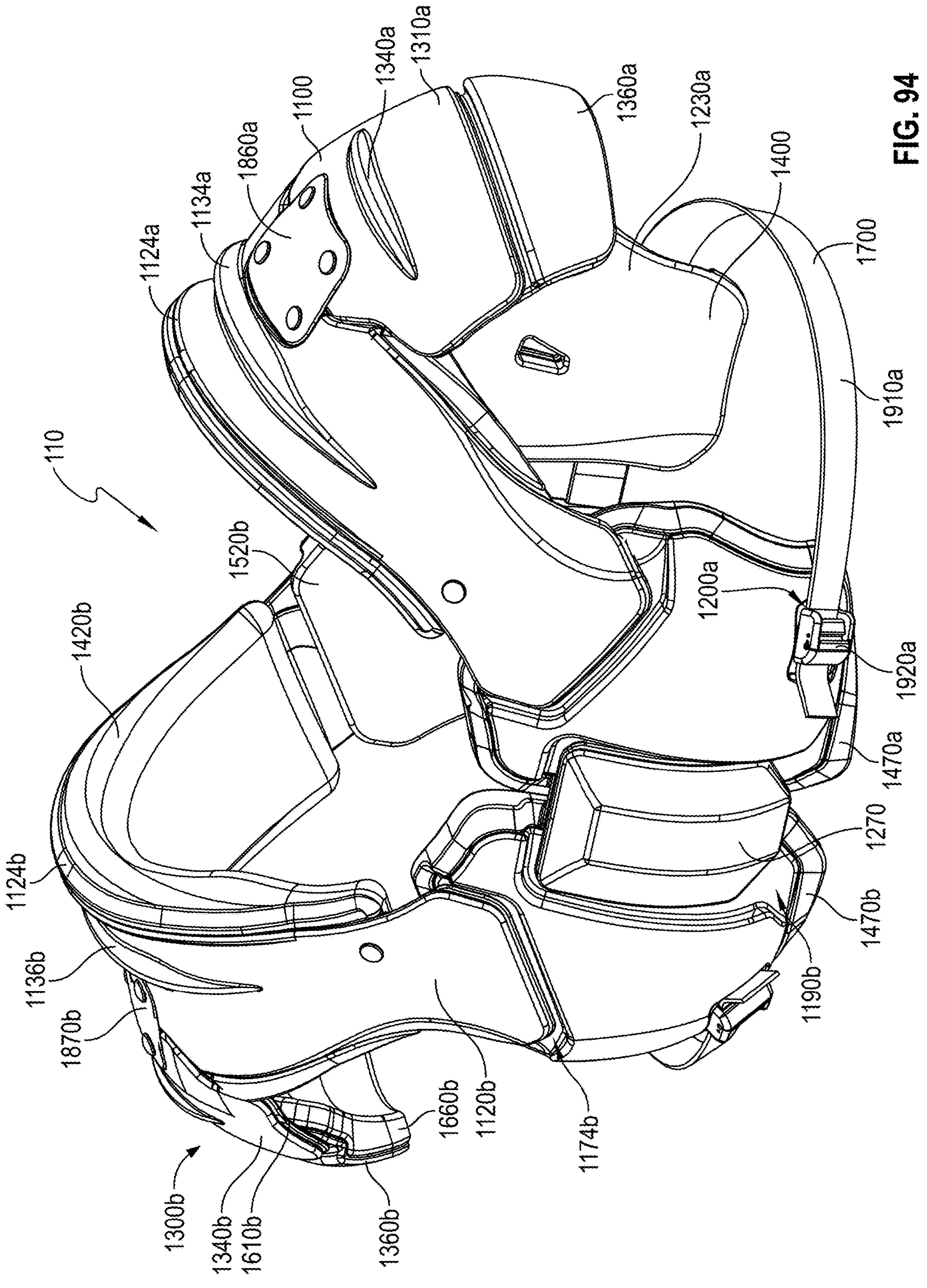
FIG. 94 is a perspective view of a human torso protective assembly.
Figure 95:
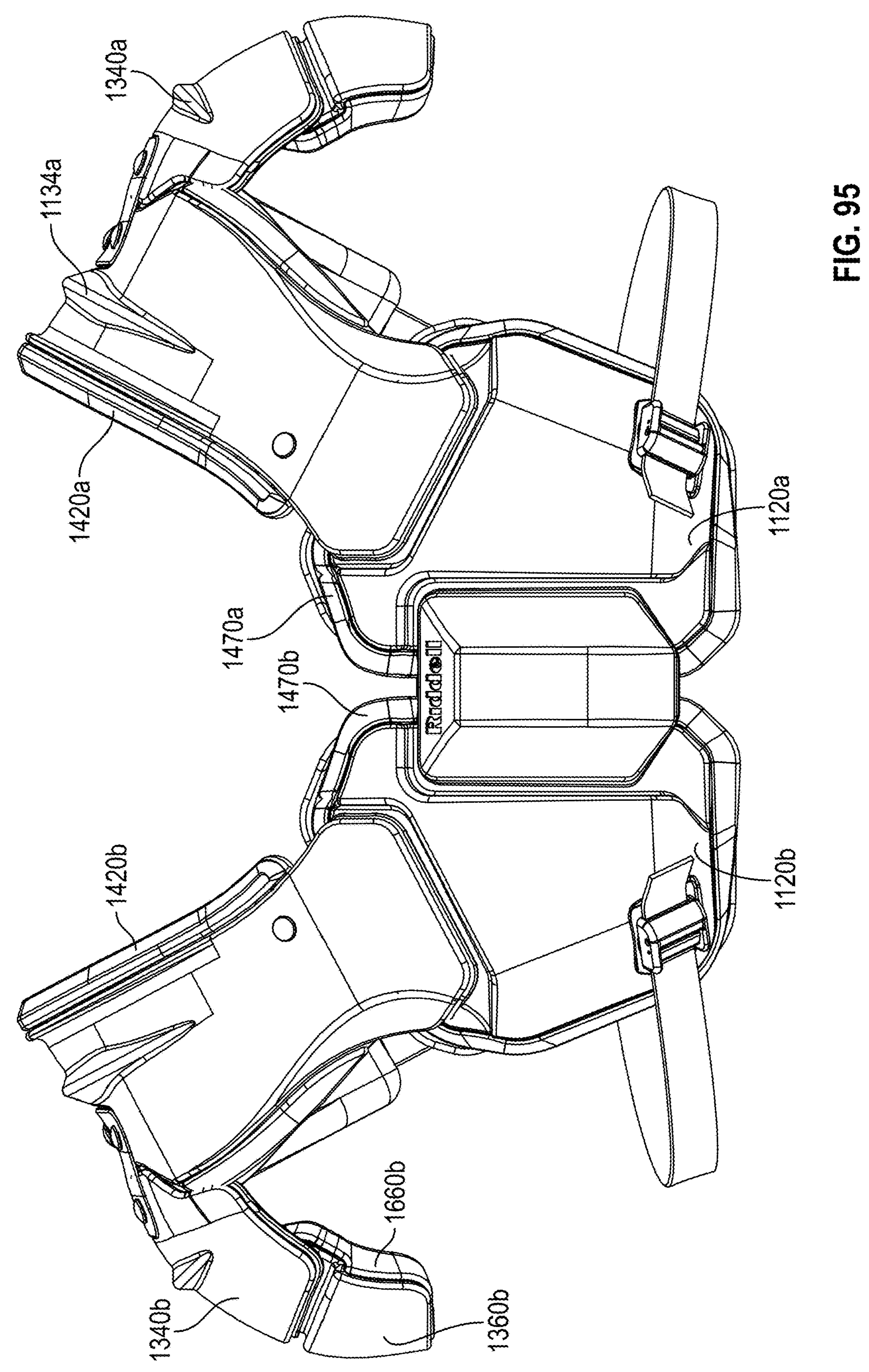
FIG. 95 is a front view of the human torso protective assembly.
Figure 96:
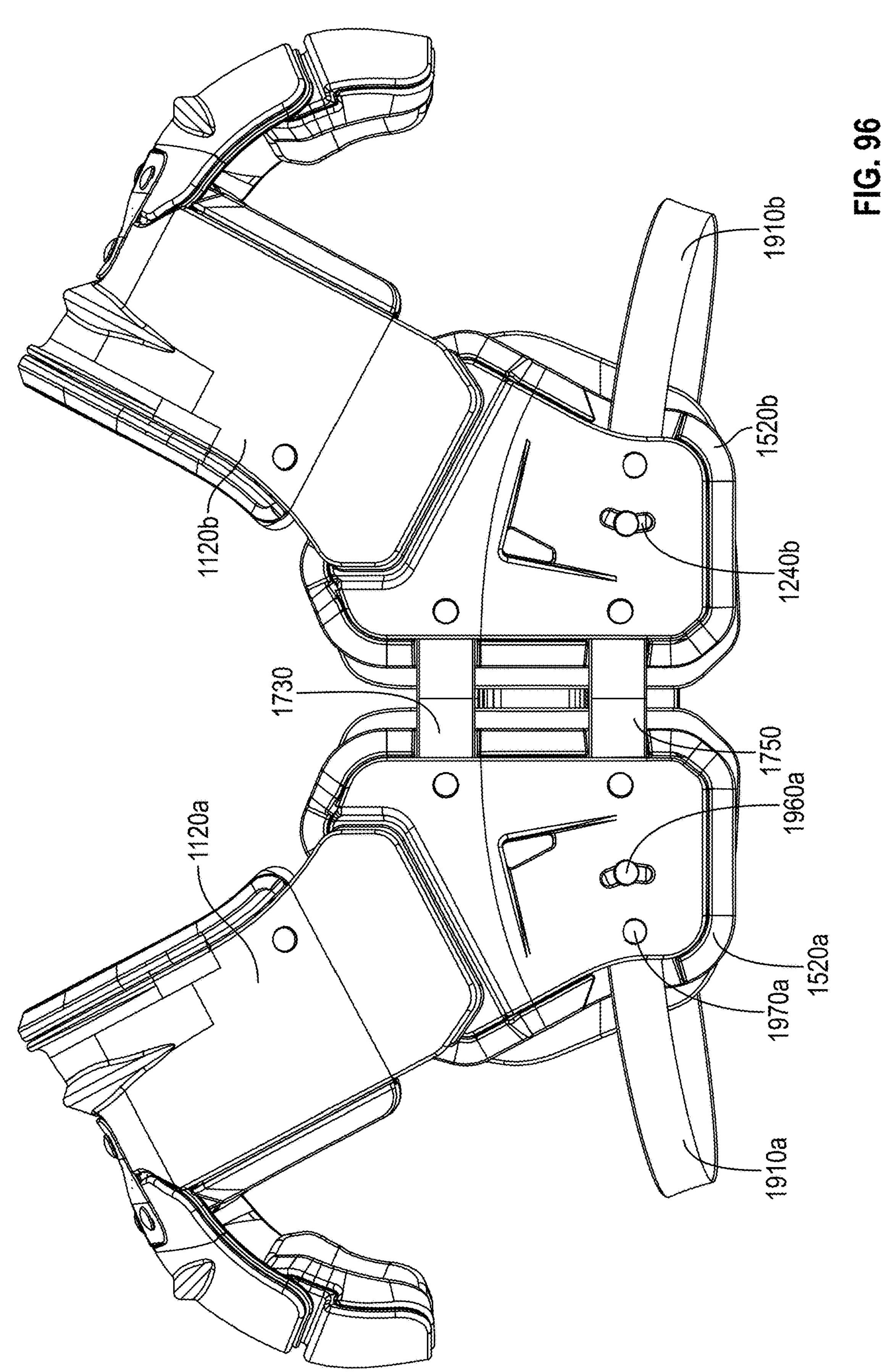
FIG. 96 is a rear view of the human torso protective assembly.
Figure 97:
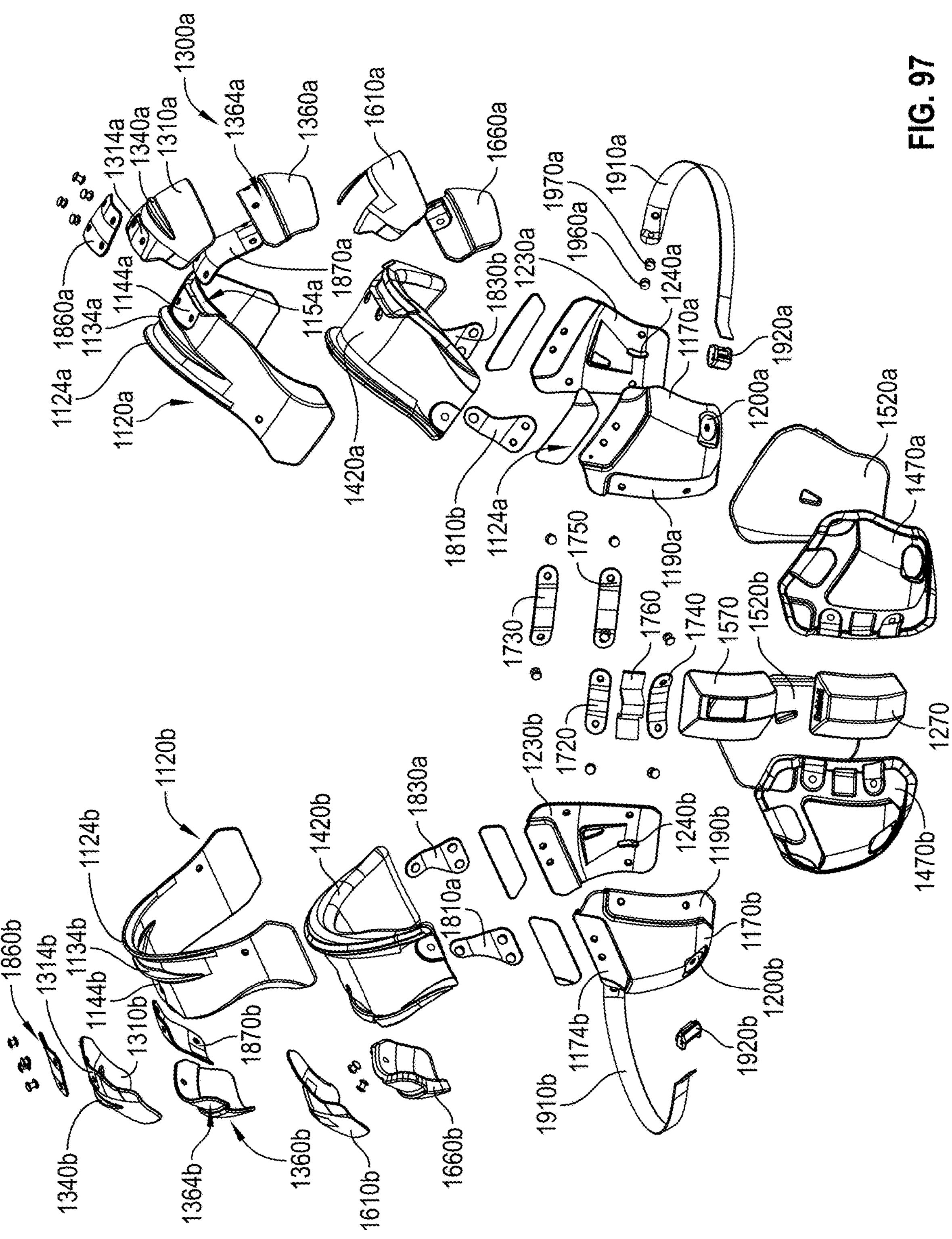
FIG. 97 is an exploded view of the human torso protective assembly.
Figure 98:
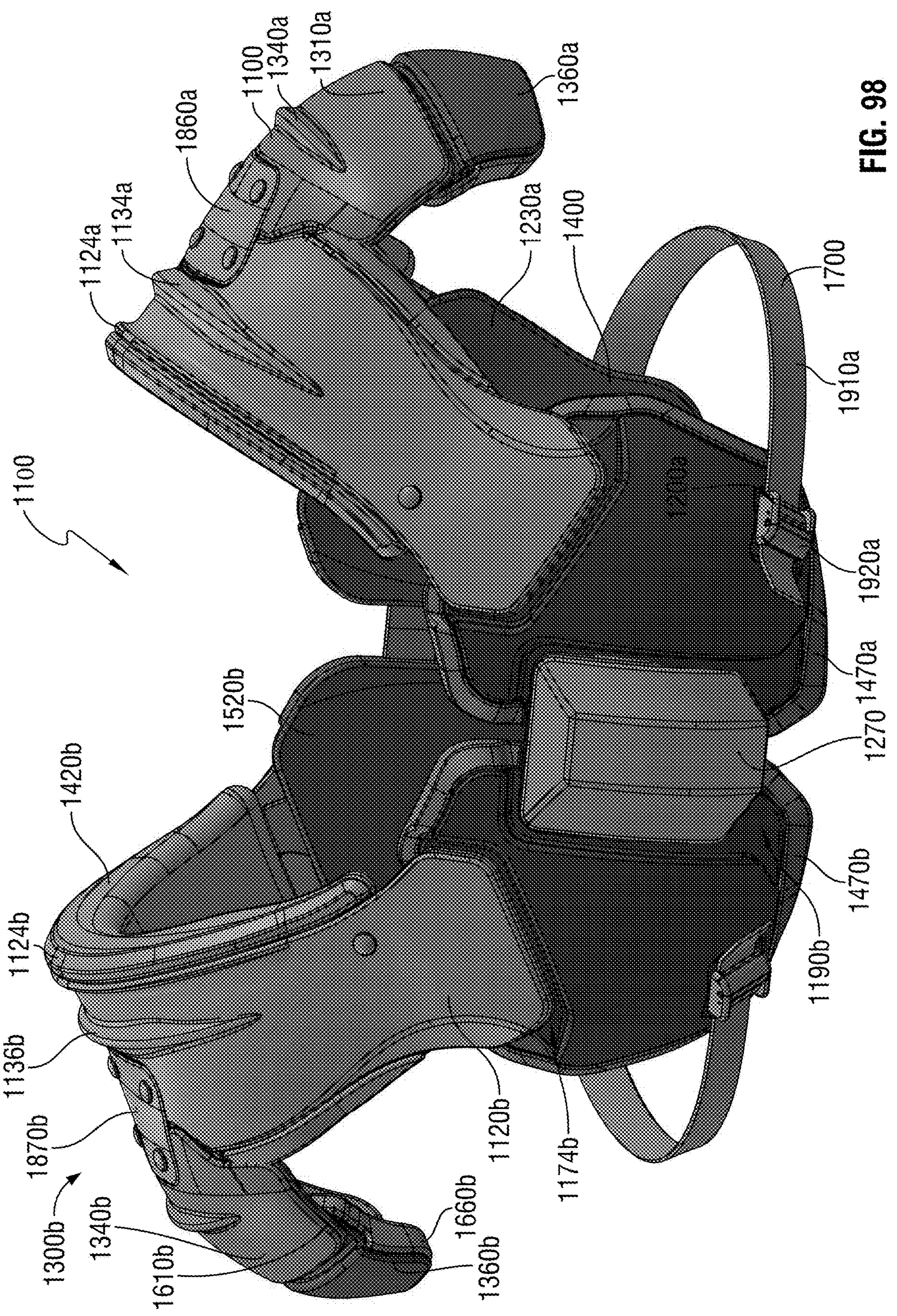
FIG. 98 is a perspective view of a first human torso protective assembly designed from the spatial data collection, processing and fitment system, wherein said first human torso protective assembly includes an outer protective assembly and an inner energy attenuation assembly that has been specifically selected for a first player's torso based on data collected of the first player.
Figure 99:
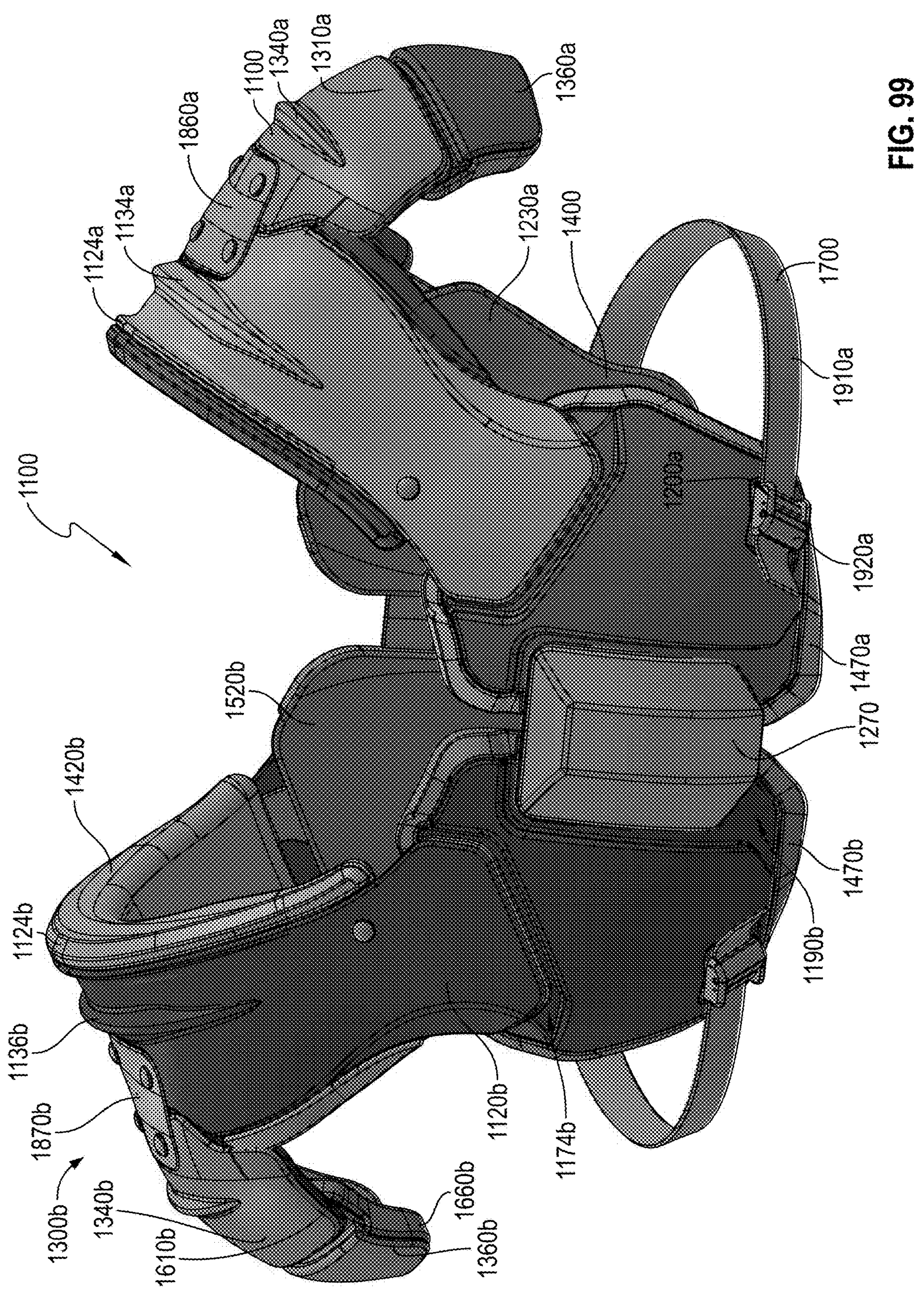
Figures 100A, 100B, 100C, 100D, 100E:
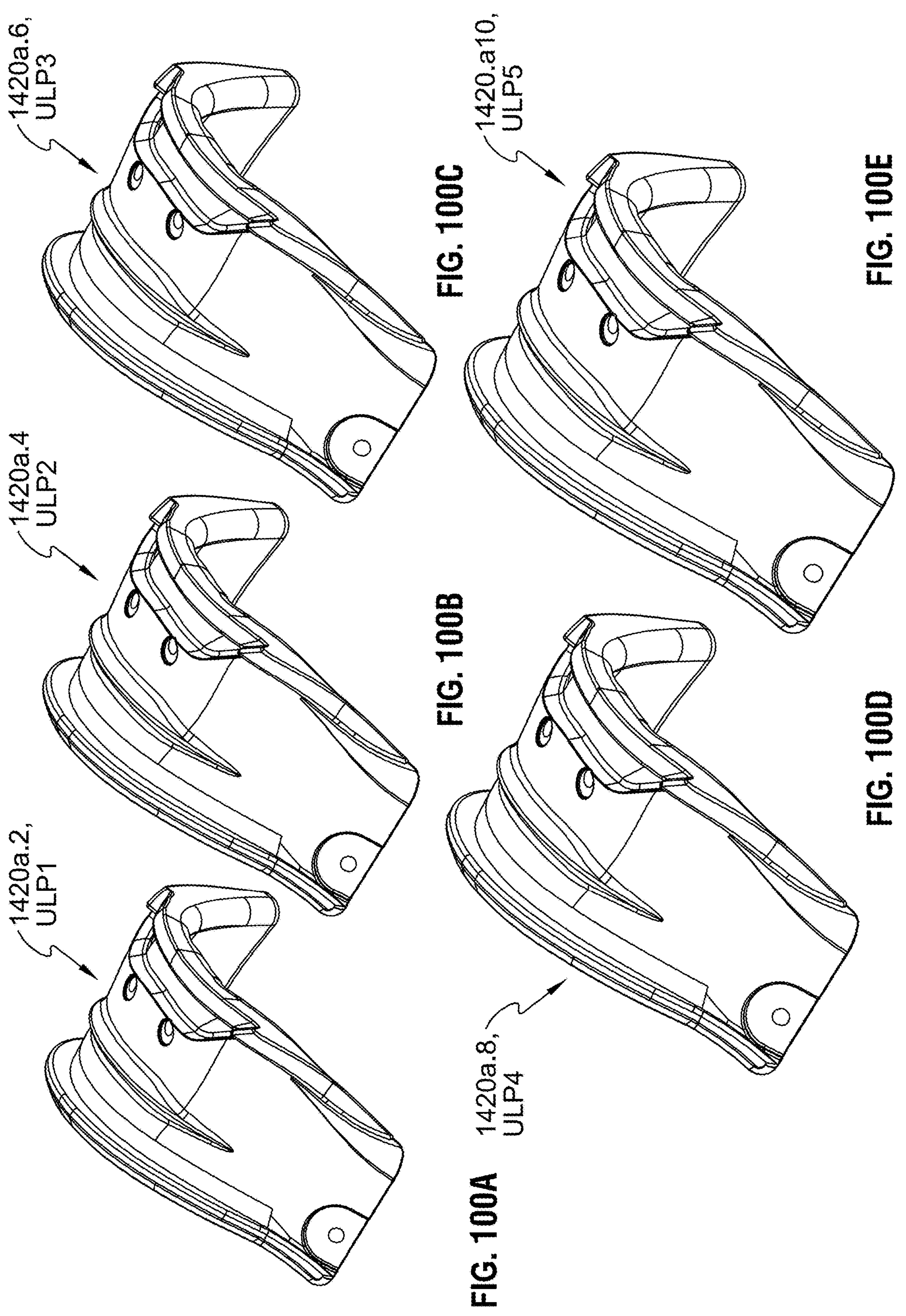
Figures 101A, 101B:
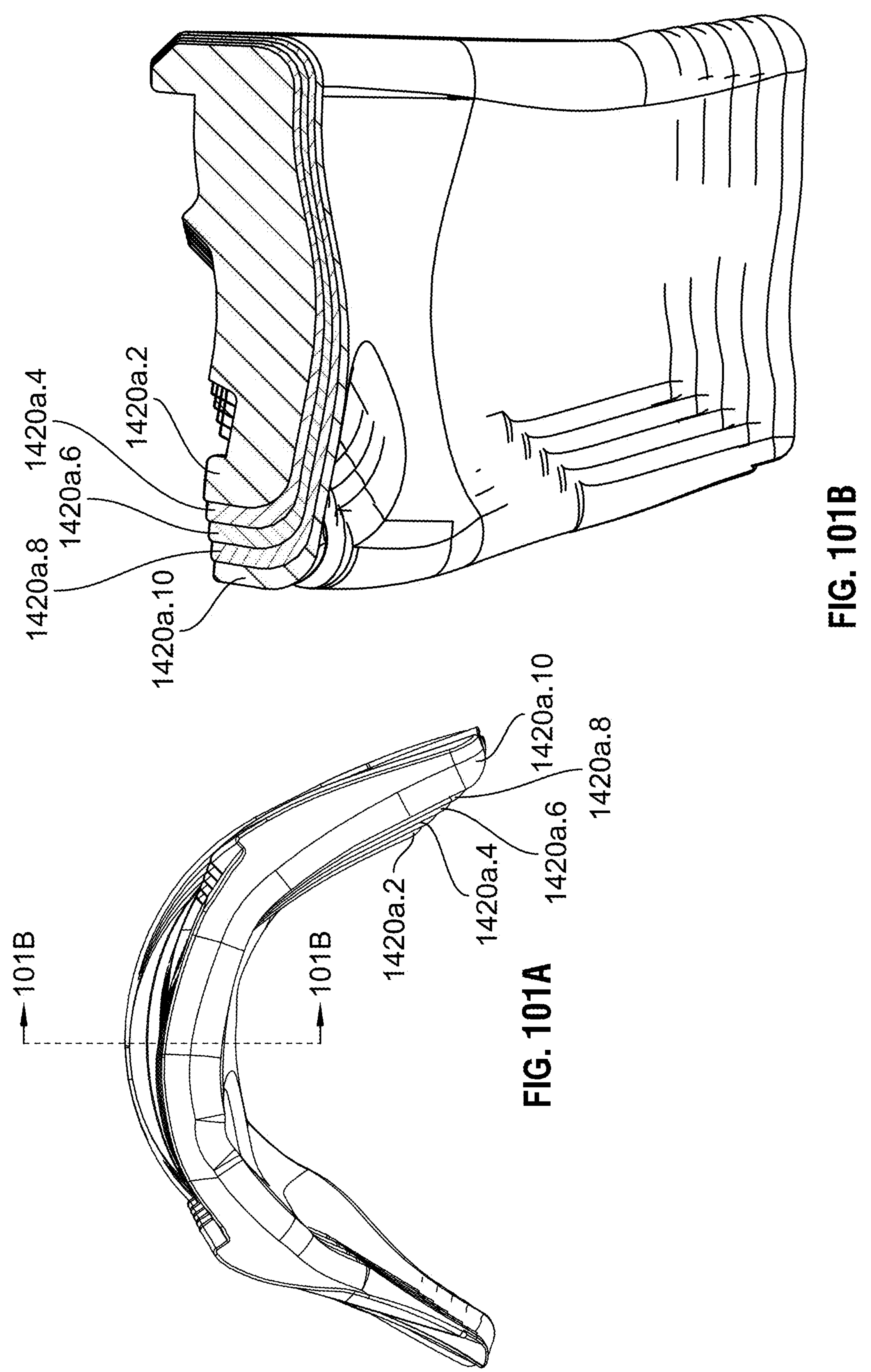
Figures 102A, 102B:
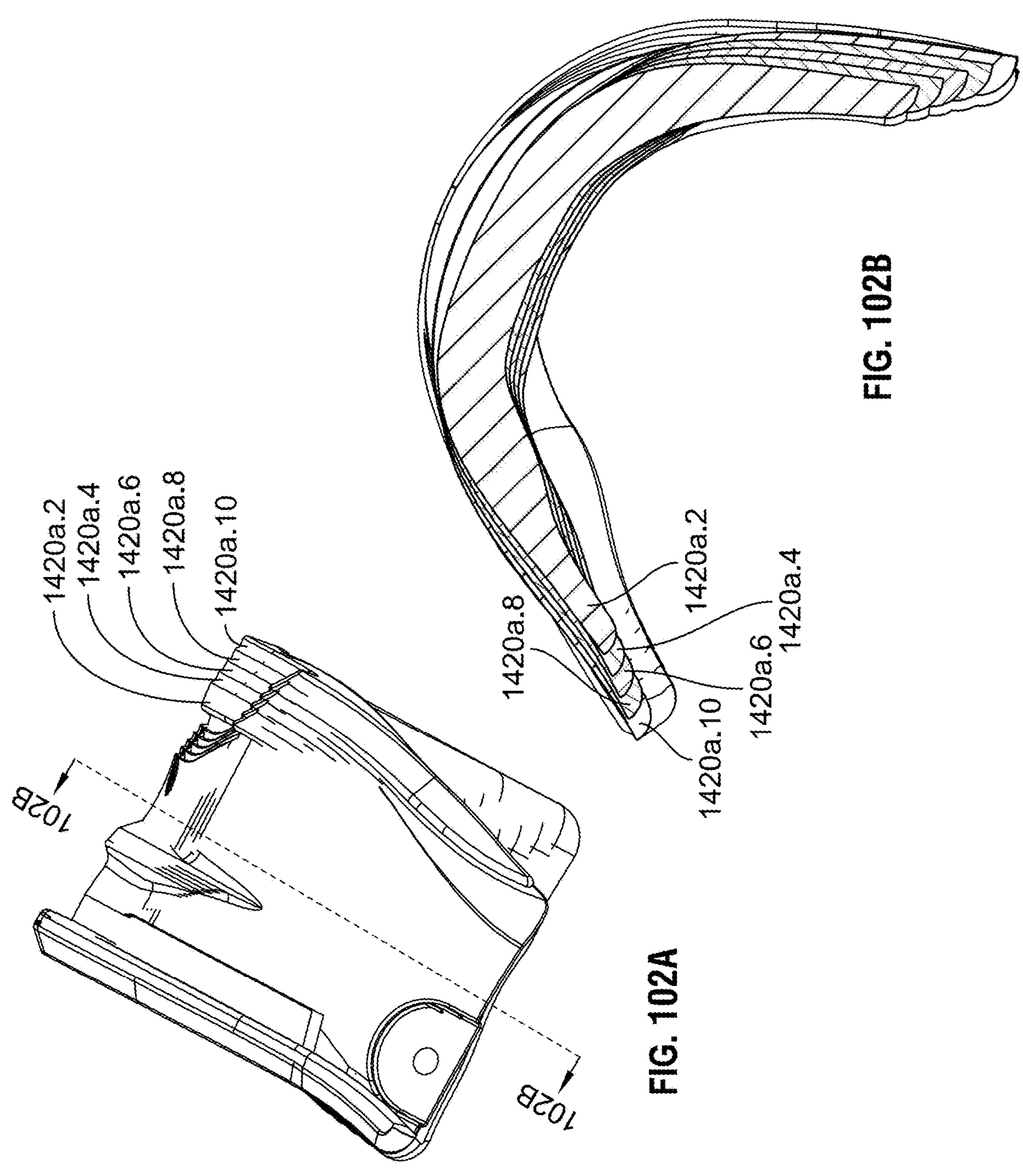

FIGS. 89-93 show that the number of components that can be selected for a given region effect how close the protective sports equipment—namely, the inner surface—can fit the outer surface of the player's body part. Moreover, the number of components in a given region of a protective sports helmet effect how close the inner surface of the energy attenuation assembly can match the topography of the specific player's head. Specifically, FIGS. 89-90 show that increasing the radial number of component will increase how close the energy attenuation assembly can radially match the topography of the specific player's head. Moreover, FIGS. 89-90 increasing the components from 3 to 8 allows for more precise interference fit selection. Additionally, FIGS. 91-93 show that increasing the number of component within a layer will increase how close the energy attenuation assembly can laterally match the topography of the specific player's head. Moreover, FIGS. 89-90 increasing the components from 1 to 34 allows for better adjustment of the curvatures of a player's head. It should be understood that the concepts disclosed in FIGS. 89-93 can be combine to increase or decrease the radial and lateral fits of the equipment. Further, it should be understood that these are only examples and that the number of layer (e.g., shown in FIGS. 89-90) can be any number (e.g., 1-25) and the number of components contained in each layer (e.g., shown in FIGS. 91-93) can be any number (e.g., 1-100).

H. OTHER EMBODIMENTS

1. Protective Assembly for a Human Torso 10

FIGS. 94-102B disclose a protective assembly for a human torso 1010, which is designed to be worn by a player engaged in the play or practice of a contact sport, such as football, lacrosse or hockey. Unlike conventional shoulder pad assemblies, the disclosed human torso protective assembly 1010 is modular. Moreover, the disclosed human torso protective assembly 1010 can include either: (i) a combination of pre-manufactured components that are selected from a plurality of pre-manufactured components based on a specific player's $P_S$ anatomical features—namely, information derived from body part data 110.99 collected using an electronic device, (ii) custom/bespoke components that are custom dimensioned and manufactured for the specific player $P_S$ based on his/her anatomical features—namely, information derived from body part data 110.99 collected using an electronic device, or (iii) a combination of pre-manufactured components and custom/bespoke components.

The modularity of the human torso protective assembly 1010 also allows said assembly 1010 to be configured to adjust the angle at which the upper left and right members 1120*a*, 1120*b* are positioned on and overlying the specific player's body parts intended for protection. In particular, this adjustment can account for variations between: (i) the specific player's anatomical features (e.g., the angle of the player's trapezius muscles or "trap angle") and the anatomical features (e.g., the trap angle) of other players (i.e., that are not the specific player), and (ii) the specific player's $P_S$ left anatomical features (e.g., the trap angle) and the specific player's $P_S$ right anatomical features (e.g., the trap angle). The use of individually selected pre-manufactured components, custom/bespoke components, or a combination thereof allows for the disclosed human torso protective assembly 1010 more closely match the player's anatomical features in comparison to conventional shoulder pad assemblies. Increasing the extent of correspondence or the degree of match between the human torso protective assembly 1010 and player's anatomical features increases the comfort and wearability, minimizes grab points, allows for a low profile design that is more streamlined, and increases the energy attenuation resulting from inbound impacts.

i. Assemblies Contained in the Protective Assembly for a Human Torso

As shown in at least FIG. 94-99, the human torso protective assembly 1010 includes a central opening 1050 through which the player P inserts his/her head to wear the assembly 1010 and which is defined by the combination of portions of both the outer protective member assembly 1100 and the inner energy attenuation assembly 1400. Specifically, the outer protective member assembly 1100 includes a cuirass 1110 and left and right shoulder member assemblies or left and right spaulders 1300*a*, 1300*b*. The cuirass 1110 is comprised of a combination of upper right and left members or left and right arch members 1120*a*, 1120*b*, the lower front left and right members or left and right chest members 1170*a*, 1170*b*, the lower rear left and right members or left and right back members 1230*a*, 1230*b*, and a central member or sternum member 1270. The left and right shoulder member assemblies are comprised of a combination of upper left and right shoulder members or left and right epaulets 1310*a*, 1310*b* and lower left and right shoulder members or left and right caps 1360*a*, 1360*b*.

The components of the outer protective member assembly 1100 are coupled to one another using a securement assembly 1700 that includes flexible straps, belts, links, and bands that can be cut during an emergency in order to remove the human torso protective assembly 1010 from the player P, even when the player P is lying supine on the ground or playing field. In particular, the securement assembly 1700 is comprised of: (i) strap assemblies 1710 that include an upper front strap or upper sternum strap 1720, an upper rear strap or upper rear strap 1730, a lower front strap or lower sternum strap 1740, a lower rear strap or lower rear strap 1750, and a retaining strap or middle sternum strap 1760, (ii) middle, arch, or pectoral coupler assembly 1800 that includes front left and right, arch, or pectoral link 1810*a*, 1810*b*, and rear left and right, arch, or pectoral link 1830*a*, 1830*b*, (iii) shoulder band assemblies 1850 that include upper left and right bands 1860*a*, 1860*b*, and lower left and right bands 1870*a*, 1870*b*, and (iv) left and right belt assemblies 1900 that include left and right belts 1910*a*, 1910*b*, left and right belt couplers 1920*a*, 1920*b*, a slot connector 1960*a*, 1960*b*, and a pivot connector 1970*a*, 1970*b*. Here, the traditional buckles that are utilized on conventional shoulder pad assemblies have been replaced with a securement assembly 1700 that includes both left and right belts 1910*a*, 1910*b* and both left and right belt couplers 1920*a*, 1920*b*. These couplers 1920*a*, 1920*b* are directly attached to the lower left and right front members and can rotate around a central axis. Additional information about the functionality of these couplers 1920*a*, 1920*b* is disclosed in connection with US. Provisional application 61/861,536 and U.S. utility application Ser. No. 17/741,523, both of which are hereby incorporated by reference.

The disclosed combination of the upper left and right members 1120*a*, 1120*b* along with the lower left and right members 1170*a*, 1170*b*, 1230*a*, 1230*b* enables the human torso protective assembly 1010 to: (i) be more durable than conventional shoulder pads, (ii) provide the player with a higher degree of mobility than what is possible with a conventional shoulder pad, (iii) increases the human torso protective assembly's 1010 stability and proper positioning on the player P in comparison with conventional shoulder pads, especially after the assembly 1010 receives multiple impacts in a single play or during a short time interval, (iv) have more complicated geometries in comparison to conventional shoulder pads, (v) utilize less complicated tools to create the desired geometries in comparison to the tools that would need to be utilized to create the same geometries in conventional shoulder pads, and (vi) permit greater articulation and range of motion between the various members and energy attenuation components that is not possible with conventional shoulder pads.

The inner energy attenuation assembly 1400 includes distinct energy attenuation components affixed to distinct components of the outer protective member assembly 1100. Specifically, the inner energy attenuation assembly 1400 includes a torso energy attenuation assembly 1410 and left and right shoulder energy attenuation assemblies 1600. The torso energy attenuation assembly 1410 is comprised of upper left and right energy attenuation components or left and right arch energy attenuation components 1420*a*, 1420*b*, lower left and right front energy attenuation components or left and right chest energy attenuation components 1470*a*, 1470*b*, lower left and right rear energy attenuation components or left and right rear energy attenuation components 1520*a*, 1520*b*, and central energy attenuation component or sternum energy attenuation component 1570. Additionally, the left and right shoulder energy attenuation assemblies 1600 include upper left and right shoulder energy attenuation components or left and right epaulets energy attenuation components 1610*a*, 1610*b*, and lower left and right shoulder energy attenuation components or left and right cap energy attenuation components 1660*a*, 1660*b*.

The outer protective member assembly 1100 of the human torso protective assembly 10 includes members having variable thicknesses. Similarly, the inner energy attenuation assembly 1400 includes energy attenuation components that have variable thicknesses. These thicknesses vary or change throughout the outer protective member assembly 1100 and/or the inner energy attenuation assembly 1400 in order to: (i) optimize impact energy attenuation and thus increase the protection factor of the assembly 1010, (ii) improve the fit of said human torso protective assembly 1010, and (iii) reduce the distance the members are offset from the player's body, which reduces the overall profile of the protective assembly 1010 on the player's P torso. In particular, the reduction of the distance the members are offset from the player is beneficial because it reduces the number of points that the opposing player can grab and/or pull, while also providing the assembly 1010 with a sleek, aesthetically appealing look that is preferred by players P engaged in the play of contact sports.

ii. Assemblies Contained in the Protective Assembly for a Human Torso

The components and/or assembly contained in the human torso protective assembly 1010 may be selected from a plurality of components and/or a plurality of assemblies based upon player data 109.99, wherein said selection may be done using any one of the above described methods. In particular, any of the described methods may be used to: (i) select a single pre-manufactured component (e.g., left chest member 1170*a* or central energy attenuation component 1570), (ii) multiple pre-manufactured components (e.g., right spaulders 1300*b* or left energy attenuation assembly 1600), (iii) an entire pre-manufactured assembly (e.g., inner energy attenuation assembly 1400), or (iv) a protective sports helmet (e.g., entire human torso protective assembly 1010). Additionally, a selection of a first components and/or assembly may be utilized to: (i) directly select other components, assemblies, or products, (ii) indirectly select other components and/or assemblies based on algorithms or methodologies that utilize neural networks, artificial intelligence, machine learning, linear regression analysis, combinations of the same, and/or any know method of selecting a component, assembly, or product based on the selection of a first component, (iii) indirectly select other component based player information 109.2.99 (e.g., player level, position, or age), and/or player impact data 109.4.99.

The below table shows a list of potential pre-manufactured components contained in the outer protective member assembly 1100 that may be selected from for a specific player. Moreover, an upper left member 1120*a* (e.g., Size 2—ULM3) of a specific player's human torso protective assembly 1010 may be selected from the 38 pre-manufactured left members 1120*a* shown in the below. In another example, the specific player's human torso protective assembly 1010 may include a central member 1270 (e.g., size 1—CM2) that has been selected from the 15 pre-manufactured central members 1270 shown in the below. In particular, FIGS. 100A-102B, shows five different left arch energy attenuation components 1420*a*.2-1420.10—namely, ULP1-ULP5—for a size 3. It should be understood that the below table is a non-limiting example of the pre-manufactured components of the outer protective member assembly 1100. As such, it should be understood that there may be less or more sizes and configurations of components contained within the outer protective member assembly 1100. Further, some components (e.g., central member 1270) may be common for all players.

| Overall Size | Upper Left/ Right Member 1120a, 1120b | Lower Left/ Right Front Member 1170a. 1170b | Lower Left/ Right Rear Member 1230a 1230b | Central Member 1270 | Upper Left/ Right Shoulder Member 1310a, 1310b | Lower Left/ Right Shoulder Member 1360a, 1360b |
|---|---|---|---|---|---|---|
| Size 1 | ULM1 | LLFM1 | LLRM1 | CM1 | ULSM1 | LLSM1 |
| | ULM2 | LLFM2 | LLRM2 | CM2 | ULSM2 | LLSM2 |
| | ULM3 | LLFM3 | | | ULSM3 | |
| | ULM4 | LLFM4 | | | ULSM4 | |
| | ULM5 | LLFM5 | | | ULSM5 | |
| | ULM6 | LLFM6 | | | ULSM6 | |
| | ULM7 | LLFM7 | | | | |
| | ULM8 | | | | | |
| | ULM9 | | | | | |
| Size 2 | ULM1 | LLFM1 | LLRM1 | CM1 | ULSM1 | LLSM1 |
| | ULM2 | LLFM2 | | CM2 | ULSM2 | LLSM2 |
| | ULM3 | LLFM3 | | CM3 | ULSM3 | LLSM3 |
| | ULM4 | LLFM4 | | CM4 | ULSM4 | |
| | ULM5 | | | | ULSM5 | |
| | ULM6 | | | | | |
| | ULM7 | | | | | |
| | ULM8 | | | | | |
| | ULM9 | | | | | |
| Size 3 | ULM1 | LLFM1 | LLRM1 | CM1 | ULSM1 | LLSM1 |
| | ULM2 | LLFM2 | LLRM2 | CM2 | ULSM2 | LLSM2 |
| | ULM3 | LLFM3 | LLRM3 | CM3 | ULSM3 | LLSM3 |
| | ULM4 | LLFM4 | LLRM4 | CM4 | | LLSM4 |
| | ULM5 | LLFM5 | | CM5 | | LLSM5 |
| | ULM6 | LLFM6 | | | | LLSM6 |
| Size 4 | ULM1 | LLFM1 | LLRM1 | CM1 | ULSM1 | LLSM1 |
| | ULM2 | LLFM2 | LLRM2 | CM2 | ULSM2 | |
| | ULM3 | LLFM3 | LLRM3 | CM3 | ULSM3 | |
| | ULM4 | LLFM4 | LLRM4 | | ULSM4 | |
| | ULM5 | LLFM5 | LLRM5 | | ULSM5 | |
| | ULM6 | LLFM6 | | | ULSM6 | |
| | ULM7 | LLFM7 | | | ULSM7 | |
| | ULM8 | LLFM8 | | | ULSM8 | |
| Size 5 | ULM1 | LLFM1 | LLRM1 | CM1 | ULSM1 | LLSM1 |
| | ULM2 | LLFM2 | LLRM2 | | ULSM2 | LLSM2 |
| | ULM3 | LLFM3 | LLRM3 | | | LLSM3 |
| | ULM4 | | | | | LLSM4 |
| | ULM5 | | | | | LLSM5 |
| | ULM6 | | | | | LLSM6 |
| | | | | | | LLSM7 |

The below table shows a list of potential pre-manufactured components contained in the inner energy attenuation assembly 1400 that may be selected from for a specific player. Moreover, a right rear energy attenuation component 1520*a* (e.g., Size 3—LLRP1) of a specific player's human torso protective assembly 1010 may be selected from the 13 pre-manufactured right rear energy attenuation component 1520*a* shown in the below. In another example, the specific player's human torso protective assembly 1010 may include a lower left shoulder energy attenuation component 1660*a* (e.g., size 5—LLSP4) that has been selected from the 30 pre-manufactured lower left shoulder energy attenuation component 1660*a* shown in the below. It should be understood that the below table is a non-limiting example of the pre-manufactured components of the inner energy attenuation assembly 1400. As such, it should be understood that there may be less or more sizes and configurations of components contained within the inner energy attenuation assembly 1400. Further, some components (e.g., central member 1270) may be common for all players. It should be understood that the selection of the upper left member 1120*a* may be different from the selection of the upper right member 1120*b*. Moreover, the human torso protective assembly 1010 may not be symmetric about the sagittal plane; however, it should be understood that said human torso protective assembly 1010 may be symmetric about the sagittal plane. This is beneficial because it allows the human torso protective assembly 1010 to be uniquely adapted to the specific player's body.

permit the system 10 is selecting component(s), assemblies, or a product (e.g., complete human torso protective assembly 1010) from a plurality of component(s), assemblies, or a product (e.g., complete human torso protective assembly 1010). Said anatomical features may include: (i) locations or positions in space of: (a) acromioclavicular joint (AC), (b) jugular notch (JN), (c) xyphoid process (XP), (d) armpit (AP), (ii) distances of: (a) trap or acromioclavicular joint

| Overall Size | Upper Left/Right Component 1420a, 1420b | Lower Left/Right Front Component 1470a, 1470b | Lower Left/Right Rear Component 1520a, 1520b | Central Component 1570 | Upper Left/Right Shoulder Component 1610a, 1610b | Lower Left/Right Shoulder Component 1660a, 1660b |
|---|---|---|---|---|---|---|
| Size 1 | ULP1 | LLFP1 | LLRP1 | CP1 | ULSP1 | LLSP1 |
| | ULP2 | LLFP2 | | | ULSP2 | LLSP2 |
| | ULP3 | LLFP3 | | | | LLSP3 |
| | ULP4 | LLFP4 | | | | LLSP4 |
| | ULP5 | LLFP5 | | | | LLSP5 |
| | ULP6 | LLFP6 | | | | LLSP6 |
| | ULP7 | LLFP7 | | | | |
| Size 2 | ULP1 | LLFP1 | LLRP1 | CP1 | ULSP1 | LLSP1 |
| | ULP2 | LLFP2 | LLRP2 | CP2 | | LLSP2 |
| | ULP3 | LLFP3 | | CP3 | | LLSP3 |
| | | LLFP4 | | CP4 | | |
| Size 3 | ULP1 | LLFP1 | LLRP1 | CP1 | ULSP1 | LLSP1 |
| | ULP2 | LLFP2 | LLRP2 | CP2 | ULSP2 | LLSP2 |
| | ULP3 | LLFP3 | | | ULSP3 | LLSP3 |
| | ULP4 | LLFP4 | | | ULSP4 | LLSP4 |
| | ULP5 | LLFP5 | | | ULSP5 | LLSP5 |
| | | LLFP6 | | | ULSP6 | LLSP6 |
| | | | | | ULSP7 | LLSP7 |
| | | | | | | LLSP8 |
| | | | | | | LLSP9 |
| Size 4 | ULP1 | LLFP1 | LLRP1 | CP1 | ULSP1 | LLSP1 |
| | ULP2 | LLFP2 | LLRP2 | | ULSP2 | LLSP2 |
| | ULP3 | LLFP3 | LLRP3 | | ULSP3 | LLSP3 |
| | | LLFP4 | LLRP4 | | ULSP4 | LLSP4 |
| | | LLFP5 | LLRP5 | | ULSP5 | LLSP5 |
| | | LLFP6 | | | ULSP6 | |
| | | LLFP7 | | | ULSP7 | |
| | | LLFP8 | | | | |
| Size 5 | ULP1 | LLFP1 | LLRP1 | CP1 | ULSP1 | LLSP1 |
| | ULP2 | LLFP2 | LLRP2 | CP2 | ULSP2 | LLSP2 |
| | ULP3 | LLFP3 | LLRP3 | CP3 | | LLSP3 |
| | ULP4 | | | CP4 | | LLSP4 |
| | ULP5 | | | CP5 | | LLSP5 |
| | ULP6 | | | | | LLSP6 |
| | ULP7 | | | | | LLSP7 |
| | ULP8 | | | | | |
| | ULP9 | | | | | |

The sizes and number of components contained within each size may be pre-determined (e.g., determined before the fitting of the specific player) based upon data that has previously been collected from players or from other sources. In particular, player information (including player body part data) may be collected using any step described above and then manipulated using any known clustering, tabulating, or sorting method including density-based, distribution-based, centroid-based, hierarchical-based, K-means clustering, or any other methods disclosed within U.S. Provisional Application No. 62/719,130. Once the information has been manipulated, then said information can be used to generate an idea player for each cluster, tabulation, and/or group. Said idea players can then be used to form a plurality of pre-manufactured component(s), assemblies, or a product (e.g., complete human torso protective assembly 1010).

iii. Examples of the Protective Assembly for Different Players

Figure 103:
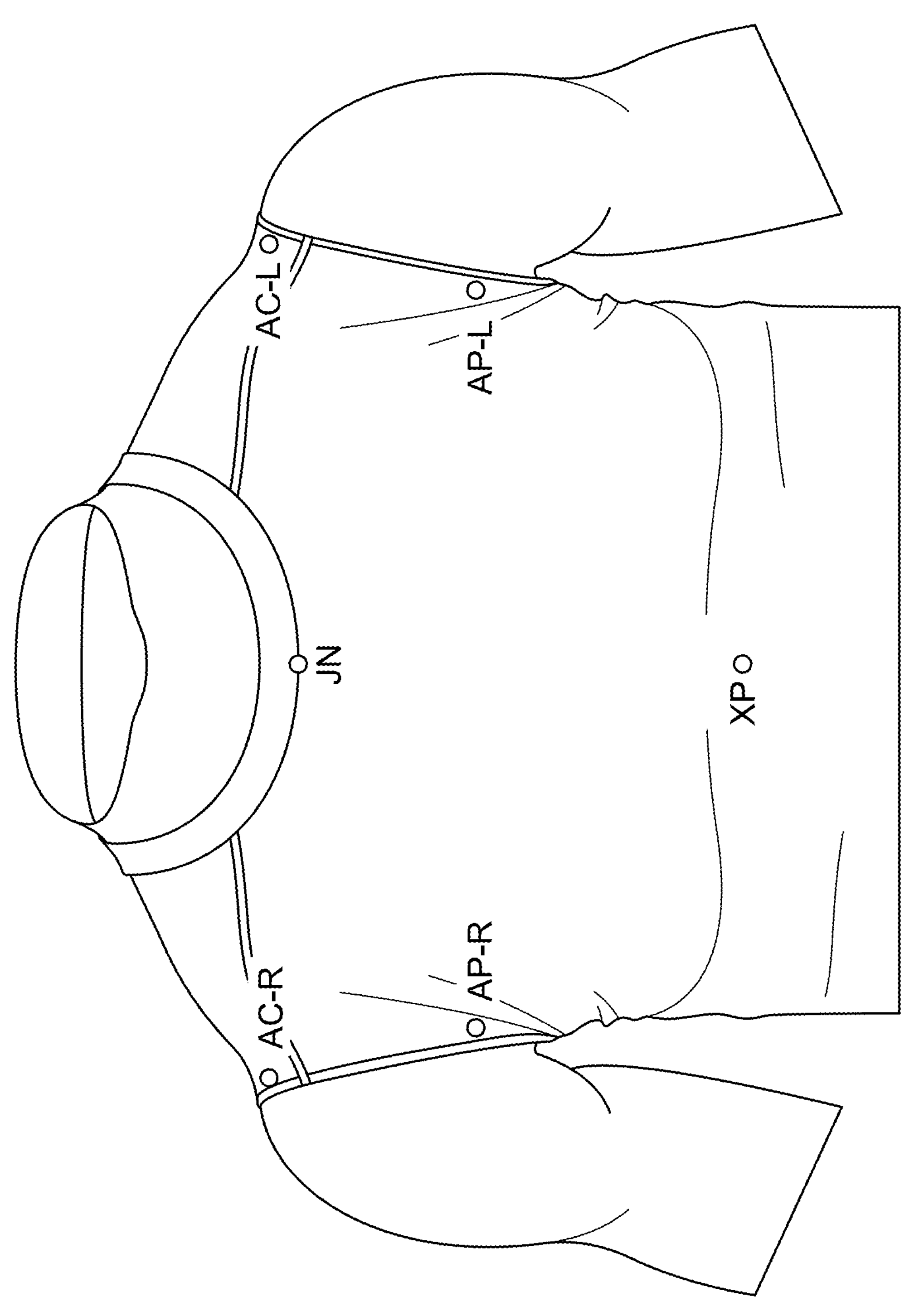
Figure 104:
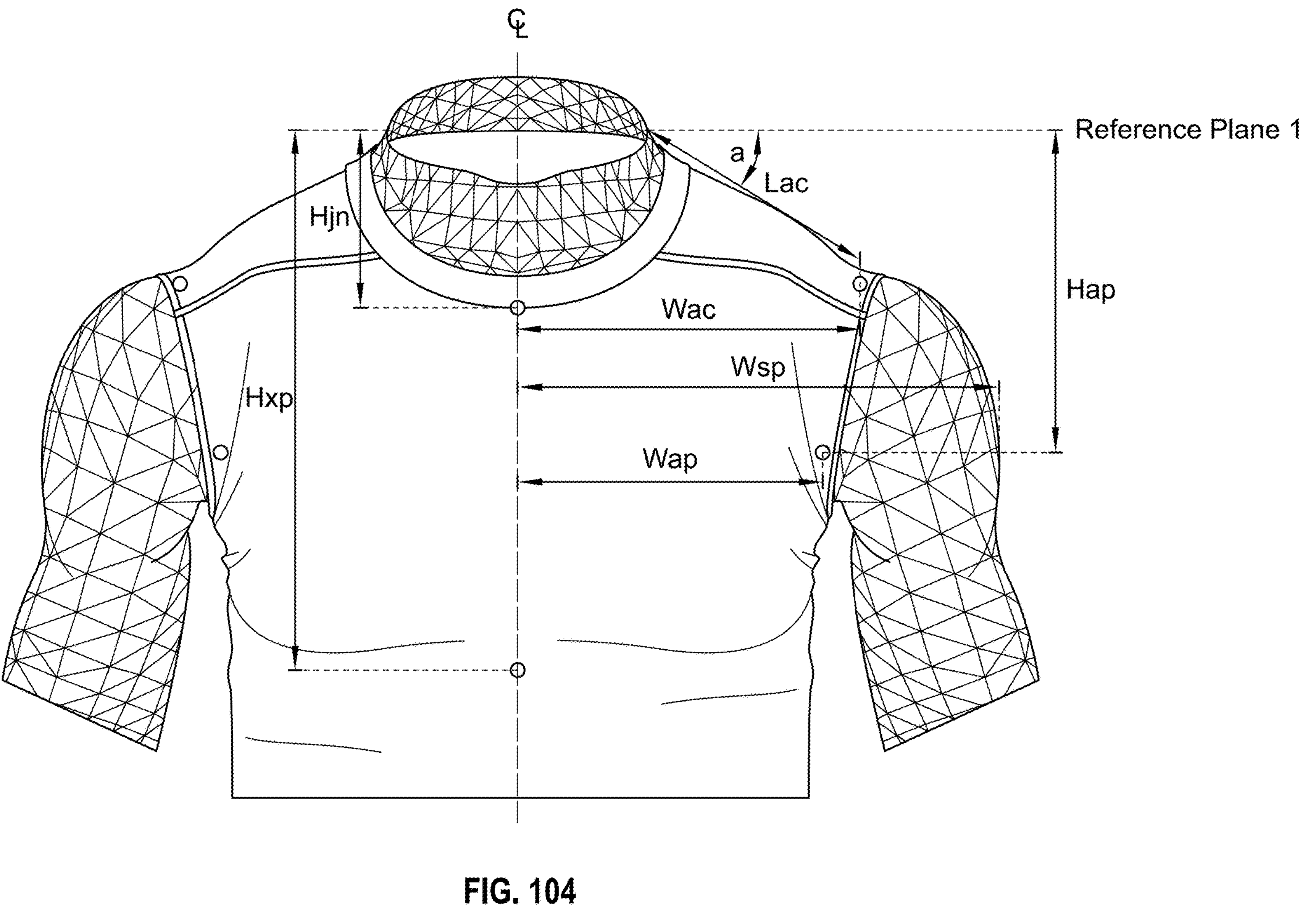
Figure 105:
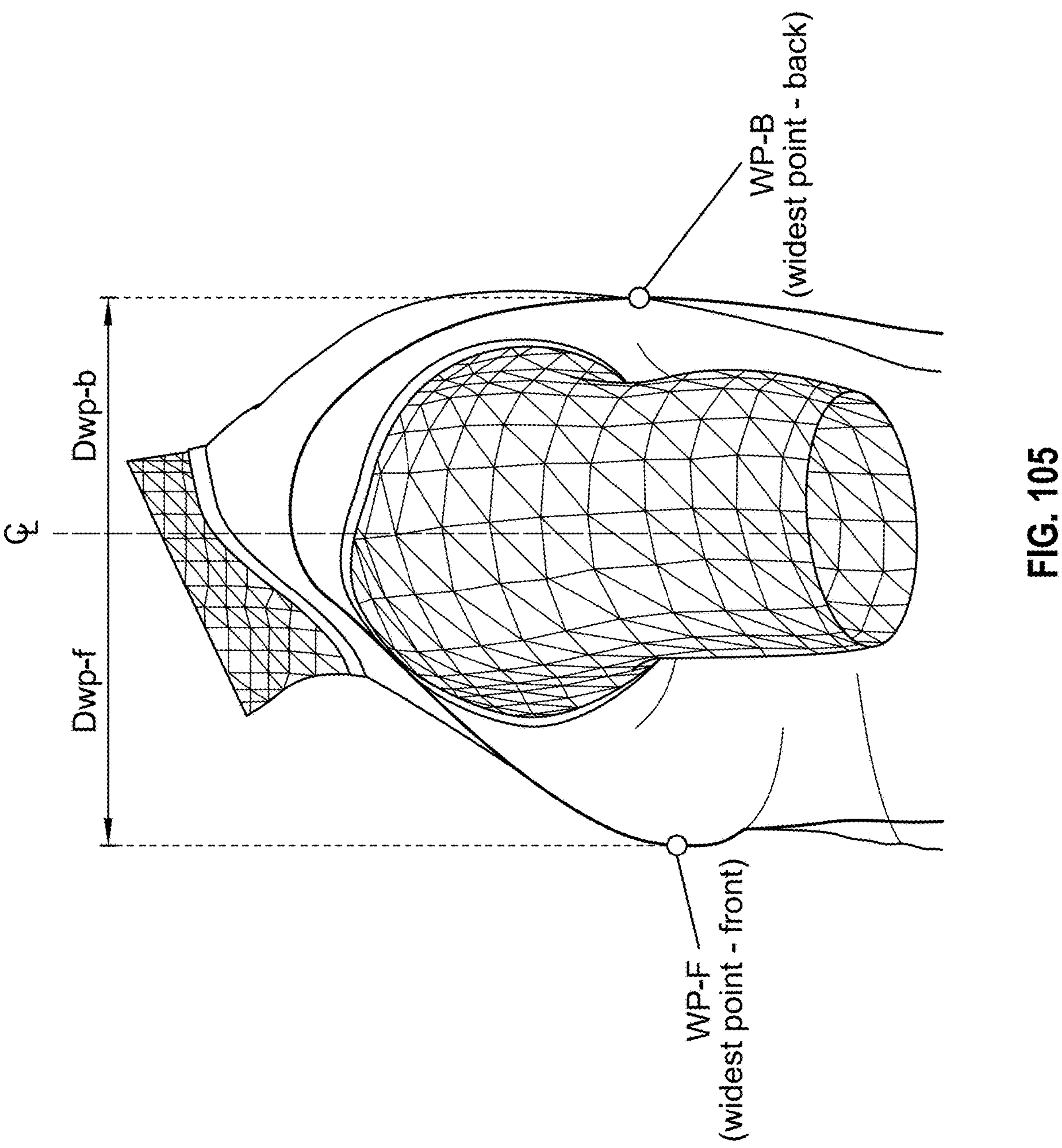

FIGS. 103-105 show that some of the anatomical features that the electronic device may collect data about in order to angle from horizontal/reference plane, (b) trap or acromioclavicular joint length (Lac), (c) jugular notch height (Hjn), (d) xyphoid process height (Hxp), (e) armpit height (Hap), (f) armpit width (Wap), (g) acromioclavicular joint width (Wac), (h) shoulder width (Wsp), (i) depth widest point front (Dwp-f), and/or (j) depth widest point back (Dwp-b). The collected player body part data can then be analyzed and compared by the system 10 against pre-defined data sets that have been previously determined. Based on the comparison between the player body part data and the data sets, the system 10 may recommend: (i) a combination of pre-manufactured component(s), pre-manufactured assemblies, or a pre-manufactured product, or (ii) a combination of pre-manufactured component(s), pre-manufactured assemblies, bespoke component(s), bespoke assemblies, or bespoke product. The system 10 can then use this recommendation to identify (step 800) and assemble (step 900) the protective sports equipment.

In this embodiment, the optimal combination of pre-manufactured components that "best fit" the player's body part (e.g., torso) are not specifically designed to provide an interference fit between the selected pre-manufactured components and the player's body part when the protective sports equipment (e.g., human torso protective assembly 1010) is worn by the specific player. Instead, said optimal combination of pre-manufactured components that "best fit" the player's body part have an inner surface that substantially matches the outer surface of the player's body part. Alternatively, said optimal combination of pre-manufactured components that "best fit" the player's body part have an inner surface is the closer to the outer surface of the player's body part then all other combinations of pre-manufactured components. It should be understood that a minor amount of pre-compression of some aspects of the optimal combination of pre-manufactured components that "best fit" the player's body part may be present when said optimal combination of pre-manufactured components are worn by the player. However, said optimal combination of pre-manufactured components are not specifically designed to be pre-compressed when the optimal combination of pre-manufactured components are worn by the player. It should also be understood that any method (e.g., distance, volume, area, models, curvilinear data, pressures, point locations, planes, etc.) disclosed herein might be used to select the pre-manufactured component(s), pre-manufactured assemblies, or a pre-manufactured product for the specific based on the specific player's anatomical features.

Using the above described anatomical features in connection with the system 10, two different versions of the torso protective assembly 1010 (shown in FIGS. 98-99) were formed based on information derived from data collected from that player using an electronic device. In comparing each of these versions to one another it can be seen that each version of the torso protective assembly 1010 has a unique configuration and is specifically tailored to one of the specific players, as demonstrated by the color-coded components. Moreover, different components were identified and selected for each of the identified players from the above charts. In particular, the first version that is configured for the first player, where said player's anatomical features are symmetric along the sagittal plane. Thus, the components contained in the right half of the torso protective assembly 1010 match the components contained in the left half of the torso protective assembly 1010.

The second version of the torso protective assembly 1010 that is configured for a second. In comparison to the first version, the second version of the torso protective assembly 1010 is not symmetric along the sagittal plane. As discussed above, the system selected different components for the second version of the torso protective assembly 1010 in comparison to the first version of the torso protective assembly 1010 primarily based on information derived from data collected from the second player using an electronic device. It should be understood that these combination are designed to illustrate the functionality of the system 10 and the design modularity and flexibility it provides for the torso protective assembly 1010 wherein each component of that assembly 10 can be individually selected for a particular player to ensure that the assembly 1010 provides premium energy attenuation performance and fit.

2. Fitting of Other Sports Equipment Using the Disclosed System

Figure 106:
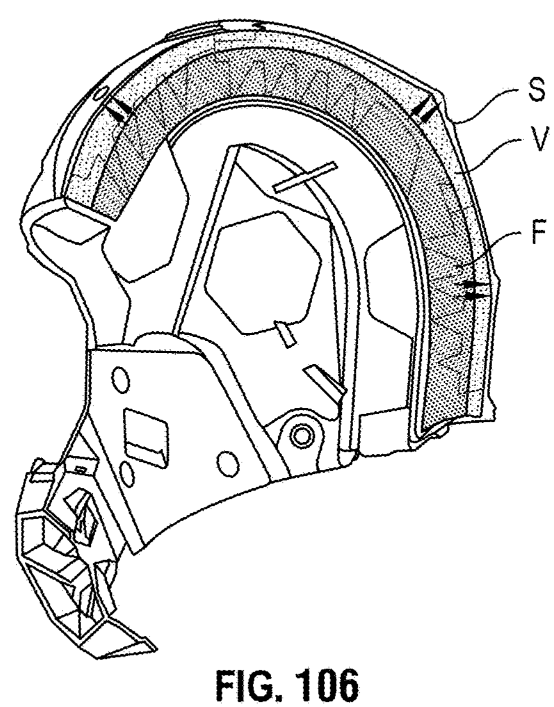

FIG. 106 discloses a protective sports helmet, specifically a protective recreational sports helmet, and more specifically a motorsports helmet. Said motorsports helmet includes: (i) an outer shell, S, (ii) a variable layer V positioned adjacent to the shell, and (iii) a fixed layer F positioned between the variable layer and the wearer's head. In this embodiment, the system 10 can use the body part data 110.99 to select the size/configuration of the outer shell S and variable layer V. The body part data 110.99 may not separately alter the size/configuration of the fixed layer F.

Figure 107:
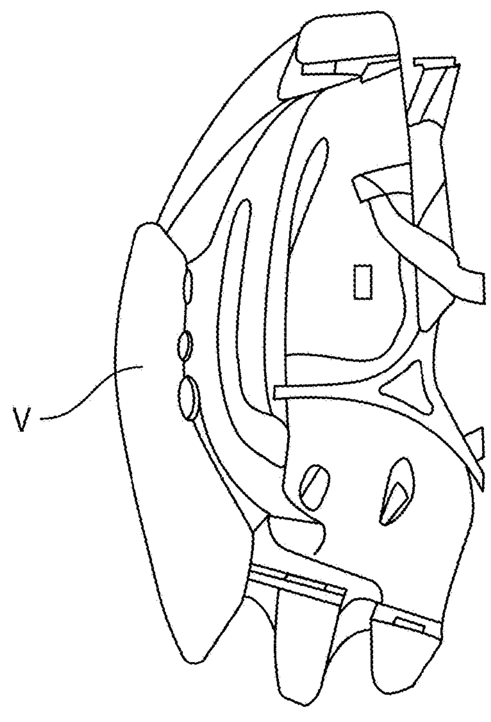
Figure 108:
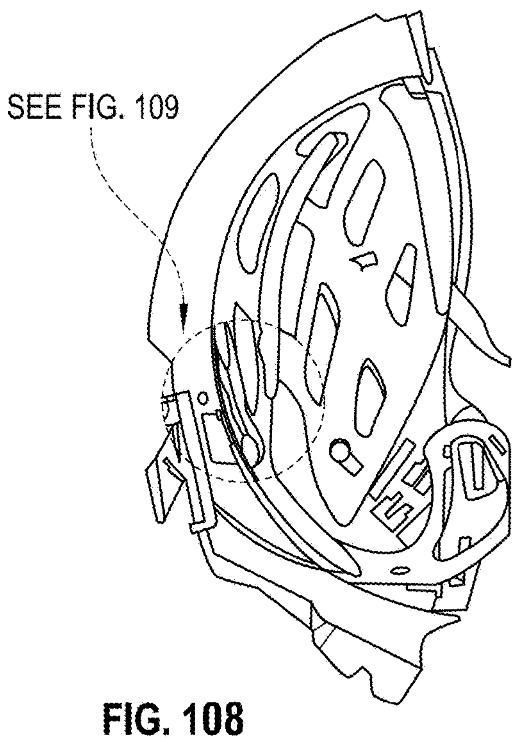
Figure 109:
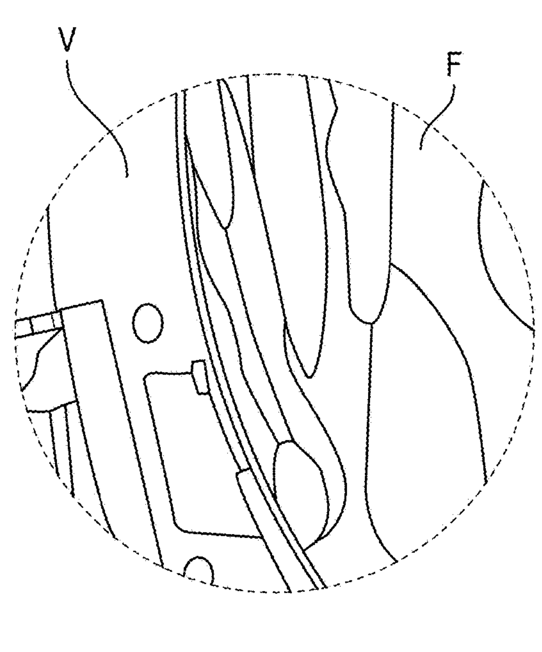

FIG. 107 discloses a protective sports helmet, specifically a protective recreational sports helmet, and more specifically a first embodiment of a cycling helmet. Said cycling helmet includes a variable layer V and omits a shell and a fixed layer. In this embodiment, the system 10 can use the body part data 110.99 to select the size/configuration of the variable layer V. In other embodiments, the protective recreational sports helmet may only have a specific size for the entire product and said system 10 may use the body part data 110.99 to select the helmet product size that based fits the player.

FIGS. 108-109 and 112-113 disclose a protective sports helmet, specifically a protective recreational sports helmet, and more specifically a second and fourth embodiments of a cycling helmet. Said cycling helmets includes a variable layer V and a fixed layer F, but omits a shell. In this embodiment, the system 10 can use the body part data 110.99 to select the size/configuration of the variable layer V. Regardless of the body part data 110.99, every wearer will have the same fixed layer F. In other embodiments, the protective recreational sports helmet may only have a specific size for the entire product and said system 10 may use the body part data 110.99 to select the helmet product size that based fits the player.

FIG. 110-111 disclose a protective sports helmet, specifically a protective recreational sports helmet, and more specifically a second embodiment of a cycling helmet. Said cycling helmet includes a variable layer V and two fixed layers F, but omits a shell. In this embodiment, the system 10 can use the body part data 110.99 to select the size/configuration of the variable layer V. Regardless of the body part data 110.99, every wearer will have the same fixed layers F. In other embodiments, the protective recreational sports helmet may only have a specific size for the entire product and said system 10 may use the body part data 110.99 to select the helmet product size that based fits the player.

FIG. 114 disclose a first embodiment of a chest protector that include: (i) front and rear exterior components S, (ii) two arm components A, and (iii) front and rear energy attenuation components E. Like the above disclosed embodiment, the system 10 can use the body part data 110.99 to select the size/configuration of each component contained in said first embodiment of a chest protector.

FIG. 115 disclose a second embodiment of a chest protector that includes: (i) front and rear exterior components S, and (ii) front and rear energy attenuation components E. In this embodiment, the system 10 can use the body part data 110.99 to select the size/configuration of the front and rear exterior components S. The body part data 110.99 will not separately alter the size/configuration of the fixed layer F.

FIG. 116 disclose a third embodiment of a chest protector that includes: (i) center component C, and (ii) left and right side components S. In this embodiment, the system 10 can use the body part data 110.99 to select the size/configuration of the center, left, and right components. Said energy attenuation components are coupled to the exterior of the chest protector and are not separately altered by the body part data 110.99.

FIG. 117 discloses a pair of gloves. Said gloves come in different sizes and do not include separate layers or shells.

As such, the system 10 can use the body part data 110.99 to select the size/configuration of the overall product (i.e., gloves).

FIG. 118 disclose a shoe that includes: (i) midsole, (ii) outsole, (iii) insole, (iv) sockliner, (v) tongue, (vi) heel collar, (vii) heel counter, (viii) gel cushioning, and (ix) space trusstic. In this embodiment, the system 10 can use the body part data 110.99 to select the size/configuration of the each and every one of these components.

FIG. 119A-119B disclose a ski boot that includes: (i) shell, (ii) footbed, (iii) toe lip, (iv) heel lip, (v) liner, and (vi) flex adjustment. In this embodiment, the system 10 can use the body part data 110.99 to select the size/configuration of the each and every one of these components.

FIG. 120 disclose a first embodiment of a shin guard that includes: (i) an upper component U, (ii) middle component M, (iii) lower component L, (vi) upper fixed layer UF, (v) middle fixed layer MF, and (vi) lower fixed layer LF. In this embodiment, the system 10 can use the body part data 110.99 to select the size/configuration of the upper, middle, and lower components. The body part data 110.99 will not separately alter the size/configuration of the upper, middle, and lower fixed layer F.

FIG. 121 disclose a second embodiment of a shin guard that includes: (i) an outer component O, and (ii) a fixed layer F. In this embodiment, the system 10 can use the body part data 110.99 to select the size/configuration of the outer component. The body part data 110.99 will not separately alter the size/configuration of the fixed layer F.

FIG. 122 discloses a pair of elbow energy attenuation components that include: (i) an upper component U, (ii) middle component M, (iii) lower component L, (vi) upper fixed layer UF, (v) middle fixed layer MF, and (vi) lower fixed layer LF. In this embodiment, the system 10 can use the body part data 110.99 to select the size/configuration of the upper, middle, and lower components. The body part data 110.99 will not separately alter the size/configuration of the upper, middle, and lower fixed layer F.

The following disclosure relates to different/alternative embodiments of the protective sports equipment:

- The protective sports equipment may not include a shell or outer layer. Instead, said protective sports equipment may only include an energy attenuation assembly.
- The protective sports equipment may not include an energy attenuation assembly and instead may only include an outer layer/shell.
- The protective sports equipment may only include a variable layer.
- The shell and the variable layer may be integrated into a single unit. The fixed layer may be positioned on either side (e.g., inside/adjacent to the player's body part or outside/separated from the player's body part) of the unit. Alternatively, the fixed lay may be omitted.
- The protective sports equipment may not have individual components that can be selected. Instead, said system may be used to select an equipment size from a plurality of equipment sizes.
- The protective sports equipment may include any number of fixed layers (e.g., between 0 and 100) or any number of variable layers (e.g., between 0 and 100). Additionally, said layers may be arranged in any positional relationship in connection with each other and the shell. For example, the protective sports equipment may include a variable layer that is positioned between two fixed layers.
- The components of the fixed layer may not have a substantially uniform compression deflection ("CD") ratio and may not have the same configuration for all player's regardless of head topography (e.g., different size fixed layers depending on the size shells).
- The fixed layer may be positioned adjacent to the inner surface of the shell and the variable layer may be positioned adjacent or nearly adjacent to the player's head.
- The fixed layer may include a single monolithic component or any number of energy attenuation components (e.g., between 0 and 1,000 components) that are designed to be positioned adjacent (e.g., edge to edge (lateral/radial arrangement) or outer surface to inner surface (vertical stack)) to one another. Moreover, the fixed layer may have between 1 and 25 layers and between 1 and 100 components contained in each layer.
- The variable layer may include a single monolithic component or any number of energy attenuation components (e.g., between 0 and 1,000) that are designed to be positioned adjacent (e.g., edge to edge (lateral/radial arrangement) or outer surface to inner surface (vertical stack)) to one another. Specifically, decreasing the number of energy attenuation components in the variable layer will reduce the ability for the energy attenuation assembly to: (i) have an inner surface that substantially mirrors the outer surface/locus of the player's head/an outer surface/locus derived from the player's head, and/or (ii) apply the idea pressure on the player's head when the protective sports equipment is in the worn, but pre-impact state (see FIG. 52). In contrast, increasing the number of energy attenuation components in the variable layer will increase the ability for the energy attenuation assembly to: (i) have an inner surface that substantially mirrors the outer surface/locus of the player's head/an outer surface/locus derived from the player's head, and/or (ii) apply the idea pressure on the player's head when the protective sports equipment is in the worn, but pre-impact state (see FIG. 53).
- The components (e.g., energy attenuation component) may not be distinctly configured and instead they may be interchangeable with each other. For example, all energy attenuation components may be in the shape of circles, squares, pentagons, hexagons, or any other similar shape. Because the components in this embodiment are interchangeable, said protective sports equipment may include spacers or other modular components that can be used to alter the curvature of the components.
- The components (e.g., shell and/or energy attenuation component) may be coupled to one another in any manner (e.g., mechanical or chemical). For example, the variable layer may be coupled to the shell using mechanical fasteners, such as the retaining system disclosed in U.S. patent Ser. No. 17/878,199, which is incorporated by reference herein. The fixed layer can then be coupled to the variable layer using mechanical fasteners, such as Velcro™ or the coupling system disclosed in U.S. patent Ser. No. 16/940,365, which is incorporated by reference herein. Alternatively, both the fixed and variable layers may be directly coupled to the shell. In a further alternative, the fixed layer may be directly coupled to the shell and the variable layer may be indirectly secured within the shell due to its positioned relationship between the fixed layer and the shell. Also, the energy attenuation components may be stacked on top of one another or directly secured to one another.

The protective sports equipment may include multiple internal shells or thin plastic layers that are positioned between the energy attenuation layers. For example, the fixed layer may be coupled to an internal shell/plastic layer, the internal shell/plastic layer may be coupled to the variable layer, and the variable layer may be coupled to the inner surface of the shell. Alternatively, the fixed layer may be coupled to an internal shell/plastic layer, the internal shell/plastic layer may be coupled to the inner surface of the shell, and the variable layer may be indirectly secured within the shell due to its positioned relationship between the internal shell/plastic layer and the shell. Additionally, the variable layer may be coupled to an internal shell/plastic layer, the internal shell/plastic layer may be coupled to the fixed layer, and the fixed layer may be coupled to the inner surface of the shell. Moreover, the variable layer may be coupled to an internal shell/plastic layer, the internal shell/plastic layer may be coupled to the inner surface of the shell, and the fixed layer may be indirectly secured within the shell due to its positioned relationship between the internal shell/plastic layer and the shell.

The system 10 may not align all players in the same location within the protective sports equipment. Instead, the system 10 may align the center of the mass of the body part with the center of mass of the computerized template. In a further embodiment, the player's head may be move rearward from its initial alignment against the front fixed component 4100, if: (i) the interference fit between the player's head and the upper front variable component 2200 is greater than the ideal fit value, and (ii) initially selected rear variable component 2400 and occipital variable component 2500 are not the smallest sizes. In this embodiment, this rearward movement of the player's head will likely reduce the suggested size of the rear variable component 2400 and occipital variable component 2500.

The system 10 may allow a player or wearer to have the thinnest energy attenuation components in a combination of locations (e.g., rear, and both sides). If the system recommends a combination of the thinnest energy attenuation components, then said system will increase the size of the helmet shell. Said increased size of the helmet shell will result in recommending the utilization of energy attenuation components that are thicker than the thinnest size.

In another embodiment, the optimal, or combination of, pre-manufactured components that "best fit" the player's body part (e.g., head H) does not provide an interference fit between the selected pre-manufactured components and the player's body part when the protective sports equipment (e.g., helmet) is worn by the player, but instead simply selects the protective sports equipment with a combination of pre-manufactured components that has an inner surface that is: (i) larger than the outer surface of the player's body part, but (ii) is the closer to the outer surface of the player's body part then all other combinations of pre-manufactured components. In order to forgo said desirable interference fit, the optimal combination of pre-manufactured components will not be pre-compressed when said protective sports equipment are worn by the player prior to an impact.

In other embodiments, the optimal, or combination of, pre-manufactured components that "best fit" the player's body part (e.g., head H) applies the desired amount of pressure (e.g., between 50 psi and 0 psi) to selected regions of the player's body part (e.g., neck, chest, arms, legs, feet). As such, the optimal combination of pre-manufactured components may be: (i) pre-compressed in certain regions a substantial amount when the protective sports equipment is worn by the player, and (ii) (i) not pre-compressed in other regions when the protective sports equipment is worn by the player.

I. CROSS-REFERENCE TO OTHER APPLICATIONS

PCT Application PCT/US22/42966, U.S. Pat. Nos. 10,362,829, 10,506,841, 10,561,193, 10,721,987, 10,780,338, 10,932,514, 10,948,898, 11,033,796, 11,167,198, 11,399,589, U.S. patent application Ser. Nos. 16/712,879, 16/813,294, 17/135,099, 17/164,667, 17/327,641, 17/647,459, U.S. Provisional Patent Application Ser. Nos. 61/754,469, 61/812,666, 61/875,603, 61/883,087, 62/719,130, 62/778,559, 62/770,453, 63/079,476, 63/157,337, 63/188,836, 63/242,010, U.S. Design Pat. D603,099, D764,716, D850,011, D850,012, D850,013, D946,833, D939,782 D939,151, U.S. Design patent application Nos. 29/797,439, 29/797,453, 29/797,458, 29/829,992, 29/839,498, 29/797,453, the disclosure of which are hereby incorporated by reference in their entirety for all purposes. In the event U.S. patents, U.S. patent applications, or other materials (e.g., articles) have been incorporated by reference conflict with the text contained in this Application, then the text of this Application controls, and terms in this document should not be given a narrower reading in virtue of the way in which those terms are used in other materials incorporated by reference.

J. INDUSTRIAL APPLICATION

As is known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer. In operation, the code is stored within the general-purpose computer platform. At other times, however, the software may be stored at other locations and/or transported for loading into the appropriate general-purpose computer system.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. The server functions may be implemented in a distributed fashion on a number of similar platforms, to distribute the processing load.

Hence, aspects of the disclosed methods and systems outlined above may be embodied in programming. Program aspects of the technology may be thought of as "products" or "articles of manufacture" typically in the form of executable code and/or associated data that is carried on or embodied in a type of machine-readable medium. "Storage" type media includes any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the disclosed methods and systems. Volatile storage media include dynamic memory, such as main memory of such a computer platform. Tangible transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

It is to be understood that the invention is not limited to the exact details of construction, operation, exact materials or embodiments shown and described, as obvious modifications and equivalents will be apparent to one skilled in the art. While the specific embodiments have been illustrated and described, numerous modifications come to mind without significantly departing from the spirit of the invention, and the scope of protection is only limited by the scope of the accompanying claims.

The invention claimed is:

1. A method of designing and assembling an American football helmet for a specific player from a collection of pre-manufactured energy attenuation components that best fit the head of the specific player, the method comprising:

obtaining anatomical data of a specific player's head using a scanning device;

creating a model of the specific player's head from the obtained anatomical data within a computer software program, wherein said model includes an outer surface;

providing a computerized template that includes a plurality of energy attenuation surfaces that are individually associated with a group of pre-manufactured energy attenuation components, wherein each of the pre-manufactured energy attenuation components has a different thickness;

aligning the model of the specific player's head within the computerized template;

determining a plurality of fit values, wherein each of the plurality of fit values is defined as a distance extending from the outer surface of the model of the specific player's head to an energy attenuation surface of the plurality of energy attenuation surfaces;

comparing each of the plurality of fit values to a predefined ideal fit value that provides a desired interference fit with the specific player's head when the helmet is worn in a pre-impact state;

selecting a specific fit value that best fits the predefined ideal fit value;

identifying the pre-manufactured energy attenuation component that is associated with the specific fit value; and installing the identified pre-manufactured energy attenuation component within a helmet shell.

2. The method of claim 1, wherein the model of the specific player's head is generated using photogrammetry.

3. The method of claim 1, wherein the outer surface of the model substantially matches the outer surface of the specific player's head with a hood disposed thereover.

4. The method of claim 1, wherein each energy attenuation surface represents an inner surface of the pre-manufactured energy attenuation components, wherein the inner surface is oriented towards the specific player's head when the helmet is worn by the specific player.

5. The method of claim 1, wherein the identified pre-manufactured energy attenuation component is not interchangeable with another pre-manufactured energy attenuation component in said group.

6. The method of claim 1, wherein each pre-manufactured energy attenuation component is configured to be installed in a specific location within the helmet shell and is incompatible with a different location within the helmet shell.

7. The method of claim 1, wherein the pre-manufactured energy attenuation components form a variable layer when said components are installed in the helmet shell, and wherein the variable layer is configured to be different between helmets for different players in order to account for their anatomical differences.

8. The method of claim 1, wherein the group of pre-manufactured energy attenuation components includes a front pad assembly with a single lower front pad with a single thickness and a plurality of upper front pads, wherein each upper front pad has a a unique thickness, wherein each unique thickness provide a different energy attenuation surface that is evaluated in the step of determining a plurality of fit values.

9. The method of claim 8, wherein the group of pre-manufactured energy attenuation components further includes a plurality of rear variable components, wherein each rear variable component has a unique thickness, and wherein each unique thickness provide a different energy attenuation surface that is evaluated in the step of determining a plurality of fit values.

10. The method of claim 1, wherein when the helmet is worn by the specific player in a pre-impact state, the identified pre-manufactured energy attenuation component applies a pressure of between 0.75 psi and 3 psi on the specific player's head.

11. The method of claim 10, wherein the identified pre-manufactured energy attenuation component that applies a pressure of between 0.75 psi and 3 psi on the specific player's head is a crown pad that is installed within a crown region of the helmet shell.

12. The method of claim 11, wherein the crown pad is installed in the crown region of the helmet shell above a reference line B-B that extends through the helmet shell.

13. A method of designing and assembling an American football helmet for a specific player from a collection of pre-manufactured energy attenuation components that best fit the head of the specific player, the method comprising:

obtaining anatomical data of a specific player's head using a scanning device;

creating a model of the specific player's head from the obtained anatomical data within a computer software program, wherein said model includes an outer surface;

aligning the model of the specific player's head within the computer software program;

providing a plurality of energy attenuation line lengths, wherein an energy attenuation line length corresponds to a pre-manufactured energy attenuation component;

determining a plurality of player line lengths within the computer software program;

determining a first fit value by assessing a difference between a first player line length and a corresponding first energy attenuation line length;

comparing the first fit value to a predefined first ideal fit value that provides a desired interference fit with the specific player's head when the helmet is worn in a pre-impact state;

based upon said comparison, selecting a first pre-manufactured energy attenuation component from amongst a group of the pre-manufactured energy attenuation components;

installing the selected first pre-manufactured energy attenuation component within a helmet shell; and wherein when the helmet is worn by the specific player in a pre-impact state, the selected first pre-manufactured energy attenuation component applies a pressure on the specific player's head.

14. The method of claim 13, comprising:

determining a second fit value by assessing the difference between a second player line length and a corresponding second energy attenuation line length;

comparing the second fit value to a predefined second ideal fit value;

based upon said comparing, selecting a second pre-manufactured energy attenuation component from amongst a group of the pre-manufactured energy attenuation components; and, installing the second pre-manufactured energy attenuation component within the helmet shell.

15. The method of claim 14, wherein (i) the first pre-manufactured energy attenuation component is installed within a first region of the helmet shell and (ii) the second pre-manufactured energy attenuation component is installed within a second region of the helmet shell.

16. The method of claim 13, further comprising:

determining a second fit value by assessing the difference between a second player line length and a corresponding second energy attenuation line length;

comparing the second fit value to a predefined second ideal fit value;

based upon said comparing, selecting from amongst (i) the first pre-manufactured energy attenuation component or (ii) a second pre-manufactured energy attenuation component from amongst the group of the pre-manufactured energy attenuation components; and, installing the selected first or second pre-manufactured energy attenuation component within the helmet shell.

17. The method of claim 13, wherein each energy attenuation line length is defined as extending between a reference point and an energy attenuation surface of a plurality of energy attenuation surfaces individually associated with the group of pre-manufactured energy attenuation components.

18. The method of claim 17, wherein each energy attenuation surface represents an inner surface of the pre-manufactured energy attenuation components.

19. The method of claim 13, wherein each player line length is defined as extending between a reference point within the computer software program to an outer surface of the model of the specific player's head.

20. The method of claim 13, wherein based upon the first fit value, the first pre-manufactured energy attenuation component applies a pressure of between 0.75 psi and 5.0 psi upon the head of the specific player when the American football helmet is in a worn, pre-impact state.

21. The method of claim 13, wherein based upon the first fit value, the first pre-manufactured energy attenuation component applies pressure to form an interference fit with the head of the specific player when the American football helmet is in a worn, pre-impact state.

22. The method of claim 13, wherein the selected first pre-manufactured energy attenuation component is configured to be installed in only one specific location within the helmet shell and cannot be installed in a different location within the helmet shell.

* * * * *